United States Patent
Ogawa et al.

(10) Patent No.: US 8,989,556 B2
(45) Date of Patent: Mar. 24, 2015

(54) RECORDING MEDIUM, PLAYBACK DEVICE, RECORDING DEVICE, AND RECORDING METHOD

(75) Inventors: Tomoki Ogawa, Osaka (JP); Tomohiro Matsumoto, Osaka (JP); Taiji Sasaki, Osaka (JP); Hiroshi Yahata, Osaka (JP); Yoshiichiro Kashiwagi, Arcadia, CA (US)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 163 days.

(21) Appl. No.: 13/824,516
(22) PCT Filed: Aug. 23, 2012
(86) PCT No.: PCT/JP2012/005293
§ 371 (c)(1),
(2), (4) Date: Apr. 3, 2013
(87) PCT Pub. No.: WO2013/027408
PCT Pub. Date: Feb. 28, 2013

(65) Prior Publication Data
US 2013/0279883 A1 Oct. 24, 2013

Related U.S. Application Data

(60) Provisional application No. 61/526,816, filed on Aug. 24, 2011.

(51) Int. Cl.
*H04N 5/92* (2006.01)
*G11B 27/10* (2006.01)
(Continued)

(52) U.S. Cl.
CPC .......... *H04N 13/0055* (2013.01); *G11B 27/105* (2013.01); *G11B 2220/2541* (2013.01); *H04N 5/85* (2013.01); *H04N 13/0003* (2013.01); *H04N 19/30* (2014.11); *H04N 19/597* (2014.11)
USPC .......................................... 386/241; 386/246

(58) Field of Classification Search
None
See application file for complete search history.

(56) References Cited

U.S. PATENT DOCUMENTS

2003/0053797 A1  3/2003 Oshima et al.
(Continued)

FOREIGN PATENT DOCUMENTS

| | | |
|---|---|---|
| EP | 2 343 906 A1 | 7/2011 |
| JP | 3935507 | 6/2007 |

(Continued)

OTHER PUBLICATIONS

International Search Report issued Nov. 6, 2012 in corresponding International Application No. PCT/JP2012/005293.
(Continued)

*Primary Examiner* — William C Vaughn, Jr.
*Assistant Examiner* — Eileen Adams
(74) *Attorney, Agent, or Firm* — Wenderoth, Lind & Ponack, L.L.P.

(57) ABSTRACT

On a recording medium, a monoscopic video specific section and a stereoscopic video specific section are continuous immediately after an extended data specific section. A shared section includes a continuous, interleaved arrangement having one each of main-view extents, sub-view extents, and extended extents. The stereoscopic video specific section includes a continuous, interleaved arrangement of extents having one each of the main-view extents and the sub-view extents. The monoscopic video specific section includes a continuous arrangement of a copy of the main-view extent arranged in the stereoscopic video specific section. The extended data specific section includes one of the extended extents that is to be used in combination with the copy of the main-view extent arranged in the monoscopic video specific section. The shared section is accessed when stereoscopic video images are played back, when monoscopic video images are played back, and when an extended stream is used. The stereoscopic video specific section is accessed during playback of the stereoscopic video images. The monoscopic video specific section is accessed during playback of the monoscopic video images. The extended data specific section and the monoscopic video specific section are accessed when the extended stream is read, immediately before or after a long jump.

6 Claims, 64 Drawing Sheets

(51) Int. Cl.
*H04N 5/85* (2006.01)
*H04N 13/00* (2006.01)
*H04N 19/30* (2014.01)
*H04N 19/597* (2014.01)

(56) References Cited

U.S. PATENT DOCUMENTS

| | | |
|---|---|---|
| 2010/0067873 A1 | 3/2010 | Sasaki et al. |
| 2010/0303444 A1 | 12/2010 | Sasaki et al. |
| 2011/0013884 A1 | 1/2011 | Sasaki et al. |
| 2011/0033170 A1 | 2/2011 | Ikeda et al. |
| 2011/0158604 A1 | 6/2011 | Sasaki et al. |
| 2011/0187817 A1 | 8/2011 | Sasaki et al. |

FOREIGN PATENT DOCUMENTS

| | | |
|---|---|---|
| JP | 2011-4411 | 1/2011 |
| WO | 2010/073499 | 7/2010 |

OTHER PUBLICATIONS

Blu-ray Disc Association, "White Paper Blu-ray Disc™ Format", [online], Dec. 2012, http://www.blu-raydisc.com/en/Technical/TechnicalWhitepapers/General.aspex.

Extended European Search Report issued Aug. 26, 2014 in corresponding European Application No. 12825215.2.

FIG.3A

| PID = 0x1011 | Primary video stream |
|---|---|
| 0x1100 | Primary audio stream |
| 0x1101 | Primary audio stream |
| 0x1200 | PG stream |
| 0x1201 | PG stream |
| 0x1400 | IG stream |
| 0x1A00 | Secondary audio stream |
| 0x1B00 | Secondary video stream |

| PID = 0x1012 | Primary video stream |
|---|---|
| 0x1220 | Left-view PG stream |
| 0x1221 | Left-view PG stream |
| 0x1240 | Right-view PG stream |
| 0x1241 | Right-view PG stream |
| 0x1420 | Left-view IG stream |
| 0x1440 | Right-view IG stream |
| 0x1B20 | Secondary video stream |

| PID = 0x1013 | Primary video stream |
|---|---|
| 0x1260 | Depth map PG stream |
| 0x1261 | Depth map IG stream |
| 0x1460 | Depth map IG stream |
| 0x1B40 | Secondary video stream |

| PID = 0x1014 | Resolution extension information |
|---|---|

- 331

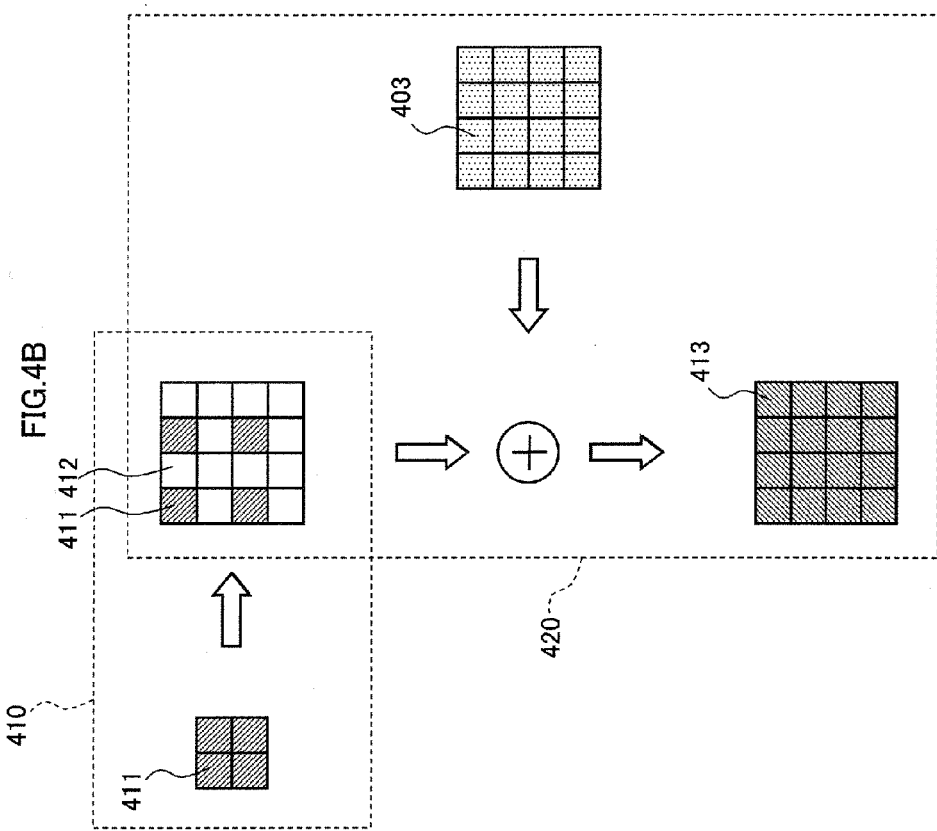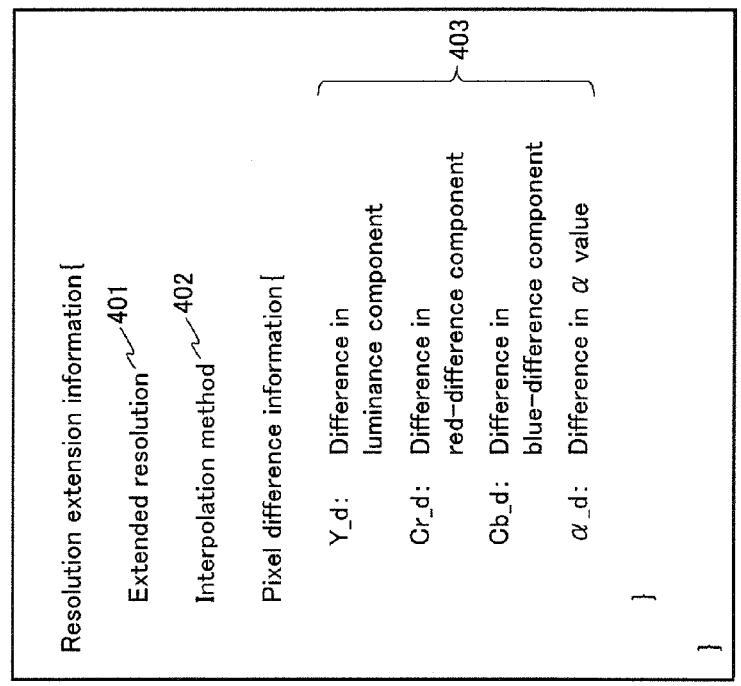

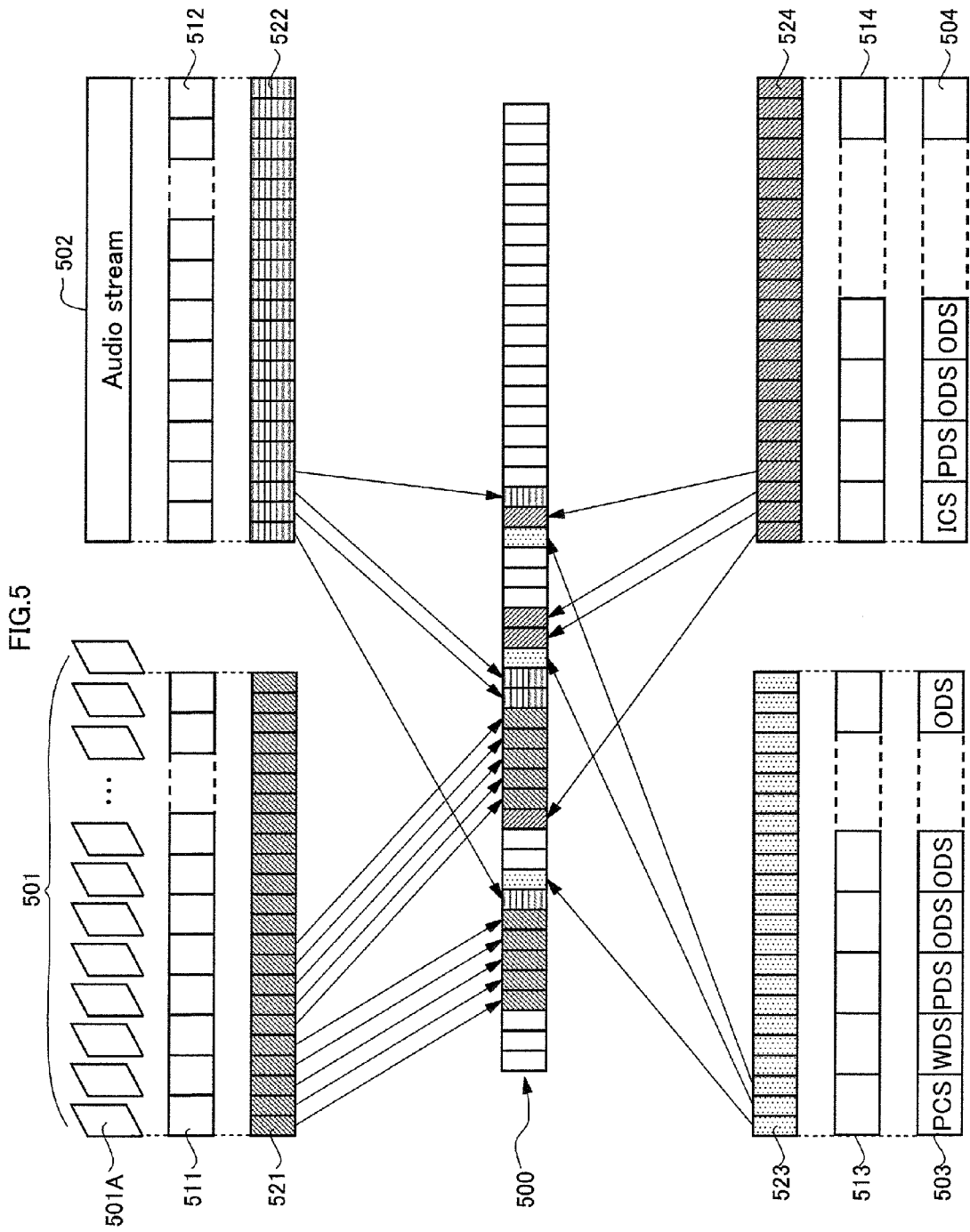

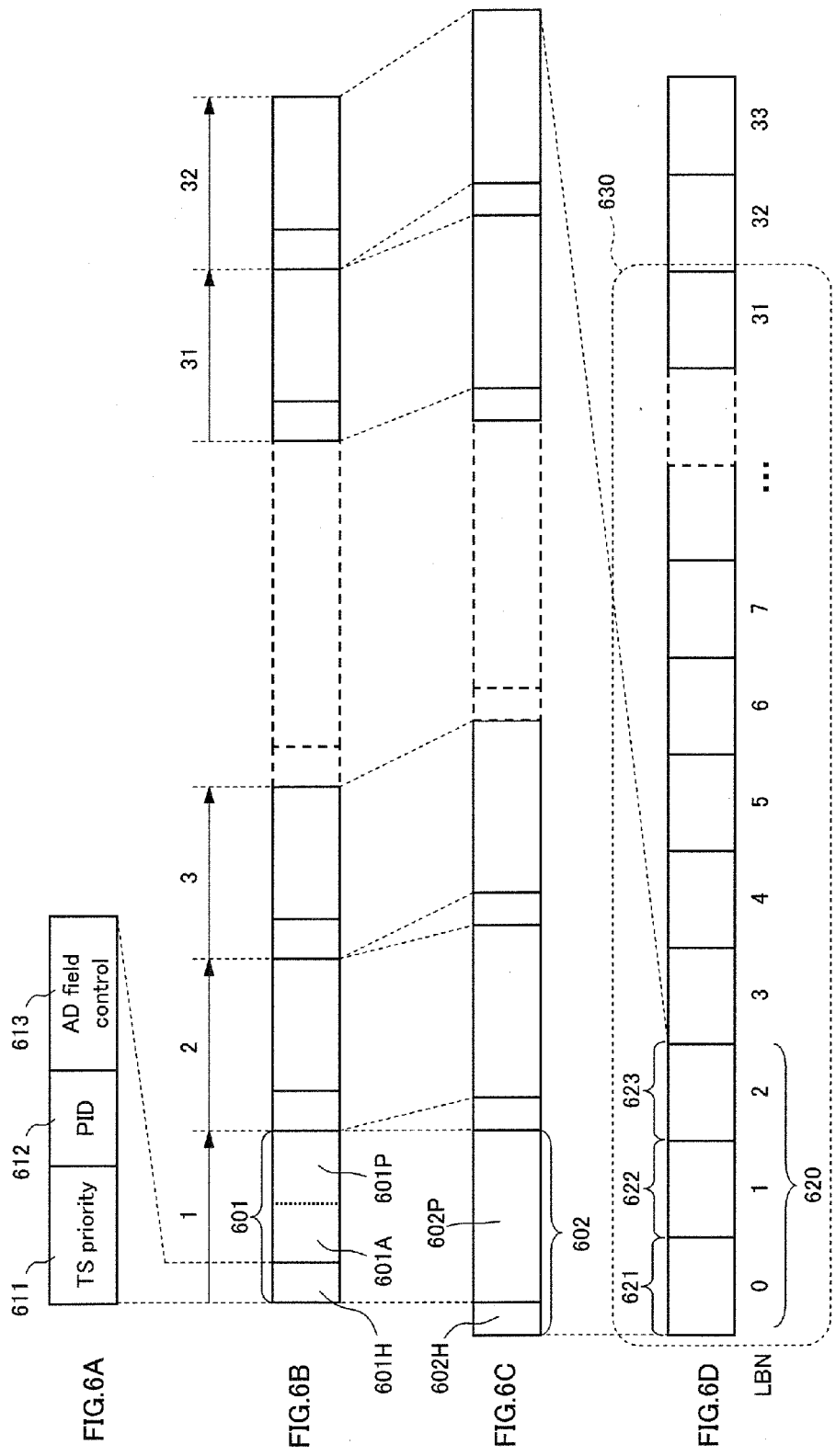

FIG.18

| $S_{JUMP}$ (sectors) | 0 | 1 – 10000 | 10001 – 20000 | 20001 – 40000 | 40000 – 1/10 stroke | 1/10 stroke or greater |
|---|---|---|---|---|---|---|
| $T_{JUMP-MAX}$ (ms) | $0 = T_{JUMP0}$ | 200 | 300 | 350 | 700 | 1400 | ot # RECORDING MEDIUM, PLAYBACK DEVICE, RECORDING DEVICE, AND RECORDING METHOD

This application is the National Stage of International Application No. PCT/JP2012/005293, filed Aug. 23, 2012, which claims the benefit of U.S. Provisional Application No. 61/526,816, filed Aug. 24, 2011.

TECHNICAL FIELD

The present invention relates to a technology for recording and playback of stereoscopic video images, i.e., 3D video images, and especially to the structure of stream data on a recording medium.

BACKGROUND ART

In recent years, movies featuring 3D video images have gained popularity. This causes people to become familiar with household playback devices that can playback 3D video content from recording media such as optical discs. Household recording devices that can record 3D television programs on recording media and household video cameras that can record 3D video images have also been developed. It is preferable that, on recording media handled by such devices, 3D video content can be recorded in such a way to be also played back as monoscopic video images, i.e., as 2D video content. More specifically, it is preferable that the 3D video content recorded on the recording media allows 2D playback devices to play back 2D video images and 3D playback devices to play back 3D video images. Here, "2D playback devices" refer to conventional playback devices that can only play back 2D video images, whereas "3D playback devices" refer to playback devices that can play back 3D video images. It is assumed in this description that a 3D playback device can also play back conventional 2D video images.

FIG. 64 is a schematic diagram illustrating the technology for ensuring the compatibility of an optical disc storing 3D video content with 2D playback devices (see, for example, Patent Document 1). Two types of video streams are stored in an optical disc PDS: One is a 2D/left-view video stream, and the other is a right-view video stream. The "2D/left-view video stream" is used for 3D video playback to represent 2D video images to be shown to the left eye of a viewer, i.e., "left views," and is used for 2D video playback to constitute 2D video images themselves. The "right-view video stream" is used for 3D video playback to represent 2D video images to be shown to the right eye of the viewer, i.e., "right views." The left- and right-view video streams have the same frame rate but different presentation times shifted from each other by half a frame period. For example, when the frame rate of the 2D/left- and right-view video streams is 24 frames per second, the frames of the video streams are alternately displayed every 1/48 seconds.

As shown in FIG. 64, the left- and right-view video streams are divided into a plurality of extents EX1A-C and EX2A-C, respectively, on the optical disc PDS. An "extent" is the smallest unit of data that can be read from the optical disc drive (see "Supplement" for details). Each extent contains at least one group of pictures (GOP). Hereinafter, the extents belonging to the 2D/left-view video stream are referred to as "2D/left-view extents," and the extents belonging to the right-view video stream are referred to as "right-view extents." The 2D/left-view extents EX1A-C and the right-view extents EX2A-C are alternately arranged on a track TRC of the optical disc PDS. Such an arrangement of extents is referred to as an "interleaved arrangement." A group of extents recorded in an interleaved arrangement on a recording medium is used both in 3D video playback and 2D video image playback, as described below.

From the optical disc PDS, a 2D playback device PL2 causes an optical disc drive DD2 to read only the 2D/left-view extents EX1A-C in order, skipping the reading of right-view extents EX2A-C. Furthermore, an image decoder VDC sequentially decodes the extents read by the optical disc drive DD2 into video frames VFL. In this way, a display device DS2 only displays left views, and viewers can watch normal 2D video images.

A 3D playback device PL3 causes an optical disc drive DD3 to alternately read 2D/left- and right-view extents from the optical disc PDS. When expressed as codes, the extents are read in the order of EX1A, EX2A, EX1B, EX2B, EX1C, and EX2C. Furthermore, from among the read extents, those belonging to the 2D/left- and right-view video streams are supplied to a left-video decoder VDL and a right-video decoder VDR, respectively. The video decoders VDL and VDR alternately decode the video streams into video frames VFL and VFR. As a result, left and right views are alternately displayed on a display device DS3. In synchronization with the switching of the views by the display device DS3, shutter glasses SHG cause its left and right lenses to become opaque alternately. Therefore, the left views are shown only to the viewer's left eye, and the right views are only to the viewer's right eye. At this point, the viewer perceives differences in shape between the left and right views as binocular parallax, and thus sees the pair of 2D video images displayed by the display device DS3 as one 3D video image.

The above-described interleaved arrangement of extents is used when 3D video content is stored on any recording medium, not only on an optical disc. This allows the recording medium to be used both for 2D and 3D video playbacks.

CITATION LIST

Patent Literature

[Patent Literature 1]
Japanese Patent No. 3935507
[Non-Patent Literature 1]
Blu-ray Disc Association, "White Paper Blu-ray Disc TM Format," [online], October, 2010, http://www.blu-raydisc.com/en/Technical/TechnicalWhitepapers/General.aspx

SUMMARY OF INVENTION

Technical Problem

In recent years, the development of 4K2K, one of the next-generation display technologies, has been advanced. "4K2K" is the technology for displaying video images at a high resolution of 3940×2160 pixels, which is approximately four times the conventional resolution of 1920×1080 pixels. If the screen size is fixed, the representation of video images becomes finer as the resolution increases. Therefore, 4K2K is a promising technology for achieving a further increase in image quality. At the same time, during the development of 4K2K, importance is being placed on ensuring compatibility with schemes of displaying video images at conventional resolutions. In particular, when 4K2K video content is recorded on a recording medium, it is preferable that a conventional 2D playback device be able to play back the video content at a conventional resolution. Accordingly, one current suggestion is to divide 4K2K video content into first and second portions, and then record both the portions on a recording medium: the first portion represents the video content at a conventional resolution, and the second portion includes extended data necessary for converting the resolution of the first portion into the 4K2K resolution. A conventional playback device is allowed to read only the first portion from the recording medium, and then play back video images at a conventional resolution from the first portion. On the other hand, a 4K2K-compatible playback device is allowed to read both the first and second portions from the recording medium, and then play back video images at the 4K2K resolution from these portions. This approach enables the 4K2K video content to be used to play back video images both at the conventional resolution and at the 4K2K resolution.

As another technology striving for a further increase in image quality, increasing the number of bits in the color information of each pixel from the current value "8" to "12," for example, has also been developed. This technology is referred to as "bit extension." Since increase in the number of bits in the color information enables each pixel to express a richer variety of colors, the bit extension holds the promise of a further increase in image quality. In order to preserve compatibility with conventional technologies, the bit extension also adopts a suggestion to separate bit-extended content into a portion representing 8-bit color information and another portion of extended data necessary for converting the 8-bit color information into 12-bit one or the like, and then to record both the portions on a recording medium.

In addition to 4K2K and bit extension, various technologies for further improvement in the quality of video content or the diversity of its attributes represent video content as a combination of conventional video content and extended data in order to preserve compatibility with conventional technologies. On the other hand, the above-described technology for recording and playback of 3D video images allows 3D video content to be compatible with 2D playback devices by adding extended data, i.e., the right-view video stream, to 2D video content, i.e., the 2D/left-view video stream. Accordingly, it is expected that incorporating extended data for 4K2K, bit extension, or the like, into 3D video content enables recording of the 3D video content on recording media in a structure to be usable for all of these technologies. Such recording of the 3D video content, however, is not easy in practice for the following reasons.

As shown in FIG. 64, when 2D video images are played back from extents placed in an interleaved arrangement, the optical disc drive DD2 skips reading of the right-view extents EX2A-C. This operation is referred to as a "jump." During a jump period, data is not provided from the optical disc drive DD2 to a buffer built in the image decoder VDC, and therefore the data stored in the buffer decreases because of being processed by the image decoder VDC. Accordingly, in order to allow the 2D playback device PL2 to seamlessly play back 2D video images, each of the 2D/left-view extents EX1A-C has to be designed to have a lower limit of its data amount, i.e., a minimum extent size, so that buffer underflow does not occur during the jump period.

When 3D video images are played back from the same extents, the optical disc drive DD2 does not read the right-view extents EX2A-C while being read the 2D/left-view extents EX1A-C. Therefore, during this period, the data of the right-view extents EX2A-C stored in a buffer built in the right-video decoder VDR decreases because of being processed by the right-video decoder VDR. Conversely, the optical disc drive DD2 does not read the 2D/left-view extents EX1A-C while being read the right-view extents EX2A-C. Therefore, during this period, the data of the 2D/left-view extents EX1A-C stored in another buffer built in the left-video decoder VDL decreases because of being processed by the left-video decoder VDL. As a result, in order to allow the 3D playback device PL3 to seamlessly play back 3D video images, each of the extents EX1A-C and EX2A-C has to be designed to have a minimum extent size so that buffer underflow does not occur during the period when the next extent is read.

Furthermore, since the read rate of an optical disc drive is higher than the processing rate of a video decoder, a buffer that stores the data of an extent has an increasing data amount while the optical disc drive is reading the extent. In order to prevent the buffer from overflow without providing an excessive capacity, each extent is required to have an upper limit of its data amount, i.e., a maximum extent size.

As described above, recording of 3D video content on a recording medium requires that the size of each extent satisfy a plurality of conditions. Accordingly, addition of extended data to the 3D video content further requires that an arrangement of the extended data do not violate any of these conditions. Such an arrangement is never obvious even to a person of ordinary skill in the art.

In an optical disc that includes multiple recording layers, such as a so-called two-layer disc, a series of video content is sometimes recorded across two layers. On a single layer disc as well, a series of video content may be recorded with other data included therebetween. While an optical disc drive is reading such a series of video content, the pickup of the optical disc drive has to perform a focus jump to switch between layers and a track jump to move in the radial direction of the optical disc.

These jumps typically have long seek times and are therefore referred to as "long jumps." In order to cause a video decoder to play back video images seamlessly despite the occurrence of a long jump, the extent to be accessed immediately before the long jump needs to has a sufficiently large size, so that buffer underflow does not occur during the long jump.

In order to prevent buffer underflow from occurring during a long jump, the sizes of extents typically satisfy different conditions for playback of 2D video images and for playback of 3D video images. The extents in an interleaved arrangement as shown in FIG. 64, however, must satisfy both the conditions for playback of 2D video images and for playback of 3D video images. Accordingly, the size of each right-view extent typically far exceeds the value necessary for seamless playback of 3D video images. As a result, a 3D playback device has to ensure a buffer capacity within its right view decoder much larger than the value necessary for seamless playback of 3D video images. This is not preferable, since this situation prevents a further reduction in the buffer capacity within the 3D playback device and further improvement in the efficiency of memory usage.

The following technology, for example, has been proposed as one that prevents buffer underflow from occurring in playback devices during long jumps, and in addition, provides further reduced buffer capacity to 3D playback devices. This technology provides the data recording areas of a recording medium with a first area that is accessed only during playback of 2D video images and a second area that is accessed only during playback of 3D video images; the first and second areas are located immediately before or after a location where a long jump is required. Extents representing the same left view are duplicated in the first and second areas, and an extent representing the right view that is paired with the left view is recorded in the second area. As a result, the sizes of the extents recorded in the first area only have to satisfy the conditions for preventing buffer underflow from occurring during a long jump performed in 2D video playback. On the other hand, the size of the extents recorded in the second area only have to satisfy the conditions for preventing buffer underflow from occurring during a long jump performed in 3D video playback. This technology therefore enables seamless playback of both 2D and 3D video images and in addition, further reduction in buffer capacity of 3D playback devices.

As described above, the data recording areas of a recording medium include a more complicated arrangement of extents immediately before or after a location where a long jump is required. Accordingly, it is never obvious even to a person of ordinary skill in the art how extended data, when added to 3D video content, should be arranged immediately before and after a location where a long jump is required.

An object of the present invention is to solve the above-discussed problems, in particular, to provide a recording medium including a combination of 3D video content and extended data recorded thereon so as to enable a playback device to maintain good playback performance.

Solution to Problem

In one aspect of the present invention, a recording medium includes a main-view stream, a sub-view stream, and an extended stream recorded thereon. The main-view stream represents main views of stereoscopic video images. The sub-view stream represents sub-views of the stereoscopic video images. The extended stream is used in combination with the main-view stream. The main-view stream includes a plurality of main-view extents, the sub-view stream includes a plurality of sub-view extents, and the extended stream includes a plurality of extended extents. The recording medium comprises a shared section, a stereoscopic video specific section, a monoscopic video specific section, and an extended data specific section. The shared section includes a continuous, interleaved arrangement of extents having one each of the plurality of main-view extents, the plurality of sub-view extents, and the plurality of extended extents. The stereoscopic video specific section includes a continuous, interleaved arrangement of extents having one each of the plurality of main-view extents and the plurality of sub-view extents. The monoscopic video specific section is located adjacent to the stereoscopic video specific section and includes a continuous arrangement of a copy of the main-view extent arranged in the stereoscopic video specific section. The extended data specific section is located immediately before a continuous arrangement of the stereoscopic video specific section and the monoscopic video specific section and includes one of the plurality of extended extents that is to be used in combination with the copy of the main-view extent arranged in the monoscopic video specific section. The shared section is accessed when the stereoscopic video images are played back, when the main views are played back as monoscopic video images, and when the extended stream is used in combination with the main-view stream. The stereoscopic video specific section is accessed during playback of the stereoscopic video images, next to the shared section immediately before start of a long jump, or ahead of the shared section immediately after completion of a long jump. The monoscopic video specific section is accessed during playback of the monoscopic video images, next to the shared section immediately before start of a long jump, or ahead of the shared section immediately after completion of a long jump. The extended data specific section and the monoscopic video specific section are accessed when the extended stream is read along with the main-view stream, next to the shared section immediately before start of a long jump, or ahead of the shared section immediately after completion of a long jump.

In another aspect of the present invention, a playback device is for reading a main-view stream, a sub-view stream, and an extended stream from a recording medium, and for playing back stereoscopic video images, playing back main views as monoscopic video images, and using the extended stream in combination with the main-view stream. The playback device comprises a read unit, a switching unit, a first read buffer, a second read buffer, a third read buffer, and a decoding unit. The read unit is configured to read data from the recording medium. The switching unit is configured to extract the main-view stream, the sub-view stream, and the extended stream from the data read by the read unit. The first read buffer is for storing the main-view stream extracted by the switching unit. The second read buffer is for storing the sub-view stream extracted by the switching unit. The third read buffer is for storing the extended stream extracted by the switching unit. The decoding unit is configured to read and decode the main-view stream from the first read buffer, the sub-view stream from the second read buffer, and the extended stream from the third read buffer. The read unit accesses the shared section on the recording medium when the stereoscopic video images are played back, when the main views are played back as monoscopic video images, and when the extended stream is used in combination with the main-view stream. The read unit accesses the stereoscopic video specific section during playback of the stereoscopic video images, next to the shared section on the recording medium immediately before performing a long jump, or ahead of the shared section immediately after performing a long jump. The read unit accesses the monoscopic video specific section during playback of the monoscopic video images, next to the shared section on the recording medium immediately before performing a long jump, or ahead of the shared section immediately after performing a long jump. The read unit accesses the extended data specific section and the monoscopic video specific section when reading the extended stream along with the main-view stream, next to the shared section on the recording medium immediately before performing a long jump, or ahead of the shared section on the recording medium immediately after performing a long jump.

Advantageous Effects of Invention

In the above-described aspect of the present invention, the playback device, when reading data from the recording medium, accesses different sections on the recording medium immediately before or after performing a long jump during playback of stereoscopic video images, playback of monoscopic video images, and use of the extended stream in combination with the main-view stream. As a result, the sizes of extents arranged in the different sections may separately satisfy different conditions for preventing buffer underflow from occurring during the long jump. This enables the playback device to seamlessly play back both stereoscopic video images and monoscopic video images, and in addition, to ensure a further reduced buffer capacity. Furthermore, the same monoscopic video specific section is accessed both during playback of the monoscopic video images and during use of the extended stream in combination with the main-view stream. As a result, the data amount of the main-view extents to be redundantly recorded on a single recording medium is reduced to a minimum. Accordingly, playback of stereoscopic video images, playback of monoscopic video images, and use of the extended stream in combination with the main-view stream all can include only long jumps with distances falling within acceptable ranges. The above-defined recording medium thus includes a combination of 3D video content and extended data recorded thereon so as to enable the playback device to maintain good playback performance.

BRIEF DESCRIPTION OF DRAWINGS

FIG. 3A is a list of elementary streams multiplexed in a main TS on the BD-ROM disc shown in FIG. 1, FIG. 3B is an example of a list of elementary streams multiplexed in a sub-TS on the BD-ROM disc, FIG. 3C is another example of a list of elementary streams multiplexed in the sub-TS on the BD-ROM disc, and FIG. 3D is a list of elementary streams multiplexed in an extended stream on the BD-ROM disc;

FIG. 4A is a table showing the data structure of resolution extension information, and FIG. 4B is a schematic diagram showing the role of resolution extension information in the process to extend a full HD video frame to a 4K2K video frame;

FIG. 5 is a schematic diagram showing an arrangement of TS packets in multiplexed stream data;

FIG. 6A is a schematic diagram showing a data structure of a TS header, FIG. 6B is a schematic diagram showing a format of a TS packet sequence comprising multiplexed stream data; FIG. 6C is a schematic diagram of a format of a source packet sequence composed of a TS packet sequence in multiplexed stream data, and FIG. 6D is a schematic diagram showing sectors located in a volume area of the BD-ROM disc, in which a sequence of source packets are continuously recorded;

FIG. 18 is an example of a correspondence table between jump distances $S_{JUMP}$ and maximum jump times $T_{JUMP\text{-}MAX}$ for a BD-ROM disc;

DESCRIPTION OF EMBODIMENTS

The following describes embodiments of the present invention with reference to the drawings.

Embodiment 1

1: System Structure

Figure 1:
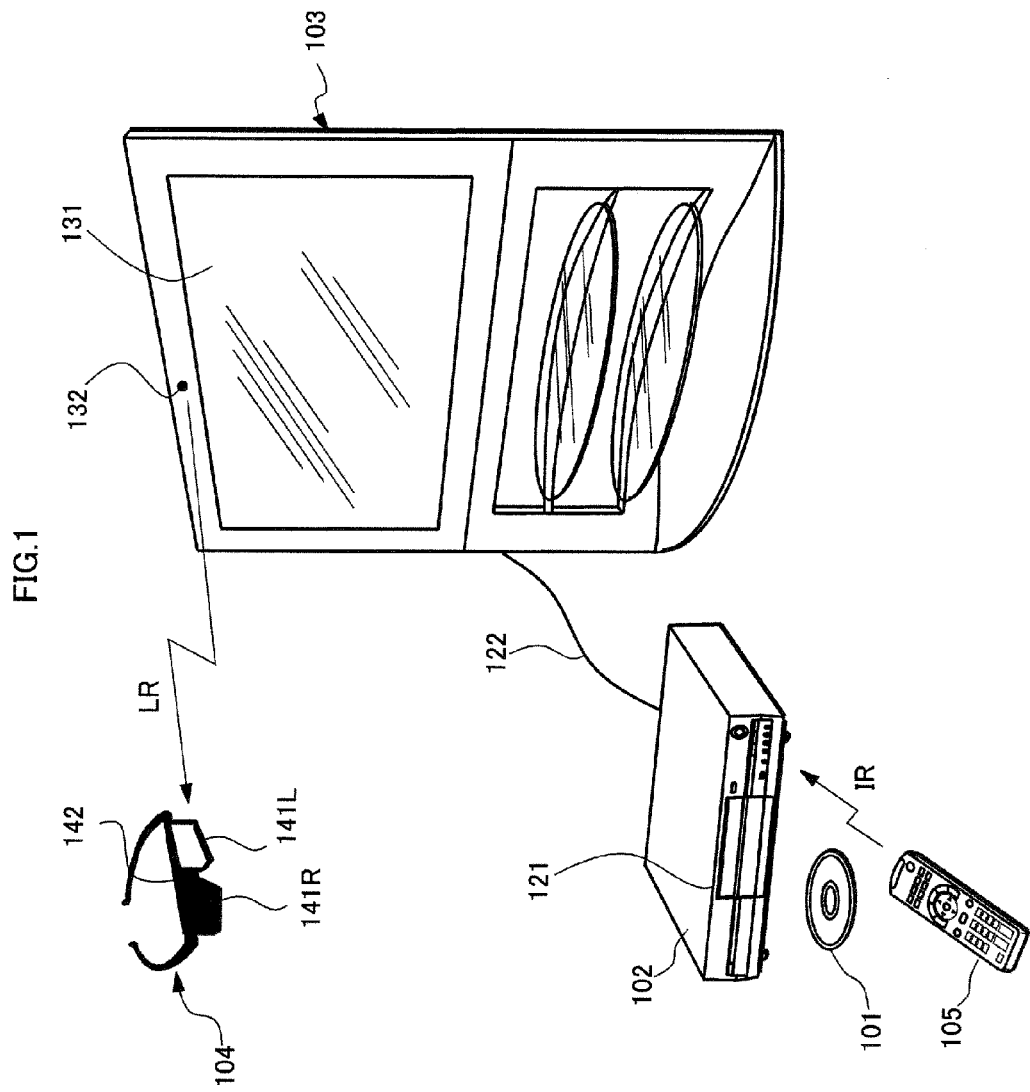
FIG. 1 is a schematic diagram showing a home theater system that uses a recording medium according to Embodiment 1 of the present invention.

FIG. 1 is a schematic diagram showing a home theater system that uses a recording medium according to Embodiment 1 of the present invention. In addition to 2D video images and 3D video images at 1920×1080 pixels (hereinafter referred to as full HD (full High Definition)), this home theater system can display 2D video images in 4K2K. As shown in FIG. 1, this home theater system plays back a recording medium 101 and includes a playback device 102, a display device 103, shutter glasses 104, and a remote control 105.

The recording medium 101 is a read-only Blu-ray disc (BD, registered trademark), i.e. a BD-ROM disc, and in particular is a multi-layer disc that includes a plurality of recording layers. The BD-ROM disc 101 stores movie content. This content includes a video stream representing 2D video images in full HD, a video stream representing 3D video images, and a video stream representing 2D video images in 4K2K. These video streams are arranged on the BD-ROM disc 101 in units of extents and are accessed using a file structure described below.

A BD-ROM drive 121 is mounted on the playback device 102. The BD-ROM drive 121 is an optical disc drive conforming to the BD-ROM format. The playback device 102 uses the BD-ROM drive 121 to read content from the BD-ROM disc 101. The playback device 102 further decodes the content into video data/audio data. The playback device 102 can play the content back as 2D video images, as 3D video images, or as 2D video images in 4K2K. Hereinafter, the operational mode of the playback device 102 is referred to as "2D playback mode" when playing back full HD 2D video images, as "3D playback mode" when playing back 3D video images, and as "extended playback mode" when playing back 2D video images in 4K2K.

The playback device 102 is connected to the display device 103 via a High-Definition Multimedia Interface (HDMI) cable 122. The playback device 102 converts the video data/audio data into a video signal/audio signal in the HDMI format and transmits the signals to the display device 103 via the HDMI cable 122. Additionally, the playback device 102 exchanges CEC messages with the display device 103 via the HDMI cable 122. The playback device 102 can thus ask the display device 103 whether it supports playback of 3D video images and of video images at 4K2K.

The display device 103 is a liquid crystal display. The display device 103 displays video on the screen 131 in response to a video signal, and causes the speakers to produce audio in response to an audio signal. The display device 103 supports playback of 3D video images and of video images at 4K2K. During playback of 2D video images, either the left view or the right view is displayed on the screen 131. During playback of 3D video images, the left view and right view are alternately displayed on the screen 131.

The display device 103 includes a left/right signal transmitting unit 132. The left/right signal transmitting unit 132 transmits a left/right signal LR to the shutter glasses 104 via infrared rays or by radio transmission. The left/right signal LR indicates whether the image currently displayed on the screen 131 is a left-view or a right-view image. During playback of 3D video images, the display device 103 detects switching of frames by distinguishing between a left-view frame and a right-view frame based on a control signal that accompanies a video signal. Furthermore, the display device 103 causes the left/right signal transmitting unit 132 to switch the left/right signal LR synchronously with the detected switching of frames.

The shutter glasses 104 include two liquid crystal display panels 141L and 141R and a left/right signal receiving unit 142. The liquid crystal display panels 141L and 141R respectively constitute the left and right lens parts. The left/right signal receiving unit 142 receives a left/right signal LR, and in accordance with changes therein, transmits the signal to the left and right liquid crystal display panels 141L and 141R. In response to the signal, each of the liquid crystal display panels 141L and 141R either lets light pass through the entire panel or shuts light out. For example, when the left/right signal LR indicates a left-view display, the liquid crystal display panel 141L for the left eye lets light pass through, while the liquid crystal display panel 141R for the right eye shuts light out. When the left/right signal LR indicates a right-view display, the display panels act oppositely. The two liquid crystal display panels 141L and 141R thus alternately let light pass through in sync with the switching of frames. As a result, when the viewer looks at the screen 131 while wearing the shutter glasses 104, the left view is shown only to the viewer's left eye, and the right view is shown only to the right eye. The viewer is made to perceive the difference between the images seen by each eye as the binocular parallax for the same stereoscopic object, and thus the video image appears to be stereoscopic.

The remote control 105 includes an operation unit and a transmitting unit. The operation unit includes a plurality of buttons. The buttons correspond to each of the functions of the playback device 102 and the display device 103, such as turning the power on or off, starting or stopping playback of the BD-ROM disc 101, etc. The operation unit detects when the user presses a button and conveys identification information for the button to the transmitting unit as a signal. The transmitting unit converts this signal into a signal IR and outputs it via infrared rays or radio transmission to the playback device 102 or the display device 103. On the other hand, the playback device 102 and display device 103 each receive this signal IR, determine the button indicated by this signal IR, and execute the function associated with the button. In this way, the user can remotely control the playback device 102 or the display device 103.

2: Data Structure of the BD-ROM Disc

Figure 2:
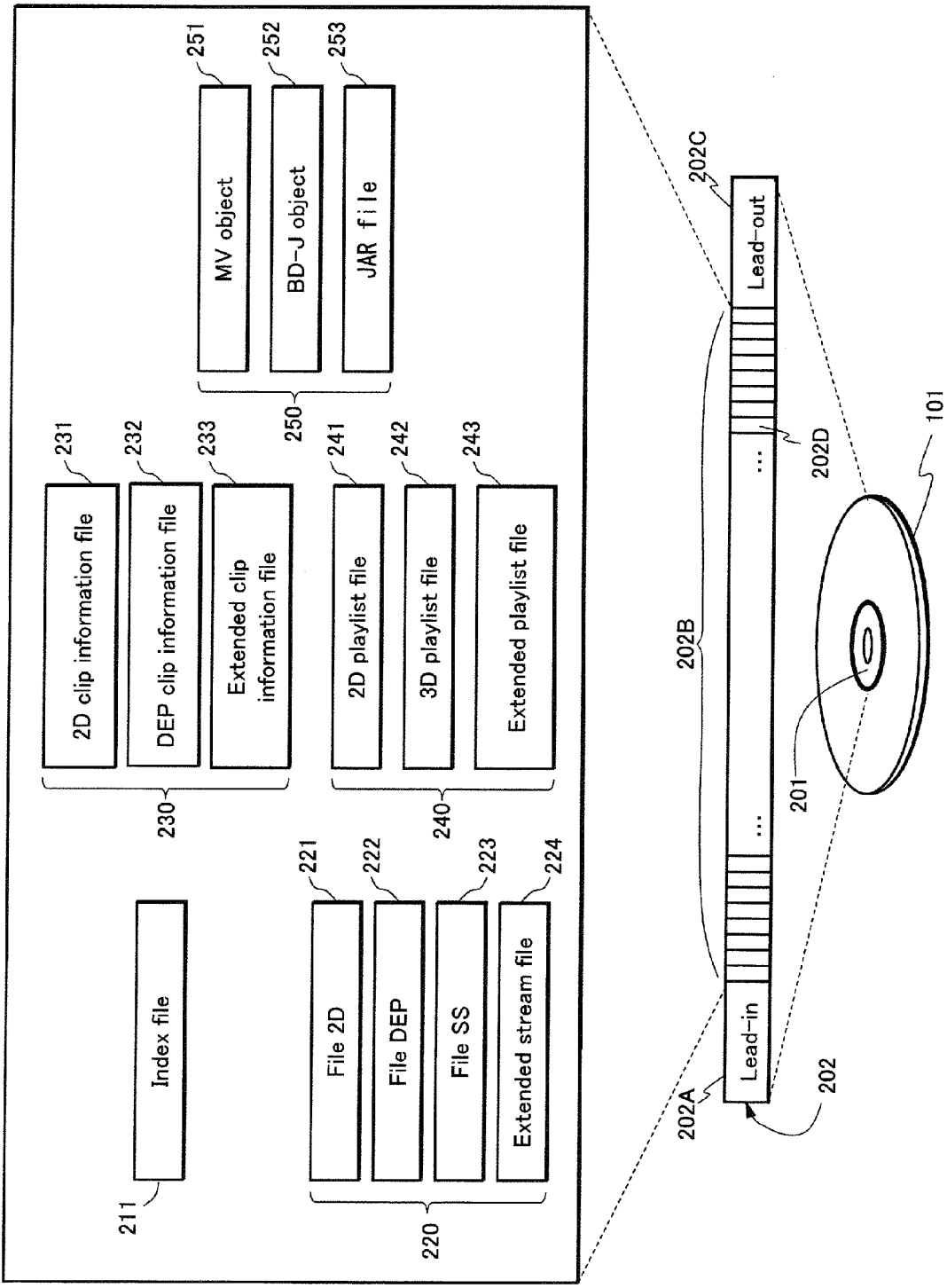
FIG. 2 is a schematic diagram showing the data structure of a BD-ROM disc shown in FIG. 1.

FIG. 2 is a schematic diagram showing the data structure of a BD-ROM disc 101. As shown in FIG. 2, a Burst Cutting Area (BCA) 201 is provided at the innermost part of the data recording area on the BD-ROM disc 101. Only the BD-ROM drive 121 is permitted to access the BCA, and access by application programs is prohibited. The BCA 201 can thus be used as technology for copyright protection. In the data recording area outside of the BCA 201, tracks spiral from the inner to the outer circumference. In FIG. 2, a track 202 is schematically extended in a transverse direction. The left side represents the inner circumferential part of the disc 101, and the right side represents the outer circumferential part. As shown in FIG. 2, track 202 contains a lead-in area 202A, a volume area 202B, and a lead-out area 202C in order from the inner circumference. The lead-in area 202A is provided immediately on the outside edge of the BCA 201. The lead-in area 202A includes information necessary for the BD-ROM drive 121 to access the volume area 202B, such as the size, the physical address, etc. of the data recorded in the volume area 202B. The lead-out area 202C is provided on the outermost circumferential part of the data recording area and indicates the end of the volume area 202B. The volume area 202B includes application data such as video images, audio, etc.

The volume area 202B is divided into small areas 202D called "sectors." The sectors have a common size, for example 2048 bytes. Each sector 202D is consecutively assigned a serial number in order from the top of the volume area 202B. These serial numbers are called logical block numbers (LBN) and are used in logical addresses on the BD-ROM disc 101. During reading of data from the BD-ROM disc 101, data to be read is specified through designation of the LBN for the destination sector. The volume area 202B can thus be accessed in units of sectors. Furthermore, on the BD-ROM disc 101, logical addresses are substantially the same as physical addresses. In particular, in an area where the LBNs are consecutive, the physical addresses are also substantially consecutive. Accordingly, the BD-ROM drive 121 can consecutively read data from sectors having consecutive LBNs without making the optical pickup perform a seek.

The data recorded in the volume area 202B is managed under a predetermined file system. Universal Disc Format (UDF) is adopted as this file system. Alternatively, the file system may be ISO9660. The data recorded on the volume area 202B is represented in a directory/file format in accordance with the file system (see "Supplement" for details). In other words, the data is accessible in units of directories or files.

As further shown in FIG. 2, an index file 211, an AV (audio-visual) stream file 220, a clip information file 230, a playlist file 240, and a BD program file 250 are recorded in the volume area 202B. The AV stream file 220 includes a file 2D 221, a file dependent (file DEP) 222, a stereoscopic interleaved file (SSIF; hereinafter referred to as a file SS) 223, and an extended stream file 224. The clip information file 230 includes a 2D clip information file 231, a dependent-view (DEP) clip information file 232, and an extended clip information file 233. The playlist file 240 includes a 2D playlist file 241, a 3D playlist file 242, and an extended playlist file 243. The BD program file 250 includes a movie (MV) object file 251, a BD-J (BD Java (registered trademark)) object file 252, and a Java archive (JAR) file 253.

The "index file" 211 contains information for managing as a whole the content recorded on the BD-ROM disc 101. In particular, this information includes both information to make the playback device 102 recognize the content, as well as an index table. The index table is a correspondence table between titles and BD program files constituting the content. A "BD program file" is a file storing objects. An "object" is a program for controlling operations of the playback device 102. Object types are a MV object and a BD-J (BD-J) object.

An "AV stream file" 220 refers to a file, from among an actual video content recorded on a BD-ROM disc 101, that complies with the file format determined by the file system. Such an actual video content generally refers to stream data in which different types of stream data representing video, audio, subtitles, etc., i.e. elementary streams, have been multiplexed. This multiplexed stream data has three types: a main transport stream (TS), a sub-TS, and an extended stream.

A "main TS" is multiplexed stream data that includes a base-view video stream as a primary video stream. A "base-view video stream" is a video stream that can be played back independently and that represents full HD 2D video images. Note that a base-view is also called a "main-view."

A "sub-TS" is multiplexed stream data that includes a dependent-view video stream as a primary video stream. A "dependent-view video stream" is a video stream that requires a base-view video stream for playback and represents 3D video images by being combined with the base-view video stream. Note that a dependent-view is also called a "sub-view." The types of dependent-view video streams are a right-view video stream, left-view video stream, and depth map stream. When 2D video images represented by a base-view video stream are used by a playback device as the left view of 3D video images, the "right-view video stream" is used as the video stream representing the right view of the 3D video images. When 2D video images represented by a base-view video stream are used by a playback device as the right view of 3D video images, the "left-view video stream" is used as the video stream representing the left view of the 3D video images. When 2D video images represented by a base-view video stream are used by a playback device as a projection of 3D video images on a virtual 2D screen, the "depth map stream" is used as stream data representing the depth map of the 3D video images (for details, see 5: Modifications). When the playback device 102 is in 3D playback mode and uses the right-view video stream (or the left-view video stream) as the dependent-view video stream, the operation mode is referred to as "left/right (L/R) mode." On the other hand, when the playback device 102 is in 3D playback mode and uses the depth map stream as the dependent-view video stream, the operation mode is referred to as depth mode.

The "extended stream" is multiplexed stream data storing information used in combination with the main TS, i.e. extended data. In Embodiment 1 of the present invention, the extended data includes information necessary for extending full HD 2D video images representing the base-view video stream to 2D video images at 4K2K.

The "file 2D" 221 is an AV stream file used by the playback device 102 in 2D playback mode and includes a main TS. The "file DEP" is an AV stream file that includes a sub-TS. The "file SS" 223 is an AV stream file used by the playback device 102 in 3D playback mode and includes both a main TS and a sub-TS. The "extended stream file 224" is an AV stream file used by the playback device 102 in extended playback mode and includes an extended stream.

The file SS 223 shares its main TS with a file 2D 221 and shares its sub-TS with a file DEP 222. In other words, in the file system on the BD-ROM disc 101, the main TS can be accessed as either the file SS 223 or the file 2D 221, and the sub-TS can be accessed as either the file SS 223 or the file DEP 222.

The clip information file 230 is a file associated on a one-to-one basis with the file 2D 221, the file DEP 222, and the extended stream file 224 and includes an entry map for each of the files 221, 222, and 224. The "entry map" is a correspondence table between the presentation time for each scene represented by the file 2D 221, the file DEP 222, and the extended stream file 224 and the address within the respective one of the files 221, 222, and 224 at which the scene is recorded. The "2D clip information file" 231 is associated with the file 2D 221, the "DEP clip information file" 232 is associated with the file DEP 222, and the "extension clip information file" 233 is associated with the extended stream file 224.

The "playlist file" 240 is a file that specifies the playback path of the AV stream file 220. The "playback path" refers to the correspondence between the part of the AV stream file 220 for playback and the order of playback. The "2D playlist file" 241 specifies the playback path of the file 2D 221. The "3D playlist file" 242 specifies, for the playback device 102 in 2D playback mode, the playback path of the file 2D 221, and for the playback device 102 in 3D playback mode, the playback path of the file SS 223. The "extended playlist file" 243 specifies, for the playback device 102 in 2D playback mode, the playback path of the file 2D 221, and for the playback device 102 in extended playback mode, the playback path of the file 2D 221 and of the extended stream file 224.

The MV object file 251 generally stores a plurality of MV objects. Each MV object includes a sequence of navigation commands. A navigation command is a control command causing the playback device 102 to execute a playback process similar to general DVD players. Types of navigation commands are, for example, a read-out command to read out a playlist file corresponding to a title, a playback command to play back stream data from an AV stream file indicated by a playlist file, and a transition command to make a transition to another title. Navigation commands are written in an interpreted language and are deciphered by an interpreter, i.e. a job control program, included in the playback device 102, thus making the control unit execute the desired job. A navigation command is composed of an opcode and an operand. The opcode describes the type of operation that the playback device 102 is to execute, such as dividing, playing back, or calculating a title, etc. The operand indicates identification information targeted by the operation such as the title's number, etc. The control unit of the playback device 102 calls a MV object in response, for example, to a user operation and executes navigation commands included in the called MV object in the order of the sequence. In a manner similar to general DVD players, the playback device 102 first displays a menu on the display device 103 to allow the user to select a command The playback device 102 then executes playback start/stop of a title, switches to another title, etc. in response to the selected command, thereby dynamically changing the progress of video playback.

The BD-J object file 252 includes a single BD-J object. The BD-J object is a bytecode program to cause a Java virtual machine mounted on the playback device 102 to play back a title and render graphics images. The BD-J object is written in a compiler language such as Java or the like. The BD-J object includes an application management table and identification information for the playlist file to which is referred. The "application management table" is a list of the Java application programs to be executed by the Java virtual machine and their period of execution, i.e. lifecycle. The "identification information of the playlist file to which is referred" identifies a playlist file that corresponds to a title to be played back. The Java virtual machine calls a BD-J object in response to a user operation or an application program and executes the Java application program according to the application management table included in the BD-J object. Consequently, the playback device 102 dynamically changes the progress of the video for each title played back, or causes the display device 103 to display graphics images independently of the title video.

The JAR directory 253 generally includes a plurality of actual Java application programs to be executed in accordance with the application management table shown in the BD-J object. A "Java application program" is a bytecode program written in a compiler language such as Java or the like, as is the BD-J object. Types of Java application programs include programs causing the Java virtual machine to perform playback of a title and programs causing the Java virtual machine to render graphics images. The JAR file 261 is a Java archive file, and when it is read by the playback device 102, it is loaded in internal memory. In this way, a Java application program is stored in memory.

2-1: Structure of Multiplexed Stream Data

FIG. 3A is a list of elementary streams multiplexed in a main TS on a BD-ROM disc 101. The main TS is a digital stream in MPEG-2 Transport Stream (TS) format and includes the file 2D 221 shown in FIG. 2. As shown in FIG. 3A, the main TS includes a primary video stream 301 and primary audio streams 302A and 302B. The main TS may additionally include presentation graphics (PG) streams 303A and 303B, an interactive graphics (IG) stream 304, a secondary audio stream 305, and a secondary video stream 306.

The primary video stream 301 represents the primary video of a movie, and the secondary video stream 306 represents secondary video of the movie. The primary video is the main video pertaining to the content, such as the main feature of a movie, and is displayed on the entire screen, for example. On the other hand, the secondary video is displayed on the screen simultaneously with the primary video with the use, for example, of a picture-in-picture method, so that the secondary video images are displayed in a smaller window within the primary video images. The primary video stream 301 and the secondary video stream 306 are both a base-view video stream. Each of the video streams 301 and 306 is encoded by a video compression encoding method, such as MPEG-2, MPEG-4 AVC, or SMPTE VC-1. Each of the video frames included in the video streams 301 and 306 is thus compressed into one picture. Here, a "video frame" is a 2D array of pixel data, the size of the array being equal to the resolution of the frame. For example, a full HD video frame is a 1920×1080 2D array. A set of pixel data is formed by a combination of chromatic coordinate values and an a value (opacity). The chromatic coordinate value is expressed as 8-bit RGB values or YCrCb values. The $\alpha$ value is also an 8-bit value.

The primary audio streams 302A and 302B represent the primary audio of the movie. In this case, the two primary audio streams 302A and 302B are in different languages. The secondary audio stream 305 represents secondary audio to be mixed with the primary audio, such as sound effects accompanying operation of an interactive screen. Each of the audio streams 302A, 302B, and 305 is encoded by a method such as AC-3, Dolby Digital Plus ("Dolby Digital" is a registered trademark), Meridian Lossless Packing™ (MLP), Digital Theater System™ (DTS), DTS-HD, or linear Pulse Code Modulation (PCM). The audio frames included in the audio streams 302A, 302B, and 305 are thus individually compressed.

Each of the PG streams 303A and 303B represents graphics images, such as subtitles formed by graphics, to be displayed superimposed on the video images represented by the primary video stream 301. The two PG streams 303A and 303B represent, for example, subtitles in a different language. The IG stream 304 represents Graphical User Interface (GUI) graphics elements, and the arrangement thereof, for constructing an interactive screen on the screen 131 in the display device 103.

The elementary streams 301-306 are identified by packet identifiers (PIDs). PIDs are assigned, for example, as follows. Since one main TS includes only one primary video stream, the primary video stream 301 is assigned a hexadecimal value of 0x1011. When up to 32 other elementary streams can be multiplexed by type in one main TS, the primary audio streams 302A and 302B are each assigned any value from 0x1100 to 0x111F. The PG streams 303A and 303B are each assigned any value from 0x1200 to 0x121F. The IG stream 304 is assigned any value from 0x1400 to 0x141F. The secondary audio stream 305 is assigned any value from 0x1A00 to 0x1A1F. The secondary video stream 306 is assigned any value from 0x1B00 to 0x1B1F.

FIG. 3B is an example of a list of elementary streams multiplexed in a sub-TS on a BD-ROM disc 101. The sub-TS is multiplexed stream data in MPEG-2 TS format and is included in the file DEP 222 shown in FIG. 2. As shown in FIG. 3B, the sub-TS includes a primary video stream 311. The sub-TS may additionally include left-view PG streams 312A and 312B, right-view PG streams 313A and 313B, a left-view IG stream 314, a right-view IG stream 315, and a secondary video stream 316. When the primary video stream 301 in the main TS represents the left view of 3D video images, the primary video stream 311, which is a right-view video stream, represents the right view of the 3D video images. The pairs of left-view and right-view PG streams 312A+313A and 312B+313B represent the left view and right view of graphics images, such as subtitles, when these graphics images are displayed as 3D video images. The pair of left-view and right-view IG streams 314 and 315 represent the left view and right view of graphics images for an interactive screen when these graphics images are displayed as 3D video images. When the secondary video stream 306 in the main TS represents the left view of 3D video images, the secondary video stream 316, which is a right-view video stream, represents the right view of the 3D video images.

PIDs are assigned to the elementary streams 311-316 as follows, for example. A PID of 0x1012 is assigned to the primary video stream 311. When up to 32 other elementary streams can be multiplexed by type in one sub-TS, the left-view PG streams 312A and 312B are assigned any value from 0x1220 to 0x123F, and the right-view PG streams 313A and 313B are assigned any value from 0x1240 to 0x125F. The left-view IG stream 314 is assigned any value from 0x1420 to 0x143F, and the right-view IG stream 315 is assigned any value from 0x1440 to 0x145F. The secondary video stream 316 is assigned any value from 0x1B20 to 0x1B3F.

FIG. 3C is another example of a list of elementary streams multiplexed in the sub-TS on the BD-ROM disc 101. As shown in FIG. 3C, the sub-TS includes a primary video stream 321. The sub-TS may additionally include depth map PG streams 323A and 323B, a depth map IG stream 324, and a secondary video stream 326. The primary video stream 321 is a depth map stream and represents 3D video images in combination with the primary video stream 301 in the main TS. When the 2D video images represented by the PG streams 303A and 303B in the main TS are used to project 3D video images on a virtual 2D screen, the depth map PG streams 323A and 323B are used as the PG streams representing a depth map for the 3D video images. When the 2D video images represented by the IG stream 304 in the main TS are used to project 3D video images on a virtual 2D screen, the depth map IG stream 324 is used as the IG stream representing a depth map for the 3D video images. The secondary video stream 326 is a depth map stream and represents 3D video images in combination with the secondary video stream 306 in the main TS.

PIDs are assigned to the elementary streams 321-326 as follows, for example. A PID of 0x1013 is assigned to the primary video stream 321. When up to 32 other elementary streams can be multiplexed by type in one sub-TS, the depth map PG streams 323A and 323B are assigned any value from 0x1260 to 0x127F. The depth map IG stream 324 is assigned any value from 0x1460 to 0x147F. The secondary video stream 326 is assigned any value from 0x1B40 to 0x1B5F.

FIG. 3D is a list of elementary streams multiplexed in an extended stream on a BD-ROM disc 101. As shown in FIG. 3D, the extended stream includes resolution extension information 331 as extended data. The resolution extension information 331 is information necessary for extending each full HD video frame included in the primary video stream 301 in the main TS to a 4K2K video frame. A value of 0x1014 is allocated as the PID to the resolution extension information 331.

FIG. 4A shows the data structure of resolution extension information. As illustrated in FIG. 4A, the resolution extension information includes an extended resolution 401, interpolation method 402, and pixel difference information 403 for each video frame. The extended resolution 401 indicates a 4K2K resolution. The interpolation method 402 indicates an interpolation method to be used to increase the number of pieces of pixel data included in a full HD video frame to the number of pieces of pixel data included in a 4K2K video frame. The interpolation methods include bicubic and bilinear methods. The pixel difference information 403 represents the difference between the pixel data obtained by interpolation from a full HD video frame and the pixel data included in the original 4K2K video frame. When pixel data is represented as YCrCb values, the pixel difference information 403 includes a difference Y_d in the luminance component Y, a difference Cr_d in the red-difference component Cr, a difference Cb_d in the blue-difference component Cb, and a difference α_d in the opacity α.

FIG. 4B is a schematic diagram showing the role of resolution extension information in the process to extend a full HD video frame to a 4K2K video frame. This process requires the following two steps. In the first step 410, interpolation is performed based on pixel data 411 included in a full HD video frame. New pixel data 412 is thus added to the video frame. As a result, the total number of pieces of pixel data is increased to the number of pieces of pixel data included in a 4K2K video frame. The extended resolution 401 specifies the increased number of pieces of pixel data as a resolution. The interpolation method 402 specifies the interpolation method to be used in the first step. In the second step, the pixel difference information 403 is added to the pieces of pixel data 411, 412 in the video frame obtained by the interpolation. As a result, pieces of pixel data 413 included in the original 4K2K video frame are reconstructed.

FIG. 5 is a schematic diagram showing the arrangement of TS packets in the multiplexed stream data 500. The same packet structure is shared by the main TS, sub-TS, and the extended stream. In the multiplexed stream data 500, the elementary streams 501, 502, 503, and 504 are respectively converted into sequences of TS packets 521, 522, 523, and 524. For example, in the video stream 501, each video frame 501A is first converted into one Packetized Elementary Stream (PES) packet 511. Next, each PES packet 511 is generally converted into a plurality of TS packets 521. Similarly, the audio stream 502, PG stream 503, and IG stream 504 are respectively first converted into a sequence of PES packets 512, 513, and 514, after which they are converted into a sequence of TS packets 522, 523, and 524. Finally, the TS packets 521, 522, 523, and 524 obtained from the elementary streams 501, 502, 503, and 504 are time-multiplexed into one piece of stream data 500.

FIG. 6B is a schematic diagram showing a TS packet sequence constituting multiplexed stream data. Each TS packet 601 is 188 bytes long. As shown in FIG. 6B, each TS packet 601 includes a TS header 601H and either, or both, a TS payload 601P and an adaptation field (hereinafter abbreviated as "AD field") 601A. The TS payload 601P and AD field 601A together constitute a 184 byte-long data area. The TS payload 601P is used as a storage area for a PES packet. The PES packets 511-414 shown in FIG. 5 are typically divided into a plurality of parts, and each part is stored in a different TS payload 601P. The AD field 601A is an area for storing stuffing bytes (i.e. dummy data) when the amount of data in the TS payload 601P does not reach 184 bytes. Additionally, when the TS packet 601 is, for example, a PCR as described below, the AD field 601A is used as a region for storing such information. The TS header 601H is a four-byte long data area.

FIG. 6A is a schematic diagram showing the data structure of a TS header 601H. As shown in FIG. 6A, the TS header 601H includes a TS priority 611, a PID 612, and an AD field control 613. The PID 612 indicates the PID for the elementary stream whose data is stored in the TS payload 601P of the TS packet 601 containing the PID 512. The TS priority 611 indicates the degree of priority of the TS packet 601 among the TS packets that share the value indicated by the PID 612. The AD field control 613 indicates whether the TS packet 601 contains an AD field 601A and/or a TS payload 601P.

FIG. 6C is a schematic diagram showing the formation of a source packet sequence composed of the TS packet sequence for multiplexed stream data. As shown in FIG. 6C, each source packet 602 is 192 bytes long and includes one TS packet 601, shown in FIG. 6B, and a four-byte long header 602H. When the TS packet 601 is recorded on the BD-ROM disc 101, a source packet 602 is constituted by attaching a header 602H to the TS packet 601. The header 602H includes an ATS (Arrival_Time_Stamp). The "ATS" is time information used by a system target decoder in the playback device 102 as follows. The "system target decoder" is a device that decodes multiplexed stream data one elementary stream at a time. When a source packet 602 is sent from the BD-ROM disc 101 to the system target decoder, the system target decoder extracts the TS packet 602P from the source packet 602 and transfers the TS packet 602P to a PID filter. The system target decoder transfers the TS packet 602P at a point in time when the value of an internal clock, referred to as an arrival time clock (ATC), matches with the ATS in the header 602H of the source packet 602. Details regarding the system target decoder and its use of the ATS are provided below.

FIG. 6D is a schematic diagram of sectors located in the volume area 202B of the BD-ROM disc 101, in which a sequence of source packets 602 are consecutively recorded. As shown in FIG. 6D, each sequence of 32 source packets 602 is recorded on three consecutive sectors 621, 622, and 623. This is because the data amount for 32 source packets, i.e. 192 bytes×32=6144 bytes, is the same as the total size of three sectors, i.e. 2048 bytes×3=6144 bytes. 32 source packets 602 that are recorded in this way in three consecutive sectors 621, 622, and 623 are referred to as an "aligned unit" 620. The BD-ROM drive 121 in the playback device 102 reads source packets 602 from the BD-ROM disc 101 by each aligned unit 620, i.e. 32 source packets at a time. The sectors 621, 622, 623, . . . are divided into sections of 32 sectors in order from the top, each section forming one error correcting code (ECC) block 630. The BD-ROM drive 121 performs error correction process for each ECC block 630.

Data Structure of the PG Stream

The PG stream includes a plurality of data entries. The data entries represent the PG stream in display sets and are composed of data necessary for the playback device 102 to form one graphics plane. A "graphics plane" refers to plane data generated from graphics data representing a 2D graphics image. "Plane data" is a two-dimensional array of pixel data. The size of the array is the same as the resolution of the video frame. Types of graphics planes include a PG plane, IG plane, image plane, and On-Screen Display (OSD) plane. A PG plane is generated from a PG stream in the main TS. An IG plane is generated from an IG stream in the main TS. An image plane is generated in accordance with a BD-J object. An OSD plane is generated in accordance with firmware in the playback device 102.

Each data entry includes a plurality of functional segments. In order from the top, these functional segments include a Presentation Control Segment (PCS), Window Define Segment (WDS), Palette Define Segment (PDS), and Object Define Segment (ODS). WDS defines a rectangular region inside the graphics plane, i.e. a window. PDS defines the correspondence between a predetermined type of color ID and a chromatic coordinate value (for example, luminance Y, red-difference Cr, blue-difference Cb, and opacity α). There are usually a plurality of ODSs, which represent one graphics object. A "graphics object" is data that expresses graphics rendering via correspondence between pixel codes and color IDs. After being compressed via run-length encoding, a graphics object is divided up and distributed among ODSs. A PCS indicates details on display sets belonging to the same data entry and in particular defines a screen layout that uses graphics objects. Types of screen layout include Cut-In/Out, Fade-In/Out, Color Change, Scroll, and Wipe-In/Out. A content provider refers to the parameters of the PCS to indicate the screen layout to the playback device 102. Accordingly, it is possible to cause the playback device 102 to implement a visual effect whereby, for example, "a certain subtitle gradually disappears, and the next subtitle is displayed."

2-2: Data Structure of the IG Stream

The IG stream includes an Interactive Composition Segment (ICS), PDS, and ODS. PDS and ODS are the same functional segments as included in the PG stream. In particular, a graphics object that includes an ODS represents a GUI graphics element, such as a button, pop-up menu, etc., that forms an interactive screen. An ICS defines interactive operations that use these graphics objects. Specifically, an ICS defines the states that each graphics object, such as a button, pop-up menu, etc. can take when changed in response to user operation, states such as normal, selected, and active. An ICS also includes button information. Button information includes a command that the playback device 102 is to perform when the user performs a certain operation on the button or the like.

2-3: Data Structure of the Video Stream

Figure 7:
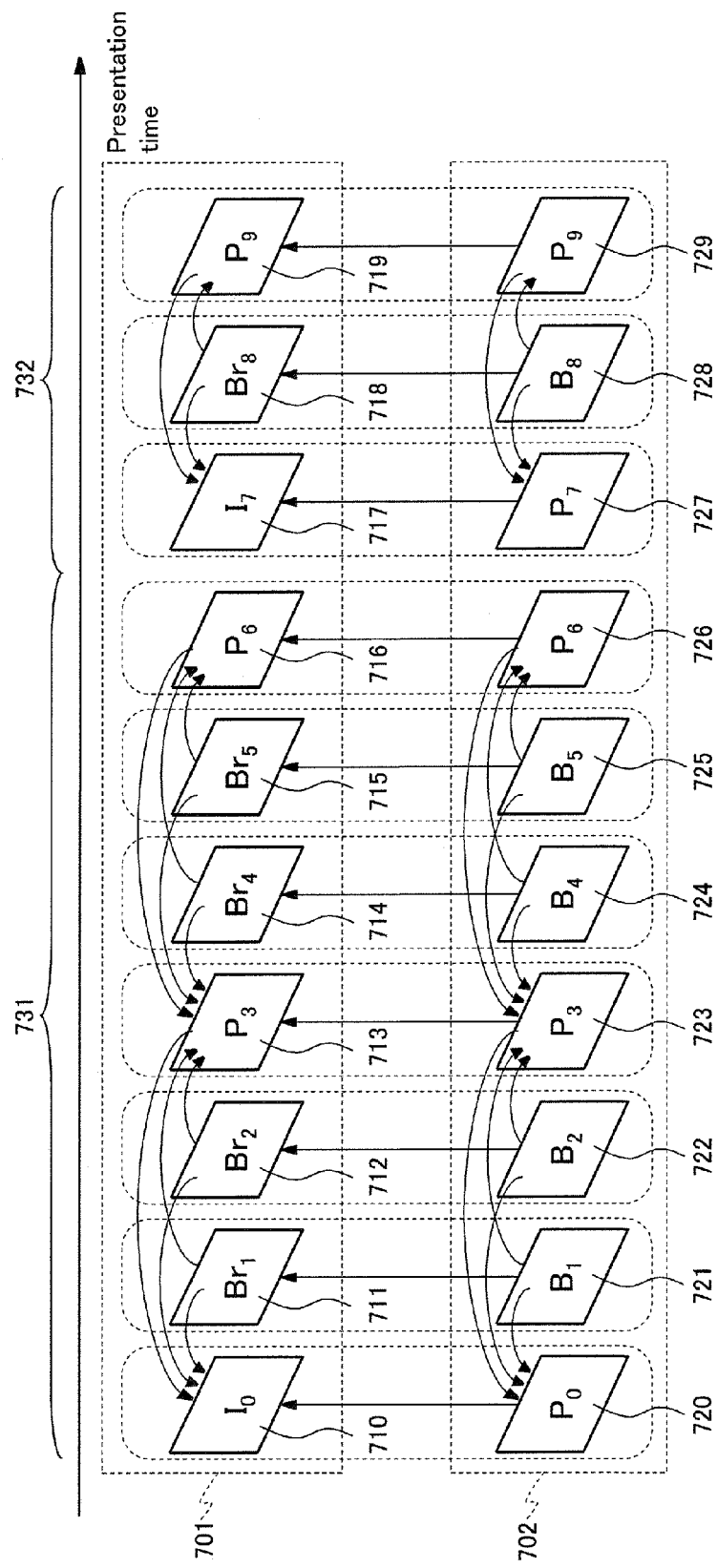
FIG. 7 is a schematic diagram showing the pictures for a base-view video stream and a right-view video stream in order of presentation time.

FIG. 7 is a schematic diagram showing the pictures for a base-view video stream 701 and a right-view video stream 702 in order of presentation time. As shown in FIG. 7, the base-view video stream 701 includes pictures 710, 711, 712, . . . , 719 (hereinafter "base-view pictures"), and the right-view video stream 702 includes pictures 720, 721, 722, . . . , 729 (hereinafter "right-view pictures"). Each of the pictures 710-719 and 720-729 represents one frame and is compressed by a video compression encoding method, such as MPEG-2, MPEG-4 AVC, etc.

This compression of each picture via the above encoding uses the picture's spatial or temporal redundancy. Here, picture encoding that only uses the picture's spatial redundancy is referred to as "intra-picture encoding." On the other hand, picture encoding that uses temporal redundancy, i.e. the similarity between data for a plurality of pictures displayed sequentially, is referred to as "inter-picture predictive encoding." In inter-picture predictive encoding, first, a picture earlier or later in presentation time is assigned to the picture to be encoded as a reference picture. Next, a motion vector is detected between the picture to be encoded and the reference picture, and then motion compensation is performed using the motion vector. Furthermore, the difference value between the picture after motion compensation and the picture to be encoded is sought, and spatial redundancy is removed using the difference value. In this way, the amount of data for each picture is compressed.

As shown in FIG. 7, the base-view pictures 710-719 are typically divided into a plurality of GOPs 731 and 732. A "GOP" refers to a sequence of pictures having an I (Intra) picture at the top of the sequence. An "I picture" refers to a picture compressed by intra-picture encoding. In addition to an I picture, a GOP typically includes P (Predictive) and B (Bidirectionally Predictive) pictures. A "P picture" refers to a picture compressed by inter-picture predictive encoding, having used as a reference picture one picture, either an I picture or another P picture, that has an earlier presentation time. A "B picture" refers to a picture compressed by inter-picture predictive encoding, having used as a reference picture two pictures, either I pictures or other P pictures, that have an earlier or later presentation time. B pictures that are used as a reference picture for other pictures in inter-picture predictive encoding are particularly referred to as "Br (reference B) pictures."

In the example shown in FIG. 7, the base-view pictures in the GOPs 731 and 732 are compressed in the following order.

In the first GOP 731, the top base-view picture is compressed as $I_0$ picture 710. The subscripted number indicates the serial number allotted to each picture in order of presentation time. Next, the fourth base-view picture is compressed as $P_3$ picture 713 using $I_0$ picture 710 as a reference picture. The arrows shown in FIG. 7 indicate that the picture at the head of the arrow is a reference picture for the picture at the tail of the arrow. Next, the second and third base-view pictures are respectively compressed as $Br_1$ picture 711 and $Br_2$ picture 712, using both $I_0$ picture 710 and $P_3$ picture 713 as reference pictures. Furthermore, the seventh base-view picture is compressed as $P_6$ picture 716 using $P_3$ picture 713 as a reference picture. Next, the fourth and fifth base-view pictures are respectively compressed as $Br_4$ picture 714 and $Br_5$ picture 715, using both $P_3$ picture 713 and $P_6$ picture 716 as reference pictures. Similarly, in the second GOP 732, the top base-view picture is first compressed as $I_7$ picture 717. Next, the third base-view picture is compressed as $P_9$ picture 719 using $I_7$ picture 717 as a reference picture. Subsequently, the second base-view picture is compressed as $Br_8$ picture 718 using both $I_7$ picture 717 and $P_9$ picture 719 as reference pictures.

In the base-view video stream 701, each GOP 731 and 732 always contains an I picture at the top, and thus base-view pictures can be decoded GOP by GOP. For example, in the first GOP 731, the $I_0$ picture 710 is first decoded independently. Next, the $P_3$ picture 713 is decoded using the decoded $I_0$ picture 710. Then the $Br_1$ picture 711 and $Br_2$ picture 712 are decoded using both the decoded $I_0$ picture 710 and $P_3$ picture 713. The subsequent pictures 714, 715, . . . are similarly decoded. In this way, the base-view video stream 701 can be decoded independently and furthermore can be randomly accessed in units of GOPs.

As further shown in FIG. 7, the right-view pictures 720-729 are compressed by inter-picture predictive encoding. However, the encoding method differs from the encoding method for the base-view pictures 710-719, since in addition to redundancy in the temporal redundancy of video images, redundancy between the left and right-video images is also used. Specifically, as shown by the arrows in FIG. 7, the reference picture for each of the right-view pictures 720-729 is not selected from the right-view video stream 702, but rather from the base-view video stream 701. In particular, the presentation time is substantially the same for each of the right-view pictures 720-729 and the corresponding base-view picture selected as a reference picture. These pictures represent a right view and a left view for the same scene of a 3D video image, i.e. a parallax video image. The right-view pictures 720-729 and the base-view pictures 710-719 are thus in one-to-one correspondence. In particular, the GOP structure is the same between these pictures.

In the example shown in FIG. 7, the top right-view picture in the first GOP 731 is compressed as $P_0$ picture 720 using $I_0$ picture 710 in the base-view video stream 701 as a reference picture. These pictures 710 and 720 represent the left view and right view of the top frame in the 3D video images. Next, the fourth right-view picture is compressed as $P_3$ picture 723 using $P_3$ picture 713 in the base-view video stream 701 and $P_o$ picture 720 as reference pictures. Next, the second right-view picture is compressed as $B_1$ picture 721, using $Br_1$ picture 711 in the base-view video stream 701 in addition to $P_0$ picture 720 and $P_3$ picture 723 as reference pictures. Similarly, the third right-view picture is compressed as $B_2$ picture 722, using $Br_2$ picture 712 in the base-view video stream 701 in addition to $P_0$ picture 720 and $P_3$ picture 730 as reference pictures. For each of the remaining right-view pictures 724-729, a base-view picture with a presentation time substantially the same as the right-view picture is similarly used as a reference picture.

The revised standards for MPEG-4 AVC/H.264, called Multiview Video Coding (MVC), are known as a video compression encoding method that makes use of correlation between left and right-video images as described above. MVC was created in July of 2008 by the Joint Video Team (JVT), a joint project between ISO/IEC MPEG and ITU-T VCEG, and is a standard for collectively encoding video that can be seen from a plurality of perspectives. With MVC, not only is temporal similarity in video images used for inter-video predictive encoding, but so is similarity between video images from differing perspectives. This type of predictive encoding has a higher video compression ratio than predictive encoding that individually compresses data of video images seen from each perspective.

As described above, a base-view picture is used as a reference picture for compression of each of the right-view pictures 720-729. Therefore, unlike the base-view video stream 701, the right-view video stream 702 cannot be decoded independently. On the other hand, however, the difference between parallax video images is generally very small; that is, the correlation between the left view and the right view is high. Accordingly, the right-view pictures generally have a significantly higher compression rate than the base-view pictures, meaning that the amount of data is significantly smaller.

While not shown in FIG. 7, a depth map stream includes a plurality of depth maps. The depth maps are in one-to-one correspondence with base-view pictures and each represent the depth map corresponding to a 2D video image in one field as indicated by a base-view picture. The depth maps are compressed by a video compression encoding method, such as MPEG-2, MPEG-4 AVC, etc., in the same way as the base-view pictures. In particular, inter-picture predictive encoding is used in this encoding method. In other words, each depth map is compressed using another depth map as a reference picture. Furthermore, the depth map stream is divided into units of GOPs in the same way as the base-view video stream, and each GOP always contains an I picture at the top. Accordingly, depth maps can be decoded GOP by GOP. However, since a depth map itself is only information representing the depth of each part of a 2D video image pixel by pixel, the depth map stream cannot be used independently for playback of video images. The encoding method used in compression of the depth map stream is the same as that used in compression of the right-view video stream. For example, if the right-view video stream is encoded in MVC format, the depth map stream is also encoded in MVC format. In this case, during playback of 3D video images, the playback device 102 can smoothly switch between L/R mode and depth mode, while maintaining a constant encoding method.

Figure 8:
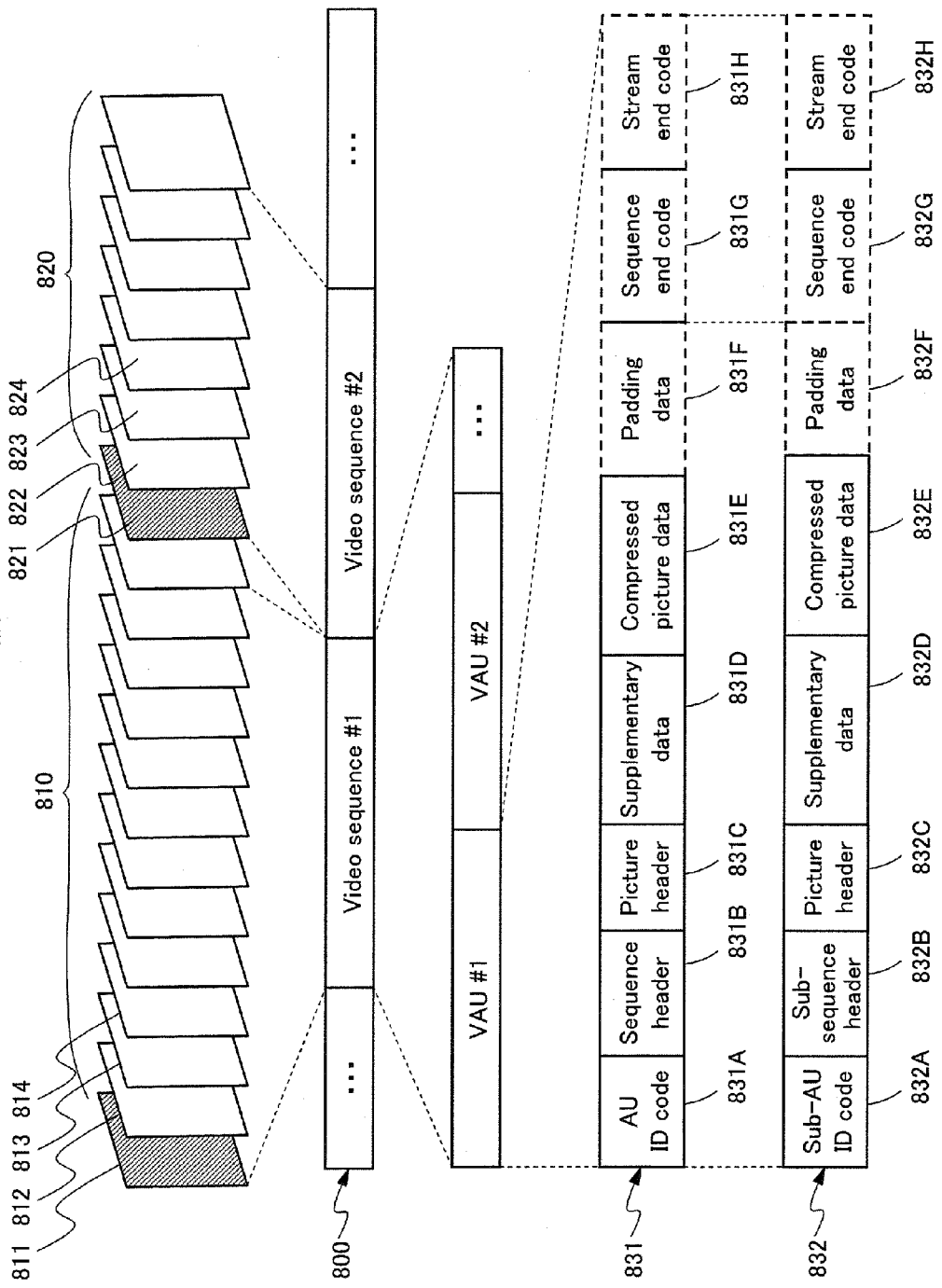
FIG. 8 is a schematic diagram showing details on the data structure of a video stream.

FIG. 8 is a schematic diagram showing details on the data structure of a video stream 800. This data structure is substantially the same for the base-view video stream and the dependent-view video stream. As shown in FIG. 8, the video stream 800 is generally composed of a plurality of video sequences #1, #2, . . . . A "video sequence" is a combination of pictures 811, 812, 813, 814, . . . that constitute a single GOP 810 and to which additional information, such as a header, has been individually attached. The combination of this additional information and a picture is referred to as a "video access unit (VAU)." That is, in the GOPs 810 and 820, a single VAU #1, #2, . . . is formed for each picture. Each picture can be read from the video stream 800 in units of VAUs.

FIG. 8 further shows the structure of VAU #1 831 located at the top of each video sequence in the base-view video stream.

The VAU #1 831 includes an access unit (AU) identification code 831A, sequence header 831B, picture header 831C, supplementary data 831D, and compressed picture data 831E. Except for not including a sequence header 831B, VAUs from the second VAU #2 on have the same structure as VAU #1 831. The AU identification code 831A is a predetermined code indicating the top of the VAU #1 831. The sequence header 831B, also called a GOP header, includes an identification number for the video sequence #1 which includes the VAU #1 831. The sequence header 831B further includes information shared by the whole GOP 810, e.g. resolution, frame rate, aspect ratio, and bit rate. The picture header 831C indicates a unique identification number, the identification number for the video sequence #1, and information necessary for decoding the picture, such as the type of encoding method. The supplementary data 831D includes additional information regarding matters other than the decoding of the picture, for example closed caption text information, information on the GOP structure, and time code information. The compressed picture data 831E includes a base-view picture.

Additionally, the VAU #1 831 may include any or all of padding data 831F, a sequence end code 831G, and a stream end code 831H as necessary. The padding data 831F is dummy data. By adjusting the size of the padding data 831F to match with the size of the compressed picture data 831E, the bit rate of the VAU #1 831 can be maintained at a predetermined value. The sequence end code 831G indicates that the VAU #1 831 is located at the end of the video sequence #1. The stream end code 831H indicates the end of the base-view video stream 800.

FIG. 8 also shows the structure of a VAU #1 832 located at the top of each video sequence in the dependent-view video stream. The VAU #1 832 includes a sub-sequence header 832B, picture header 832C, supplementary data 832D, and compressed picture data 832E. Except for not including a sub-sequence header 832B, VAUs from the second VAU #2 on have the same structure as VAU #1 832. The sub-sequence header 832B includes an identification number for the video sequence #1 which includes the VAU #1 832. The sub-sequence header 832B further includes information shared by the whole GOP 810, e.g. resolution, frame rate, aspect ratio, and bit rate. These values are the same as the values set for the corresponding GOP in the base-view video stream, i.e. the values shown by the sequence header 831B in the VAU #1 831. The picture header 832C indicates a unique identification number, the identification number for the video sequence #1, and information necessary for decoding the picture, such as the type of encoding method. The supplementary data 832D includes additional information regarding matters other than the decoding of the picture, for example closed caption text information, information on the GOP structure, and time code information. The compressed picture data 832E includes a dependent-view picture.

Additionally, the VAU #1 831 may include any or all of padding data 832F, a sequence end code 832G, and a stream end code 832H as necessary. The padding data 832F is dummy data. By adjusting the size of the padding data 832F in conjunction with the size of the compressed picture data 831E, the bit rate of the VAU #1 832 can be maintained at a predetermined value. The sequence end code 832G indicates that the VAU #1 832 is located at the end of the video sequence #1. The stream end code 832H indicates the end of the dependent-view video stream 800.

The specific content of each component in a VAU differs according to the encoding method of the video stream 800. For example, when the encoding method is MPEG-4 AVC, the components in the VAUs shown in FIG. 8 are composed of a single Network Abstraction Layer (NAL) unit. Specifically, the AU identification code 831A, sequence header 831B, picture header 831C, supplementary data 831D, compressed picture data 831E, padding data 831F, sequence end code 831G, and stream end code 831H respectively correspond to an Access Unit (AU) delimiter, Sequence Parameter Set (SPS), Picture Parameter Set (PPS), Supplemental Enhancement Information (SEI), View Component, Filler Data, End of Sequence, and End of Stream.

Figure 9:
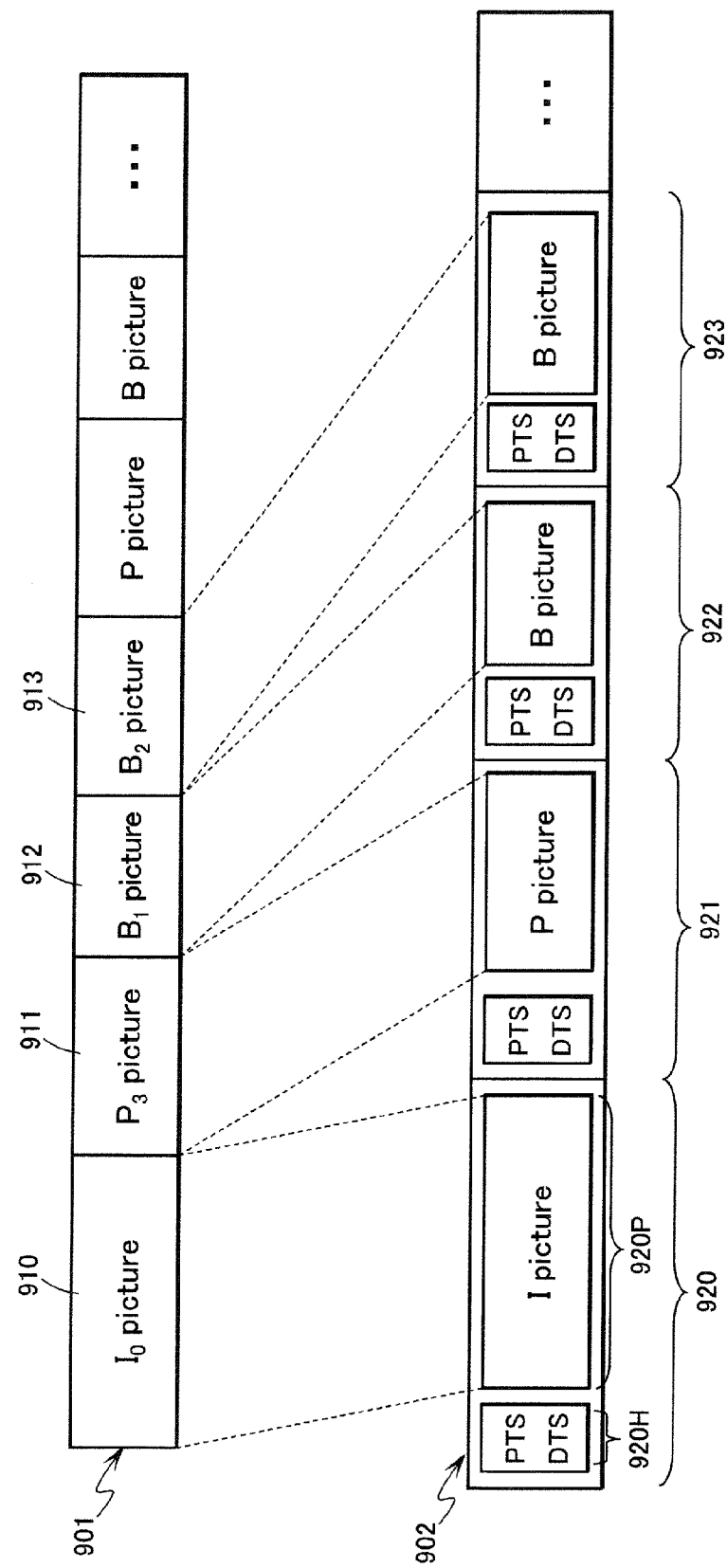
FIG. 9 is a schematic diagram showing details on a method for storing a video stream into a PES packet sequence.

FIG. 9 is a schematic diagram showing details on a method for storing a video stream 901 into a PES packet sequence 902. This storage method is the same for the base-view video stream and the dependent-view video stream. As shown in FIG. 9, in the actual video stream 901, pictures are multiplexed in the order of encoding, not in the order of presentation time. For example, in the VAUs in the base-view video stream, as shown in FIG. 9, $I_0$ picture 910, $P_3$ picture 911, $B_1$ picture 912, $B_2$ picture 913, . . . are stored in order from the top. The subscripted number indicates the serial number allotted to each picture in order of presentation time. $I_0$ picture 910 is used as a reference picture for encoding $P_3$ picture 911, and both $I_0$ picture 910 and $P_3$ picture 911 are used as reference pictures for encoding $B_1$ picture 912 and $B_2$ picture 913. Each of these VAUs is stored as a different PES packet 920, 921, 922, 923, . . . . Each PES packet 920, . . . includes a PES payload 920P and a PES header 920H. Each VAU is stored in a PES payload 920P. Each PES header 920H includes a presentation time, (Presentation Time-Stamp, or PTS), and a decoding time (Decoding Time-Stamp, or DTS), for the picture stored in the PES payload 920P in the same PES packet 920. The "PTS" indicates the timing at which data, such as a picture, decoded by a decoder in the playback device 102 is output by the decoder. The "DTS" indicates the timing at which to cause the decoder to begin decoding the data, such as a picture.

As with the video stream 901 shown in FIG. 9, the other elementary streams shown in FIG. 3 are stored in PES payloads in a sequence of PES packets. Furthermore, the PES header in each PES packet includes the PTS for the data stored in the PES payload for the PES packet.

Figure 10:
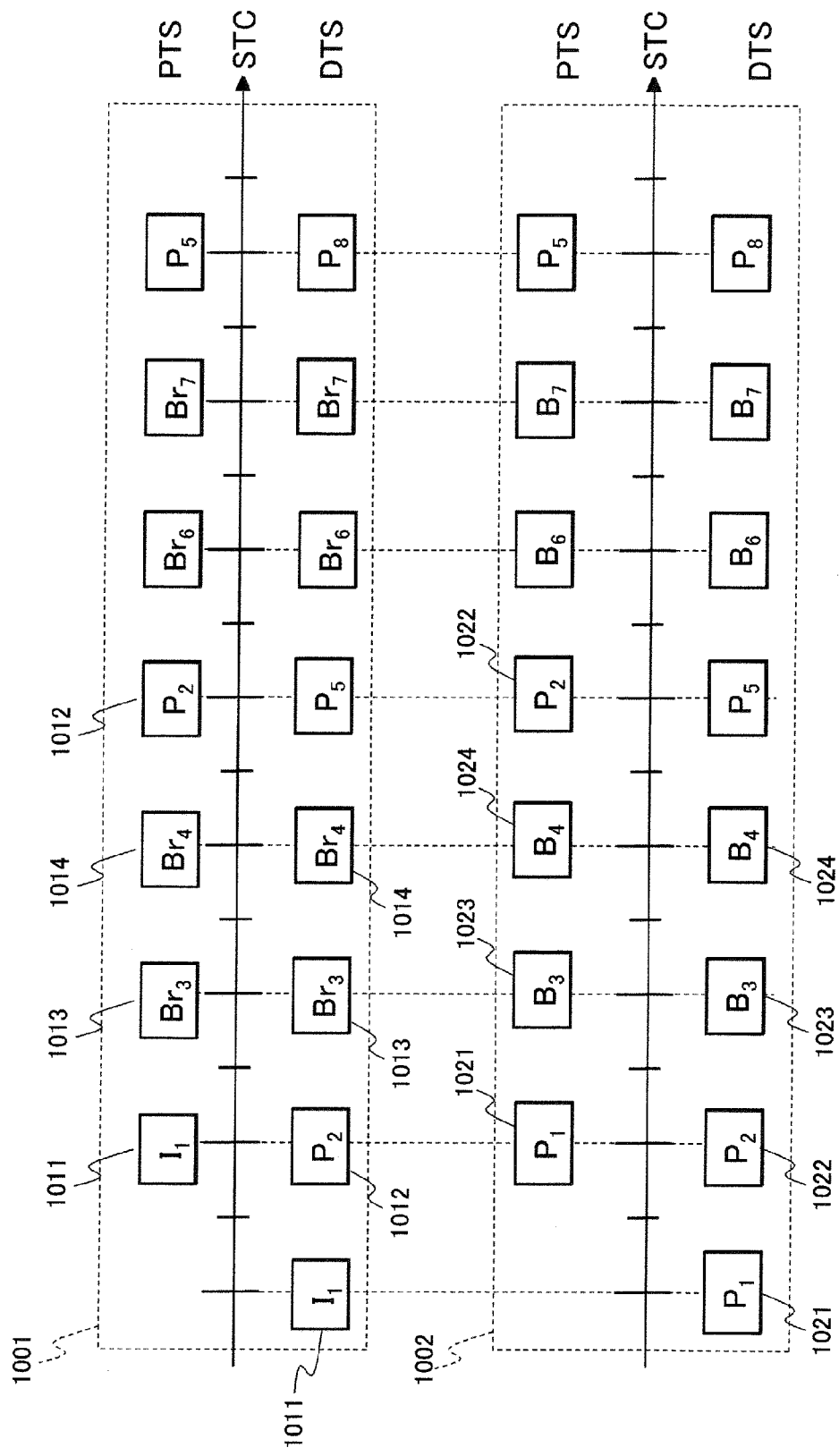
FIG. 10 is a schematic diagram showing correspondence between PTSs and DTSs assigned to each picture in a base-view video stream and a dependent-view video stream.

FIG. 10 is a schematic diagram showing correspondence between PTSs and DTSs assigned to each picture in a base-view video stream 1001 and a dependent-view video stream 1002. As shown in FIG. 10, between the video streams 1001 and 1002, the same PTSs and DTSs are assigned to a pair of pictures representing the same frame in a 3D video image. For example, the top frame in the 3D video image is rendered from a combination of $I_1$ picture 1011 in the base-view video stream 1001 and $P_1$ picture 1021 in the dependent-view video stream 1002. Accordingly, the PTS and DTS for these two pictures 1011 and 1021 are the same. The subscripted numbers indicate the serial number allotted to each picture in the order of DTSs. Also, when the dependent-view video stream 1002 is a depth map stream, $P_1$ picture 1021 is replaced by an I picture representing a depth map for the $I_1$ picture 1011. Similarly, the PTS and DTS for the pair of second pictures in the video streams 1001 and 1002, i.e. $P_2$ pictures 1012 and 1022, are the same. The PTS and DTS are both the same for the pair of third pictures in the video streams 1001 and 1002, i.e. $Br_3$ picture 1013 and $B_3$ picture 1023. The same is also true for the pair $Br_4$ picture 1014 and $B_4$ picture 1024.

A pair of VAUs that include pictures for which the PTS and DTS are the same between the base-view video stream 1001 and the dependent-view video stream 1002 is called a "3D VAU." Using the allocation of PTSs and DTSs shown in FIG. 10, it is easy to cause the decoder in the playback device 102 in 3D playback mode to process the base-view video stream 1001 and the dependent-view video stream 1002 in parallel in units of 3D VAUs. In this way, the decoder definitely processes a pair of pictures representing the same frame in a 3D video image in parallel. Furthermore, the sequence header in the 3D VAU at the top of each GOP includes the same resolution, the same frame rate, and the same aspect ratio. In particular, this frame rate is equal to the value when the base-view video stream 1001 is decoded independently in 2D playback mode.

2-4: Other TS Packets Included in the AV Stream File

In addition to the TS packets converted from the elementary stream as shown in FIG. 3, the types of TS packets included in an AV stream file include a Program Association Table (PAT), Program Map Table (PMT), and Program Clock Reference (PCR). The PCR, PMT, and PAT are specified by the European Digital Broadcasting Standard and regulate the AV stream in the same way as the partial transport stream constituting a single program. Specifically, the PAT shows the PID of a PMT included in the same AV stream file. The PID of the PAT itself is 0. The PMT includes the PID of each elementary stream included in the AV stream file and the corresponding attribute information. The attribute information includes identification information for the codec used for compressing the elementary stream as well as a frame rate and an aspect ratio of the elementary stream. The PMT also includes various descriptors relating to the AV stream file. The descriptors indicate attributes shared throughout the AV stream file and particularly include copy control information showing whether copying of the AV stream file is permitted or not. The PCR includes information indicating the value of a system time clock (STC) to be associated with the ATS assigned to the PCR itself. The STC referred to here is a clock used as a reference for the PTS and the DTS by a decoder in the playback device 102. This decoder uses the PCR to synchronize the STC with the ATC. By using PCR, PMT, and PAT, the decoder in the playback device 102 can be made to process the AV stream file in the same way as the partial transport stream in the European Digital Broadcasting Standard. In this way, it is possible to ensure compatibility between a playback device for the BD-ROM disc 101 and a terminal device conforming to the European Digital Broadcasting Standard.

2-5: Interleaved Arrangement of Multiplexed Stream Data

In order to seamlessly play back any of full HD 2D video images, 3D video images, and 4K2K 2D video images from the BD-ROM disc 101, it is important how to physically arrange the base-view video stream, the dependent-view video stream, and the extended stream on the BD-ROM disc 101. "Seamless playback" refers to playing back images and sounds from multiplexed stream data without interruption.

Figure 11:
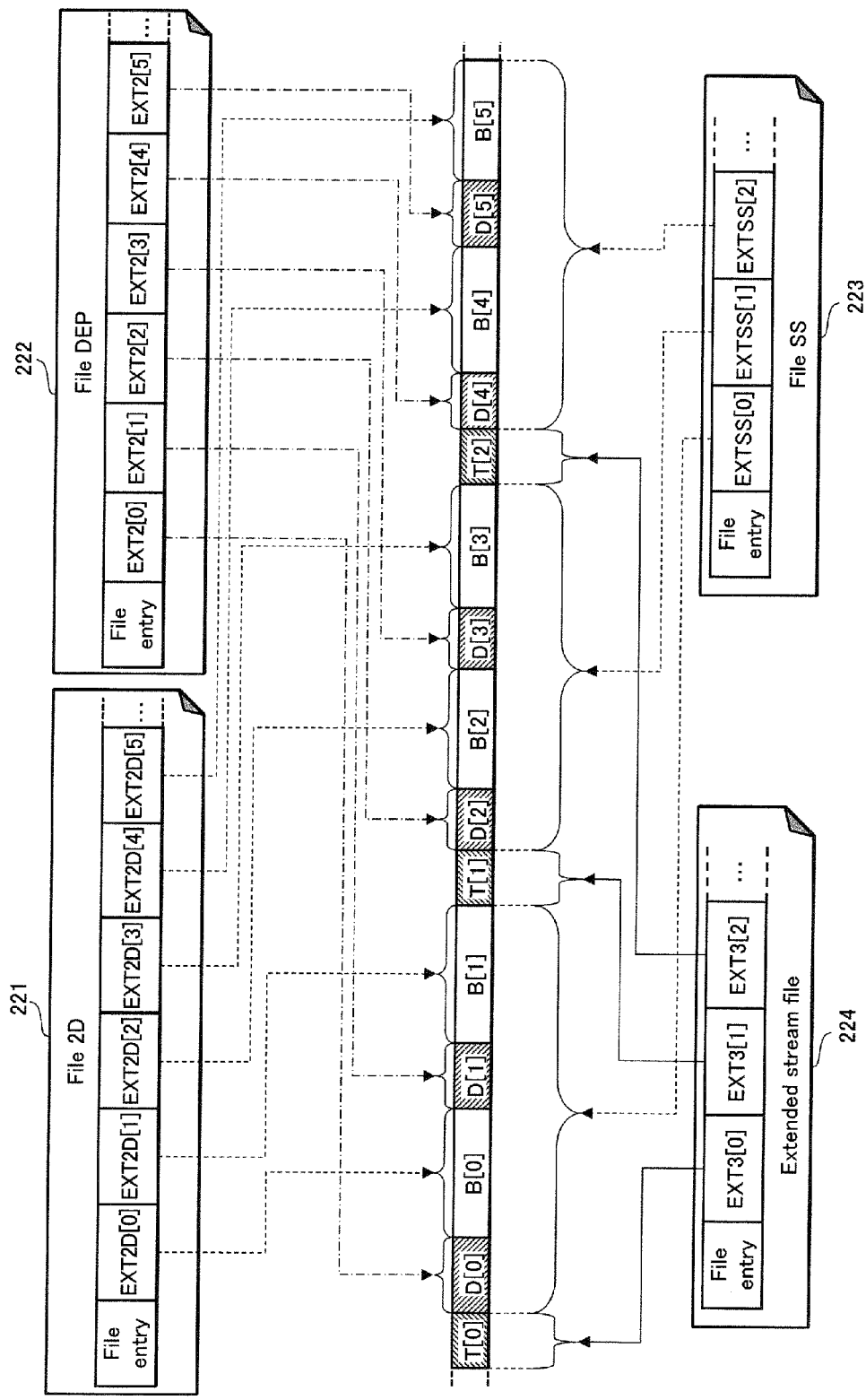
FIG. 11 is a schematic diagram showing a physical arrangement of a main TS, a sub-TS, and an extended stream on the BD-ROM disc.

FIG. 11 is a schematic diagram showing a physical arrangement of a main TS, a sub-TS, and an extended stream on the BD-ROM disc 101. As shown in FIG. 11, the main TS, the sub-TS, and the extended stream are divided into a plurality of data blocks B[n], D[n], and T[n], respectively (n=0, 1, 2, 3, ... ). The number "n" is a serial number allocated to the data blocks constituting a sequence of multiplexed stream data, starting from their top. The data blocks B[n], D[n], and T[n] are recorded in a plurality of sectors physically contiguous on the BD-ROM disc 101. The $(n+1)^{th}$ data block B[n] of the main TS can be accessed as the $(n+1)^{th}$ extent EXT2D[n] of the file 2D 221. The $(n+1)^{th}$ data block D[n] of the sub-TS can be accessed as the $(n+1)^{th}$ extent EXT2[n] of the file DEP 222. The $(n+1)^{th}$ data block T[n] of the extended stream can be accessed as the $(n+1)^{th}$ extent EXT 3[n] of the extended stream file 224. In other words, the size and the first LBN of the data blocks B[n], D[n], and T[n] can be known from the file entries of the file 2D 221, the file DEP 222, and the extended stream file 224, respectively (see "Supplement" for details). Since physical addresses on the BD-ROM disc 101 are substantially the same as logical addresses thereon, LBNs are also continuous within each of the data blocks B[n], D[n], and T[n]. Accordingly, the BD-ROM drive 121 can continuously read the data blocks B[n], D[n], and T[n] without causing the optical pickup to perform a seek. Hereinafter, the data blocks B[n] belonging to the main TS are referred to as "base-view extents," the data blocks D[n] belonging to the sub-TS are referred to as "dependent-view extents," and the data blocks T[n] belonging to the extended stream are referred to as "extended extents."

As shown in FIG. 11, the extents B[n], D[n], and T[n] are recorded continuously along a track on the BD-ROM disc 101. In particular, immediately after one extended extent T[n], at least two base-view extents B[n+1] and at least two dependent-view extents D[n+1] are arranged alternately (i=0, 1). This arrangement of the extents B[n+1], D[n+1] is referred to as an "interleaved arrangement," and the sequence of extents B[n+1], D[n+1] recorded in an interleaved arrangement is referred to as an "extent block." Each extent blocks can be accessed as one extent EXTSS[n] of the file SS 223. In other words, the size and the first LBN of the extent block B[n+i], D[n+1] can be known from the file entry of the file SS 223. The extents EXTSS[0], EXTSS[1], and EXTSS[2] of the file SS share the base-view extents B[n] with the file 2D 221 and share the dependent-view extents D[n] with the file DEP 222. Furthermore, the combination of one extended extent T[n] and the extent block B[n+i], D[n+i] arranged immediately thereafter is referred to as an "extended extent block."

Playback Path for Continuous Extended Extent Blocks

Figure 12:
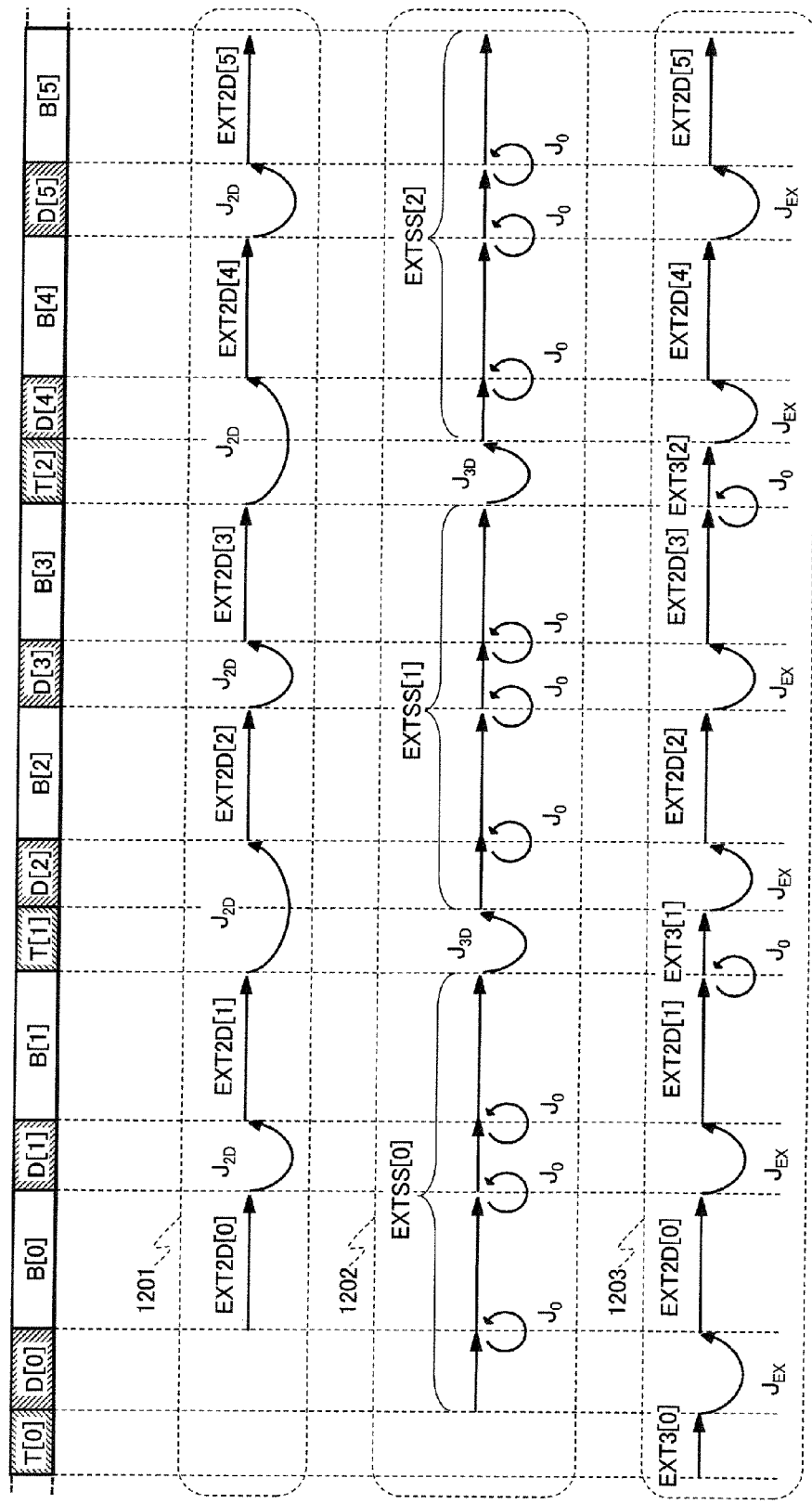
FIG. 12 is a schematic diagram showing three types of playback paths for three continuous extended extent blocks T[m], D[m+i], B[m+i] (m=0, 1, 2, i=0, 1)

FIG. 12 is a schematic diagram showing three types of playback paths, 1201, 1202, and 1203, for three continuous extended extent blocks T[m], D[m+i], B[m+i] (m=0, 1, 2, i=0, 1). The first playback path 1201 is a playback path for the file 2D 221. The second playback path 1202 is a playback path for the file SS 223. The third playback path 1203 is a playback path for the extended stream file 224. As shown in FIG. 12, among the graphics representing the playback paths 1203-1203, straight lines represent recording areas of extents read by the BD-ROM drive, whereas curved lines represent recording areas for which reading of data is skipped by a jump.

The playback device 102 in 2D playback mode plays back the file 2D 221. Accordingly, as shown by the first playback path 1201, only the base-view extents B[m+1] are read in order from the three extended extent blocks shown in FIG. 12 as extents EXT2D[m+i] of the file 2D 221. Specifically, the top base-view extent B[0] is first read, and then reading of the immediately subsequent dependent-view extent D[1] is skipped by a jump $J_{2D}$. Next, the second base-view extent B[1] is read, and then reading of the immediately subsequent extended extent T[1] and dependent-view extent D[2] is skipped by a jump $J_{2D}$. Reading of base-view extents and jumps are similarly repeated thereafter.

The playback device 102 in 3D playback mode plays back the file SS 223. Accordingly, as shown by the second playback path 1202, the three extent blocks D[m+i], B[m+i] are read in order from the three extended extent blocks shown in FIG. 12 as extents EXTSS[0], EXTSS[1], and EXTSS[2] of the file SS 223. Specifically, the top extent blocks D[0], B[0], D[1] and B[1] are first sequentially read, then reading of the immediately subsequent extended extent T[1] is skipped by a jump $J_{3D}$. Next, the second extent blocks D[2], B[2], D[2] and B[3] are sequentially read, then reading of the immediately subsequent extended extent T[2] is skipped by a jump $J_{3D}$. Subsequently, the third extent blocks D[4], B[4], D[5], B[5] are sequentially read. The playback device 102 then uses the clip information file to divide the extents EXTSS[0], EXTSS [1], . . . read from file SS 223 into dependent-view extents and base-view extents.

The playback device 102 in extended playback mode plays back the extended stream file 224 along with the file 2D 221. Accordingly, from the three extended extent blocks shown in FIG. 12, the extended extents T[m] are read as extents EXT3 [0], EXT3[1], and EXT3[2] of the extended stream file 224, and the base-view extents B[m+i] are read as extents EXT2D [0], EXT2D[1], and EXT2D[2] of the file 2D 221, as shown by the third playback path 1203. Specifically, the top extended extent T[0] is first read, and then reading of the immediately subsequent dependent-view extent D[0] is skipped by a jump $J_{EX}$. Next, the top base-view extent B[0] is read, and then reading of the immediately subsequent dependent-view extent D[1] is skipped by a jump $J_{EX}$. Subsequently, the second base-view extent B[1] and the second extended extent T[1] are contiguously read, and then reading of the immediately subsequent dependent-view extent D[2] is skipped by a jump $J_{Ex}$. Thereafter, reading of extended extents T[m] and base-view extents B[m+i] followed by jumps is similarly repeated.

When reading two adjacent extents continuously, the BD-ROM drive 121 actually performs a zero sector transition $J_0$ from the end of the first extent to the beginning of the next extent, as shown in FIG. 12. A "zero sector transition" is a movement of the optical pickup between two consecutive extents. During a period in which a zero sector transition is performed (hereinafter referred to as a "zero sector transition period"), the optical pickup temporarily suspends its read operation and waits. For this reason, a zero sector transition is considered "a jump whose jump distance equals zero sectors." The length of the zero sector transition period, that is, the zero sector transition time period, may include, in addition to the time for shifting the position of the optical pickup via revolution of the BD-ROM disc 101, overhead caused by error correction process. "Overhead caused by error correction process" refers to excess time caused by performing error correction process twice using an ECC block when the boundary between ECC blocks does not match with the boundary between two extents. A whole ECC block is necessary for error correction process. Accordingly, when two consecutive extents share a single ECC block, the whole ECC block is read and used for error correction process during reading of either extent. As a result, each time one of these extents is read, a maximum of 32 sectors of excess data is additionally read. The overhead caused by error correction process is estimated at the total time for reading the excess data, i.e. 32 sectors×2048 bytes×8 bits/byte×2 times/read rate. Note that extents may be structured in units of ECC blocks. In this case, the size of each extent equals an integer multiple of the size of an ECC block. The overhead caused by error correction process can thus be removed from the zero sector transition period.

Structure of Extent Blocks

Within one extent block, the $(i+1)^{th}$ base-view extent B[m+i] and dependent-view extent D[m+i] have the same extent ATC time. Hereinafter, such a pair of extents B[m+i], D[m+i] is referred to as an "extent pair." The "extent ATC time" indicates the range of ATSs assigned to source packets in one extent, i.e. the difference from the ATS of the top source packet in an extent to the ATS of the top source packet in the next extent. This difference equals the time, expressed as an ATC value, required for the playback device 102 to transfer all of the source packets in the extent from the read buffer to the system target decoder. The method of aligning the extent ATC times is described below. The "read buffer" is a buffer memory in the playback device 102 where extents read from the BD-ROM disc 101 are temporarily stored before being transmitted to the system target decoder. Details on the read buffer are provided later.

The VAUs located at the top of each extent pair D[m+1], B[m+1] belong to the same 3D VAU, and in particular include the top picture of the GOP representing the same 3D video image. For example, the top dependent-view extent D[m+i] includes a P picture in the right-view video stream, and the top base-view extent B[m+1] includes an I picture in the base-view video stream. The 2D video image represented by the P picture in the right-view video stream and the 2D video image represented by the I picture in the base-view video stream together represent one 3D video image. In particular, the P picture, as shown in FIG. 7, is compressed using the I picture as a reference picture. Accordingly, the playback device 102 in 3D playback mode can start playback of 3D video images from any extent pair D[m+1], B[m+1]. That is to say, the device can perform the process that requires random access of video streams, such as interrupt playback.

Relationship Between Extended Extents and Extent Blocks

Figure 13:
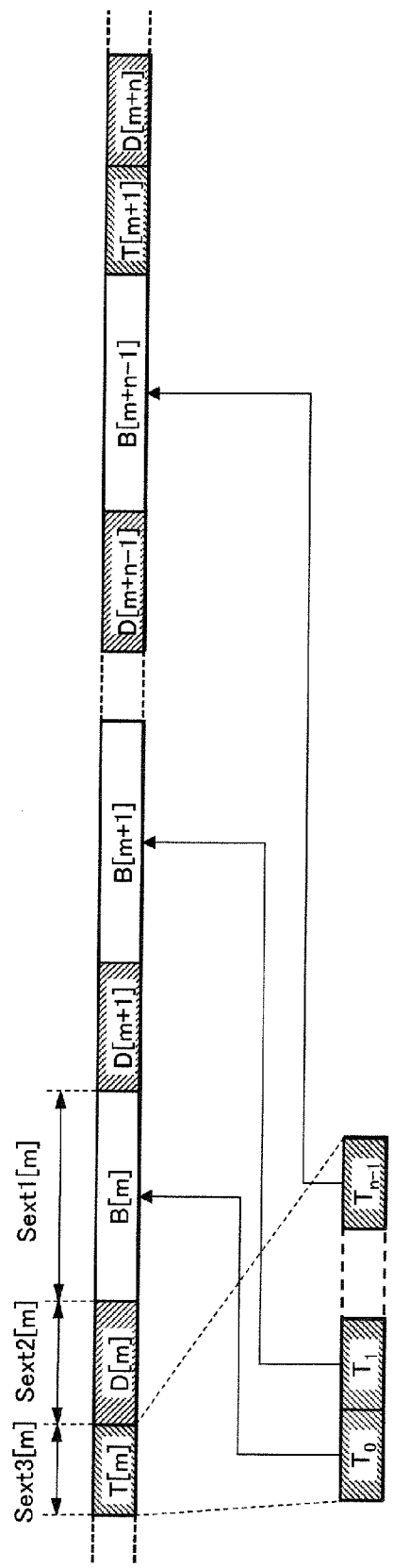
FIG. 13 is a schematic diagram showing the relationship between one extended extent T[m] (m=0, 1, 2, ... ) and the extent blocks B[k], D[k] (k=m, m+1, ..., m+n−1) arranged immediately thereafter.

FIG. 13 is a schematic diagram showing the relationship between one extended extent T[m] (m=0, 1, 2, . . . ) and the extent blocks B[k], D[k] (k=m, m+1, . . . , m+n−1) arranged immediately thereafter. As illustrated in FIG. 13, one extent block includes "n" base-view extents B[k] and "n" dependent-view extents D[k]. The number "n" is two or greater, and different extent blocks may have different numbers "n." The reason why the number "n" is 2 or greater is described below. The extended extents T[m] include extended data T, to be used in combination with the following "n" base-view extents B[m+1] (i=0, 1, n−1). The $(i+1)^{th}$ piece of extended data T, is resolution extension information for the pictures included in the $(m+1+1)^{th}$ base-view extent B[m+1] and is used when extending these full HD pictures to 4K2K pictures. During random access, such as interrupt playback or the like, an extended extent to be first read includes extended data for a base-view picture located at the playback start position. The extent ATC time of the extended extent T[m] is equal to the extent ATC time of the entirety of the following "n" base-view extents B[m+1].

As shown in FIG. 13, the $(m+1)^{th}$ extended extent block has the extended extent T[m] located before the extent block D[m+i], B[m+i] (i=0, 1, . . . , n−1). The reason is, as described below, that the extended extent T[m] has a lower bit rate than either the dependent-view extent D[m+i] or the base-view extent B[m+i] constituting the extent block. Furthermore, each extent pair has the dependent-view extent D[k] located before the base-view extent B[k]. The reason is, as described below, that the dependent-view extent D[k] generally has a lower bit rate than the base-view extent B[k].

When the $(k+1)^{th}$ dependent-view extent D[k] includes a right-view picture, the picture is compressed by using the base-view picture included in the $(k+1)^{th}$ base-view extent B[k] as a reference picture. On the other hand, when the dependent-view extent D[k] includes a depth map, the amount of data per pixel in the depth map, i.e., the number of bits of a depth value is generally smaller than the amount of data per pixel of the base-view picture, i.e., the sum of the number of bits of chromatic coordinate values and an a value. Furthermore, as shown in FIGS. 3A through 3D, unlike the sub-TS, the main TS includes other elementary streams such as a primary audio stream, in addition to the primary video stream. Accordingly, the bit rate of the dependent-view extent D[k] is generally equal to or less than the bit rate of the base-view extent B[k]. Since both the extents D[k] and B[k] have the same extent ATC time, the size $S_{EXT2}[k]$ of the dependent-view extent D[k] is generally equal to or less than the size $S_{EXT1}[k]$ of the base-view extent B[k]: $S_{EXT2}[k] \leq S_{EXT1}[k]$.

The bit rate of the extended extent T[m] is determined by the amount of data per frame of the pixel difference information 403 shown in FIG. 4. The pixel difference information 403 is simply the difference between the pixel data obtained by interpolation from a full HD video frame and the pixel data included in the original 4K2K video frame. Accordingly, even for the entirety of "n" frames, the amount of data in the pixel difference information 403 is sufficiently smaller than the amount of data in one full HD frame. Therefore, the size $S_{EXT3}[k]$ of the extended extent T[m] is generally no larger than the size $S_{EXT2}[k]$ of any of the dependent-view extents D[k]: $S_{EXT3}[k] \leq S_{EXT2}[k]$.

Placing extents at the top of each extended extent block and in each extent pair in order from the extent with the smallest bit rate has the following advantage. The playback device 102 in 3D playback mode, when reading an extent from the top of each extent block, or when reading an extent from the playback start position, does not transfer the read extent to the system target decoder until finishing the reading of the entirety of the extent into the read buffer. After finishing the reading, the playback device 102 transfers the extent to the system target decoder in parallel with the next extent. This process is called "preloading." The playback device 102 in extended playback mode similarly performs preloading during reading of each extended extent.

The technical significance of preloading is as follows. In L/R mode, decoded base-view pictures are necessary for decoding dependent-view pictures. Therefore, in order to maintain the minimum capacity of a buffer required for holding decoded pictures until output process, it is preferable to simultaneously provide one extent pair to the system target decoder to be simultaneously decoded. In depth mode, it is necessary to generate a pair of video frames that represents parallax images from a pair of a decoded base-view picture and a decoded depth map. Therefore, in order to maintain the minimum capacity of the buffer necessary for holding the decoded data until generation of the pair of video frames, it is preferable to simultaneously provide the extent pair to the system target decoder to be simultaneously decoded. In extended playback mode, it is necessary to use resolution extension information to extend a decoded base-view picture to a 4K2K video frame. Therefore, in order to maintain the minimum capacity of the buffer necessary for holding the decoded data until extension of its resolution, it is preferable to simultaneously provide an extended extent and a base-view extent to the system target decoder to be simultaneously decoded. Therefore, preloading is performed in both 3D playback mode and extended playback mode. The playback device 102 can thereby simultaneously provide an extent that is first read and its next extent from the read buffer to the system target decoder.

When preloading, the entirety of the extent that is read first is stored in the read buffer. Accordingly, the read buffer requires at least a capacity equal to the size of the extent. in order to maintain the capacity of the read buffer at a minimum, the size of the extent to be preloaded should be as small as possible. Therefore, as shown in FIG. 13, an extent with a small amount of data is placed first. This enables the minimum capacity to be maintained in the read buffer.

2-6: Arrangement of Extents Near Locations where a Long Jump is Necessary

Since the BD-ROM disc 101 is a multi-layer disc, a sequence of multiplexed stream data may be recorded continuously across a layer boundary. A "layer boundary" refers to the boundary between two portions of the logical address space of a multi-layer disc; one of the portions belonging to one recording layer and the other to another recording layer. Even when the BD-ROM disc 101 is a single layer disc, a sequence of multiplexed stream data may be recorded so as to sandwich a recording area for other data. When reading the multiplexed stream data, the BD-ROM drive performs a long jump in order to skip over the layer boundary or the recording area of the other data. A "long jump" is a collective term for a jump with a long seek time and specifically refers to (i) a jump performed to switch recording layers and (ii) a jump whose distance exceeds a predetermined threshold value. "Jump distance" refers to the length of the area on the BD-ROM disc 101 where reading is skipped during a jump period. The jump distance is expressed as the number of sectors included in the area, or as the amount of data that can be stored in the area. The threshold value in type (ii) is specified as 40,000 sectors=about 78.1 MB, for example, in the BD-ROM standard. This threshold value, however, depends on the type of BD-ROM disc and on the reading performance of BD-ROM drive. Long jumps particularly include focus jumps and track jumps. A "focus jump" is a jump caused by switching recording layers, and includes the process to change the focus distance of the optical pickup. A "track jump" includes the process to move the optical pickup in a radial direction along the BD-ROM disc 101.

On the BD-ROM disc 101, immediately before or immediately after the location where a long jump is necessary, such as a layer boundary, extents are arranged so that a playback path in 3D playback mode is separated from playback paths in 2D playback mode and in extended playback mode. These patterns for arrangement include, for example, arrangement 1 and arrangement 2 described below. For ease of explanation, arrangements 1 and 2 are assumed to be used for both an extent group recorded immediately before a layer boundary on the BD-ROM disc 101 and another extent group recorded immediately after the layer boundary. Note that the following explanation holds true when the recording area of extents is separated, not by a layer boundary, by a recording area of other data that exceeds a predetermined number of sectors (such as 40,000 sectors).

Arrangement 1

Figure 14:
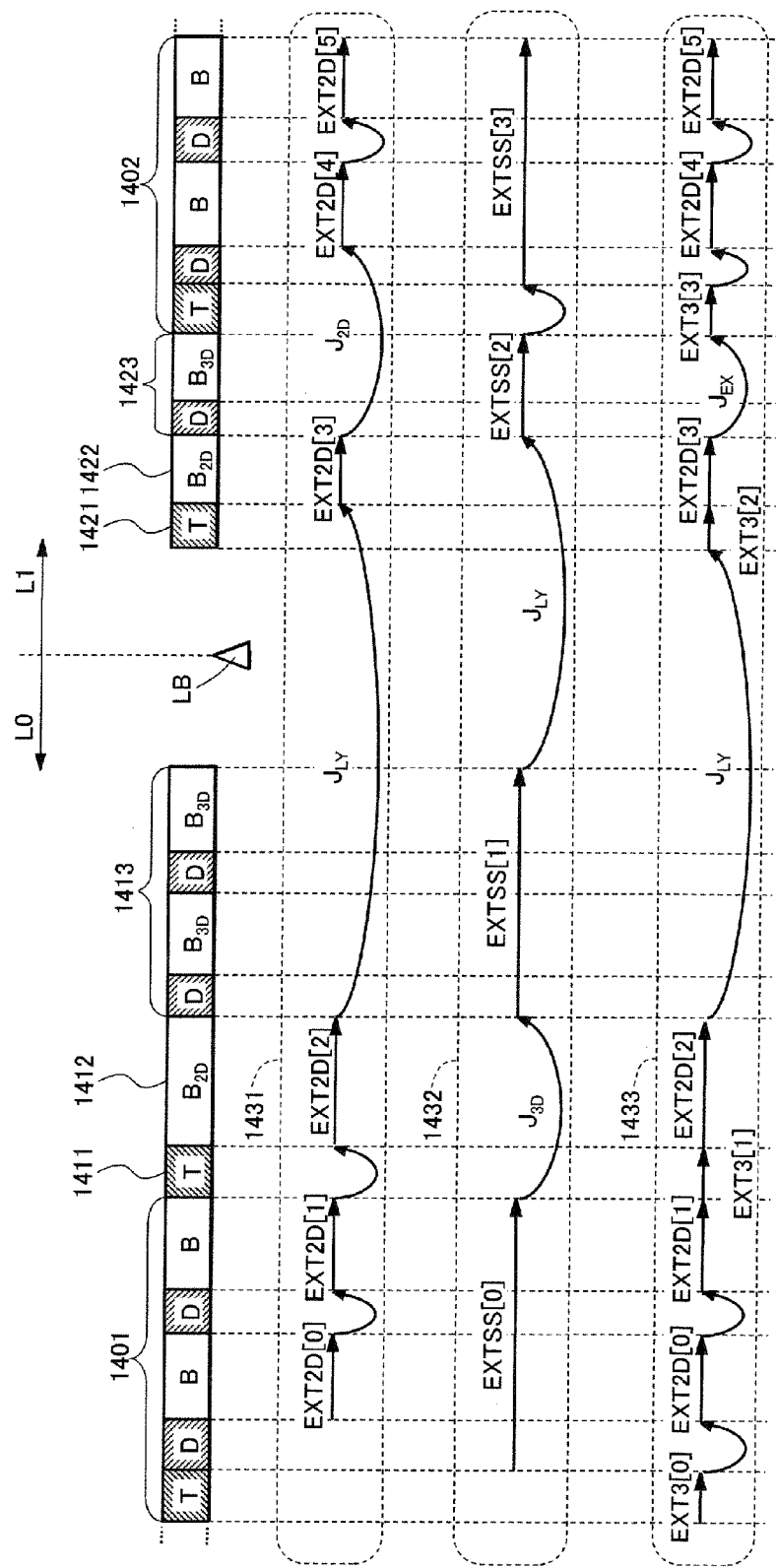
FIG. 14 is a schematic diagram showing arrangement 1 of extents recorded before and after a layer boundary on the BD-ROM disc, as well as the playback paths in their respective modes designed for the extents.

FIG. 14 is a schematic diagram showing arrangement 1 of extents recorded before and after a layer boundary LB on the BD-ROM disc 101, as well as the playback paths in their respective modes designed for the extents. As illustrated in FIG. 14, a first recording layer L0 located before the layer boundary LB includes a first shared section 1401, and a second recording layer L1 located after the layer boundary LB includes a second shared section 1402. The "shared sections" 1401 and 1402 are sectors in which extended extent blocks are arranged continuously and are accessed by the playback device in every mode: 2D playback mode, 3D playback mode, and extended playback mode. In each extended extent block, two extent pairs D, B are provided in an interleaved arrangement immediately after one extended extent T.

As illustrated in FIG. 14, the first recording layer L0 includes a first extended data specific section 1411, a first monoscopic video specific section 1412, and a first stereoscopic video specific section 1413 between the first shared section 1401 and the layer boundary LB. One extended extent T is located in the first extended data specific section 1411, one base-view extent $B_{2D}$ is located in the first monoscopic video specific section 1412, and two extent pairs D, $B_{3D}$ are located in the first stereoscopic video specific section 1413. The base-view extent $B_{2D}$ in the first monoscopic video specific section 1412 is a copy of the entirety of the base-view extents $B_{3D}$ in the first stereoscopic video specific section 1413, i.e., the extent $B_{2D}$ matches with the entirety of the extents $B_{3D}$ bit for bit. In other words, the same data is recorded in duplicate. The extended extent T in the first extended data specific section 1411 includes extended data to be used in combination with the base-view extent $B_{2D}$ in the first monoscopic video specific section 1412. Accordingly, the extended extent T and the base-view extent $B_{2D}$ have the same extent ATC time. The extended extent T in the first extended data specific section 1411 can be accessed as one extent EXT3[1] of the extended stream file. The base-view extent $B_{2D}$ in the first monoscopic video specific section 1412 can be accessed as one extent EXT2D[2] of the file 2D. The base-view extent $B_{3D}$ in the first stereoscopic video specific section 1413, along with the dependent-view extent D therein, can be accessed as one extent EXTSS[1] of the file SS.

The second recording layer L1 includes a second extended data specific section 1421, a second monoscopic video specific section 1422, and a second stereoscopic video specific section 1423 between the layer boundary LB and the second shared section 1402. One extended extent T is located in the second extended data specific section 1421, one base-view extent $B_{2D}$ is located in the second monoscopic video specific section 1422, and one extent pair D, $B_{3D}$ is located in the second stereoscopic video specific section 1423. The base-view extent $B_{2D}$ in the second monoscopic video specific section 1422 is a copy of the base-view extent $B_{3D}$ in the second stereoscopic video specific section 1423, i.e., the former extent $B_{2D}$ matches with the latter extent $B_{3D}$ bit for bit. In other words, the same data is recorded in duplicate. The extended extent T in the second extended data specific section 1421 includes extended data to be used in combination with the base-view extent $B_{2D}$ in the second monoscopic video specific section 1422. Accordingly, the extended extent T and the base-view extent $B_{2D}$ have the same extent ATC time. The extended extent T in the second extended data specific section 1421 can be accessed as one extent EXT3[2] of the extended stream file. The base-view extent $B_{2D}$ in the second monoscopic video specific section 1422 can be accessed as one extent EXT2D[3] of the file 2D. The base-view extent $B_{3D}$ in the second stereoscopic video specific section 1423, along with the dependent-view extent D therein, can be accessed as one extent EXTSS[2] of the file SS.

As shown in FIG. 14, arrangement 1 has the monoscopic video specific sections 1412 and 1422 immediately after the extended data specific sections 1411 and 1421, respectively, and in addition the stereoscopic video specific sections 1413 and 1423 immediately after the monoscopic video specific sections 1412 and 1422, respectively.

The playback device 102 in 2D playback mode plays back the file 2D. Accordingly, from the extents shown in FIG. 14, the extents EXT2D[0]-EXT2D[5] of the file 2D are read, as shown by the playback path 1431 in 2D playback mode. Specifically, in the first shared section 1401, two base-view extents B are read as two extents EXT2D[0] and EXT2D[1] of the file 2D, and reading of the dependent-view extent D located therebetween is skipped. Next, access to the first extended data specific section 1411 is skipped, and then the base-view extent $B_{2D}$ is read from the immediately subsequent first monoscopic video specific section 1412 as one extent EXT2D[2] of the file 2D. Immediately thereafter, a long jump $J_{LY}$ occurs to move the position of reading over the first stereoscopic video specific section 1413, the layer boundary LB, and the second extended data specific section 1421. The base-view extent $B_{2D}$ in the second monoscopic video specific section 1422 is then read as one extent EXT2D[3] of the file 2D. A jump $J_{2D}$ occurs immediately thereafter to skip access to the second stereoscopic video specific section 1423, as well as reading of the extended extent T and dependent-view extent D at the top of the second shared section 1402. Furthermore, in the second shared section 1402, two base-view extents B are read as two extents EXT2D[4] and EXT2D[5] of the file 2D, and reading of the dependent-view extent D located therebetween is skipped.

The playback device 102 in 3D playback mode plays back the file SS. Accordingly, from the extents shown in FIG. 14, the extents EXTSS[0]-EXTSS[3] of the file SS are read, as shown by the playback path 1432 in 3D playback mode. Specifically, an extent block D, B, D, and B is read continuously from the first shared section 1401 as one extent EXTSS[0] of the file SS. Immediately thereafter, a jump $J_{3D}$ occurs to skip access to the first extended data specific section 1411 and the first monoscopic video specific section 1412. Next, an extent block D, $B_{3D}$, D, and $B_{3D}$ is read continuously from the first stereoscopic video specific section 1413 as one extent EXTSS[1] of the file SS. Immediately thereafter, a long jump $J_{LY}$ occurs to move the position of reading over the layer boundary LB, the second extended data specific section 1421, and the second monoscopic video specific section 1422. Subsequently, an extent pair D and $B_{3D}$ is read continuously from the second stereoscopic video specific section 1423 as one extent EXTSS[2] of the file SS. Furthermore, in the second shared section 1402, reading of the extended extent T is skipped, and then the subsequent extent block D, B, D, and B is read continuously as one extent EXTSS[3] of the file SS.

The playback device 102 in extended playback mode plays back the extended stream file and the file 2D. Accordingly, from the extents shown in FIG. 14, the extents EXT3[0]-EXT3[3] of the extended stream file and the extents EXT2D[0]-EXT2D[5] of the file 2D are read, as shown by the playback path 1433 in extended playback mode. Specifically, in the first shared section 1401, the extended extent T=EXT3[0] is first read, and then two base-view extents B are read as two extents EXT2D[0] and EXT2D[1] of the file 2D, and further reading of two dependent-view extents D is skipped. Next, the extended extent T=EXT3[1] is read from the first extended data specific section 1411, and then the base-view extent $B_{2D}$ is read from the first monoscopic video specific section 1412 as one extent EXT2D[2] of the file 2D. Immediately thereafter, a long jump $J_{LY}$ occurs to move the position of reading over the first stereoscopic video specific section 1413 and the layer boundary LB. Subsequently, the extended extent T=EXT3[2] is read from the second extended data specific section 1421, and then the base-view extent $B_{2D}$ is read from the second monoscopic video specific section 1422 as one extent EXT2D[3] of the file 2D. A jump $J_{EX}$ occurs immediately thereafter to skip access to the second stereoscopic video specific section 1423. Furthermore, in the second shared section 1402, the extended extent T=EXT3[3] is first read, and then two base-view extents B are read as two extents EXT2D[4] and EXT2D[5] of the file 2D, and in addition reading of two dependent-view extents D is skipped.

Arrangement 2

Figure 15:
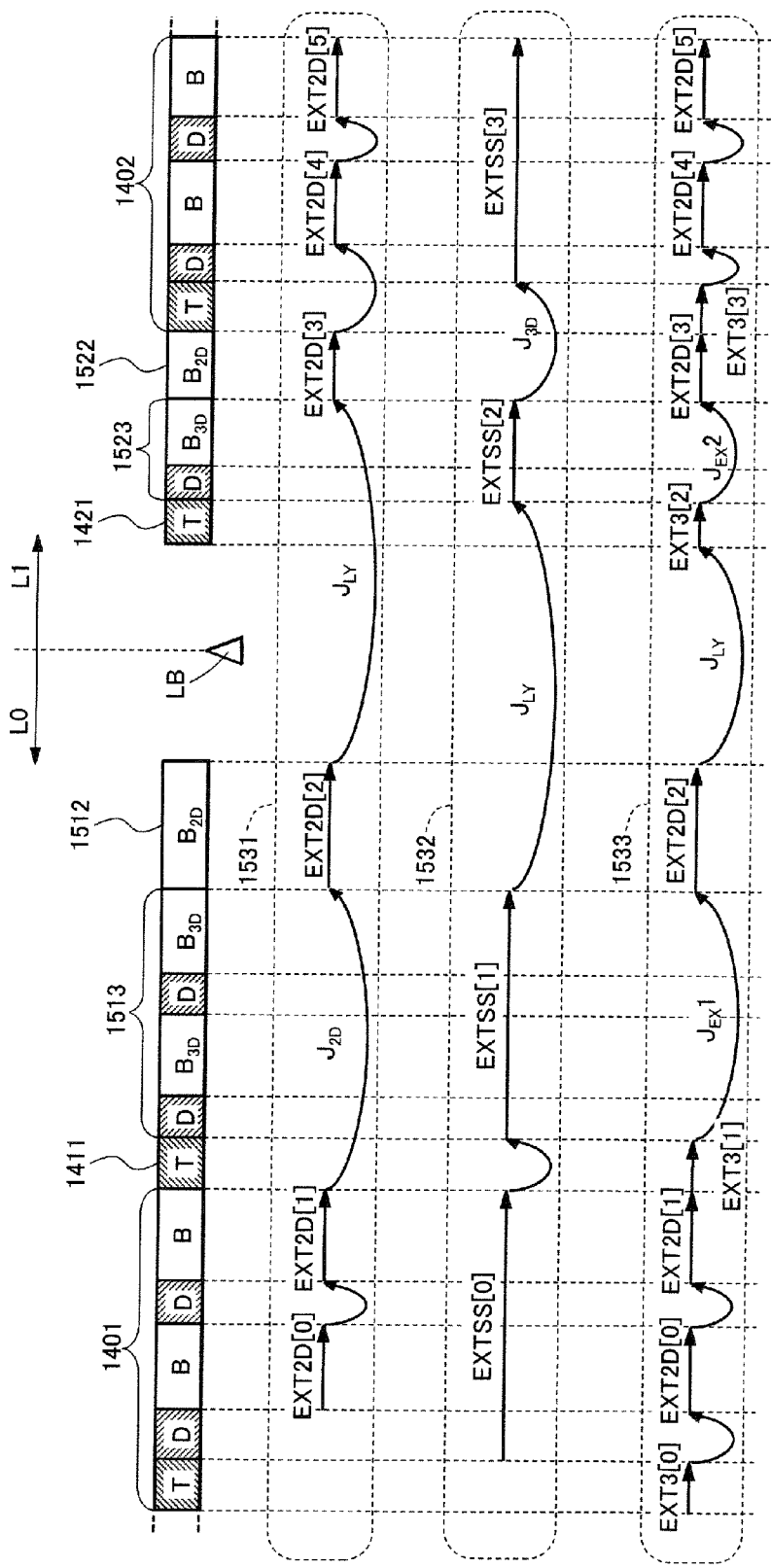
FIG. 15 is a schematic diagram showing arrangement 2 of extents recorded before and after a layer boundary on the BD-ROM disc, as well as the playback paths in their respective modes designed for the extents.

FIG. 15 is a schematic diagram showing arrangement 2 of extents recorded before and after a layer boundary LB on the BD-ROM disc 101, as well as playback paths in their respective modes designed for the extents. As is clear when FIG. 15 is compared with FIG. 14, arrangement 2 differs from arrangement 1 only in that monoscopic video specific sections 1512 and 1522 and stereoscopic video specific sections 1513 and 1523 are located at the reversed positions. In other words, arrangement 2 has the stereoscopic video specific sections 1513 and 1523 located immediately after the extended data specific sections 1411 and 1421, respectively, and further the monoscopic video specific sections 1512 and 1522 located immediately after the stereoscopic video specific sections 1513 and 1523, respectively.

As indicated by the playback path 1431 in 2D playback mode, the playback device 102 in 2D playback mode reads the extents EXT2D[0]-EXT2D[5] of the file 2D from the extents shown in FIG. 15. Specifically, in the first shared section 1401, two base-view extents B are read as two extents EXT2D[0] and EXT2D[1] of the file 2D, and reading of the dependent-view extent D located therebetween is skipped. Immediately thereafter, a jump $J_{2D}$ occurs to skip access to the first extended data specific section 1411 and the first stereoscopic video specific section 1513. The base-view extent $B_{2D}$ is then read from the first monoscopic video specific section 1512 as one extent EXT2D[2] of the file 2D. Immediately thereafter, a long jump $J_{LY}$ occurs to move the position of reading over the layer boundary LB, the second extended data specific section 1421, and the second stereoscopic video specific section 1523. The base-view extent $B_{2D}$ in the second monoscopic video specific section 1522 is then read as one extent EXT2D[3] of the file 2D. Next, in the second shared section 1402, reading of an extended extent T and two dependent-view extents D is skipped, and two base-view extents B are read as two extents EXT2D[4] and EXT2D[5] of the file 2D.

As indicated by the playback path 1532 in 3D playback mode, the playback device 102 in 3D playback mode reads the extents EXTSS[0]-EXTSS[3] of the file SS from the extents shown in FIG. 15. Specifically, an extent block D, B, D, and B is read continuously from the first shared section 1401 as one extent EXTSS[0] of the file SS. Next, access to the first extended data specific section 1411 is skipped, and then an extent block D, $B_{3D}$, D, and $B_{3D}$ is read continuously from the first stereoscopic video specific section 1513 as one extent EXTSS[1] of the file SS. Immediately thereafter, a long jump $J_{LY}$ occurs to move the position of reading over the first monoscopic video specific section 1512, the layer boundary LB, and the second extended data specific section 1421. Subsequently, an extent pair D and $B_{3D}$ is read continuously from the second stereoscopic video specific section 1523 as one extent EXTSS[2] of the file SS. A jump $J_{3D}$ occurs immediately thereafter to skip access to the second monoscopic video specific section 1522. Furthermore, in the second shared section 1402, reading of the extended extent T is skipped, and then the subsequent extent block D, B, D, and B is read continuously as one extent EXTSS[3] of the file SS.

As shown by the playback path 1533 in extended playback mode, the playback device 102 in extended playback mode reads the extents EXT3[0]-EXT3[3] of the extended stream file and the extents EXT2D[0]-EXT2D[5] of the file 2D from the extents shown in FIG. 15. Specifically, in the first shared section 1401, the extended extent T=EXT3[0] is first read, and then two base-view extents B are read as two extents EXT2D[0] and EXT2D[1] of the file 2D, and in addition reading of two dependent-view extents D is skipped.

Next, the extended extent T=EXT3[1] is read from the first extended data specific section 1411. A jump $J_{EX1}$ occurs immediately thereafter to skip access to the first stereoscopic video specific section 1513. The base-view extent $B_{2D}$ in the first monoscopic video specific section 1512 is then read as one extent EXT2D[2] of the file 2D. Immediately thereafter, a long jump $J_{LY}$ occurs to move the position of reading over the layer boundary LB. Subsequently, the extended extent T=EXT3[2] is read from the second extended data specific section 1421. A jump $J_{EX2}$ occurs immediately thereafter to skip access to the second stereoscopic video specific section 1523. Furthermore, the base-view extent $B_{2D}$ is then read from the second monoscopic video specific section 1522 as one extent EXT2D[3] of the file 2D. In the second shared section 1402, the extended extent T=EXT3[3] is first read, and then two base-view extents B are read as two extents EXT2D[4] and EXT2D[5] of the file 2D, and reading of two dependent-view extents D is skipped.

As shown in FIGS. 14 and 15, in 2D playback mode, the monoscopic video specific sections are accessed, whereas access to the extended data specific sections and the stereoscopic video specific sections is skipped. In 3D playback mode, the stereoscopic video specific sections are accessed, whereas access to the extended data specific sections and the monoscopic video specific sections is skipped. In extended playback mode, the extended data specific sections and the monoscopic video specific sections are accessed, whereas access to the stereoscopic video specific sections is skipped. In this way, arrangements 1 and 2 separate playback paths in different modes immediately before and after the long jump $J_{LY}$; the playback paths in 2D playback mode and in extended playback mode run through the monoscopic video specific sections, whereas the playback path in 3D playback mode runs through the stereoscopic video specific sections. In other words, the playback path in 3D playback mode is separated from the playback paths in 2D playback mode and in extended playback mode. Since the entirety of the base-view extents $B_{3D}$ in the stereoscopic video specific sections matches with the entirety of the base-view extents $B_{2D}$ in the monoscopic video specific sections bit for bit, the same base-view video frames are played back in both the playback modes.

2-7: Conditions on Extent Size

The base-view extent B, the dependent-view extent D, and the extended extent T are each structured in aligned units. Accordingly, the size of each extent equals a multiple of the size of an aligned unit (=6,144 bytes, or approximately 6 KB). Accordingly, the BD-ROM drive can reliably read any extent continuously in its entirety, since the boundary between extents coincides with the boundary between sectors.

As illustrated in FIG. 12, in any of 2D playback mode, 3D playback mode, and extended playback mode, the playback device 102 performs a jump. Accordingly, in order to play back video images seamlessly in any playback mode, the lower limit of the size of each data block, i.e. the minimum extent size, should be designed so that underflow does not occur in the read buffer during the jump.

2-7-A: Conditions in 2D Playback Mode

Figure 16:
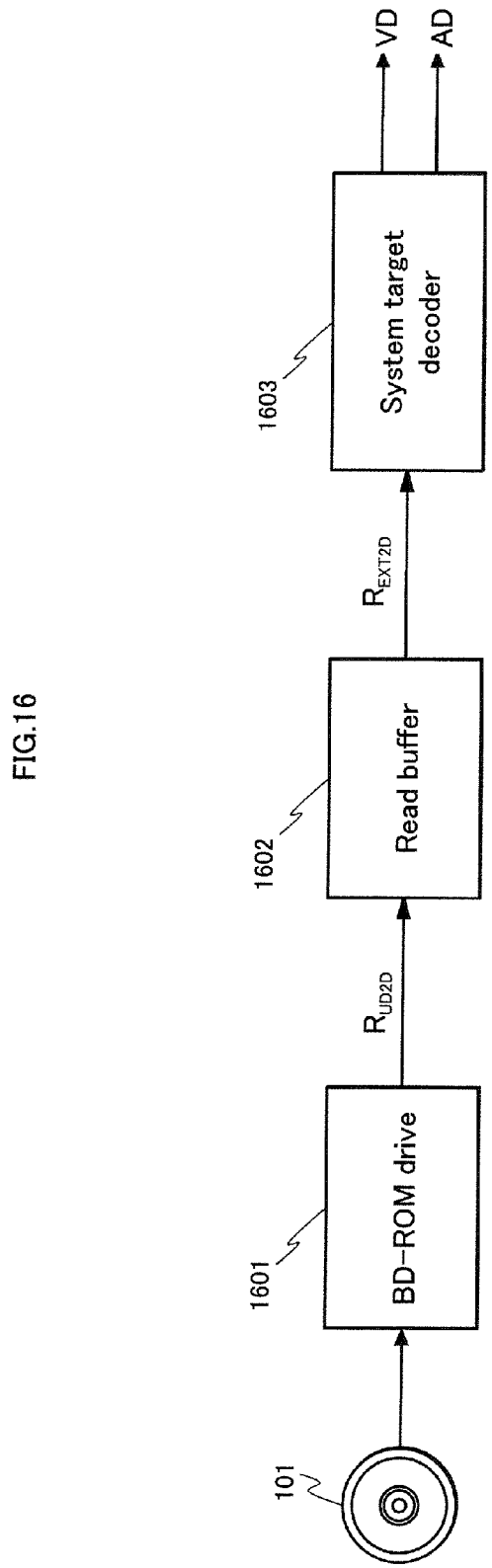
FIG. 16 is a block diagram showing a playback processing system built in the playback device in 2D playback mode.

FIG. 16 is a block diagram showing a playback processing system built in the playback device 102 in 2D playback mode. As shown in FIG. 16, this playback processing system includes a BD-ROM drive 1601, read buffer 1602, and system target decoder 1603. The BD-ROM drive 1601 reads extents in the file 2D from the BD-ROM disc 101 and transfers the extents to the read buffer 1602 at a read rate $R_{UD2D}$. The read buffer 1602 is a buffer memory that is built in the playback device 102 and receives and stores extents from the BD-ROM drive 1601. The system target decoder 1603 reads source packets from each extent stored in the read buffer 1602 at a mean transfer rate $R_{EXT2D}$ and decodes the source packets into video data VD and audio data AD.

The mean transfer rate $R_{EXT2D}$ equals 192/188 times the mean processing rate at which the system target decoder 1603 extracts TS packets from source packets stored in the read buffer 1602. In this case, the coefficient 192/188 is the ratio of the byte numbers between a source packet and a TS packet. The mean transfer rate $R_{EXT2D}$ is conventionally represented in bits/second and specifically equals the size of an extent, which is expressed in bits, divided by the extent ATC time. The "size of an extent expressed in bits" equals the number of source packets in the extent times the bit number per source packet (=192 bytes×8 bits/byte). The mean transfer rate $R_{EXT2D}$ typically varies with extent. The maximum value $R_{MAX2D}$ of the mean transfer rate $R_{EXT2D}$ equals 192/188 times the bit rate of the file 2D. The maximum value of the speed at which the system target decoder 1603 is requested to process TS packets, i.e., the "system rate" $R_{TS}$, is set to be equal to the bit rate of the file 2D. The system rate $R_{TS}$ is normally expressed in bits per second (bps) and equals eight times the main TS recording rate expressed in bytes per second (Bps).

The read rate $R_{UD2D}$ is normally expressed in bits/second and is set at a higher value, e.g., 54 Mbps, than the maximum value $R_{MAX2D}$ of the mean transfer rate $R_{EXT2D}$: $R_{UD2D} > R_{MAX2D}$. This prevents decoding operation of the system target decoder 1603 from causing underflow of the read buffer 1602 while the BD-ROM drive 1601 is reading an extent from the BD-ROM disc 101.

Figures 17A, 17B:
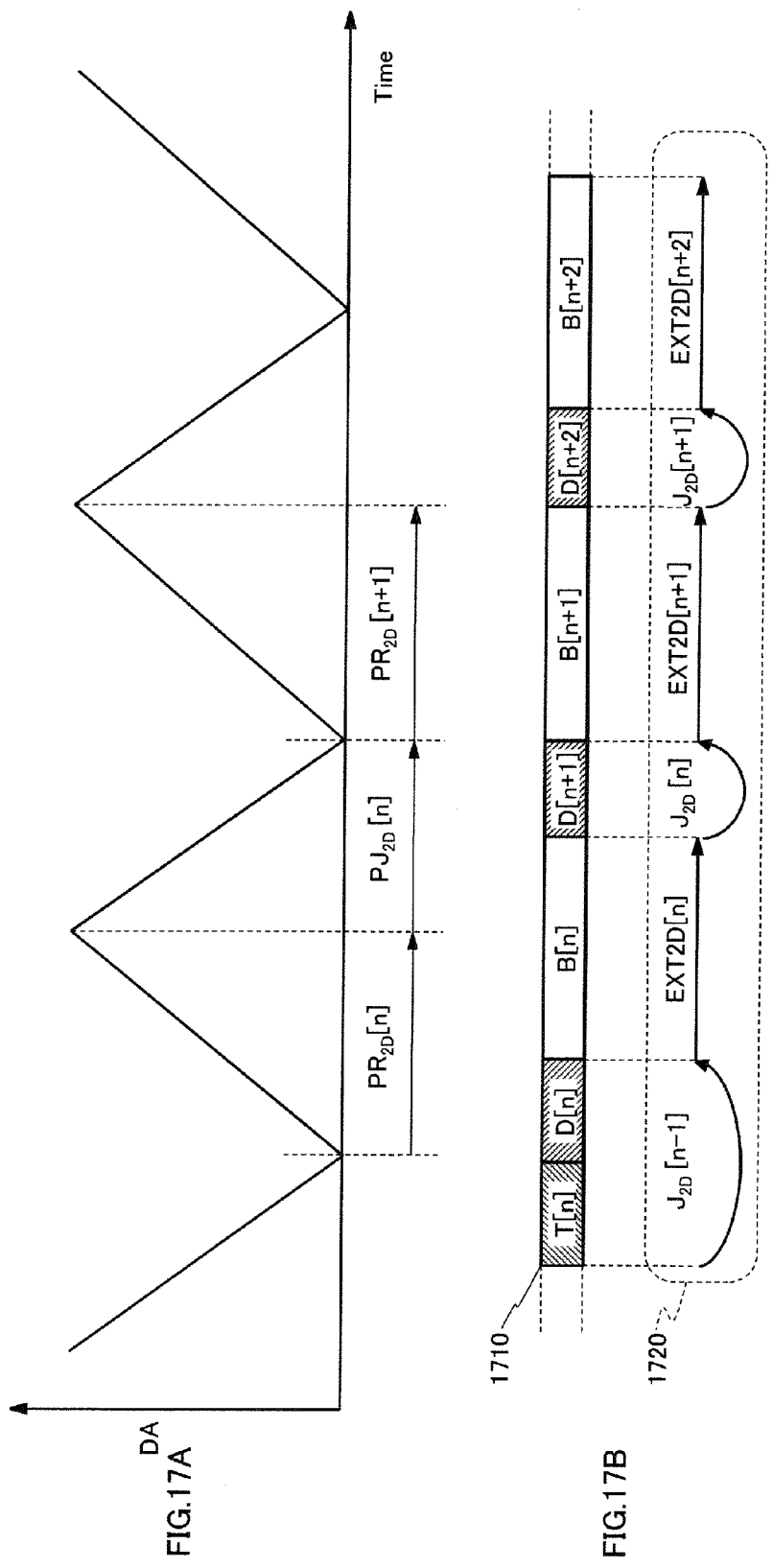
FIG. 17A is a graph showing the change in the data amount stored in the read buffer during operation in 2D playback mode.
FIG. 17B is a schematic diagram showing a playback path in 2D playback mode for an extended extent block for playback.

FIG. 17A is a graph showing the change in the data amount DA stored in the read buffer 1602 during operation in 2D playback mode. FIG. 17B is a schematic diagram showing a playback path 1720 in 2D playback mode designed for an extended extent block 1710 to be played back. As shown in FIG. 17B, in accordance with the playback path 1720, the base-view extents B[m] (m=n, n+1, n+2, where the number "n" is an integer equal to or greater than zero) included in the extended extent block 1710 are read from the BD-ROM disc 101 into the read buffer 1602 as one extent EXT2D[m] of the file 2D. As shown in FIG. 17A, during the read period $PR_{2D}$[n] for each extent EXT2D[n], the stored data amount DA increases at a rate equal to $R_{UD2D}$-$R_{EXT2D}$[n], the difference between the read rate $R_{UD2D}$ and the mean transfer rate $R_{EXT2D}$[n]. A jump $J_{2D}$[n] occurs between two contiguous 2D extents EXT2D[n] and EXT2D[n+1]. Reading of data from the BD-ROM disc 101 is interrupted during this jump period $PJ_{2D}$[n], since the reading of the dependent-view extent D[n+1] is skipped. Accordingly, the stored data amount DA decreases at a mean transfer rate $R_{EXT2D}$[n] during each jump period $PJ_{2D}$[n].

Reading and transfer operations by the BD-ROM drive 1601 are not actually performed in a continuous manner, as suggested by the graph in FIG. 17A, but rather in an intermittent manner. This prevents the stored data amount DA from exceeding the capacity of the read buffer 1602, i.e., overflow in the read buffer 1602 during the read period $PR_{2D}$[n] for each extent. Accordingly, the graph in FIG. 17A represents actual step-wise changes as approximated linear changes.

For seamless playback of full HD 2D video images from the extent block 1710 shown in FIG. 17B, the following two conditions should be satisfied: first, the size $S_{EXT2D}$[n] of each extent EXT2D[n] of the file 2D should satisfy expression (1) below. Second, the distance between extents of the file 2D should not exceed a predetermined upper limit.

Minimum Extent Size of Extents of the File 2D

During each jump period $PJ_{2D}$[n], data needs to be so continuously provided from the read buffer 1602 to the system target decoder 1603 that the system target decoder 1603 can ensure its continuous output. To do so, the size of each extent in the file 2D should satisfy the following condition 1.

The size $S_{EXT2D}$[n] of each extent EXT2D[n] is the same as the data amount transferred from the read buffer 1602 to the system target decoder 1603 from the read period $PR_{2D}$[n] through the next jump period $PJ_{2D}$[n]. In this case, as shown in FIG. 17A, the stored data amount DA at the end of the jump period $PJ_{2D}$[n] does not fall below the value at the start of the read period $PR_{2D}$[n]. In other words, during each jump period $PJ_{2D}$[n], data is continuously provided from the read buffer 1602 to the system target decoder 1603. In particular, underflow does not occur in the read buffer 1602. Note that the length of the read period $PR_{2D}$[n] equals a value $S_{EXT2D}$[n]/$R_{UD2D}$, the size $S_{EXT2D}$[n] of an extent EXT2D[n] divided by the read rate $R_{UD2D}$. Accordingly, condition 1 indicates the following. The minimum extent size of each extent EXT2D[n] in the file 2D is expressed in the right-hand side of expression (1):

$$S_{EXT2D}[n] \geq \left( \frac{S_{EXT2D}[n]}{R_{UD2D}} + T_{JUMP\text{-}2D}[n] \right) \times R_{EXT2D}[n] \therefore \quad (1)$$

$$S_{EXT2D}[n] \geq CEIL\left( \frac{R_{EXT2D}[n]}{8} \times \frac{R_{UD2D}}{R_{UD2D} - R_{EXT2D}[n]} \times T_{JUMP\text{-}2D}[n] \right).$$

In expression (1), the jump time $T_{JUMP\text{-}2D}$[n] represents the length of the jump period $PJ_{2D}$[n] in seconds. The read rate $R_{UD2D}$ and the mean transfer rate $R_{EXT2D}$ are both expressed in bits per second. Accordingly, in expression (1), the mean transfer rate $R_{EXT2D}$ is divided by 8 to convert the size $S_{EXT2D}$[n] of the extent from bits to bytes. That is, the size $S_{EXT2D}$[n] of the extent is expressed in bytes. The function CEIL( ) is an operation to round up fractional numbers after the decimal point of the value in parentheses.

As is clear from the playback path 1201 in 2D playback mode shown in FIG. 12, jumps occur frequently in 2D playback mode. Accordingly, to further ensure seamless playback during the jumps, it is preferable to add a margin to the minimum extent size expressed in the right-hand side of expression (1). The following lists three methods for adding a margin.

The first method is to replace the mean transfer rate $R_{EXT2D}$ included in the denominator of the right-hand side of expression (1) with the maximum value thereof, $R_{MAX2D}$. In other words, the size $S_{EXT2D}$ of the extent in the file 2D satisfies expression (1A) instead of expression (1):

$$S_{EXT2D}[n] \geq CEIL\left( \frac{R_{EXT2D}[n]}{8} \times \frac{R_{UD2D}}{R_{UD2D} - R_{MAX2D}} \times T_{JUMP\text{-}2D}[n] \right). \quad (1A)$$

The second method is to extend the extent ATC time of an extent in the file 2D by ΔT seconds. In other words, the size $S_{EXT2D}$ of the extent satisfies expression (1B) or (1C) instead of expression (1):

$$S_{EXT2D}[n] \geq \quad (1B)$$
$$CEIL\left\{ \frac{R_{EXT2D}[n]}{8} \times \left( \frac{R_{UD2D}}{R_{UD2D} - R_{EXT2D}[n]} \times T_{JUMP\text{-}2D}[n] + \Delta T \right) \right\},$$

$$S_{EXT2D}[n] \geq \quad (1C)$$
$$CEIL\left\{ \frac{R_{EXT2D}[n]}{8} \times \left( \frac{R_{UD2D}}{R_{UD2D} - R_{MAX2D}[n]} \times T_{JUMP\text{-}2D}[n] + \Delta T \right) \right\}.$$

The extension time ΔT may be determined by the length of a GOP, or by the upper limit of the number of extents that can be played back during a predetermined time. For example, if the length of a GOP is one second, the extension time ΔT is set to one second. On the other hand, if the number of extents that can be played back during a predetermined time [sec] has the upper limit of k, then the extension time ΔT is set to the predetermined time/k [sec].

The third method is to replace all of the mean transfer rates $R_{EXT2D}$ included in the right-hand side of expression (1) with the maximum value thereof, $R_{MAX2D}$. In other words, the size $S_{EXT2D}$ of the extent in the file 2D satisfies expression (1D) instead of expression (1):

$$S_{EXT2D}[n] \geq CEIL\left(\frac{R_{MAX2D}}{8} \times \frac{R_{UD2D}}{R_{UD2D} - R_{MAX2D}} \times T_{JUMP\text{-}2D}[n]\right). \quad (1D)$$

The third method can add a larger margin to the minimum extent size than the first method. On the other hand, even when the bit rate of the file 2D is low, a sufficiently large capacity has to be guaranteed in the read buffer since the size of the extent is large. Accordingly, it is necessary to weigh the size of the margin against the use efficiency of the read buffer.

Interval Between Extents of the File 2D

Since the capacity of the read buffer 1602 is limited, the maximum value of the jump time $T_{JUMP\text{-}2D}[n]$ is restricted. In other words, even if the stored data amount DA fills the capacity of the read buffer 1602 immediately before a jump period $PJ_{2D}[n]$, the jump time $T_{JUMP\text{-}2D}[n]$ being too long would cause the stored data amount DA to reach zero during the jump period $PJ_{2D}[n]$, and thus there would be a risk of underflow occurring in the read buffer 1602. Hereinafter, the time for the stored data amount DA to decrease from the capacity of the read buffer 1602 to zero while data supply from the BD-ROM disc 101 to the read buffer 1602 has stopped, that is, the maximum value of the jump time $T_{JUMP\text{-}2D}$ that guarantees seamless playback, is referred to as the "maximum jump time $T_{JUMP\text{-}MAX}$."

Standards of optical discs determine correspondence between jump distances and maximum jump times from the access speed of an optical disc drive and other factors. FIG. 18 is an example of a correspondence table between jump distances $S_{JUMP}$ and maximum jump times $T_{JUMP\text{-}MAX}$ for a BD-ROM disc. As shown in FIG. 18, jump distances $S_{JUMP}$ are represented in units of sectors, and maximum jump times $T_{JUMP\text{-}MAX}$ are represented in milliseconds. One sector equals 2048 bytes. When a jump distance $S_{JUMP}$ is within a range of 1-10000 sectors, 10001-20000 sectors, 20001-40000 sectors, 40001 sectors-1/10 of a stroke (=640000 sectors), and 1/10 of a stroke or greater, the corresponding maximum jump time $T_{JUMP\text{-}MAX}$ is 200 ms, 300 ms, 350 ms, 700 ms, and 1400 ms, respectively. Furthermore, when the jump distance $S_{JUMP}$ is zero sectors, the maximum jump time $T_{JUMP\text{-}MAX}$ is equal to the zero sector transition time $T_{JUMP0}$=0 ms.

Based on the above considerations, the jump time $T_{JUMP\text{-}2D}[n]$ to be substituted into expression (1) is the maximum jump time $T_{JUMP\text{-}MAX}$ specified for each jump distance by BD-ROM disc standards. Specifically, in the table in FIG. 18, the maximum jump time $T_{JUMP\text{-}MAX}$ corresponding to the jump distance $S_{JUMP}$ between two contiguous extents EXT2D[n] and EXT2D[n+1] in the file 2D is substituted into expression (1) as the jump time $T_{JUMP\text{-}2D}[n]$. The jump distance $S_{JUMP}$ equals the number of sectors within the range from the end of the $(n+1)^{th}$ extent EXT2D[n] to the top of the $(n+2)^{th}$ extent EXT2D[n+1].

In order to reduce the capacity of the read buffer that is to be stored in the playback device in 2D playback mode, it is preferable to set the minimum extent size for the file 2D to be as small as possible. Accordingly, the jump time $T_{JUMP\text{-}2D}[n]$ to be substituted into expression (1) is set to be 200 ms, the next smallest value after 0 ms among the maximum jump times $T_{JUMP\text{-}MAX}$ specified in the table in FIG. 18. As a result, the jump distance $S_{JUMP}$ between the extents EXT2D[n] and EXT2D[n+1] in the file 2D, i.e. the interval between these extents EXT2D[n] and EXT2D[n+1], is restricted to be a maximum of 10000 sectors. Like this maximum for the jump distance $S_{JUMP}$, a jump distance $S_{JUMP}$ corresponding to a jump time $T_{JUMP}$ equal to its maximum jump time $T_{JUMP\text{-}MAX}$ is referred to as a "maximum jump distance $S_{JUMP\text{-}MAX}$."

In each extent block, the interval between extents in the file 2D is restricted to at most the maximum jump distance $S_{JUMP\text{-}MAX}$=10000. In this context, this interval equals the size of a dependent-view extent. Accordingly, the size of the dependent-view extents is restricted to at most the amount of data that can be stored in the area for the maximum jump distance $S_{JUMP\text{-}MAX}$=10000 sectors, approximately 19.5 MB (1 MB=1024×1024 bytes).

As shown in FIG. 12, an extended extent is arranged between two adjacent extent blocks. Accordingly, during the jump from the base-view extent located at the end of one extent block until the base-view extent located at the beginning of the next extent block, reading of not only the dependent-view extent but also of the extended extent needs to be skipped. A margin is therefore added to the extents in the file 2D so as to satisfy any of expressions (1A)-(1D) instead of expression (1). In this case, the maximum jump distance $S_{JUMP\text{-}MAX}$ between extent blocks is expanded to 20000 sectors. In other words, it suffices for the sum of the size of the extended extent and of the dependent-view extent to be at most 20000 sectors.

2-7-B: Conditions in 3D Playback Mode

Figure 19:
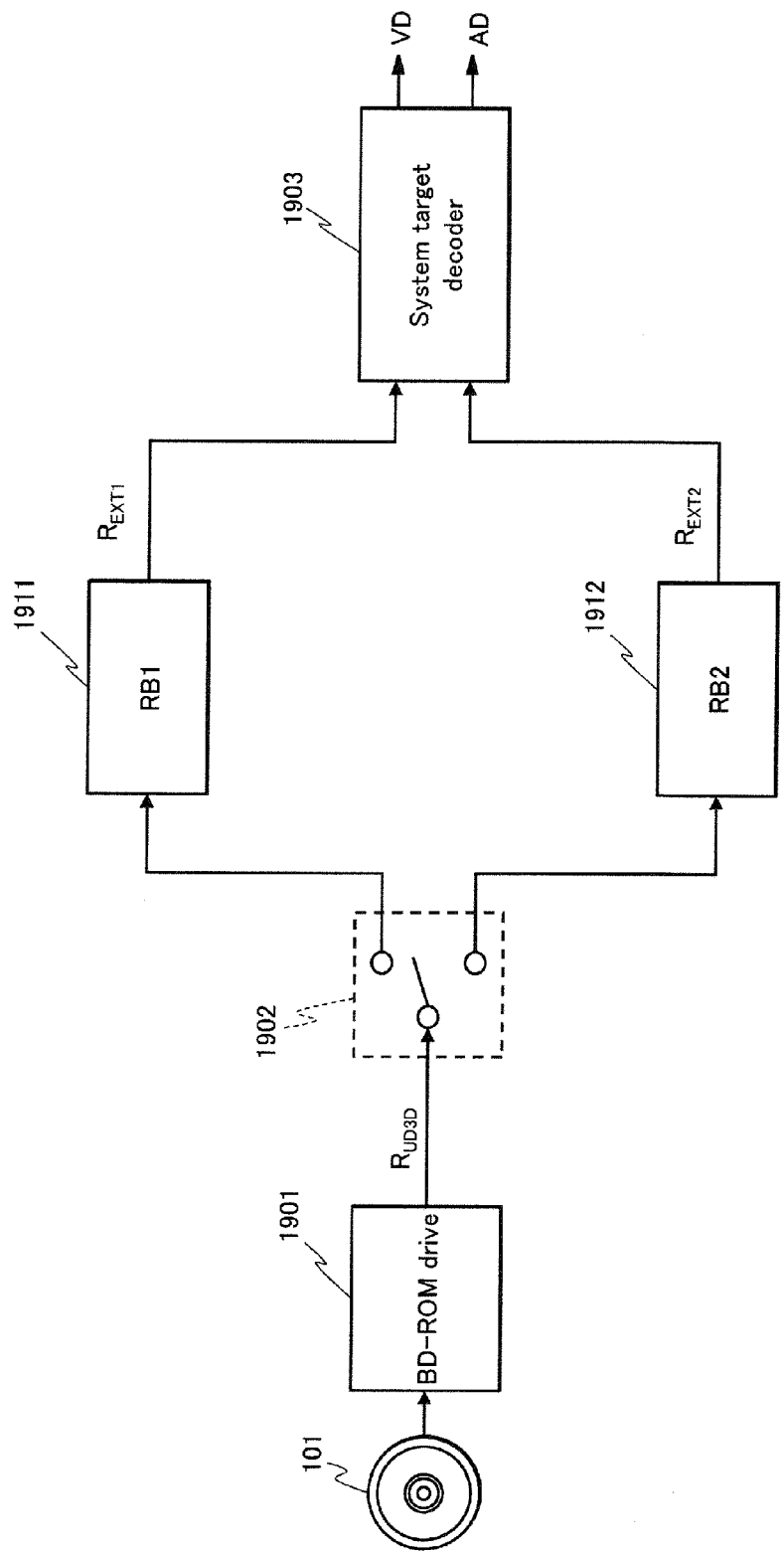
FIG. 19 is a block diagram showing a playback processing system built in the playback device in 3D playback mode.

FIG. 19 is a block diagram showing a playback processing system built in the playback device 102 in 3D playback mode. As shown in FIG. 19, this playback processing system includes a BD-ROM drive 1901, a switch 1902, a pair of read buffers 1911 and 1912, and a system target decoder 1903. The BD-ROM drive 1901 reads extents in the file 3D from the BD-ROM disc 101 and transfers the extents to the switch 1902 at a read rate $R_{UD3D}$. The switch 1902 separates the extents in the file SS into base-view extents and dependent-view extents. Details on separation process are provided below. The first read buffer 1911 and the second read buffer 1912 (hereinafter abbreviated as RB1 and RB2) are buffer memories internal to the playback device 102 and store extents separated by the switch 1902. The RB1 1911 stores base-view extents, and the RB2 1912 stores dependent-view extents. The system target decoder 1903 reads source packets from the base-view extents in the RB1 1911 at a first transfer rate $R_{EXT1}$ and reads source packets from the dependent-view extents in the RB2 1912 at a second transfer rate $R_{EXT2}$. The system target decoder 1903 also decodes pairs of read base-view extents and dependent-view extents into video data VD and audio data AD.

The first transfer rate $R_{EXT1}$ equals 192/188 times the mean processing rate at which the system target decoder 1903 extracts TS packets from source packets stored in the RB1 1911. The maximum value $R_{MAX1}$ of the first transfer rate $R_{EXT1}$ equals 192/188 times the system rate $R_{TS1}$ for the file 2D: $R_{MAX1}=R_{TS1}\times 192/188$. This system rate $R_{TS1}$ is normally expressed in bits per second (bps) and equals eight times the main TS recording rate expressed in bytes per second (Bps). The second transfer rate $R_{EXT2}$ equals 192/188 times the mean processing rate at which the system target decoder 1903 extracts TS packets from source packets stored in the RB2 1912. The maximum value $R_{MAX2}$ of the second transfer rate $R_{EXT2}$ equals 192/188 times the system rate $R_{TS2}$ for the file DEP: $R_{MAX2}=R_{TS2}\times192/188$. This system rate $R_{TS2}$ is normally expressed in bits per second (bps) and equals eight times the sub-TS recording rate expressed in bytes per second (Bps). The transfer rates $R_{EXT1}$ and $R_{EXT2}$ are typically represented in bits/second and specifically equal to the size of each extent, which is expressed in bits, divided by the extent ATC time thereof. The extent ATC time equals the time required to transfer all of the source packets in the extent from the RB1 1911 and RB2 1912 to the system target decoder 1903.

The read rate $R_{UD3D}$ is typically expressed in bits/second and is set at a higher value, e.g. 72 Mbps, than either of the maximum values $R_{MAX1}$, $R_{MAX2}$ of the transfer rates $R_{EXT1}$, $R_{EXT2}$: $R_{UD3D}>R_{MAX1}$, $R_{UD3D}>R_{MAX2}$. This prevents decoding process of the system target decoder 1903 from causing underflow of the RB1 1911 and RB2 1912 due to while the BD-ROM drive 1901 is reading an extent of the file SS from the BD-ROM disc 101.

Seamless Playback from One Extended Extent Block

Figure 20:
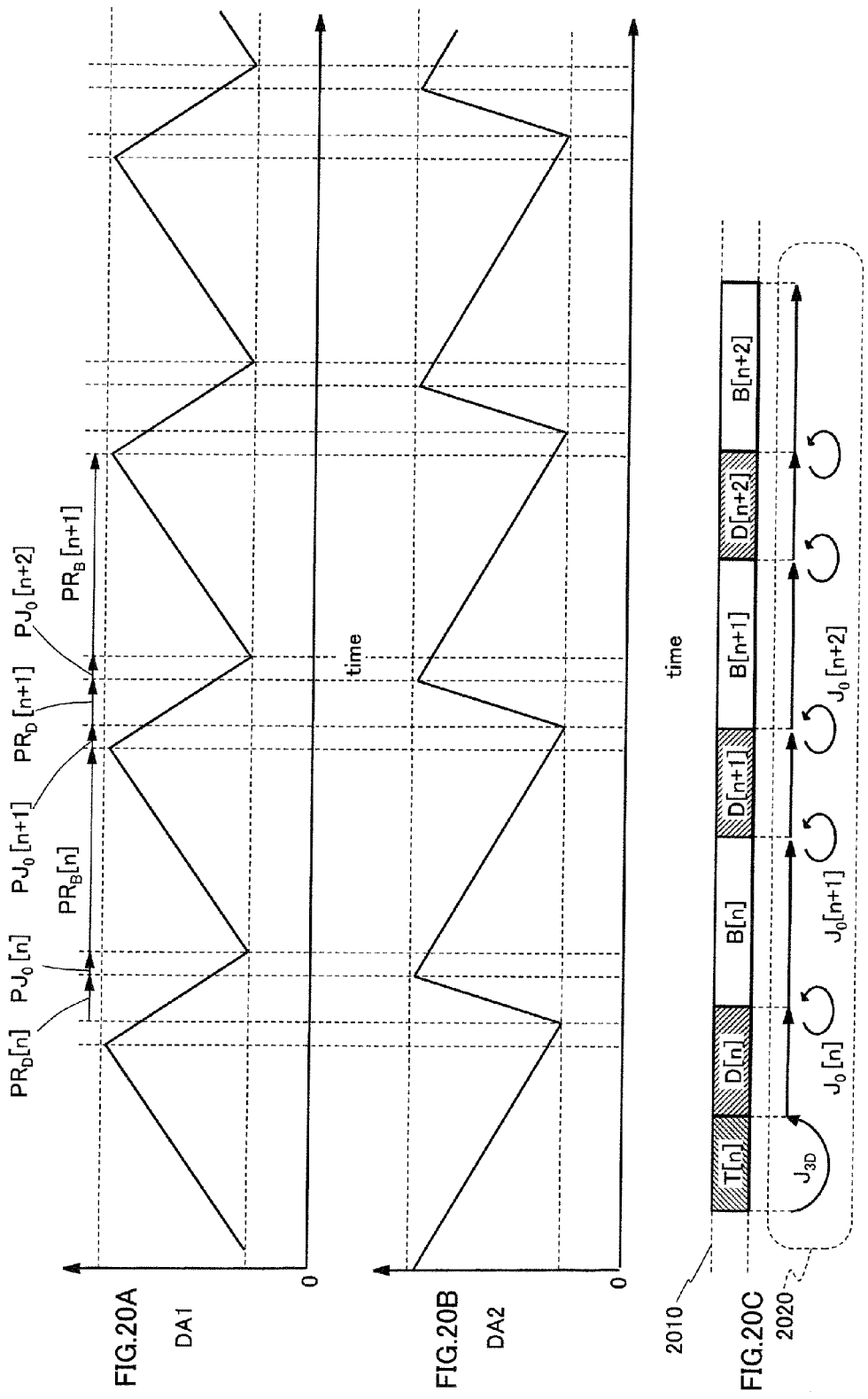
FIGS. 20A and 20B are graphs showing changes in data amounts DA1 and DA2, respectively stored in the RB1 and RB2, when 3D video images are played back seamlessly from a single extended extent block.
FIG. 20C is a schematic diagram showing a playback path in 3D playback mode for the corresponding extended extent block.

FIGS. 20A and 20B are graphs showing changes in data amounts DA1 and DA2, respectively stored in the RB1 1911 and RB2 1912, when 3D video images are played back seamlessly from a single extended extent block. FIG. 20C is a schematic diagram showing a playback path 2020 in 3D playback mode for the corresponding extended extent block 2010. As shown in FIG. 20C, in accordance with the playback path 2020, a portion of the extended extent block 2010 other than the top extended extent T is read all at once as one extent in the file SS. Subsequently, the switch 1902 separates the extent into dependent-view extents D[k] and base-view extents B[k] (k= . . . n, n+1, n+2, . . . ).

Reading and transfer operations by the BD-ROM drive 1901 are not actually performed in a continuous manner, as suggested by the graphs in FIGS. 20A and 20B, but rather in an intermittent manner During the read periods $PR_D[k]$ and $PR_B[k]$ of the extents D[k] and B[k], this prevents overflow in the RB1 1911 and RB2 1912. Accordingly, the graphs in FIGS. 20A and 20B represent actual step-wise changes as approximated linear changes.

As shown in FIGS. 20A and 20B, during the read period $PR_D[n]$ for the $(n+1)^{th}$ dependent-view extent D[n], the data amount DA2 stored in the RB2 1912 increases at a rate equal to $R_{UD3D}-R_{EXT2}[n]$, the difference between the read rate $R_{UD3D}$ and the second transfer rate $R_{EXT2}[n]$, whereas the data amount DA1 stored in the RB1 1911 decreases at the first transfer rate $R_{EXT}[n-1]$. As shown in FIG. 20C, a zero sector transition $J_0[n]$ occurs from the $(n+1)^{th}$ dependent-view extent D[n] to the $(n+1)^{th}$ base-view extent B[n]. As shown in FIGS. 20A and 20B, during the zero sector transition period $PJ_0[n]$, the data amount DA1 stored in the RB1 1911 continues to decrease at the first transfer rate $R_{EXT1}[n-1]$, whereas the data amount DA2 stored in the RB2 1912 decreases at the second transfer rate $R_{EXT2}[n]$.

As further shown in FIGS. 20A and 20B, during the read period $PR_B[n]$ for the $(n+1)^{th}$ base-view extent B[n], the stored data amount DA1 in the RB1 1911 increases at a rate equal to $R_{UD3D}-R_{EXT1}[n]$, the difference between the read rate $R_{UD3D}$ and the first transfer rate $R_{EXT1}[n]$. On the other hand, the data amount DA2 stored in the RB2 1912 continues to decrease at the second transfer rate $R_{EXT2}[n]$. As further shown in FIG. 20C, a zero sector transition $J_0[n+1]$ occurs from the base-view extent B[n] to the next dependent-view extent D[n+1]. As shown in FIGS. 20A and 20B, during the zero sector transition period $PJ_0[n+1]$, the data amount DA1 stored in the RB1 1911 decreases at the first transfer rate $R_{EXT1}[n]$, whereas the data amount DA2 stored in the RB2 1912 continues to decrease at the second transfer rate $R_{EXT2}[n]$.

In order to seamlessly play back 3D video images from the first extended extent block 2010, the size of each of the extents B[n] and D[n] in the extended extent block should satisfy conditions 2 and 3 described below.

The size $S_{EXT1}[n]$ of the $(n+1)^{th}$ base-view extent B[n] is at least equal to the data amount transferred from the RB1 1911 to the system target decoder 1903 during the period from the start of the corresponding read period $PR_B[n]$ until immediately before the read period $PR_B[n+1]$ of the next base-view extent B[n+1]. In this case, as shown in FIG. 20A, immediately before the read period $PR_B[n+1]$ of the next base-view extent B[n+1], the stored data amount DA1 in the RB1 1911 does not fall below the amount immediately before the read period $PR_B[n]$ of the $(n+1)^{th}$ base-view extent B[n]. Here, the length of the read period $PR_B[n]$ of the $(n+1)^{th}$ base-view extent B[n] equals a value $S_{EXT1}[n]/R_{UD3D}$, the size $S_{EXT1}[n]$ of this base-view extent B[n] divided by the read rate $R_{UD3D}$. On the other hand, the length of the read period $PR_D[n+1]$ of the $(n+2)^{th}$ dependent-view extent D[n+1] equals a value $S_{EXT1}[n+1]/R_{UD3D}$, the size $S_{EXT2}[n+1]$ of this dependent-view extent D[n+1] divided by the read rate $R_{UD3D}$. Accordingly, condition 2 indicates the following. The minimum extent size of the $(n+1)^{th}$ base-view extent B[n] is expressed in the right-hand side of expression (2):

$$S_{EXT1}[n] \geq \left(\frac{S_{EXT1}[n]}{R_{UD3D}} + T_{JUMP0}[n+1]\frac{S_{EXT2}[n+1]}{R_{UD3D}} + T_{JUMP0}[n+2]\right) \times \quad (2)$$

$$R_{EXT1}[n] \therefore S_{EXT1}[n] \geq CEIL\left(\frac{R_{EXT1}[n]}{8} \times \frac{R_{UD3D}}{R_{UD3D} - R_{EXT1}[n]} \times \right.$$

$$\left.\left(T_{JUMP0}[n+1] + 8 \times \frac{S_{EXT2}[n+1]}{R_{UD3D}} + T_{JUMP0}[n+2]\right)\right).$$

The size $S_{EXT2}[n]$ of the $(n+1)^{th}$ dependent-view extent D[n] is at least equal to the data amount transferred from the RB2 1912 to the system target decoder 1903 during the period from the start of the corresponding read period $PR_D[n]$ until immediately before the read period $PR_D[n+1]$ of the next dependent-view extent D[n+1]. In this case, as shown in FIG. 20B, the data amount DA2 stored in the RB2 1912 immediately before the read period $PR_D[n+1]$ of the next dependent-view extent D[n+1] does not fall below the amount immediately before the read period $PR_D[n]$ of the $(n+1)^{th}$ dependent-view extent D[n]. Here, the length of the read period $PR_D[n]$ of the $(n+1)^{th}$ dependent-view extent D[n] equals a value $S_{EXT2}[n]/R_{UD3D}$, the size $S_{EXT2}[n]$ of this dependent-view extent D[n] divided by the read rate $R_{UD3D}$. Accordingly, condition 3 indicates the following. The minimum extent size of the (n+1)th dependent-view extent D[n] is expressed in the right-hand side of expression (3):

$$S_{EXT2}[n] \geq \quad (3)$$

$$\left(\frac{S_{EXT2}[n]}{R_{UD3D}} + T_{JUMP0}[n]\frac{S_{EXT1}[n]}{R_{UD3D}} + T_{JUMP0}[n+1]\right) \times R_{EXT2}[n] \therefore$$

$$S_{EXT2}[n] \geq CEIL\left(\frac{R_{EXT2}[n]}{8} \times \frac{R_{UD3D}}{R_{UD3D} - R_{EXT2}[n]} \times \right.$$

$$\left.\left(T_{JUMP0}[n] + 8 \times \frac{S_{EXT1}[n]}{R_{UD3D}} + T_{JUMP0}[n+1]\right)\right).$$

Seamless Playback from Continuous Extended Extent Blocks

Figure 21:
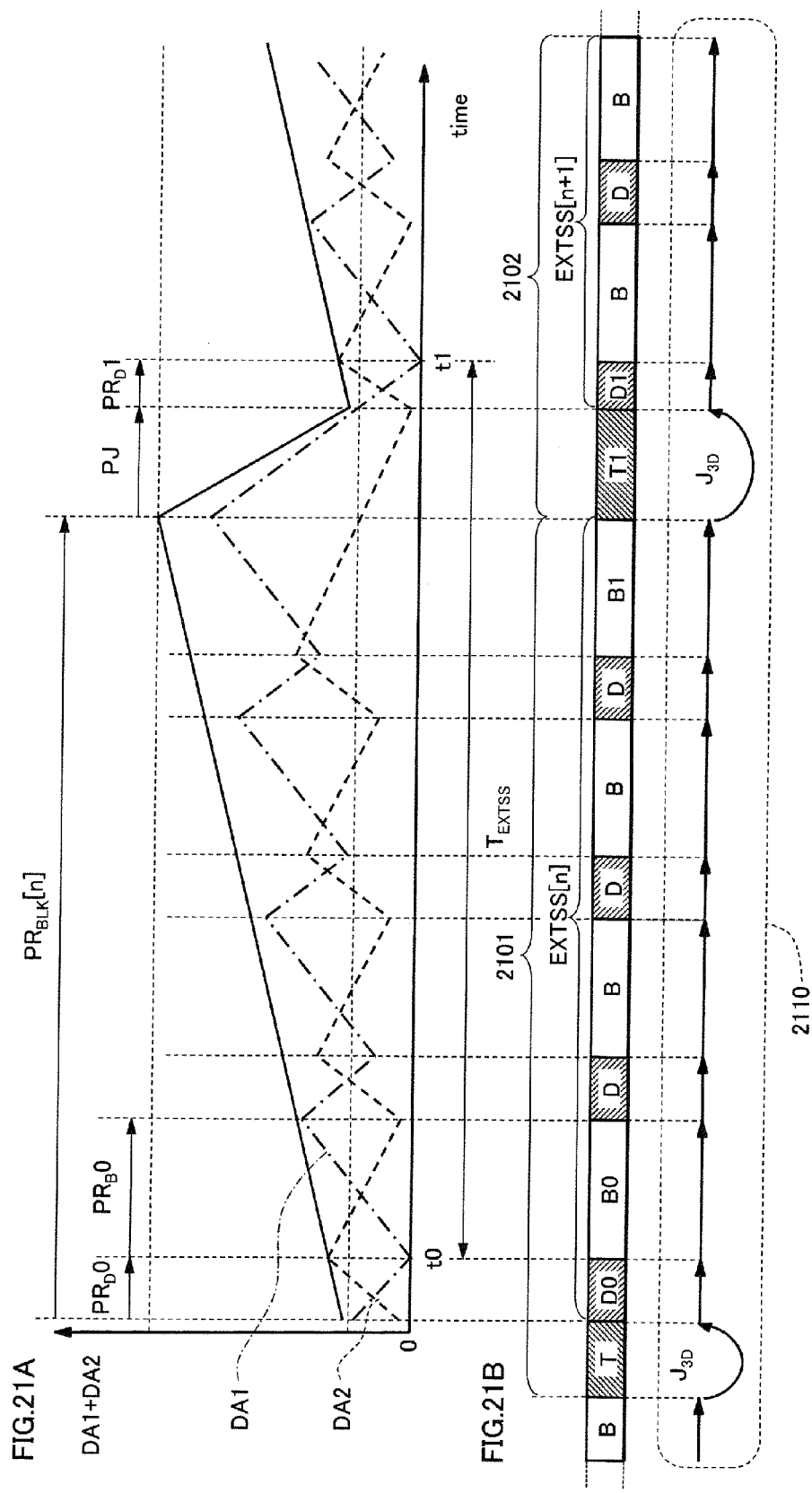
FIG. 21A is a graph showing changes in data amounts DA1 and DA2, stored in the RB1 and RB2, respectively, and changes in their sum DA1+DA2, when 3D video images are played back seamlessly and continuously from two contiguous extended extent blocks.
FIG. 21B is a schematic diagram showing the $(n+1)^{th}$ extended extent block, the $(n+2)^{th}$ extended extent block, and the playback path in 3D playback mode for these extent blocks.

FIG. 21B is a schematic diagram showing the $(n+1)^{th}$ extended extent block 2101, the $(n+2)^{th}$ extended extent block 2102, and the playback path 2110 in 3D playback mode for these extent blocks. As shown in FIG. 21B, two contiguous extents EXTSS[n] and EXTSS[n+1] in the file SS are separated by an extended extent T1. In accordance with the playback path 2110, the $(n+1)^{th}$ extent EXTSS[n] is first read. A jump $J_{3D}$ occurs immediately thereafter, and then the $(n+2)^{th}$ extent EXTSS[n+1] is read all at once.

FIG. 21A is a graph showing changes in data amounts DA1 and DA2, stored in the RB1 1911 and RB2 1912, respectively, and changes in their sum DA1+DA2, when 3D video images are played back seamlessly and continuously from two contiguous extended extent blocks 2101 and 2102. In FIG. 21A, the alternating long and short dashed line indicates changes in the data amount DA1 stored in the RB1 1911, the dashed line indicates changes in the data amount DA2 stored in the RB2 1912, and the solid line indicates changes in the sum DA1+DA2 of the two data amounts. In this graph, the solid line is an approximation that averages small changes each time an extent is read. Furthermore, the zero sector transition time $T_{JUMP0}$ is assumed to be zero ms.

As shown in FIG. 21A, during the period $PR_{BLK}[n]$ while the extent block EXTSS[n] is being read from the $(n+1)^{th}$ extended extent 2101 to the RB1 1911 and the RB2 1912, the data amounts DA1 and DA2 stored therein increase. Specifically, during the read period $PR_{BLK}[n]$, the sum of the stored data amounts DA1+DA2 increases at a rate equal to $R_{UD3D}$ $R_{EXTSS}[n]$, the difference between the read rate $R_{UD3D}$ and the mean transfer rate $R_{EXTSS}[n]$. The mean transfer rate $R_{EXTSS}[n]$ is estimated at the size $S_{EXTSS}[n]$ of the entirety of the extent block EXTSS[n] divided by the extent ATC time $T_{EXTSS}$.

In FIG. 21A, when the base-view extent B1 at the end of the $(n+1)^{th}$ extent block EXTSS[n] is read into the RB1 1911, the sum DA1+DA2 of the stored data amount reaches the maximum value. During the immediately subsequent jump period PJ, the sum DA1+DA2 of the stored data amount decreases at the mean transfer rate $R_{EXTSS}[n]$. Accordingly, by adjusting the maximum value of sum DA1+DA2 of the stored data amount to be sufficiently large, underflow of both RB1 1911 and RB2 1912 can be prevented from occurring during the jump $J_{3D}$ over the recording area of the extended extent T1. As a result, 3D video images can be played back seamlessly from two contiguous extended extent blocks 2101 and 2102.

The maximum value of the sum DA1+DA2 of the stored data amount in FIG. 21A depends on the size of the $(n+1)^{th}$ extent block EXTSS[n]. Accordingly, during the jump $J_{3D}$ between the extended extent blocks 2101 and 2102, the size of the $(n+1)^{th}$ extent block EXTSS[n] should satisfy the following four conditions in order to prevent underflow in either the RB1 1911 or the RB1 1912.

Preloading is performed during the read period $PR_D0$ of the dependent-view extent D0 located at the top of the $(n+1)^{th}$ extent block EXTSS[n]. During the preload period $PR_D0$, data in the $n^{th}$ extent block continues to be transferred from the RB2 1912 to the system target decoder 1903 as during the immediately prior jump period. Data supply to the system target decoder 1903 is thus maintained. Similarly, preloading is performed during the read period $PR_D1$ of the dependent-view extent D2 located at the top of the $(n+2)^{th}$ extent block EXTSS[n+1]. Accordingly, during the preload period $PR_D1$, data in the $(n+1)^{th}$ extent block EXTSS[n] continues to be transferred from the RB2 1912 to the system target decoder 1903 as during the immediately prior jump period PJ. Data supply to the system target decoder 1903 is thus maintained. Therefore, in order to prevent underflow in the RB1 1911 and the RB2 1912 during the jump $J_{3D}$, the extent ATC time $T_{EXTSS}$ of the $(n+1)^{th}$ extent block EXTSS[n] needs to be at least equal to the length of the period from the end point t0 of the first preload period $PR_D0$ until the end point t1 of the next preload period $PR_D1$. In other words, the size $S_{EXTSS}[n]$ of the $(n+1)^{th}$ extent block EXTSS[n] needs to be at least equal to the sum of the amount of data transferred from the RB1 1911 and the RB2 1912 to the system target decoder 1903 during the period t0-t1.

As is clear from FIG. 21A, the length of the period t0-t1 is equal to the sum of the length of the read period $PR_{BLK}[n]$ of the $(n+1)^{th}$ extent block EXTSS[n], the length $T_{JUMP}[n]$ of the jump period PJ, and the difference $T_{DIFF}[n]$ between the lengths of the preload periods $PR_D0$ and $PR_D1$ between the two extent blocks EXTSS[n] and EXTSS[n+1]. Furthermore, the length of the read period $PR_{BLK}[n]$ of the $(n+1)^{th}$ extent block EXTSS[n] is equal to $S_{EXTSS}[n]/R_{UD3D}$, i.e. the size $S_{EXTSS}[n]$ of the extent block EXTSS[n] divided by the corresponding read rate $R_{UD3D}$. Accordingly, condition 4 indicates the following. The minimum extent size of the $(n+1)^{th}$ extent EXTSS[n] in the file SS is expressed in the right-hand side of expression (4):

$$S_{EXTSS}[n] \geq \left( \frac{S_{EXTSS}[n]}{R_{UD3D}} + T_{JUMP}[n] + T_{DIFF}[n] \right) \times R_{EXTSS}[n] \therefore \quad (4)$$

$$S_{EXTSS}[n] \geq \frac{R_{UD3D} \times R_{EXTSS}[n]}{R_{UD3D} - R_{EXTSS}[n]} \times (T_{JUMP}[n] + T_{DIFF}[n]).$$

The lengths of the preload periods $PR_D0$ and $PR_D1$ are respectively equal to $S_{EXT2}0/R_{UD3D}$ and $S_{EXT2}1/R_{UD3D}$, which are the sizes $S_{EXT2}0$ and $S_{EXT2}1$ of the dependent-view extents D0 and D1 located at the respective tops of the extent blocks EXTSS[n] and EXTSS[n+1] divided by the read rate $R_{UD3D}$. Accordingly, the difference $T_{DIFF}$ between the lengths of the preload periods $PR_D0$ and $PR_D1$ equals the difference between these values: $T_{DIFF}=S_{EXT2}1/R_{UD3D}-S_{EXT2}0/R_{UD3D}$. Like the right-hand side of expressions (1)-(3), the right-hand side of expression (4) may be expressed as an integer value in units of bytes.

When decoding of multiplexed stream data is modified in the following manner, the difference $T_{DIFF}$ in expression (4) may be considered to be zero. First, the maximum value of the difference $T_{DIFF}$ throughout the multiplexed stream data, i.e. the worst value of the difference $T_{DIFF}$, is sought. Next, when the multiplexed stream data is played back, the start of decoding is delayed after the start of reading by a time equal to the worst value of $T_{DIFF}$.

2-7-C: Maximum Extent Size

By condition 1-4, the minimum extent size of the extents in the file 2D, the file DEP, and the file SS is limited. On the other hand, as the size of the extents grows larger, the capacity required for the read buffers generally increases. For details, see "Supplement"). Accordingly, in order to reduce the capacities of the read buffers as much as possible, it is preferable to restrict the upper limits on the sizes of extents as much as possible. The upper limits are referred to as "maximum extent sizes."

The extent ATC time is equal for a base-view extent EXT1[k] and a dependent-view extent EXT2[k] constituting one extent pair (the letter k represents an integer equal to or greater than zero). Accordingly, if the extent ATC time is shortened by a restriction on the maximum extent size of the base-view extent EXT1[k], the maximum extent size of the dependent-view extent EXT2[k] is also restricted. Therefore, in order to maintain the lower limits of the capacities of RB1 1911 and RB2 1912 within permissible ranges, the size of each base-view extent EXT1[k] should satisfy condition 5 below.

In the shared sections, the base-view extent B[k] is shared between the file 2D and the file SS. Accordingly, the sizes $S_{EXT1}[k]$ of the base-view extent B[k] should satisfy expression (1). In order to reduce the size $S_{EXT1}[k]$ of the base-view extent B[k] as much as possible while satisfying expression (1), the maximum extent size should be as close as possible to upper limit of the right-hand side of expression (1), i.e. the upper limit of the minimum extent size of the base-view extent B[k].

Accordingly, condition 5 indicates the following. The maximum extent size of the base-view extent B[k] is expressed in the right-hand side of expression (5):

$$S_{EXT1}[k] \leq CEIL\left(\frac{R_{EXT1}[k]}{8} \times \frac{R_{UD2D}}{R_{UD2D} - R_{MAX2D}} \times T_{JUMP\text{-}2D\_MIN}\right). \quad (5)$$

The right-hand side of expression (5) differs from the right-hand side of expression (1) in the following ways. First, the mean transfer rate $R_{EXT2D}$ included in the denominator is replaced by the maximum value thereof, $R_{MAX2D}$. Accordingly, the second fraction in the right-hand side of expression (5) equals the maximum value of the same fraction in expression (1). Next, the jump time $T_{JUMP\text{-}2D\text{-}MIN}$ in expression (5) is equal to the minimum value among the maximum jump times defined by the standards. For example, among the maximum jump times $T_{JUMP\text{-}MAX}$ specified in the table in FIG. 18, the next largest value after 0 ms, namely 200 ms, is adopted as the jump time $T_{JUMP\text{-}2D\text{-}MIN}$ in expression (5). In this case, the interval between the extents EXT2D[k] and EXT2D[k+1] in the shared sections of the file 2D is restricted to being at most the corresponding maximum jump distance $S_{JUMP\text{-}MAX} = 10000$ sectors.

By adopting expression (1A) instead of expression (1), the size of the base-view extents satisfies the expression (5A) below instead of expression (5) when a margin is added to the base-view extents:

$$S_{EXT1}[n] \leq \quad (5A)$$
$$CEIL\left\{\frac{R_{EXT2D}[n]}{8} \times \left(\frac{R_{UD2D}}{R_{UD2D} - R_{MAX2D}} \times T_{JUMP\text{-}2D\_MIN} + \Delta T\right)\right\}.$$

The maximum extent size expressed in the right-hand side of expression (5A) is larger than the minimum extent size expressed in the right-hand side of expression (5) by a data amount that is read from the read buffer to the system target decoder during an extension time ΔT. This data amount is guaranteed as a margin.

Transfer Rate of Stream Data

As shown in FIG. 7, dependent-view pictures are compressed with reference to base-view pictures. Accordingly, on average, the bit rate for a dependent-view video stream is lower than for a base-view video stream. As a result, it suffices to set the system rate $R_{TS2}$ for the file DEP lower than the system rate $R_{TS1}$ for the file 2D. For example, if the system rate $R_{TS1}$ for the file 2D is set to 48 Mbps or less, it suffices to set the system rate $R_{TS2}$ for the file DEP to 32 Mbps or less: $R_{TS1} \leq 48$ Mbps, $R_{TS2} \leq 32$ Mbps.

Here, it is assumed that the sum of the system rates $R_{TS1}$ and $R_{TS2}$ is restricted to a constant threshold value or less. This threshold value is set to be equal to or less than a transfer bandwidth allocated to the system target decoder 1903 and equals, for example, 64 Mbps: $R_{TS1}+R_{TS2} \leq 64$ Mbps. In this case, if the system rate $R_{TS1}$ for the file 2D is set to 48 Mbps, the system rate $R_{TS2}$ for the file DEP is set to 16 Mbps or less: $R_{TS1}=48$ Mbps, $R_{TS2} \leq 16$ Mbps. As long as the bit rate of each video stream is maintained at a normal value, this sort of restriction on the sum of the system rates $R_{TS1}$ and $R_{TS2}$ is useful for efficient use of the transfer bandwidth. In practice, however, the bit rate of a dependent-view video stream may temporarily exceed the bit rate of the base-view video stream. Such a reversal of bit rates may occur, for example, during playback of 3D video images representing a natural landscape, if the base view (for example, the left view) suddenly goes out of focus and only the dependent view (for example, the right view) is in focus. In this case, even though the first transfer rate $R_{EXT1}$ is much lower than the system rate $R_{TS1}=48$ Mbps for the file 2D, the second transfer rate $R_{EXT2}$ cannot not exceed the system rate $R_{TS2} \leq 16$ Mbps for the file DEP (to be precise, 16 Mbps multiplied by 192/188, which is approximately 1.02. Hereinafter, this coefficient is considered to be one unless precision is required). When the sum of the system rates $R_{TS1}$ and $R_{TS2}$ is thus restricted, the second transfer rate $R_{EXT2}$ cannot be adapted to a temporary rise in the bit rate of the dependent-view video stream.

In order to enable such adaptation, instead of restricting the sum of the system rates $R_{TS1}$ and $R_{TS2}$, the sum of the first transfer rate $R_{EXT1}[n]$ and the second transfer rate $R_{EXT2}[n]$ in units of extents should be restricted: $R_{EXT1}[n]\ R_{EXT2}[n] \leq 64$ Mbps. Here, among the $(n+1)^{th}$ extent pair, the average value when transferring source packets that include the base-view extent EXT1[n] is the first transfer rate $R_{EXT1}[n]$, and the average value when transferring source packets that include the dependent-view extent EXT2[n] is the second transfer rate $R_{EXT2}[n]$.

Figure 22:
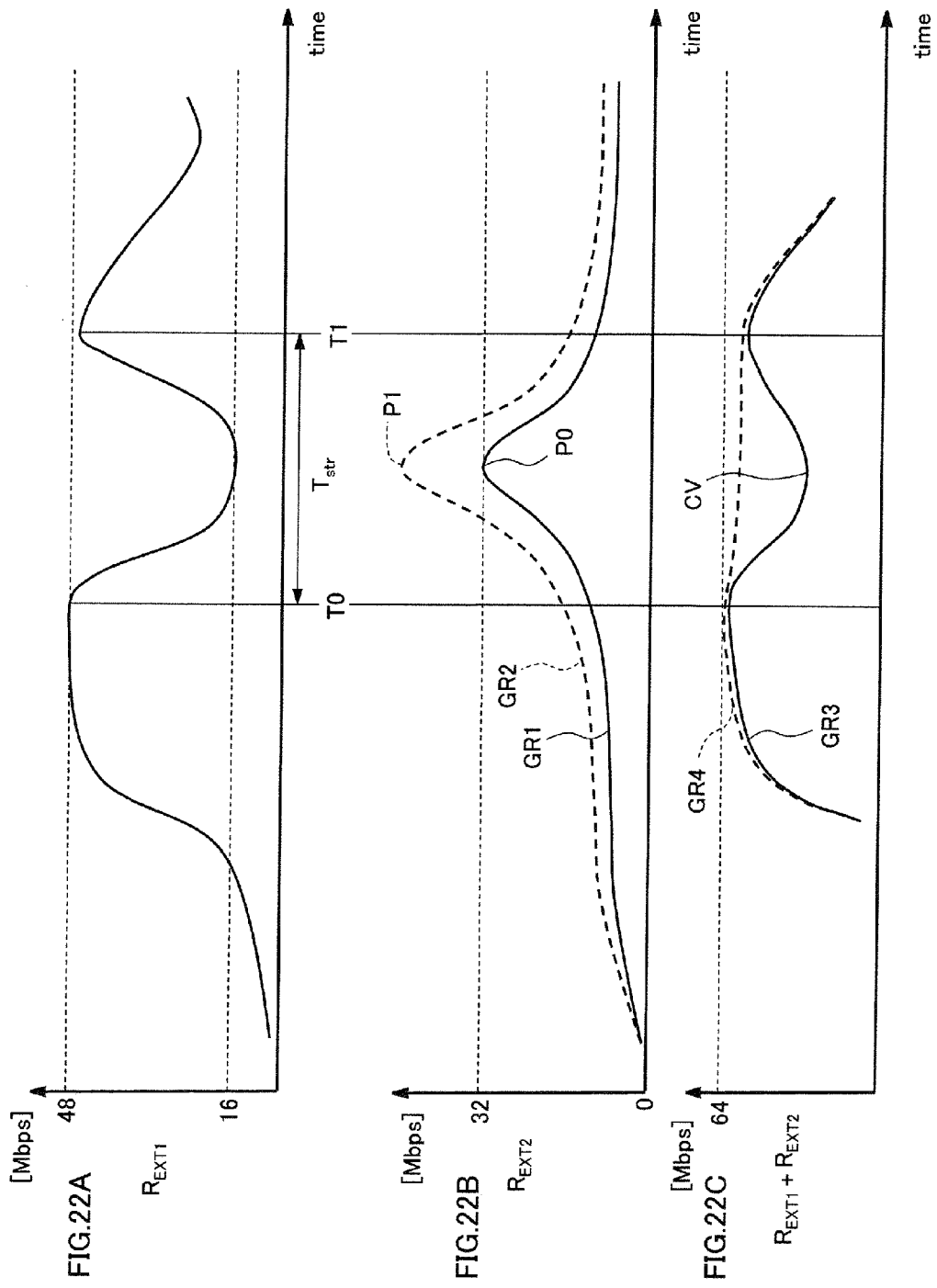
FIGS. 22A and 22B are graphs showing changes over time in the first transfer rate $R_{EXT1}$ and the second transfer rate $R_{EXT2}$ when the total of the first transfer rate $R_{EXT1}$ and the second transfer rate $R_{EXT2}$ is restricted.
FIG. 22C is a graph showing changes over time in $R_{EXT1} R_{EXT2}$, i.e. the sum of the first transfer rate $R_{EXT1}$ and the second transfer rate $R_{EXT2}$ shown in FIGS. 22A and 22B.

FIGS. 22A and 22B are graphs showing changes over time in the first transfer rate $R_{EXT1}$ and the second transfer rate $R_{EXT2}$ when the total of the first transfer rate $R_{EXT1}$ and the second transfer rate $R_{EXT2}$ is restricted. As shown in FIG. 22A, the first transfer rate $R_{EXT1}$ suddenly falls from a maximum value $R_{MAX1}$ approximately equal to 48 Mbps at a first time T0, and during a period $T_{str}$ from the first time T0 until a second time T1 remains at a low level of 16 Mbps. On the other hand, as shown by the solid curve GR1 in FIG. 22B, the change in the second transfer rate $R_{EXT2}$ is complementary to the change in the first transfer rate $R_{EXT1}$. In particular, during the period $T_{str}$, the peak P0 reaches a maximum value $R_{MAX2}$ of approximately 32 Mbps. When the sum of the first transfer rate $R_{EXT1}$ and the second transfer rate $R_{EXT2}$ is thus restricted in units of extents, the second transfer rate $R_{EXT2}$ can adapt to a temporary rise in the bit rate of the dependent-view video stream.

To further effectively use the transfer bandwidth allocated to the system target decoder 1903 for transfer of stream data, it is preferable for the system rate $R_{TS2}$ for a file DEP to be set even higher. FIG. 22C is a graph showing changes over time in $R_{EXT1}\ R_{EXT2}$, i.e. the sum of the first transfer rate $R_{EXT1}$ and the second transfer rate $R_{EXT2}$ shown in FIGS. 22A and 22B. As indicated by the depression CV in the solid curve GR3 in FIG. 22C, $R_{EXT1}\ R_{EXT2}$, i.e. the sum of the first transfer rate $R_{EXT1}$ and the second transfer rate $R_{EXT2}$, falls below the threshold value of 64 Mbps during the period $T_{str}$ from the first time T0 to the second time T1. As shown by the solid curve GR1 in the graph in FIG. 22B, this is because the second transfer rate $R_{EXT2}$ is restricted to the system rate $R_{TS2}$ for the file DEP, i.e. to 32 Mbps or less. As shown in FIG. 22A, the first transfer rate $R_{EXT1}$ falls to 16 Mbps during the period $T_{str}$, and thus there remains a margin of at least 48 Mbps in the transfer bandwidth; the value 48 Mbps is the difference between the threshold value of 64 Mbps and the above value of 16 Mbps. Accordingly, the system rate $R_{TS2}$ for the file DEP is set within a higher range than 32 Mbps, or preferably, the same range as the system rate $R_{TS1}$ for the file 2D, such as 48 Mbps or less: $R_{TS1} \le 48$ Mbps, $R_{TS2} \le 48$ Mbps. In FIGS. 22B and 22C, the changes over time in the second transfer rate $R_{EXT2}$, as well as the changes over time in the sum $R_{EXT1} R_{EXT2}$ of the first transfer rate $R_{EXT1}$ and the second transfer rate $R_{EXT2}$, are respectively indicated by dashed curves GR2 and GR4. As shown by the dashed curve GR2 in FIG. 22B, the peak P1 of the second transfer rate $R_{EXT2}$ cannot exceed 32 Mbps. As a result, as the dashed curve GR4 in FIG. 22C indicates, the sum $R_{EXT1} R_{EXT2}$ of the first transfer rate $R_{EXT1}$ and the second transfer rate $R_{EXT2}$ is maintained near the threshold value of 64 Mbps during the period $T_{str}$. Efficient use of the transfer bandwidth can thus be further improved.

When the system rate $R_{TS2}$ for the file DEP is set as high as the system rate $R_{TS1}$ for the file 2D, it is assumed that the second transfer rate $R_{EXT2}$ can also rise to the same level. When the transfer rate $R_{EXT2}[n]$ for the $(n+1)^{th}$ dependent-view extent in the $(n+1)^{th}$ extent pair rises in this way, then based on the limit on the sum of the transfer rates, the transfer rate $R_{EXT1}[n]$ for the base-view extent falls conspicuously below the maximum value $R_{MAX1}$. On the other hand, the mean transfer rate $R_{EXT2D}$ included in the denominator in the definition of the maximum extent size in expression (5) is estimated at the maximum value thereof, $R_{MAX2D}$. Furthermore, the upper limit on the extent ATC time of the base-view extent is the value yielded by dividing the maximum extent size by the first transfer rate $R_{EXT1}[n]$. Accordingly, the upper limit is conspicuously longer than the actual extent ATC time. Since the extent ATC time is shared in the $(n+1)^{th}$ extent pair, the maximum size of the dependent-view extent reaches the product of the second transfer rate $R_{EXT2}[n]$ and the above upper limit on the extent ATC time. This product is conspicuously larger than the actual value necessary for seamless playback. As a result, further reduction of the capacity of the RB2 1912 is prevented.

In order to permit further reduction of the capacity of the RB2 1912 even when the system rate $R_{TS2}$ for the file DEP is set approximately as high as the system rate $R_{TS1}$ for the file 2D, condition 5 for the maximum extent size, i.e. expression (5), is changed to expression (5B):

$$S_{EXT1}[n] \le CEIL\left(\frac{R_{EXT1}[n]}{8} \times \frac{R_{UD2D}}{R_{UD2D} - \min(R_{MAX2D}, R_{MAX1} + R_{MAX2} - R_{EXT2}[n])} \times T_{JUMP\_2D\_MIN}\right). \quad (5B)$$

In the right-hand side of expression (5B), the lower of (i) the maximum value $R_{MAX2D}$ of the mean transfer rate for the extent in the file 2D and (ii) the difference between the sum $R_{MAX1}+R_{MAX2}$ of the maximum values of the transfer rates and the second transfer rate $R_{EXT2}[n]$ is used as the transfer rate included in the denominator. In this context, the sum $R_{MAX1}+R_{MAX2}$ of the maximum values of the transfer rates equals 192/188 times the sum $R_{TS1}+R_{TS2}$ of the system rates.

Accordingly, when the second transfer rate $R_{EXT2}[n]$ rises to the same level as the system rate $R_{TS2}$, the maximum extent size is estimated at the above difference. As a result, the upper limit on the extent ATC time of the base-view extent is maintained at a value near the actual extent ATC time. Therefore, the size of the dependent-view extent is maintained at a level actually necessary for seamless playback. The capacity of the RB2 1912 is thus kept sufficiently low.

When expression (5B) is complicated to estimate the maximum extent size, the maximum extent size may be preliminarily determined depending on a range for the second transfer rate $R_{EXT2}[n]$. For example, the size $S_{EXT1}[n]$ of the base-view extent and the size $S_{EXT2}[n]$ of the dependent-view extent are set so as to satisfy the following expression (5C):

When the second transfer rate $R_{EXT2}[n]$ is equal to or less than 32 Mbps×192/188, $S_{EXT1}[n] \le 20 \times 106$ bytes=approximately 19 MB, $S_{EXT2}[n] \le 6.5 \times 106$ bytes=approximately 6.2 MB, when the second transfer rate $R_{EXT2}[n]$ exceeds 32 Mbps× 192/188, $S_{EXT1}[n] \le 20 \times 106$ bytes=approximately 19 MB, and $S_{EXT2}[n] \le 8.1 \times 106$ bytes=approximately 7.7 MB. (5C)

2-7-D: Conditions in Extended Playback Mode

Figure 23:
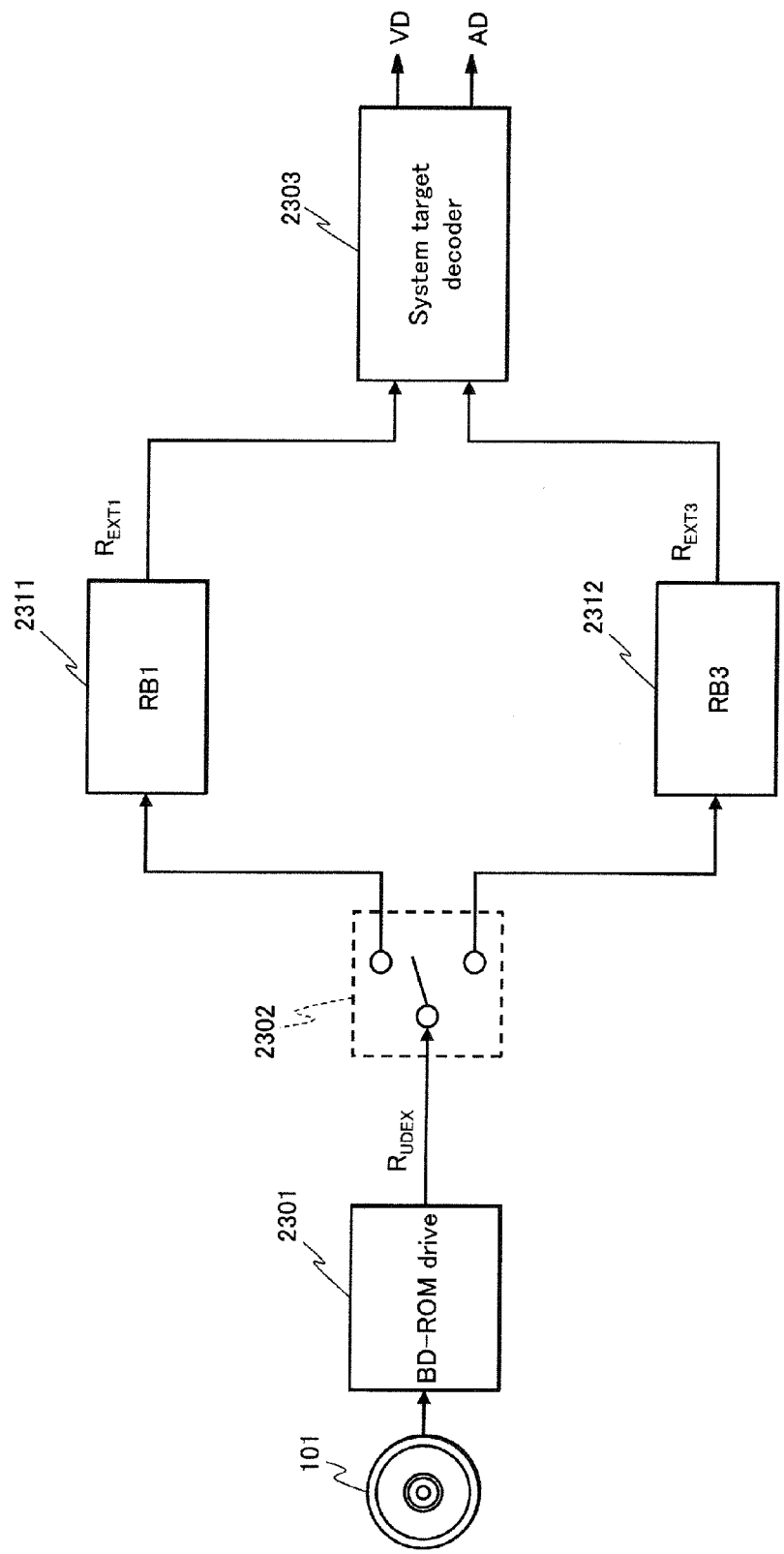
FIG. 23 is a block diagram showing a playback processing system built in the playback device in extended playback mode.

FIG. 23 is a block diagram showing a playback processing system built in the playback device 102 in extended playback mode. As shown in FIG. 23, this playback processing system includes a BD-ROM drive 2301, a switch 2302, a pair of read buffers 2311 and 2312, and a system target decoder 2303. The BD-ROM drive 2301 reads extended extents and base-view extents from the BD-ROM disc 101 and transfers the extents to the switch 2302 at a read rate $R_{UDEX}$. The switch 2302 separates extended extents from base-view extents. A first read buffer 2311 and a third read buffer 2313 (hereinafter abbreviated as RB1 and RB3) are buffer memories internal to the playback device 102 and store extents separated by the switch 2302. The RB1 2311 stores base-view extents, and the RB3 2312 stores extended extents. The system target decoder 2303 reads source packets from the base-view extents in the RB1 2311 at a first transfer rate $R_{EXT1}$ and reads source packets from the extended extents in the RB3 2312 at a third transfer rate $R_{EXT3}$. The system target decoder 2303 also decodes pairs of read base-view extents and extended extents into video data VD and audio data AD.

The first transfer rate $R_{EXT1}$ is equal to the first transfer rate in 3D playback mode. The third transfer rate $R_{EXT3}$ equals 192/188 times the mean processing rate at which the system target decoder 2303 extracts TS packets from source packets stored in the RB3 2312. The maximum value $R_{MAX3}$ of the third transfer rate $R_{EXT3}$ equals 192/188 times the system rate $R_{TS3}$ for the extended stream file: $R_{MAX3}=R_{TS3}\times192/188$. The system rate $R_{TS3}$ is normally expressed in bits/second (bps) and equals eight times the recording rate of the extended stream expressed in bytes/second (Bps). The transfer rates $R_{EXT1}$ and $R_{EXT3}$ are typically represented in bits/second and specifically equal to the size of each extent, which is expressed in bits, divided by the extent ATC time thereof.

The read rate $R_{UDEX}$ is typically expressed in bits/second and is set at a higher value, e.g., 72 Mbps, than either of the maximum values $R_{MAX1}$, $R_{MAX3}$ of the transfer rates $R_{EXT1}$, $R_{EXT3}$: $R_{UDEX}>R_{MAX1}$, $R_{UDEX}>R_{MAX2}$. This prevents decoding process of the system target decoder 2303 from causing underflow of the RB1 2311 and the RB3 2312 while the BD-ROM drive 2301 is reading an extent of the file 2D or reading an extent of the extended stream file from the BD-ROM disc 101.

Extent ATC Time of Extended Extents

Figure 24:
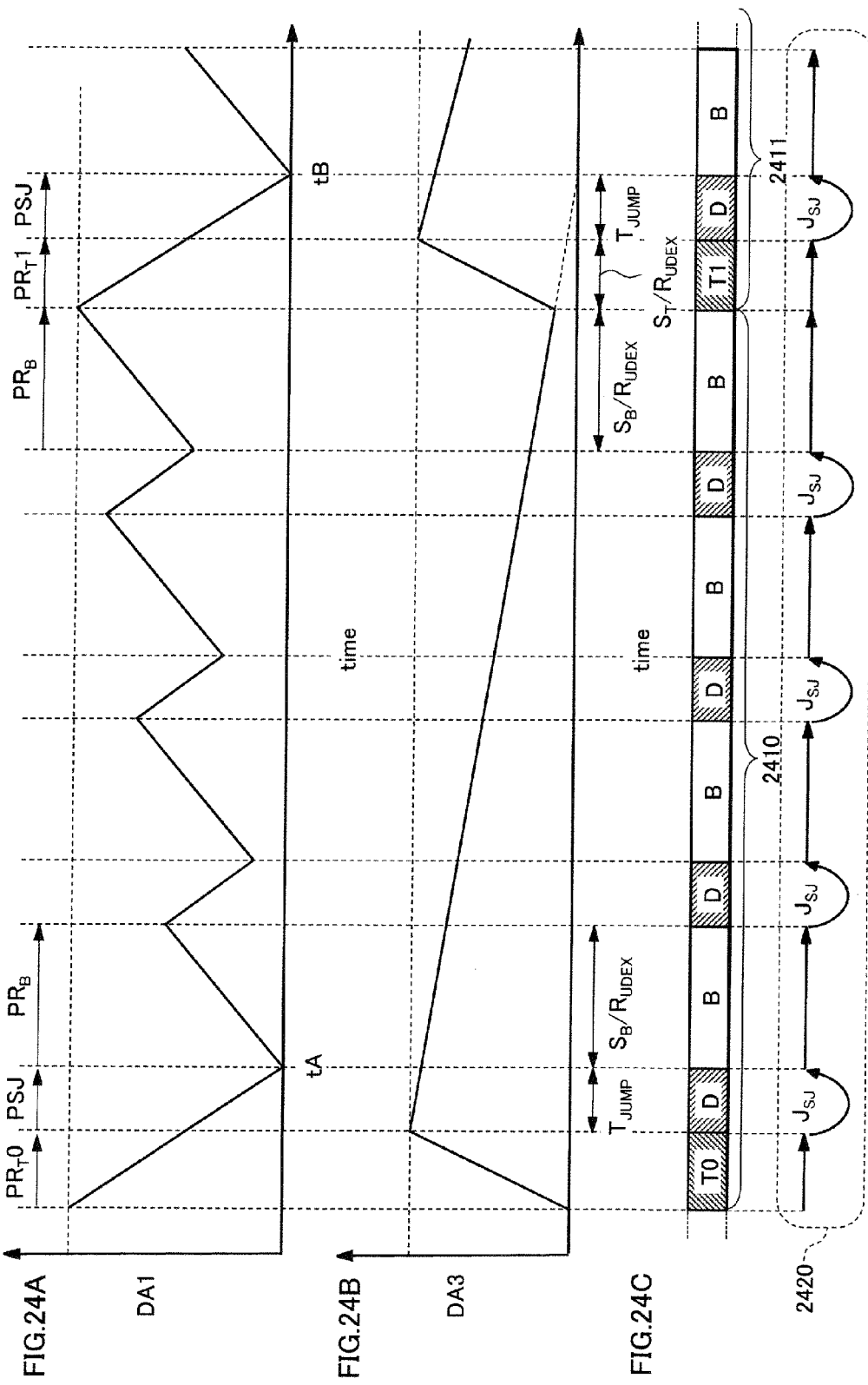
FIGS. 24A and 24B are graphs showing changes in data amounts DA1 and DA3, respectively stored in the RB1 and RB2, when 4K2K 2D video images are played back seamlessly from two contiguous extended extent blocks.
FIG. 24C is a schematic diagram showing a playback path in extended playback mode corresponding to the extended extent blocks.

FIGS. 24A and 24B are graphs showing changes in data amounts DA1 and DA3, respectively, that are stored in the RB1 2311 and RB2 2312, respectively, when 4K2K 2D video images are played back seamlessly from two contiguous extended extent blocks 2410 and 2411. FIG. 24C is a schematic diagram showing a playback path 2420 in extended playback mode corresponding to the extended extent blocks 2410 and 2411. As shown in FIG. 24C, in accordance with a playback path 2420, the top extended extent T is first read from the extended extent blocks 2410 and 2411. Subsequently, a jump $J_{SJ}$ over the recording area of the dependent-view extent D and reading of the base-view extent B are repeated multiple times.

Reading and transfer operations by the BD-ROM drive 2301 are not actually performed in a continuous manner, as suggested by the graphs in FIGS. 24A and 24B, but rather in an intermittent manner. Thus, overflow in the RB1 2311 and RB2 2312 is prevented during the read periods of the extents T and B. Accordingly, the graphs in FIGS. 24A and 24B represent actual step-wise changes as approximated linear changes. Furthermore, the zero sector transition time $T_{JUMP0}$ is assumed to be zero milliseconds.

As shown by FIGS. 24A and 24B, during the read period $PR_T0$ for the first extended extent T0, the data amount DA3 stored in the RB3 2312 increases at a rate equal to $R_{UDEX}-R_{EXT3}$, the difference between the read rate $R_{UDEX}$ and the third transfer rate $R_{EXT3}$, whereas the data amount DA1 stored in the RB1 2311 decreases at the first transfer rate $R_{EXT1}$. As shown in FIG. 24C, a jump $J_{SJ}$ occurs at the end of the read period $PR_T0$ of the first extended extent T0, and reading of the first dependent-view extent D is skipped. As shown in FIGS. 24A and 24B, during the jump period PSJ, the data amount DA1 stored in the RB1 2311 continues to decrease at the first transfer rate $R_{EXT1}$, whereas the data amount DA2 stored in the RB3 2312 decreases at the third transfer rate $R_{EXT3}$. Thereafter, during the read period $PR_B$ of the first base-view extent B, the data amount DA1 stored in the RB1 2311 increases at a rate equal to $R_{UDEX}-R_{EXT1}$, the difference between the read rate $R_{UDEX}$ and the first transfer rate $R_{EXT1}$. Subsequently, the data amount DA1 stored in the RB1 2311 decreases during the jump $J_{SJ}$ over the recording area of the dependent-view extent D and increases during the read period of the base-view extent B. Overall, however, the data amount DA1 stored in the RB1 2311 increases until the end of the first extended extent block 2410 is read. On the other hand, the data amount DA3 stored in the RB3 2312 continues to decrease at the third transfer rate $R_{EXT3}$.

Once all of the first extended extent blocks 2410 have been read, reading of the second extended extent T1 begins. During the read period $PR_T1$, the data amount DA3 stored in the RB3 2312 increases at a rate equal to $R_{UDEX}-R_{EXT3}$, the difference between the read rate $R_{UDEX}$ and the third transfer rate $R_{EXT3}$, whereas the data amount DA1 stored in the RB1 2311 decreases at the first transfer rate $R_{EXT1}$. Furthermore, a jump $J_{SJ}$ occurs at the end of the read period $PR_T1$ of the second extended extent T1, and reading of the dependent-view extent D is skipped. During the jump period PSJ, the data amount DA1 stored in the RB1 2312 continues to decrease at the first transfer rate $R_{EXT1}$, whereas the data amount DA2 stored in the RB3 2312 decreases at the third transfer rate $R_{EXT3}$.

For seamless playback of 4K2K 2D video images from the extent blocks 2410 and 2411 shown in FIG. 24C, the size of the extended extent T should fulfill condition 6 below.

The first extended extent T0 should be transferred from the RB3 2312 to the system target decoder 2303 during the period from the first read start time tA until the second read start time tB; at the first read start time tA, the base-view extent B located immediately after the first extended extent T0 starts to be read, and at the second read start time tB, the base-view extent B located immediately after the next extended extent T1 starts to be read. As shown in FIG. 24B, the data amount DA3 stored in the RB3 2312 does not fall below the level at which the data amount was kept immediately before the read period $PR_T0$ of the first extended extent T0. Here, the read period $PR_B$ of one base-view extent B has a length equal to the value $S_B/R_{UDEX}$, i.e., the size $S_B$ of the base-view extent B divided by the read rate $R_{UDEX}$. On the other hand, the read period $PR_T1$ of the second extended extent T1 has a length equal to the value $S_T/R_{UDEX}$, i.e., the size $S_T$ of the extended extent T1 divided by the read rate $R_{UDEX}$. Accordingly, condition 6 indicates that the extent ATC time ATC(T0) of the first extended extent T0 satisfies the following expression (6):

$$ATC(T0) \geq \Sigma T_{JUMP} + \Sigma \frac{S_B}{R_{UDEX}} + \frac{S_T}{R_{UDEX}}. \tag{6}$$

Here, the summation symbols represent the sum of the jump times $T_{jump}$ included in a period and the sum of the lengths $S_B/R_{UDEX}$ of the read periods of the base-view extents included in the same period; the period is from the first read start point tA until the second read start point tB; at the first read start point tA, the base-view extent B located immediately after the first extended extent T0 starts to be read, and at the second read start point tB, the base-view extent B located immediately after the next extended extent T1 starts to be read.

The extent ATC time ATC(T0) of the extended extent T0 equals the sum of the extent ATC times ATC(B) of the base-view extents B included in the extent block located immediately after the extended extent T0: ATC(T0)=ΣATC(B).

2-8: Number of Extent Pairs that Extended Extent Block Should Include

As shown in FIGS. 21A and 21B, by reading the extent block EXTSS[n] located immediately after the first extended extent T, the playback device 102 in 3D playback mode stores, in the RB1 1911 and the RB2 1912, the data amount to be transmitted to the system target decoder 1903 during the jump over the recording area of the next extended extent T1. In this case, the lower limit on the extent ATC time of the extent block EXTSS[n] is determined by condition 4. On the other hand, the maximum extent sizes of the base-view extent and the dependent-view extent are determined by condition 5. Accordingly, supposing that the extent block EXTSS[n] only included one extent pair, the extent ATC time of the extent block EXTSS[n] would run the risk of not reaching its lower limit even if the size of each extent in the pair is expanded to the maximum extent size. Therefore, as shown in FIG. 13, at least two extent pairs D[k] and B[k] are provided immediately after one extended extent T[m]. This allows for the extent ATC time of the extent block constituted by these extent pairs to be designed so as to be at least the lower limit.

Preferably, the number of extent pairs D[k] and B[k] provided immediately after one extended extent T[m] is fixed at two. This reduces the extent ATC time of the extended extent T[m] to a minimum, thus reducing the necessary capacity of the RB3 2312 to a minimum. Furthermore, when the playback device in extended playback mode performs interrupt playback or trickplay such as fast forward or reverse, the range for searching for the base-view picture and the extended data located at the playback start position is reduced to a minimum. Accordingly, the playback device can easily search for the base-view picture and the extended data located at the playback start position.

2-9: Separation of Playback Paths at Locations where a Long Jump is Necessary

Figure 25:
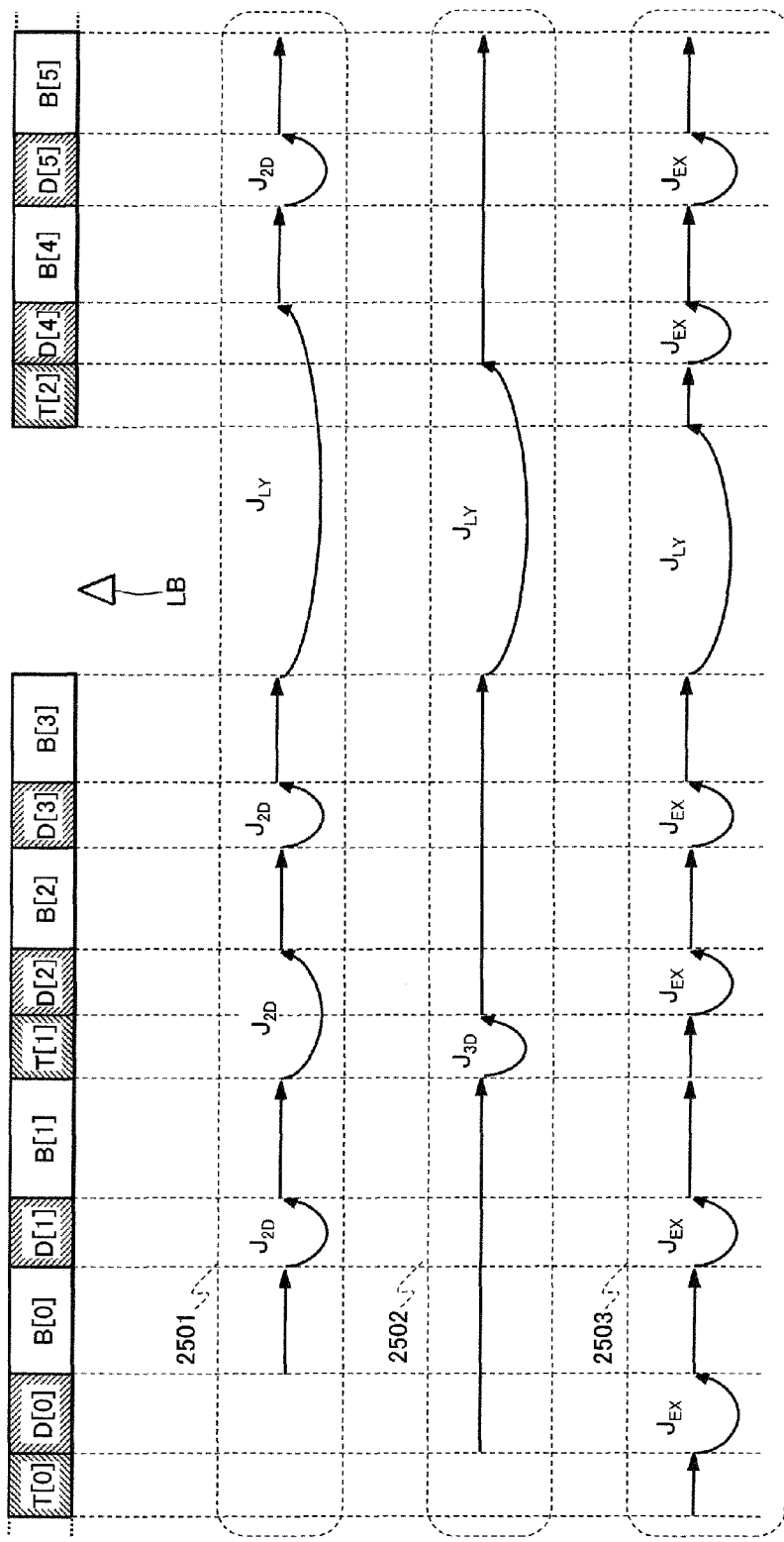
FIG. 25 is a schematic diagram showing the arrangement of extents when two recording layers on the BD-ROM disc only include shared sections before and after a layer boundary, as well as the playback paths in their respective modes designed for the extents.

The Case when Only Shared Sections are Provided Before and after a Layer Boundary FIG. 25 is a schematic diagram showing the arrangement of extents when two recording layers on the BD-ROM disc 101 only include shared sections before and after a layer boundary LB, as well as the playback paths in their respective modes designed for the extents. As illustrated in FIG. 25, the playback path 2501 in 2D playback mode, the playback path 2502 in 3D playback mode, and the playback path 2503 in extended playback mode all pass through the fourth base-view extent B[3] to be read immediately before a long jump $J_{LY}$ to jump over the layer boundary LB. Accordingly, the size of this base-view extent B[3] must fulfill all of conditions 1, 4, and 6. The value to be substituted for the jump time $T_{JUMP}$ in the right-hand side of expressions (1), (4), and (6) is the maximum jump time of the long jump $J_{LY}$. This time includes "layer switching time" in addition to the maximum jump time $T_{JUMP-MAX}$ corresponding to the maximum jump distance $S_{JUMP-MAX}$ of the long jump $J_{LY}$ in the table shown in FIG. 18; the layer switching time is necessary for an operation to switch recording layers. The maximum jump distance $S_{JUMP-MAX}$ of the long jump $J_{LY}$ is, for example, 40,000 sectors, and the corresponding maximum jump time $T_{JUMP-MAX}$ is 350 msec. On the other hand, the layer switching time is, for example, 350 msec. In this case, the value substituted for the jump time $T_{jump}$ in the right-hand side of expressions (1), (4), and (6) is 350 msec+350 msec=700 msec.

The data amount of the main TS to be processed by the system target decoder during the long jump $J_{LY}$ is guaranteed by the size of the fourth base-view extent B[3] in accordance with condition 1 in 2D playback mode and is guaranteed by the size of the third base-view extent B[2] and the fourth base-view extents B[3] in accordance with condition 4 in 3D playback mode. Therefore, the minimum extent size required by condition 1 for the fourth base-view extent B[3] is generally larger than the minimum extent size required by condition 2. The dependent-view extent D[3] located immediately before the base-view extent B[3] has the same extent ATC time as the base-view extent B[3]. Hence, the size of the dependent-view extent D[3] is generally larger than the minimum extent size required by condition 2. Therefore, the capacity of the RB2 is generally larger than the minimum necessary value for seamless playback in 3D playback mode. With the arrangement shown in FIG. 25, it is less difficult to reduce the capacity of the RB2 to the minimum necessary value.

In order to further reduce the capacity of the RB2 while maintaining the capability of seamless playback of video images during the long jump $J_{LY}$, it suffices to separate the playback path in 3D playback mode from the playback path in 2D playback mode immediately before or immediately after the long jump $J_{LY}$. Specifically, the same portion of the main TS is recorded at least twice into different areas located either immediately before or immediately after the layer boundary LB. Next, when the playback device in 2D playback mode and the playback device in 3D playback mode are caused to play back that portion, the playback devices access the different areas separately. When the portion of the main TS is duplicated into the different areas located immediately before the layer boundary LB, the base-view extent located in one of the areas accessed by the playback device in 3D playback mode need not to have a size satisfying condition 1. On the other hand, when the portion of the main TS is duplicated into the different areas located immediately after the layer boundary LB, the long jump in 2D playback mode can have a jump distance shorter than the jump distance of the long jump in 3D playback mode. As a result of these facts, the playback device in 3D playback mode is allowed to maintain the capacity of the RB2 at the minimum necessary value.

The Case when the Playback Paths are Completely Separated in all Modes

Figure 26:
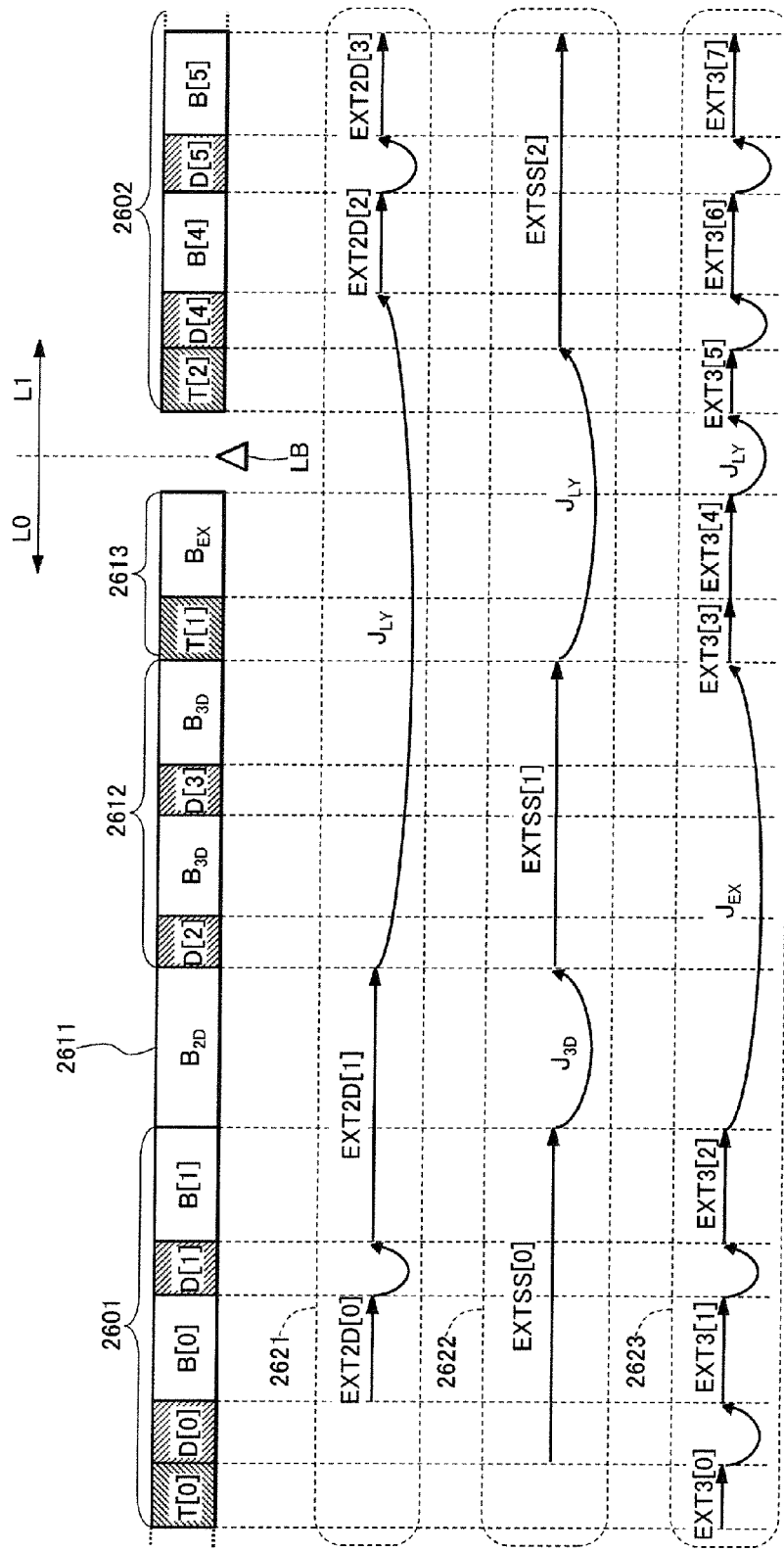
FIG. 26 is a schematic diagram showing an arrangement of extents when playback paths are completely separated in all modes immediately before a layer boundary on the BD-ROM disc, as well as the playback paths in their respective modes designed for the extents.

FIG. 26 is a schematic diagram showing an arrangement of extents when playback paths are completely separated in all modes immediately before a layer boundary LB on the BD-ROM disc 101, as well as the playback paths in their respective modes designed for the extents. As illustrated in FIG. 26, a first recording layer L0 located before the layer boundary LB includes a first shared section 2601, and a second recording layer L1 located after the layer boundary LB includes a second shared section 2602. In addition to a monoscopic video specific section 2611 and a stereoscopic video specific section 2612, the first recording layer L0 includes an extended data specific section 2613 between the first shared section 2601 and the layer boundary LB. A portion $B_{2D}$ of the main TS is provided in the monoscopic video specific section 2611, two extent pairs D and $B_{3D}$ are provided in the stereoscopic video specific section 2612, and a pair of an extended extent T and a base-view extent $B_{EX}$ is provided in the extended data specific section 2613. The portion $B_{2D}$ of the main TS provided in the monoscopic video specific section 2611 (hereinafter referred to as a 2D-playback-only block) and the base-view extent $B_{EX}$ provided in the extended data specific section 2613 (hereinafter referred to as an extended-playback-only block) are each a copy of the entirety of the base-view extents $B_{3D}$ provided in the stereoscopic video specific section 2612 (hereinafter referred to as 3D-playback-only blocks), i.e., the 2D- and extended-playback-only blocks each match with the entirety of the 3D-playback-only blocks bit for bit. In other words, the same data is recorded in triplicate. The 2D-playback-only block $B_{2D}$ can be accessed along with the immediately previous base-view extent B[1] as one extent EXT2D[1] of the file 2D. The 3D-playback-only blocks $B_{3D}$ can be accessed along with the dependent-view extents D as one extent EXTSS[1] of the file SS. The extended extents T[0]-T[2], the base-view extents B[0], B[1], B[4], and B[5] in the shared sections 2601 and 2602, and the extended-playback-only block $B_{EX}$ can each be accessed as one extent EXT3[0]-EXT3[7] of the extended stream file.

The playback device 102 in 2D playback mode plays back the file 2D. Accordingly, from the extents shown in FIG. 26, the extents EXT2D[0]-EXT2D[3] of the file 2D are read, as shown by the playback path 2621 in 2D playback mode. Specifically, the top base-view extent B[0] in the first shared section 2601 is read as one extent EXT2D[0] of the file 2D, and reading of the dependent-view extent D[1] located immediately thereafter is skipped. Next, the base-view extent B[1] located at the end of the first shared section 2601 and the 2D-playback-only block $B_{2D}$ are read as one extent EXT2D[1] of the file 2D. Immediately thereafter, a long jump $J_{LY}$ occurs, and thus the position of reading moves over the stereoscopic video specific section 2612, the extended data specific section 2613, and the layer boundary LB. In the second shared section 2602, the reading of the top extended extent T[2] and the two dependent-view extents D[4] and D[5] is skipped, whereas the two base-view extents B[4] and B[5] are read as two extents EXT2D[2] and EXT2D[3] of the file 2D.

The playback device 102 in 3D playback mode plays back the file SS. Accordingly, from the extents shown in FIG. 26, the extents EXTSS[0]-EXTSS[3] of the file SS are read, as shown by the playback path 2622 in 3D playback mode. Specifically, the extent block D[0], B[0], D[1], and B[1] is read continuously from the first shared section 2601 as one extent EXTSS[0] of the file SS. A jump $J_{3D}$ occurs immediately thereafter, and access to the monoscopic video specific section 2611 is skipped. Next, the extent block D[2], $B_{3D}$, D[3], and $B_{3D}$ is read continuously from the stereoscopic video specific section 2612 as one extent EXTSS[1] of the file SS. Immediately thereafter, a long jump $J_{LY}$ occurs, and thus the position of reading moves over the extended data specific section 2613 and the layer boundary LB. In the second shared section 2602, the reading of the extended extent T[2] is skipped, and the subsequent extent block D[4], B[4], D[5], and B[5] is read continuously as one extent EXTSS[2] of the file SS.

The playback device 102 in extended playback mode plays back the extended stream file. Accordingly, from the extents shown in FIG. 26, the extents EXT3[0]-EXT3[7] of the extended stream file are read, as shown by the playback path 2623 in extended playback mode. Specifically, in the first shared section 2601, the top extended extent T[0]=EXT3[0] is first read, then two base-view extents B[0] and B[1] are read as two extents EXT3[1] and EXT3[2] of the extended stream file, and the reading of two dependent-view extents D[0] and D[1] is skipped. Next, access to the monoscopic video specific section 2611 and the stereoscopic video specific section 2612 is skipped by a jump $J_{EX}$. The extended extent T[1] and the extended-playback-only block $B_{EX}$ are then read from the extended data specific section 2613 as two extents EXT3[3] and EXT3[4] of the extended stream file. Immediately thereafter, a long jump $J_{LY}$ occurs, and thus the position of reading moves over the layer boundary LB. In the second shared section 2602, the extended extent T[2] and the two base-view extents B[4] and B[5] are read as three extents EXT3[5], EXT3[6], and EXT3[7] of the extended stream file, and the reading of the two dependent-view extents D[4] and D[5] is skipped.

As described above, the arrangement shown in FIG. 26 separates the playback path 2621 in 2D playback mode, the playback path 2622 in 3D playback mode, and the playback path 2623 in extended playback mode from each other immediately before the long jump $J_{LY}$. Note that the entirety of the 3D-playback-only blocks $B_{3D}$ match bit for bit with each of the 2D-playback-only block $B_{2D}$ and the extended-playback-only block $B_{EX}$, and therefore the same base-view video frames are played back in every playback mode.

For seamless playback in 2D playback mode, the 2D-playback-only block $B_{2D}$ should be transferred from the read buffer 1602 to the system target decoder 1603 during the period from the start time of reading from the BD-ROM disc 101 until the end time of the long jump $J_{LY}$. Accordingly, the size $S_{DUP\_FOR\_SSIF}$ of the 2D-playback-only block $B_{2D}$ and the extent ATC time $T_{DUP\_FOR\_SSIF}$ are set to satisfy expression (7) below:

$$T_{DUP\_FOR\_SSIF} \geq \frac{S_{DUP\_FOR\_SSIF}}{R_{UD2D}} + T_{JUMP}, \quad (7)$$

$$S_{DUP\_FOR\_SSIF} = T_{DUP\_FOR\_SSIF} \times R_{MAX2D} \therefore$$

$$T_{DUP\_FOR\_SSIF} \geq \frac{R_{UD2D}}{R_{UD2D} - R_{MAX2D}} \times T_{JUMP}.$$

For example, when the jump time of the long jump $J_{LY}$ is 700 msec, the system rate $R_{TS}=R_{MAX2D}/192\times188$ for the file 2D is 48 Mbps, and the read rate $R_{UD2D}$ of the BD-ROM drive is 54 Mbps, the extent ATC time $T_{DUP\_FOR\_SSIF}$ of the 2D-playback-only block may be approximately 7.6 sec or more.

The 2D-playback-only block $B_{2D}$, the entirety of the 3D-playback-only blocks $B_{3D}$, and the extended-playback-only block $B_{EX}$ are all the same data, and thus have the same size. This size equals the size $S_{DUP\_FOR\_SSIF}$ of the 2D-playback-only block $B_{2D}$, i.e., the product of the extent ATC time $T_{DUP\_FOR\_SSIF}$ provided in expression (7) and 192/188 times the system rate $R_{TS}$ for the file 2D: $S_{DUP\_FOR\_SSIF} = T_{DUP\_FOR\_SSIF} \times R_{TS} \times 192/188$. For example, when the system rate $R_{TS}$ for the file 2D equals its maximum value of 48 Mbps and the extent ATC time $T_{DUP\_FOR\_SSIF}$ is approximately 7.6 sec, then the size $S_{DUP\_FOR\_SSIF}$ of each of the blocks $B_{2D}$, $B_{3D}$, and $B_{Ex}$ is approximately 44 MB.

In the arrangement of extents shown in FIG. 26, the same portion of the main TS $B_{2D}$, $B_{3D}$, and $B_{EX}$ is recorded in triplicate in the vicinity of the location where a long jump $J_{LY}$ is necessary. For example, when the system rate $R_{TS}$ for the file 2D equals its maximum value of 48 Mbps, data of at least 44 MB×2=88 MB is duplicated. Accordingly, it is difficult to further effectively utilize the volume area 202B on the BD-ROM disc 101. The playback path 2621 in 2D playback mode shown in FIG. 26 has to use a long jump $J_{LY}$ to skip the entirety of the 3D-playback-only blocks $B_{3D}$ and the extended-playback-only block $B_{EX}$. Accordingly, when the system rate $R_{TS}$ for the file 2D equals its maximum value of 48 Mbps, the jump distance of the long jump $J_{LY}$ exceeds approximately 88 MB=approximately 45,000 sectors. This value is larger than the maximum jump distance for a long jump=40,000 sectors=approximately 78.1 MB. Therefore, at least in the vicinity of the location where the long jump $J_{LY}$ is necessary, the system rate $R_{TS}$ for the file 2D needs to be restricted to be lower than the actual bit rate for the file 2D=48 Mbps. This would result in undesirable deterioration of the image quality in 2D playback mode.

To merely prevent degradation of the quality of video images to be played back in 2D playback mode, it would suffice to replace the monoscopic video specific section 2611 and the extended data specific section 2613 with each other within the arrangement shown in FIG. 26, and to reduce the jump distance of the long jump $J_{LY}$ in 2D playback mode to 40,000 sectors. In this case, however, a long jump in extended playback mode has to be used to skip the reading of the entirety of the 3D-playback-only blocks $B_{3D}$ and the 2D-playback-only block $B_{2D}$. The jump distance of the long jump would thus exceed 40,000 sectors. In order to have a playback device in extended playback mode maintain its good playback performance, it becomes necessary to improve the jump performance of the playback device. This would result in undesirable increase in manufacturing cost of the playback device.

Advantages Shared by Arrangements 1 and 2 of Extents

Unlike the arrangement shown in FIG. 26, arrangement 1 shown in FIG. 14 and arrangement 2 shown in FIG. 15 allow the monoscopic video specific sections 1412, 1422, 1512, and 1522 to be accessed by both the playback devices in 2D playback mode and extended playback mode. Thus, only the 2D-playback-only block $B_{2D}$ has to exist on the BD-ROM disc 101 as a copy of the entirety of the 3D-playback-only blocks. As a result, the volume area 202B on the BD-ROM disc 101 can be utilized more effectively.

Furthermore, it suffices for the playback device in any mode to use a long jump $J_{LY}$ to skip the reading of either the 2D-playback-only block $B_{2D}$ or the entirety of the 3D-playback-only blocks $B_{3D}$. Accordingly, even if the system rates for the file 2D and the file SS are set to the maximum values of 48 Mbps and 64 Mbps, respectively, the jump distance of the long jump $J_{LY}$ in either mode does not exceed the maximum jump distance of 40,000 sectors. As a result, the playback device in any mode can maintain high image quality regardless of the need for a long jump.

In practice, for arrangement 1 shown in FIG. 14, the jump distance of the long jump $J_{LY}$ in each mode is calculated as follows. Here, the following case is assumed for this calculation: the long jump $J_{LY}$ has the maximum jump time of 700 msec, and the playback path 1431 in 2D playback mode includes the jump $J_{2D}$ occurring immediately after the second monoscopic video specific section 1422 and having the maximum jump time of 350 msec. In this case, the maximum jump distance for any jump is restricted to 40,000 sectors. The file 2D, the file DEP, and the extended stream file have system rates $R_{TS1}$, $R_{TS2}$, and $R_{TS3}$ of 48 Mbps, 16 Mbps, and 16 Mbps, respectively. These values are determined by the transfer bandwidths of 48 Mbps, 64 Mbps, and 64 Mbps allocated to the system target decoders in 2D playback mode, 3D playback mode, and extended playback mode, respectively. The BD-ROM drives in 2D playback mode, 3D playback mode, and extended playback mode have read rates $R_{UD2D}$, $R_{UD3D}$, and $R_{UDEX}$ of 54 Mbps, 72 Mbps, and 72 Mbps, respectively.

First, in order to guarantee the maximum jump time of 700 msec for the long jump $J_{LY}$ in 2D playback mode, the base-view extent $B_{2D}$ located in the first monoscopic video specific section 1412 should have the size $S_{DUP\_FOR\_SSIF}$ of at least approximately 44 MB, and the extent ATC time $T_{DUP\_FOR\_SSIF}$ of approximately 7.6 sec at the shortest.

Next, for seamless playback in 3D playback mode, the extent block D, $B_{3D}$, D, and $B_{3D}$ located in the first stereoscopic video specific section 1413 should be transferred from the RB1 1911 and the RB2 1912 to the system target decoder 1903 during the period from the start time of reading from the BD-ROM disc 101 until the end time of the long jump $J_{LY}$. Accordingly, the size $S_{EXTSS}$ and extent ATC time $T_{EXTSS}$ of the extent block D, $B_{3D}$, D, and $B_{3D}$ are set so as to satisfy expression (8) described below:

$$T_{EXTSS} \geq \frac{S_{EXTSS}}{R_{UD3D}} + T_{JUMP}, \quad (8)$$

$$S_{EXTSS} = T_{EXTSS} \times (R_{MAX1} + R_{MAX2}) \therefore$$

$$T_{EXTSS} \geq \frac{R_{UD3D}}{R_{UD3D} - (R_{MAX1} + R_{MAX2})} \times T_{JUMP}.$$

The maximum value $R_{MAX1}$ of the first transfer rate $R_{EXT1}$ equals 192/188 times the system rate $R_{TS1}$ for the file 2D, and the maximum value $R_{MAX2}$ of the second transfer rate $R_{EXT2}$ equals 192/188 times the system rate $R_{TS2}$ for the file DEP: $R_{MAX1} = R_{TS1} \times 192/188$, $R_{MAX2} = R_{TS2} \times 192/188$. Accordingly, in order to guarantee the maximum jump time of the long jump $J_{LY}$ of 700 msec during 3D playback mode, it suffices for the extent block D, $B_{3D}$, D, and $B_{3D}$ located in the first stereoscopic video specific section 1413 to have the size $S_{EXTSS}$ of at least approximately 59 MB and the extent ATC time $T_{EXTSS}$ of approximately 7.6 sec at the shortest.

As is understood from expression (1), in order to guarantee the maximum jump time of 350 msec for the jump $J_{2D}$ included in the playback path 1431 in 2D playback mode, occurring immediately after the second monoscopic video specific section 1422, it suffices for the base-view extent $B_{2D}$ located in the second monoscopic video specific section 1422 to have the size $S_{EXT2D}$ of at least approximately 33 MB, and the extent ATC time $T_{EXT2D} = S_{EXT2D}/R_{MAX2D}$ of 5.7 sec at the shortest. Since the extended extent T located in the second extended data specific section 1421 has the same extent ATC time as the base-view extent $B_{2D}$ located in the second monoscopic video specific section 1422, the size of the extended extent T is at least approximately 11 MB.

As shown in FIG. 14, the playback path 1431 in 2D playback mode includes the long jump $J_{LY}$ with the jump distance that equals the total number of sectors included in the first stereoscopic video specific section 1413 and the second extended data specific section 1421. Here, the extent block D, $B_{3D}$, D, and $B_{3D}$ located in the first stereoscopic video specific section 1413 has the size $S_{EXTSS}$ of at least approximately 59 MB, and the extended extent T located in the second extended data specific section 1421 has the size of at least approximately 11 MB. Accordingly, the long jump $J_{LY}$ in 2D playback mode has the jump distance of at least 59 MB+11 MB=70 MB.

Next, the playback path 1432 in 3D playback mode includes the long jump $J_{LY}$ with the jump distance that equals the total number of sectors included in the second extended data specific section 1421 and the second monoscopic video specific section 1422. Here, the extended extent T located in the second extended data specific section 1421 has the size of at least approximately 11 MB, and the base-view extent $B_{2D}$ located in the second monoscopic video specific section 1422 has the size $S_{EXT2D}$ of at least approximately 33 MB. Accordingly, the long jump $J_{LY}$ in 3D playback mode has the jump distance of at least 11 MB+33 MB=44 MB.

Furthermore, the playback path 1433 in extended playback mode includes the long jump $J_{LY}$ with the jump distance that equals the number of sectors included in the first stereoscopic video specific section 1413. Accordingly, the long jump $J_{LY}$ in extended playback mode has the jump distance of at least 59 MB.

The jump distance of the long jump $J_{LY}$ in any mode is calculated as described above. As indicated by the calculated results, the jump distance in any mode can be reduced below the maximum jump distance of the long jump $J_{LY}$=40,000 sectors=approximately 78.1 MB. The same is true for arrangement 2 shown in FIG. 15.

Advantages Unique to Arrangement 2 of Extents

Arrangement 1 shown in FIG. 14 allows the playback path 1432 in 3D playback mode to include a jump $J_{3D}$ to occur immediately after completion of data read from the first shared section 1401 to skip access to the first extended data specific section 1411 and the first monoscopic video specific section 1412. Here, the conditions for guaranteeing the maximum jump time of 700 msec for the long jump $J_{LY}$ in 2D playback mode requires that the base-view extent $B_{2D}$ located in the first monoscopic video specific section 1412 have the size $S_{DUP\_FOR\_SSIF}$ of at least approximately 44 MB and the extent ATC time $T_{DUP\_FOR\_SSIF}$ of at least approximately 7.6 sec. In this case, since the extended extent T located in the first extended data specific section 1411 has the extent ATC time of at least approximately 7.6 sec, the extended stream file which requires the system rate of 16 Mbps, has the extended extent T with the size of 16 Mbps/8×192/188×7.6 sec=at least approximately 15 MB. Accordingly, the above-mentioned jump $J_{3D}$ needs to have the jump distance $S_{JUMP}$ of at least 15 MB+44 MB=59 MB=approximately 30,000 sectors. From the table shown in FIG. 18, the maximum jump time $T_{JUMP-MAX}$ of the jump $J_{3D}$ needs to be at least 350 msec.

Condition 4 requires that the data amount to be processed by the system target decoder 1903 in 3D playback mode during the above-mentioned jump $J_{3D}$ is guaranteed by the size of the last extent block D, B, D, and B in the first shared section 1401. Here, it is assumed that each of extents constituting this extent block has the maximum extent size determined by expression (5C), and that the second transfer rate $R_{EXT2}$ for the extent block is 48 Mbps×192/188. In this case, the dependent-view extent D belonging to the extent block has the size of at most $8.1\times10^6$ bytes, and therefore the extent ATC time $T_{EXT2}$ of approximately 1.32 sec at the longest: $T_{EXT2}=8.1\times10^6$ bytes×8/$R_{EXT2}$=approximately 1.32 sec. Accordingly, when the extent block includes "n" extent pairs, the entirety of the extent block has the extent ATC time $T_{EXTSS}$ of approximately 1.32×n sec at the longest. On the other hand, as is clear from expression (4), the jump time $T_{AMP}$ for the above-mentioned jump $J_{3D}$ satisfies expression (9) described below:

$$T_{EXTSS} = \frac{S_{EXTSS}}{R_{EXTSS}} \geq \frac{R_{ED3D}}{R_{UD3D} - R_{EXTSS}} \times T_{JUMP} \therefore \quad (9)$$

$$T_{JUMP} \leq \left(1 - \frac{R_{EXTSS}}{R_{UD3D}}\right) \times T_{EXTSS}.$$

When the mean transfer rate $R_{EXTSS}$ for the extent block is at the maximum value of 64 Mbps×192/188, then expression (9) shows that the above-mentioned jump $J_{3D}$ has the jump time $T_{AMP}$ of at most 122 msec×n. For seamless playback of 3D video images during the jump $J_{3D}$ in 3D playback mode to skip access to the first extended data specific section 1411 and the first monoscopic video specific section 1412, the jump time $T_{AMP}$=approximately 122 msec×n must be at least 350 msec.

Accordingly, arrangement 1 illustrated in FIG. 14 requires that the number n of extent pairs included in the last extent block in the first shared section 1401 must be at least three. Furthermore, raising the system rate $R_{TS3}$ for the extended stream file higher than the value of 16 Mbps assumed in the above-described calculation needs a corresponding increase in the data amount of the first extended data specific section 1411, and thus requires a further increase in the above-mentioned number "n" of extent pairs. Here, an increase in the number "n" of extent pairs prolongs the extent ATC time of the extended extent T that is arranged immediately before the extent pairs, thereby increasing the capacity required for the RB3 2312. Accordingly, it is not preferable to increase the number "n" of extent pairs to three or more.

On the other hand, arrangement 2 illustrated in FIG. 15, unlike arrangement 1, does not need the above-described limitation on the number "n" of extent pairs per extent block. In practice, arrangement 2 allows the playback path 1532 in 3D playback mode to include a jump occurring immediately after completion of data reading from the first shared section 1401 in order to skip only access to the first extended data specific section 1511. Here, the conditions for guaranteeing the maximum jump time of 700 msec for the long jump $J_{LY}$ to move across the layer boundary LB during 2D playback mode require that the base-view extent $B_{2D}$ located in the first monoscopic video specific section 1512 has the extent ATC time $T_{DUP\_FOR\_SSIF}$ of at least approximately 7.6 sec. In this case, the extended extent T located in the first extended data specific section 1511 has the extent ATC time of at least approximately 7.6 sec, and thus, when the system rate for the extended stream file is 16 Mbps, the extended extents T have the size of at least approximately 15 MB. Accordingly, the above-mentioned jump included in the playback path 1532 in 3D playback mode must have the jump distance of at least the lower limit of the data amount in the first extended data specific section 1511; the lower limit equals approximately 15 MB or approximately 7,680 sectors. From the table shown in FIG. 18, this jump needs to have the maximum jump time $T_{JUMP\_MAX}$ of at least 200 msec. Under this condition, when the mean transfer rate $R_{EXTSS}$ for the last extent block in the first shared section 1401 has the maximum value of 64 Mbps× 192/188, the jump time $T_{AMP}$ of the jump is limited up to approximately 122 msec×n. For this upper limit, approximately 122 msec×n, to exceed 200 msec, the number "n" of extent pairs included in the extent block should be at least two. In other words, the restriction on the number "n" is no different from the original restriction on the extended extent block.

In addition, arrangement 2, unlike arrangement 1, allows the system rate $R_{TS3}$ for the extended stream file to be set higher than 16 Mbps even with the number "n" of extent pairs included in the last extent block in the first shared section 1401 being two. In practice, when the mean transfer rate $R_{EXTSS}$ for the extent block is the maximum value of 64 Mbps×192/188, the jump included in the playback path 1532 in 3D playback mode immediately after reading of the extent block may have possible jump time of up to approximately 122 msec×2=approximately 243 msec. Accordingly, the first extended data specific section 1511 should have at most 10,000 sectors, i.e., the extended extent T located in this section should have the size $S_{EXT3}$ of at most approximately 19.5 MB. On the other hand, the conditions on the long jump $J_{LY}$ for moving across the layer boundary LB allows the extent ATC time $T_{EXT3}$ of this extended extent T to be approximately 7.6 sec at the shortest. Therefore, without increasing the capacity necessary in the RB3 2312, the system rate $R_{TS3}$ for the extended stream file can be raised up to approximately 21 Mbps: $R_{TS3}=S_{EXT3}/T_{EXT3}\leq 19.5$ MB×8/7.6 sec/192×188=approximately 21 Mbps.

2-10: Clip Information File

Figure 27:
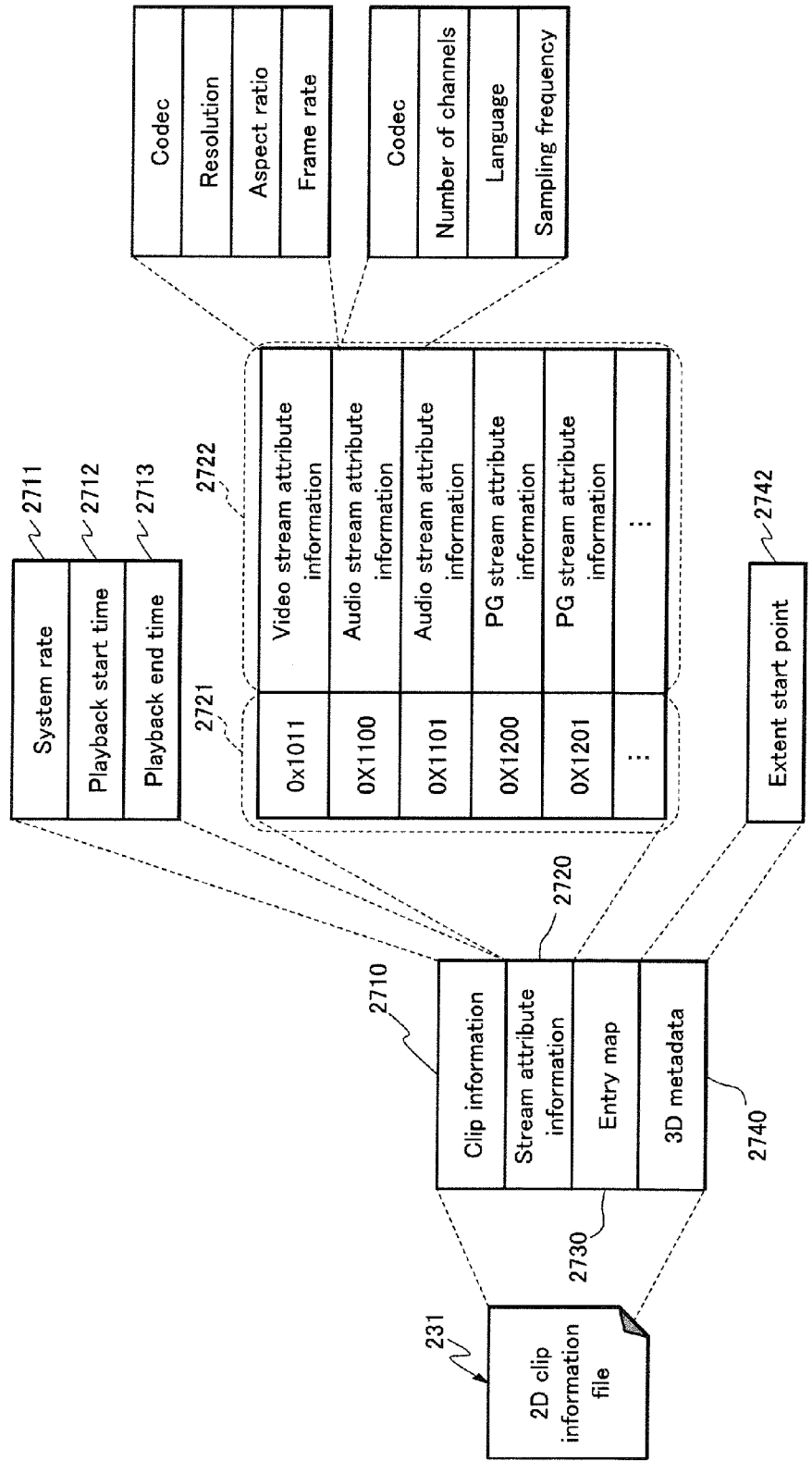
FIG. 27 is a schematic diagram showing the data structure of a 2D clip information file.

FIG. 27 is a schematic diagram showing the data structure of a 2D clip information file 231. As shown in FIG. 27, the 2D clip information file 231 includes clip information 2710, stream attribute information 2720, an entry map 2727, and 3D meta data 2740. The 3D meta data 2740 includes an extent start point 2742. The DEP clip information file and the extended clip information file 233 also have the same data structure.

As shown in FIG. 27, the clip information 2710 includes a system rate 2711, a playback start time 2712, and a playback end time 2713. The system rate 2711 specifies a system rate $R_{TS}$ for the file 2D 221. In this context, as shown in FIG. 16, the playback device 102 in 2D playback mode transfers "TS packets" belonging to the file 2D 221 from the read buffer 1602 to the system target decoder 1603.

Accordingly, the interval between the ATSs of the source packets in the file 2D 221 is set so that the transfer rate of the TS packets is limited to the system rate $R_{TS}$ or lower. The playback start time 2712 indicates the PTS allocated to the VAU located at the top of the file 2D 221, e.g. the PTS of the top video frame. The playback end time 2713 indicates the value of the STC delayed a predetermined time from the PTS allocated to the VAU located at the end of the file 2D 221, e.g. the sum of the PTS of the last video frame and the playback time of one frame.

As shown in FIG. 27, the stream attribute information 2720 is a correspondence table between the PID 2721 for each elementary stream included in the file 2D 221 and pieces of attribute information 2722. Each piece of attribute information 2722 is different for a video stream, audio stream, PG stream, and IG stream. For example, the attribute information corresponding to the PID 0x1011 for the primary video stream includes a codec type used for the compression of the video stream, as well as a resolution, aspect ratio, and frame rate for each picture constituting the video stream. On the other hand, the attribute information corresponding to the PID 0x1100 for the primary audio stream includes a codec type used for compressing the audio stream, a number of channels included in the audio stream, language, and sampling frequency. The playback device 102 uses this attribute information 2722 to initialize the decoder.

Entry Map

Figures 28A, 28B, 28C:
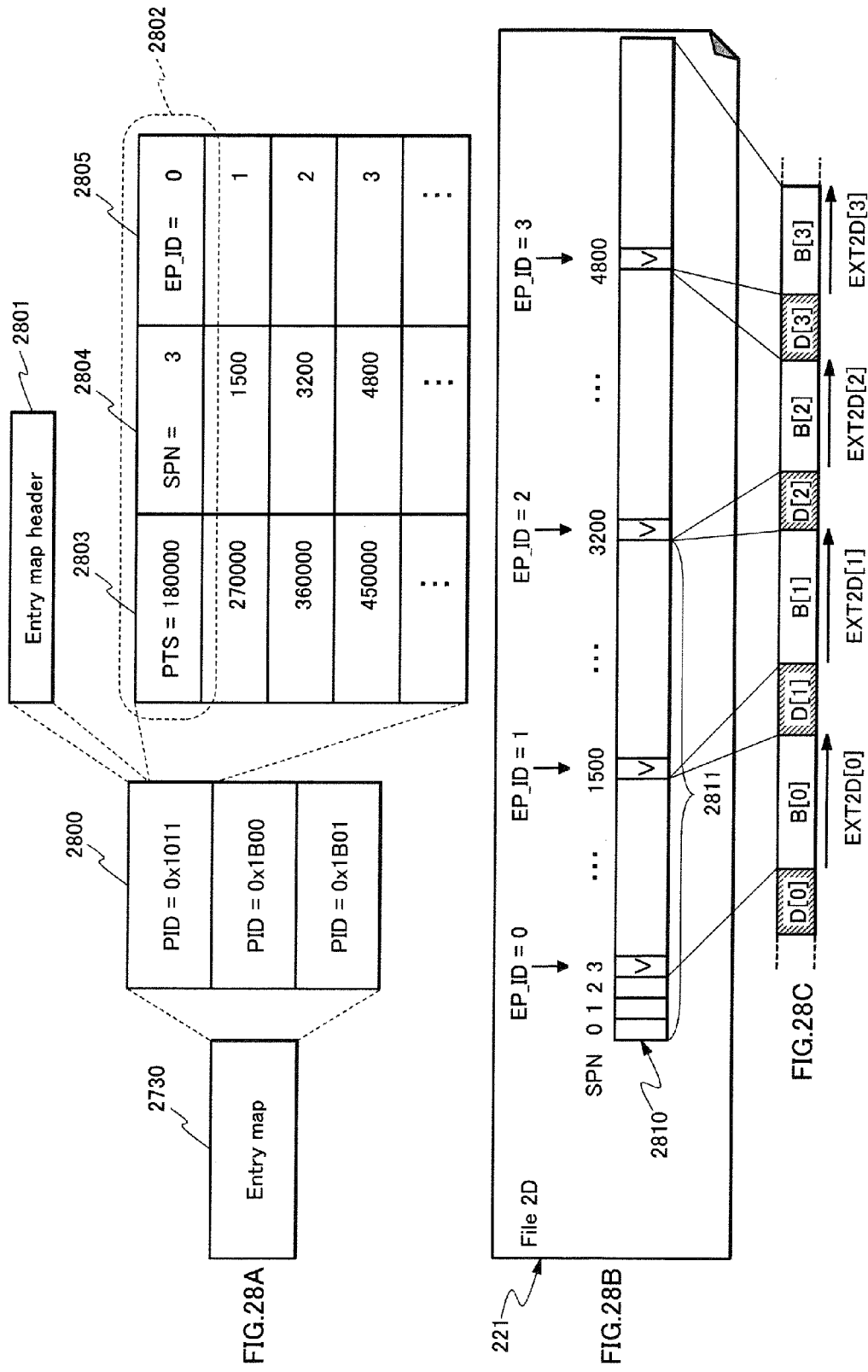
FIG. 28A is a schematic diagram showing the data structure of an entry map.
FIG. 28B is a schematic diagram showing source packets that are included in a source packet group belonging to a file 2D, and are associated with EP IDs by the entry map.
FIG. 28C is a schematic diagram showing extents D[n], B[n] (n=0, 1, 2, 3, ... ) on a BD-ROM disc corresponding to the source packet group.

FIG. 28A is a schematic diagram showing the data structure of an entry map 2730. As shown in FIG. 28A, the entry map 2730 includes tables 2800. There is the same number of tables 2800 as there are video streams multiplexed in the main TS, and tables are assigned one-by-one to each video stream. In FIG. 28A, each table 2800 is distinguished by the PID of the video stream to which it is assigned. Each table 2800 includes an entry map header 2801 and an entry point 2802. The entry map header 2801 includes the PID corresponding to the table 2800 and the total number of entry points 2802 included in the table 2800. An entry point 2802 associates each pair of a PTS 2803 and source packet number (SPN) 2804 with one of individually differing entry point IDs (EP_ID) 2805. The PTS 2803 is equivalent to the PTS for one of the I pictures included in the video stream for the PID indicated by the entry map header 2801. The SPN 2804 is equivalent to the first SPN of the source packets containing the corresponding I picture. An "SPN" refers to the serial number assigned to source packets belonging to a single AV stream file, beginning from their top. The SPN is used as the address for each source packet in the AV stream file. In the entry map 2730 in the 2D clip information file 231, the SPN refers to the number assigned to the source packets belonging to the file 2D 221, i.e. the source packets containing the main TS. Accordingly, the entry point 2802 expresses the correspondence between the PTS and the address, i.e. the SPN, of each I picture included in the file 2D 221.

An entry point 2802 does not need to be set for all of the I pictures in the file 2D 221. However, when an I picture is located at the top of a GOP, and the TS packet that includes the top of that I picture is located at the top of an extent, an entry point 2802 has to be set for that I picture.

FIG. 28B is a schematic diagram showing source packets that are included in a source packet group 2810 belonging to a file 2D 221, and are associated with EP IDs 2805 by the entry map 2730. FIG. 28C is a schematic diagram showing extents D[n], B[n] (n=0, 1, 2, 3, . . . ) on a BD-ROM disc 101 corresponding to the source packet group 2810. When the playback device 102 plays back 2D video images from the file 2D 221, it refers to the entry map 2730 to specify the SPN for the source packet that includes a frame representing an arbitrary scene from the PTS for that frame. Specifically, when for example a PTS=360000 is indicated as the PTS for a specific entry point for the playback start position, the playback device 102 first retrieves the SPN=3200 allocated to this PTS in the entry map 2730. Next, the playback device 102 seeks the quotient SPN×192/2048, i.e. the value of the SPN multiplied by 192 bytes, the data amount per source packet, and then divided by 2048 bytes, the data amount per sector. As can be understood from FIGS. 6C and 6D, this quotient is the same as the total number of sectors recorded in the main TS prior to the source packet to which the SPN is assigned. In the example shown in FIG. 28B, this quotient is 3200×192/2048=300, and is equal to the total number of sectors on which are recorded source packets 2811 to which SPNs 0 through 3199 are allocated. Next, the playback device 102 refers to the file entry in the file 2D 221 and specifies the LBN of the (total number+1)$^{th}$ sector, counting from the top of the sectors in which extents of the file 2D 221 are recorded. In the example shown in FIG. 28C, the LBN of a sector is specified; the sector is located at the 301$^{st}$ counting from the top of the sectors in which the base-view extents B[0], B[1], B[2], . . . accessible as extents EXT2D[0], EXT2D[1], EXT2D[2], . . . are recorded. The playback device 102 indicates the LBN to the BD-ROM drive. In this way, base-view extents are read in aligned units, beginning from the sector at the LBN. Furthermore, from the aligned unit that is first read, the playback device 102 selects the source packet indicated by the entry point for the playback start position, and then extracts and decodes an I picture from the source packet. From then on, subsequent pictures are decoded in order referring to already decoded pictures. In this way, the playback device 102 can play back 2D video images from the file 2D 221 from a specified PTS onwards.

Furthermore, the entry map 2730 is useful for efficiently perform trickplay such as fast forward, reverse, etc. For example, the playback device 102 in 2D playback mode first refers to the entry map 2730 to read SPNs starting at the playback start position, e.g. to read SPN=3200, 4800, . . . in order from the entry points EP_ID=2, 3, . . . that include PTSs starting at PTS=360000. Next, the playback device 102 refers to the file entry in the file 2D 221 to specify the LBN of the sectors corresponding to each SPN. The playback device 102 then indicates each LBN to the BD-ROM drive. Aligned units are thus read from the sector for each LBN. Furthermore, from each aligned unit, the playback device 102 selects the source packet indicated by each entry point and then extracts and decodes an I picture. The playback device 102 can thus selectively play back I pictures from the file 2D 221 without analyzing the extents EXT2D[n] themselves.

Extent Start Point

Figure 29A:
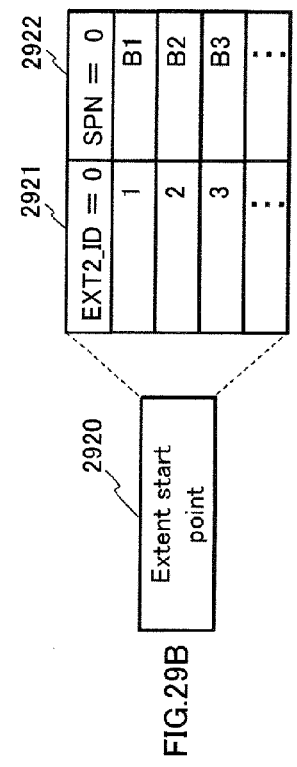
FIG. 29A is a schematic diagram showing the data structure of an extent start points included in a 2D clip information file.

FIG. 29A is a schematic diagram showing the data structure of an extent start point 2742. As shown in FIG. 29A, an "extent start point" 2742 includes base-view extent IDs (EXT1_ID) 2911 and SPNs 2912. The EXT1_IDs 2911 are serial numbers assigned consecutively from the top to the base-view extents belonging to the file SS 223. One SPN 2912 is assigned to each EXT1_ID 2911 and is the same as the SPN of the source packet located at the top of the base-view extent identified by the EXT1_ID 2911. This SPN is a serial number assigned to source packets in order from the top; the source packets are included in the base-view extents belonging to the file SS 223.

As shown in FIG. 11, the base-view extents B[0], B[1], B[2], . . . included in the extended extent blocks are shared between the file 2D 221 and the file SS 223. On the other hand, as shown in FIGS. 14 and 15, the extents arranged near the location where a long jump is necessary, such as a layer boundary, includes base-view extents belonging only to either the file 2D 221 or the file SS 223. Accordingly, the SPN 2912 indicated by the extent start point 2742 generally differs from the SPN for the source packet located at the top of the base-view extent belonging to the file 2D 221.

Figure 29B:
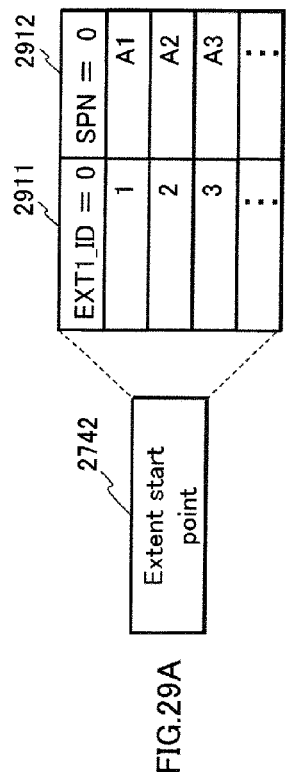
FIG. 29B is a schematic diagram showing the data structure of an extent start point included in a DEP clip information file.

FIG. 29B is a schematic diagram showing the data structure of the extent start point 2920 included in the DEP clip information file 232. As shown in FIG. 29B, the extent start point 2920 includes dependent-view extent IDs (EXT2_ID) 2921 and SPNs 2922. The EXT2_IDs 2921 are serial numbers assigned consecutively from the top to the dependent-view extents belonging to the file SS 223. One SPN 2922 is assigned to each EXT2_ID 2921 and is the same as the SPN for the source packet located at the top of the dependent-view extent identified by the EXT2_ID 2921. This SPN is a serial number assigned to source packets in order from the top; the source packets are included in the dependent-view extents belonging to the file SS 223.

Figure 29C:
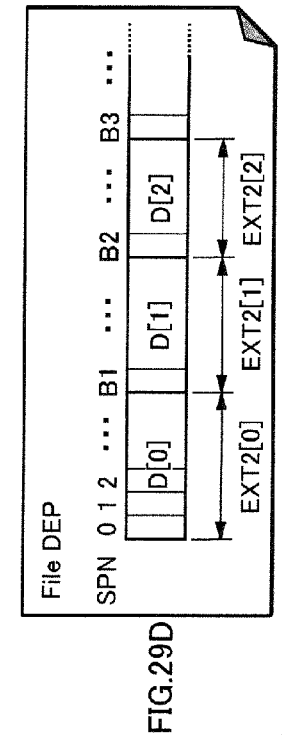
FIG. 29C is a schematic diagram representing the base-view extents B[0], B[1], B[2], ... extracted from the file SS by the playback device in 3D playback mode.
Figure 29D:
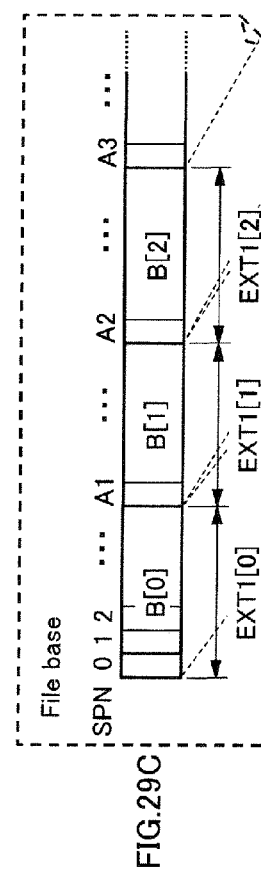
FIG. 29D is a schematic diagram representing correspondence between dependent-view extents EXT2[0], EXT2[1], ... belonging to a file DEP and the SPNs shown by the extent start point.

FIG. 29D is a schematic diagram representing correspondence between dependent-view extents EXT2[0], EXT2[1], . . . belonging to the file DEP 222 and the SPNs 2922 shown by the extent start point 2920. As shown in FIG. 11, the file DEP 222 and the file SS 243 share dependent-view extents in common. Accordingly, as shown in FIG. 29D, each SPN 2922 shown by the extent start point 2920 is the same as the SPN for the source packet located at the top of each dependent-view extent EXT2[0], EXT2[1], . . . .

As described below, the extent start point 2742 in the 2D clip information file 231 and the extent start point 2920 in the clip information file 232 are used for detecting the boundary between base-view extents and dependent-view extents included in each extent in the file SS 223 when playing back 3D video images from the file SS 223.

Figure 29E:
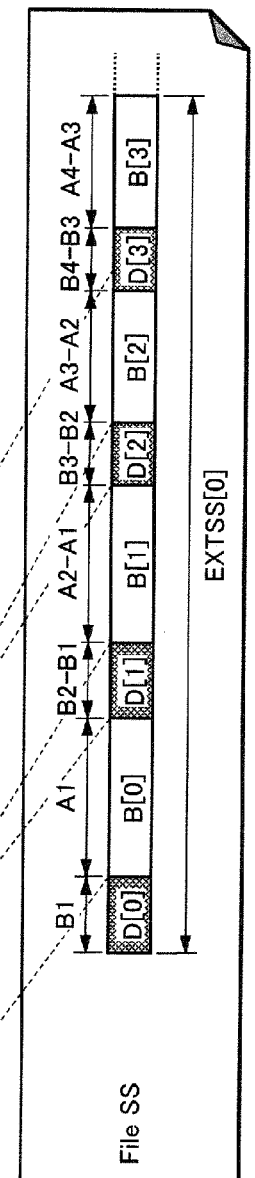
FIG. 29E is a schematic diagram showing correspondence between an extent EXTSS[0] belonging to the file SS and extent blocks on the BD-ROM disc.

FIG. 29E is a schematic diagram showing correspondence between an extent EXTSS[0] belonging to the file SS 223 and extent blocks on the BD-ROM disc 101. As shown in FIG. 29E, the extent block includes extents D[n] and B[n] (n=0, 1, 2, . . . ) in an interleaved arrangement. The extent block can be accessed as the extent EXTSS[0] in the file SS 223. Furthermore, in the extent EXTSS[0], the number of source packets included in the $(n+1)^{th}$ base-view extent B[n] is, at the extent start point 2742, the same as the difference A(n+1)−An between SPNs respectively corresponding to EXT1_ID=n+1 and n. In this case, A0=0. On the other hand, the number of source packets included in the dependent-view extent D[n+1] is, at the extent start point 2920, the same as the difference B(n+1)−Bn between SPNs respectively corresponding to EXT2_ID=n+1 and n. In this case, B0=0.

When the playback device 102 in 3D playback mode plays back 3D video images from the file SS 223, the playback device 102 refers to the entry maps and the extent start points 2742 and 2920 respectively found in the clip information files 231 and 232. By doing this, the playback device 102 specifies, from the PTS for a frame representing the right view of an arbitrary scene, the LBN for the sector on which a dependent-view extent that is required for composing the frame is recorded. Specifically, the playback device 102 for example first retrieves the SPN associated with the PTS from the entry map in the DEP clip information file 232. It is assumed that the source packet indicated by the SPN is included in the third dependent-view extent EXT2[2]=D[2] in the file DEP 222. Next, the playback device 102 retrieves "B2," the largest SPN smaller than the target SPN, from among the SPNs 2922 shown by the extent start point 2920 in the DEP clip information file 232. The playback device 102 also retrieves the corresponding EXT2_ID "2." Then the playback device 102 retrieves the value "A2" for the SPN 2912 corresponding to the EXT1_ID, which is the same as the EXT2_ID "2," from the extent start point 2742 in the 2D clip information file 231. The playback device 102 further seeks the sum B2+A2 of the retrieved SPNs. As can be seen from FIG. 29E, this sum B2+A2 is the same as the total number of source packets located before the third dependent-view extent D[2] within the extent EXTSS[0] in the file SS 223. Accordingly, this sum B2+A2 multiplied by 192 bytes, the data amount per source packet, and divided by 2048 bytes, the data amount per sector, i.e. (B2+A2)×192/2048, is the same as the number of sectors from the top of the extent EXTSS[0] in the file SS 223 until immediately before the third dependent-view extent D[2]. Using this quotient, the LBN for the sector on which the top of the dependent-view extent D[2] is recorded can be specified by referencing the file entry for the file SS 223.

After specifying the LBN via the above-described procedure, the playback device 102 indicates the LBN to the BD-ROM drive 121. In this way, the portion of the extent EXTSS [0] of the file SS 223 is read in aligned units; the portion is recorded in the sectors located at and after the LBN, i.e., the third dependent-view extent D[2] and the following extents B[2], D[3], B[3], . . . .

The playback device 102 further refers to the extent start points 2742 and 2920 to extract dependent-view extents and base-view extents alternately from the extents read from the file SS 223. For example, assume that extents D[n], B[n] (n=0, 1, 2, . . . ) are read in order from an extent EXTSS[0] of the file SS 223 shown in FIG. 29E. The playback device 102 first extracts B1 source packets from the top of the extent EXTSS[0] as the dependent-view extent D[0]. Next, the playback device 102 extracts the $(B1+1)^{th}$ source packet and the subsequent (A1−1) source packets, a total of A1 source packets, as the first base-view extent B[0]. The playback device 102 then extracts the $(B1+A1+1)^{th}$ source packet and the subsequent (B2−B1−1) source packets, a total of (B2−B1) source packets, as the second dependent-view extent D[1]. The playback device 102 further extracts the $(A1+B2+1)^{th}$ source packet and the subsequent (A2−A1−1) source packets, a total of (A2−A1) source packets, as the second base-view extent B[1]. Thereafter, the playback device 102 thus continues to detect the boundary between dependent-view and base-view extents in the extents of the file SS 223 based on the number of read source packets, thereby alternately extracting dependent-view and base-view data extents. The extracted base-view and dependent-view extents are transmitted to the system target decoder to be decoded in parallel. In this way, the playback device 102 in 3D playback mode can play back 3D video images from the file SS 223 starting at a specific PTS.

2-11: File Base

FIG. 29C is a schematic diagram representing the base-view extents B[0], B[1], B[2], . . . extracted from the file SS 223 by the playback device 102 in 3D playback mode. As shown in FIG. 29C, when SPNs are allocated to source packets included in base-view extents B[n] (n=0, 1, 2, . . . ), beginning from their top, the source packet located at the top of each base-view extent B[n] has a SPN equal to one of the SPNs 2912 indicated by the extent start point 2742. Base-view extents extracted from a single file SS by referring to extent start points, like the base-view extents B[n], are referred to as a "file base." As shown in FIG. 29E, each base-view extent EXT1[0], EXT1[1] . . . is referred to by an extent start point 2742 or 2920 in a clip information file.

An extent EXT1[n] in the file base shares the same base-view extent B[n] with an extent EXT2D[n] in the file 2D. Accordingly, the file base includes the same main TS as the file 2D. Unlike the file 2D, however, the file base does not include a file entry. Furthermore, an extent start point is necessary to refer to a base-view extent. In this sense, the file base is a "virtual file." In particular, the file base is not recognized by the file system and does not appear in the file structure shown in FIG. 2.

2-12: 2D Playlist File

Figure 30:
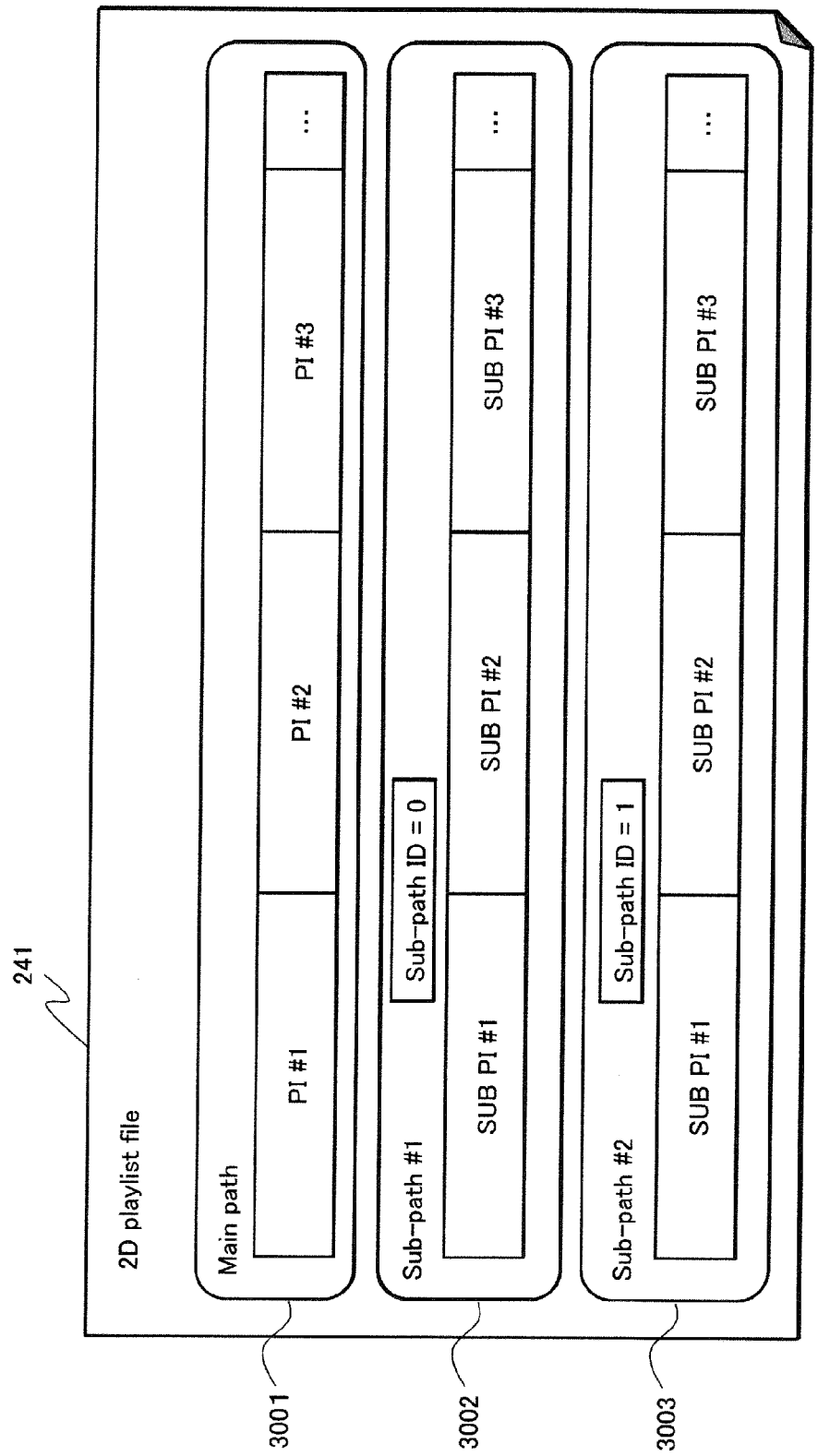
FIG. 30 is a schematic diagram showing the data structure of a 2D playlist file.

FIG. 30 is a schematic diagram showing the data structure of a 2D playlist file. As shown in FIG. 30, the 2D playlist file 241 includes a main path 3001 and two sub-paths 3002 and 3003.

The main path 3001 is a sequence of playitem information pieces (hereinafter abbreviated as PI) that defines the main playback path for the file 2D 221, i.e. the section for playback and the section's playback order. Each PI is identified with a unique playitem ID=#N (N=1, 2, 3, . . . ). Each PI #N defines a different playback section along the main playback path with a pair of PTSs. One of the PTSs in the pair represents the start time (In-Time) of the playback section, and the other represents the end time (Out-Time). Furthermore, the order of the PIs in the main path 3001 represents the order of corresponding playback sections in the playback path.

Each of the sub-paths 3002 and 3003 is a sequence of sub-playitem information pieces (hereinafter abbreviated as SUB_PI) that defines a playback path that can be associated in parallel with the main playback path for the file 2D 221. Such a playback path is a different section of the file 2D 221 than is represented by the main path 3001, or is a section of stream data multiplexed in another file 2D, along with the corresponding playback order. The stream data indicated by the playback path represents other 2D video images to be played back simultaneously with 2D video images played back from the file 2D 221 in accordance with the main path 3001. These other 2D video images include, for example, sub-video in a picture-in-picture format, a browser window, a pop-up menu, or subtitles. Serial numbers "0" and "1" are assigned to the sub-paths 3002 and 3003 in the order of registration in the 2D playlist file 241. These serial numbers are used as sub-path IDs to identify the sub-paths 3002 and 3003. In the sub-paths 3002 and 3003, each SUB_PI is identified by a unique sub-playitem ID=#M (M=1, 2, 3, . . . ). Each SUB_PI #M defines a different playback section along the playback path with a pair of PTSs. One of the PTSs in the pair represents the playback start time of the playback section, and the other represents the playback end time. Furthermore, the order of the SUB PIs in the sub-paths 3002 and 3003 represents the order of corresponding playback sections in the playback path.

Figure 31:
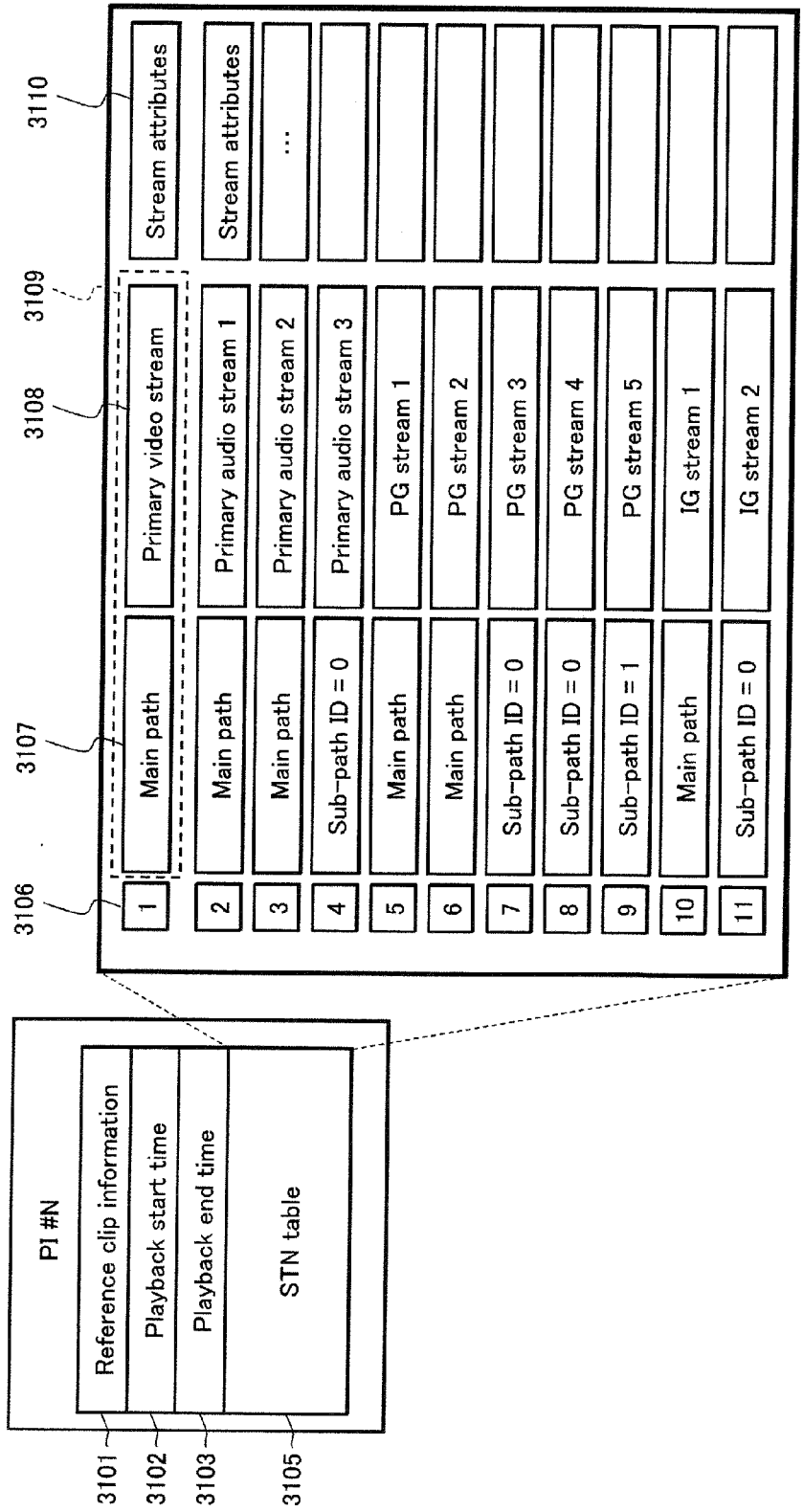
FIG. 31 is a schematic diagram showing the data structure of the $N^{th}$ piece of playitem information.

FIG. 31 is a schematic diagram showing the data structure of PI #N. As shown in FIG. 31, a PI #N includes a piece of reference clip information 3101, playback start time (In-Time) 3102, playback end time (Out-Time) 3103, and a stream selection table (hereinafter referred to as "STN table" (stream number table)) 3105. The reference clip information 3101 is information for identifying the 2D clip information file 231. The playback start time 3102 and playback end time 3103 respectively indicate PTSs for the beginning and the end of the section for playback of the file 2D 221. The STN table 3105 is a list of elementary streams that can be selected from the file 2D 221 by the decoder in the playback device 102 from the playback start time 3102 until the playback end time 3103.

The data structure of a SUB_PI is the same as the data structure of the PI shown in FIG. 31 insofar as it includes reference clip information, a playback start time, and a playback end time. In particular, the playback start time and playback end time of a SUB_PI are expressed as values along the same time axis as a PI.

STN Table

Referring again to FIG. 31, the STN table 3105 is an array of stream registration information. "Stream registration information" is information individually listing the elementary streams that can be selected for playback from the main TS between the playback start time 3102 and playback end time 3103. The stream number (STN) 3106 is a serial number allocated individually to stream registration information and is used by the playback device 102 to identify each elementary stream. The STN 3106 further indicates priority for selection among elementary streams of the same type. The stream registration information includes a stream entry 3109 and stream attribute information 3110. The stream entry 3109 includes stream path information 3107 and stream identification information 3108. The stream path information 3107 is information indicating the file 2D to which the selected elementary stream belongs. For example, if the stream path information 3107 indicates "main path," the file 2D corresponds to the 2D clip information file indicated by reference clip information 3101. On the other hand, if the stream path information 3107 indicates "sub-path ID=1," the file 2D to which the selected elementary stream belongs corresponds to the 2D clip information file indicated by the reference clip information of the SUB_PI included in the sub-path with a sub-path ID=1. The playback start time and playback end time specified by this SUB_PI are both included in the interval from the playback start time 3102 until the playback end time 3103 specified by the PI included in the STN table 3105. The stream identification information 3108 indicates the PID for the elementary stream multiplexed in the file 2D specified by the stream path information 3107. The elementary stream indicated by this PID can be selected from the playback start time 3102 until the playback end time 3103. The stream attribute information 3110 indicates attribute information for each elementary stream. For example, the attribute information for each of an audio stream, PG stream, and IG stream indicates a language type of the stream.

Playback of 2D Video Images in Accordance with a 2D Playlist File

Figure 32:
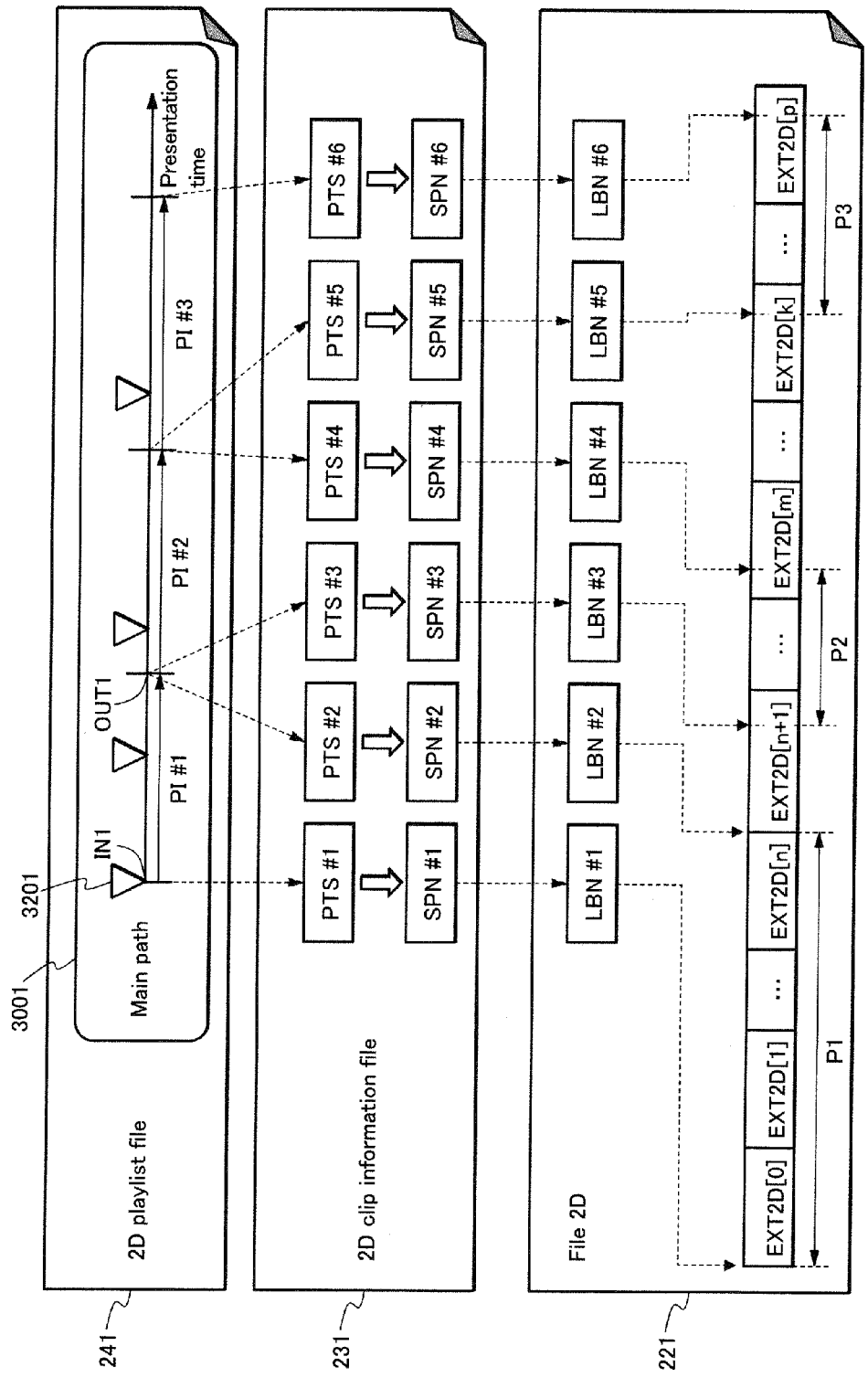
FIG. 32 is a schematic diagram showing correspondence between PTSs indicated by a 2D playlist file and sections played back from a file 2D.

FIG. 32 is a schematic diagram showing correspondence between PTSs indicated by the 2D playlist file 241 and sections played back from the file 2D 221. As shown in FIG. 32, in the main path 3001 in the 2D playlist file 241, the PI #1 specifies a PTS #1, which indicates a playback start time IN1, and a PTS #2, which indicates a playback end time OUT1. The reference clip information for PI #1 indicates the 2D clip information file 231. When playing back 2D video images in accordance with the 2D playlist file 241, the playback device 102 first reads the PTS #1 and PTS #2 from the PI #1. Next, the playback device 102 refers to the entry map in the 2D clip information file 231 to retrieve from the file 2D 221 the SPN #1 and SPN #2 that correspond to the PTS #1 and PTS #2. The playback device 102 then calculates the corresponding numbers of sectors from the SPN #1 and SPN #2. Furthermore, the playback device 102 refers to these numbers of sectors and the file entry of the file 2D 221 to specify LBN #1 and LBN #2 assigned to the top and end, respectively, of the sector group P1 on which extents EXT2D[0], . . . , EXT2D[n] to be played back are recorded. Calculation of the numbers of sectors and specification of the LBNs are as per the description about FIGS. 28A, 28B, and 28C. Finally, the playback device 102 indicates the range from LBN #1 to LBN #2 to the BD-ROM drive 121. In response, the BD-ROM drive 121 uses the file entry of the file 2D 221 to read source packets belonging to the extents EXT2D[0], . . . , EXT2D[n] from the sector group P1 located in the range. Similarly, the pair PTS #3 and PTS #4 indicated by the PI #2 are first converted into a pair of SPN #3 and SPN #4 by referring to the entry map in the 2D clip information file 231. Then, referring to the file entry for the file 2D 221, the pair of SPN #3 and SPN #4 are converted into a pair of LBN #3 and LBN #4. Furthermore, source packets belonging to extents of the file 2D 221 are read from the sector group P2 located in a range from LBN #3 to LBN #4. Conversion of a pair of PTS #5 and PTS #6 indicated by PI #3 to a pair of SPN #5 and SPN #6, conversion of the pair of SPN #5 and SPN #6 to a pair of LBN #5 and LBN #6, and reading of source packets from the sector group P3 located in a range from LBN #5 to LBN #6 are similarly performed. The playback device 102 thus plays back 2D video images from the file 2D 221 in accordance with the main path 3001 in the 2D playlist file 241.

The 2D playlist file 241 may include an entry mark 3201. The entry mark 3201 indicates a time point in the main path 3001 at which playback is actually to start. For example, as shown in FIG. 32, a plurality of entry marks 3201 can be set for the PI #1. The entry mark 3201 is particularly used for searching for a playback start position during interrupt playback. For example, when the 2D playlist file 241 specifies a playback path for a movie title, the entry marks 3201 are assigned to the top of each chapter. Consequently, the playback device 102 can play back the movie title by chapters.

2-13: 3D Playlist File

Figure 33:
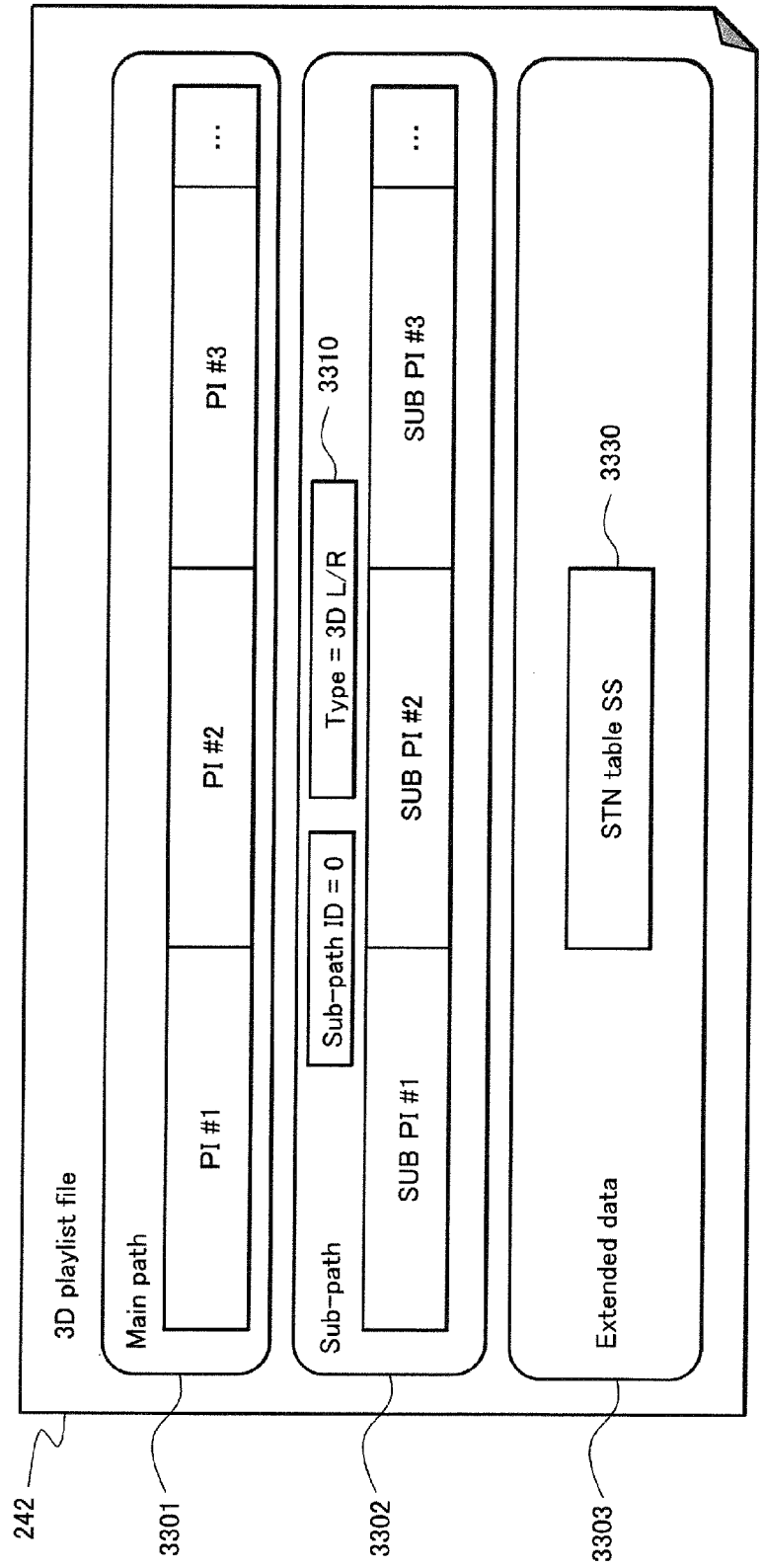
FIG. 33 is a schematic diagram showing the data structure of a 3D playlist file.

FIG. 33 is a schematic diagram showing the data structure of a 3D playlist file 242. As shown in FIG. 33, the 3D playlist file 242 includes a main path 3301, sub-path 3302, and extended data 3303.

The main path 3301 specifies the playback path for the main TS. Accordingly, the main path 3301 is substantially the same as the main path 3001 for the 2D playlist file 241. In other words, the playback device 102 in 2D playback mode can play back 2D video images from the file 2D 221 in accordance with the main path 3301 in the 3D playlist file 242.

The sub-path 3302 specifies the playback path for the sub-TS, i.e. the playback path for the file DEP 222. The data structure of the sub-path 3302 is the same as the data structure of the sub-paths 3002 and 3003 in the 2D playlist file 241. Accordingly, details on this similar data structure can be found in the description about FIG. 30, in particular details on the data structure of the SUB_PI.

The SUB_PI #N (N=1, 2, 3, . . . ) in the sub-path 3302 are in one-to-one correspondence with the PI #N in the main path 3301. Furthermore, the playback start time and playback end time specified by each SUB_PI #N is the same as the playback start time and playback end time specified by the corresponding PI #N. The sub-path 3302 additionally includes a sub-path type 3310. The "sub-path type" generally indicates whether playback according to the main path should be synchronized with playback according to the sub-path or not. In the 3D playlist file 242, the sub-path type 3310 in particular indicates the type of the 3D playback mode, i.e. the type of the dependent-view video stream to be played back in accordance with the sub-path 3302. In FIG. 33, the value of the sub-path type 3310 is "3D L/R," thus indicating that the 3D playback mode is L/R mode, i.e. that the right-view video stream is to be played back. On the other hand, a value of "3D depth" for the sub-path type 3310 indicates that the 3D playback mode is depth mode, i.e. that the depth map stream is to be played back. When the playback device 102 in 3D playback mode detects that the value of the sub-path type 3310 is "3D L/R" or "3D depth," the playback device 102 synchronizes playback according to the main path 3301 with playback according to the sub-path 3302.

Extended data 3303 is interpreted only by the playback device 102 in 3D playback mode, and is ignored by the playback device 102 in 2D playback mode. In particular, the extended data 3303 includes an extended stream selection table 3330. The extended stream selection table (hereinafter abbreviated as STN table SS) is an array of stream registration information to be added to the STN tables indicated by the PIs in the main path 3301 in 3D playback mode. This stream registration information indicates elementary streams that can be selected for playback from the sub TS.

STN Table SS

Figure 34:
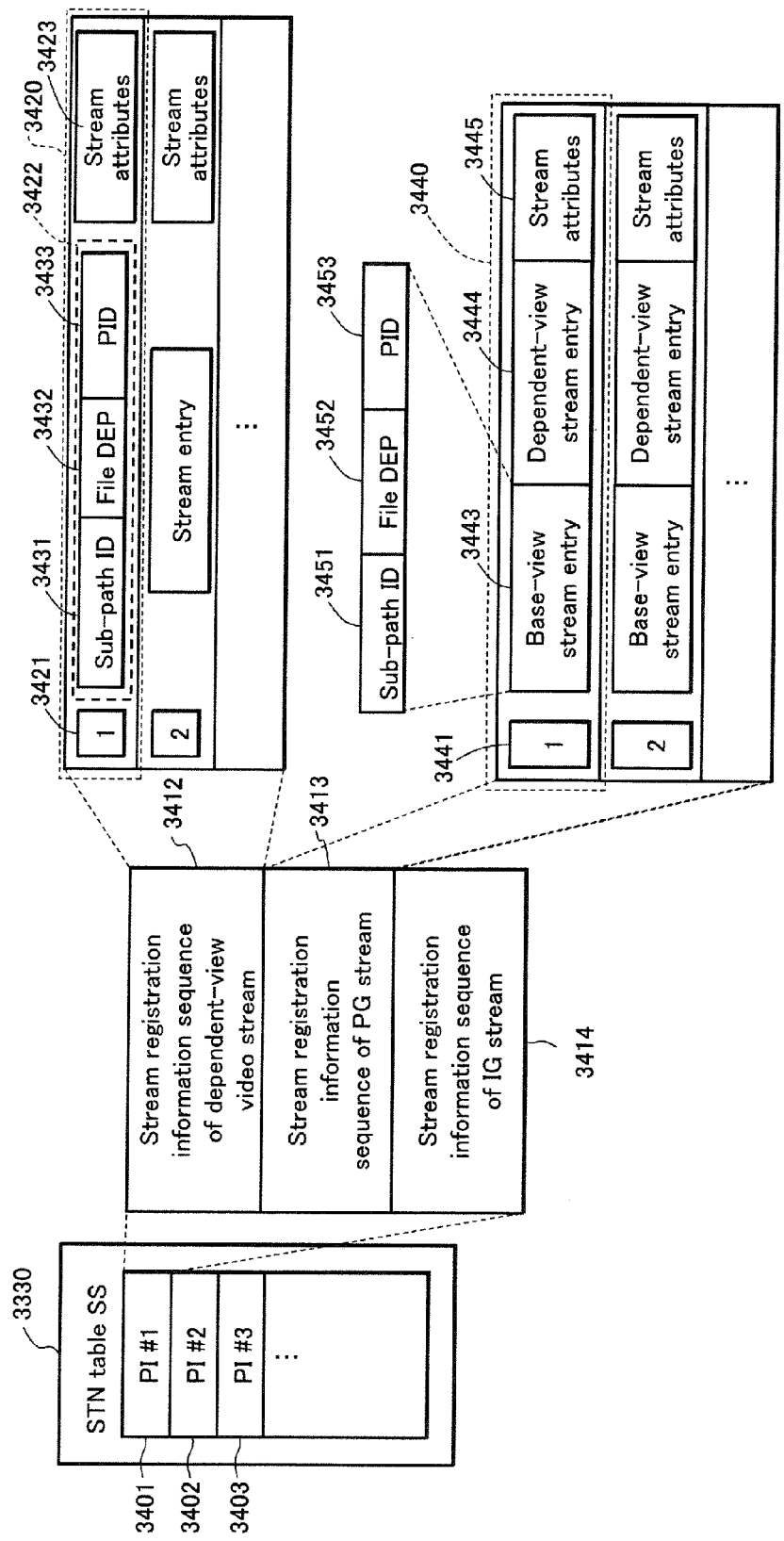
FIG. 34 is a schematic diagram showing the data structure of an STN table SS.

FIG. 34 is a schematic diagram showing the data structure of the STN table SS 3330. As shown in FIG. 34, an STN table SS 3330 includes stream registration information sequences 3401, 3402, 3403, . . . . The stream registration information sequences 3401, 3402, 3403, . . . individually correspond to the PI #1, PI #2, PI #3, . . . in the main path 3301. The playback device 102 in 3D playback mode uses these stream registration information sequences 3401, 3402, and 3403 in combination with the stream registration information sequences included in the STN tables in the corresponding PIs. The stream registration information sequences 3401-3403 for the PIs include a stream registration information sequence 3412 for the dependent-view video streams, a stream registration information sequence 3413 for the PG streams, and a stream registration information sequence 3414 for the IG streams.

The stream registration information sequence 3412 for the dependent-view video streams, stream registration information sequence 3413 for the PG streams, and stream registration information sequence 3414 for the IG streams respectively include stream registration information indicating the dependent-view video streams, PG streams, and IG streams that can be selected for playback from the sub-TS. These stream registration information sequences 3412, 3413, and 3414 are used in combination with the stream registration information sequences, included in the STN table of the corresponding PI, that indicate base-view video streams, PG streams, and IG streams. When reading a stream registration information sequence from an STN table, the playback device 102 in 3D playback mode automatically also reads the stream registration information sequence, located in the STN table SS, that has been combined with that stream registration information sequence. When simply switching from 2D playback mode to 3D playback mode, the playback device 102 can thus maintain already recognized STNs and stream attributes such as language.

The stream registration information sequence 3412 for the dependent-view video streams generally includes a plurality of pieces of stream registration information (SS_dependent_view_block) 3420. These are the same in number as the pieces of stream registration information in the corresponding PI that indicate the base-view video stream. Each piece of stream registration information 3420 includes an STN 3421, stream entry 3422, and stream attribute information 3423. The STN 3421 is a serial number assigned individually to pieces of stream registration information 3420 and is the same as the STN of the piece of stream registration information, located in the corresponding PI, with which the piece of stream registration information 4120 is combined. The stream entry 3422 includes sub-path ID reference information (ref_to_Subpath_id) 3431, stream file reference information (ref_to_subClip_entry_id) 3432, and a PID (ref_to_stream_PID_subclip) 3433. The sub-path ID reference information 3431 indicates the sub-path ID of the sub-path that specifies the playback path of the dependent-view video stream. The stream file reference information 3432 is information to identify the file DEP storing this dependent-view video stream. The PIDs 3433 are the PIDs for the dependent-view video streams. The stream attribute information 3423 includes attributes the dependent-view video stream, such as frame rate, resolution, and video format. In particular, these attributes are the same as those for the base-view video stream shown by the piece of stream registration information, located in the corresponding PI, with which each piece of stream registration information is combined.

The stream registration information sequence 3413 of the PG stream generally includes a plurality of pieces of stream registration information 3440. These are the same in number as the pieces of stream registration information in the corresponding PI that indicate the PG stream. Each piece of stream registration information 3440 includes an STN 3434, base-view stream entry (stream_entry_for_base_view) 3443, dependent-view stream entry (stream_entry_for_dependent_view) 3444, and stream attribute information 3445. The STN 3434 is a serial number assigned individually to pieces of stream registration information 3440 and is the same as the STN of the piece of stream registration information, located in the corresponding PI, with which the piece of stream registration information 4120 is combined. Both the base-view stream entry 3443 and the dependent-view stream entry 3444 include sub-path ID reference information 3451, stream file reference information 3452, and PIDs 3453. The sub-path ID reference information 3451 indicates the sub-path IDs of the sub-paths that specify the playback paths of the base-view and dependent-view PG streams. The stream file reference information 3452 is information to identify the file DEP storing the PG streams. The PIDs 3453 are the PIDs for the PG streams. The stream attribute information 3445 includes attributes for the PG streams, such as language type. The stream registration information sequence 3414 of the IG stream has the same data structure.

Playback of 3D Video Images in Accordance with a 3D Playlist File

Figure 35:
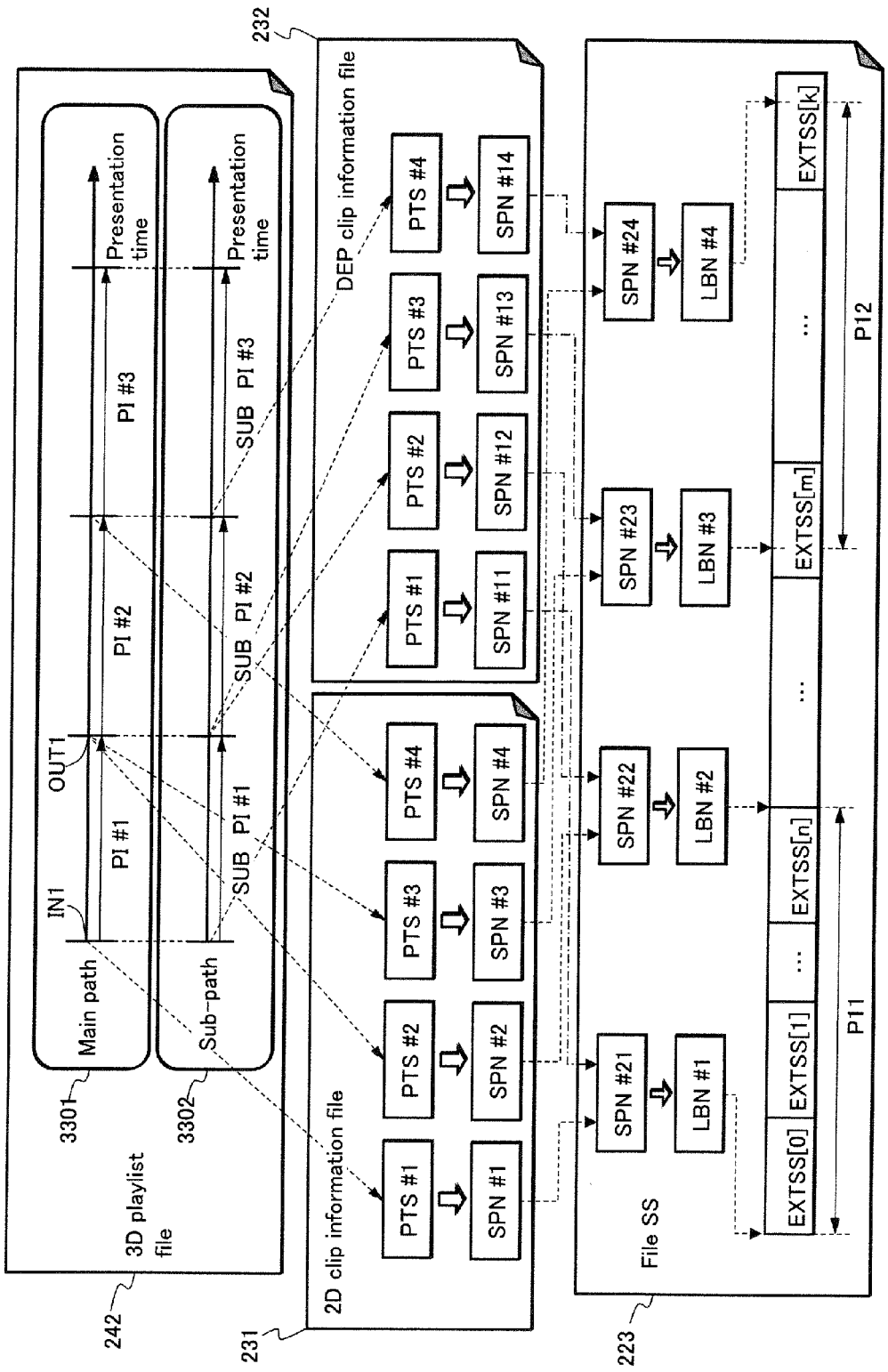
FIG. 35 is a schematic diagram showing correspondence between PTSs indicated by a 3D playlist file and sections played back from a file SS.

FIG. 35 is a schematic diagram showing correspondence between PTSs indicated by the 3D playlist file 242 and sections played back from the file SS 223. As shown in FIG. 35, in the main path 3301 in the 3D playlist file 242, the PI #1 specifies a PTS #1, which indicates a playback start time IN1, and a PTS #2, which indicates a playback end time OUT1. The reference clip information for PI #1 indicates the 2D clip information file 231. In the sub-path 3302, the SUB_PI #1 specifies the same PTS #1 and PTS #2 as the PI #1. The reference clip information for SUB_PI #1 indicates the DEP clip information file 232.

When playing back 3D video images in accordance with the 3D playlist file 242, the playback device 102 first reads PTS #1 and PTS #2 from the PI #1 and SUB_PI #1. Next, the playback device 102 refers to the entry map in the 2D clip information file 231 to retrieve from the file 2D 221 the SPN #1 and SPN #2 that correspond to the PTS #1 and PTS #2. In parallel, the playback device 102 refers to the entry map in the DEP clip information file 232 to retrieve from the file DEP 222 the SPN #11 and SPN #12 that correspond to the PTS #1 and PTS #2. As described with reference to FIG. 29E, the playback device 102 then uses the extent start points 2742 and 2920 in the clip information files 231 and 232 to calculate, from SPN #1 and SPN #11, the number of source packets SPN #21 from the top of the file SS 223 to the playback start position. Similarly, the playback device 102 calculates, from SPN #2 and SPN #12, the number of source packets SPN #22 from the top of the file SS 223 to the playback end position. The playback device 102 further calculates the numbers of sectors corresponding to the SPN #21 and SPN #22. Next, the playback device 102 refers to these numbers of sectors and the file entry of the file SS 243 to specify LBN #1 and LBN #2 at the start and end, respectively, of the sector group P11 on which extents EXTSS[0], . . . , EXTSS[n] to be played back are recorded. Calculation of the numbers of sectors and specification of the LBNs are as per the description about FIG. 29E. Finally, the playback device 102 indicates the range from LBN #1 to LBN #2 to the BD-ROM drive 121. In response, the BD-ROM drive 121 uses the file entry of the file SS 223 to read the source packets belonging to the extents EXTSS[0], . . . , EXTSS[n] from the sector group P11 located in this range. Similarly, the pair PTS #3 and PTS #4 indicated by PI #2 and SUB_PI #2 are first converted into a pair of SPN #3 and SPN #4 and a pair of SPN #13 and SPN #14 by referring to the entry maps in the clip information files 231 and 232. Then, the number of source packets SPN #23 counted from the top of the file SS 223 to the playback start position is calculated from SPN #3 and SPN #13, and the number of source packets SPN #24 counted from the top of the file SS 223 to the playback end position is calculated from SPN #4 and SPN #14. Next, the file entry of the file SS 223 is referred to convert the pair of SPN #23 and SPN #24 into a pair of LBN #3 and LBN #4. Furthermore, source packets belonging to extents of the file SS 223 are read from the sector group P12 located in the range from LBN #3 to LBN #4.

In parallel with the above-described read process, as described with reference to FIG. 32E, the playback device 102 refers to the extent start points 2742 and 2920 in the clip information files 231 and 232 to extract base-view extents and dependent-view extents from each extent in the file SS 223 and decode the extents in parallel. The playback device 102 thus plays back 3D video images from the file SS 223 in accordance with the 3D playlist file 242.

2-14: Extended Playlist File

Figure 36:
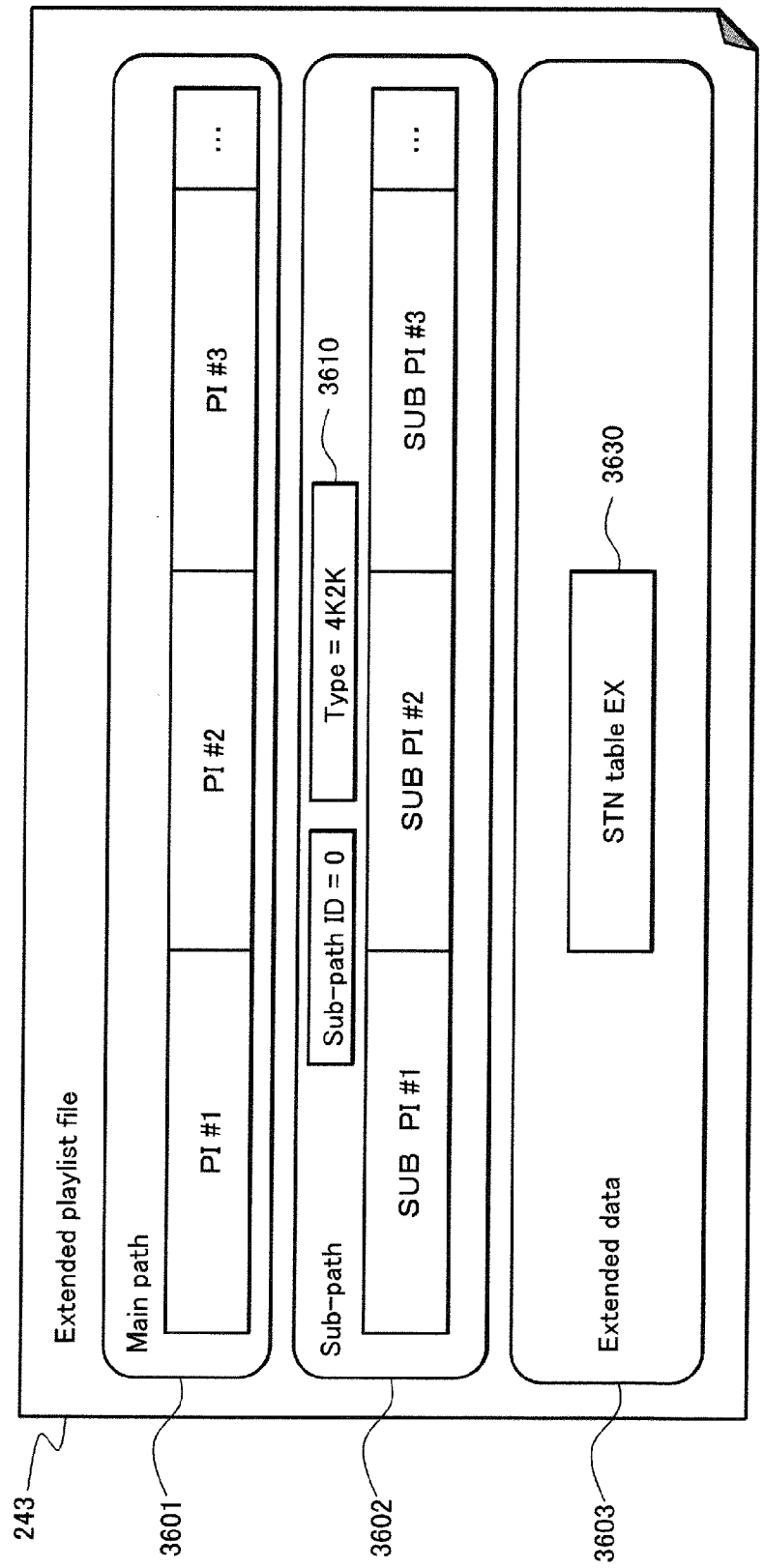
FIG. 36 is a schematic diagram showing the data structure of an extended playlist file.

FIG. 36 is a schematic diagram showing the data structure of the extended playlist file 243. As shown in FIG. 36, the extended playlist file 243 includes a main path 3601, sub-path 3602, and extended data 3603.

The main path 3601 specifies the playback path for the main TS.

Accordingly, the main path 3601 is substantially the same as the main path 3001 of the 2D playlist file 241. In other words, the playback device 102 in 2D playback mode can play back full-HD 2D video images from the file 2D 221 in accordance with the main path 3601 of the extended playlist file 243.

The sub-path 3602 specifies the playback path for the extended stream file 224. The data structure of the sub-path 3602 is the same as the data structure of the sub-paths 3002 and 3003 of the 2D playlist file 241. Accordingly, details on this similar data structure, in particular, details on the data structure of SUB_PI, can be found in the description about FIG. 30.

The SUB_PI #N (N=1, 2, 3, . . . ) of the sub-path 3602 are in one-to-one correspondence with the PI #N of the main path 3601. Furthermore, the playback start time and playback end time specified by each SUB_PI #N are the same as the playback start time and playback end time specified by the corresponding PI #N, respectively. The sub-path 3602 additionally includes a sub-path type 3610. In particular, the extended playlist file 243 has the sub-path type 3610 of "4K2K" that indicates the playback device 102 being in extended playback mode. When the playback device 102 in extended playback mode detects that the sub-path type 3610 indicates extended playback mode, the playback device 102 synchronizes playback according to the main path 3601 with playback according to the sub-path 3602.

Extended data 3603 is interpreted only by the playback device 102 in extended playback mode, and is ignored by the playback device 102 in 2D playback mode and in 3D playback mode. In particular, the extended data 3603 includes an extended stream selection table 3630. The extended stream selection table (hereinafter abbreviated as STN table EX) is an array of stream registration information to be added to the STN tables indicated by the PIs in the main path 3601 for extended playback mode. This stream registration information indicates elementary streams that can be selected for playback from the extended stream.

STN Table EX

Figure 37:
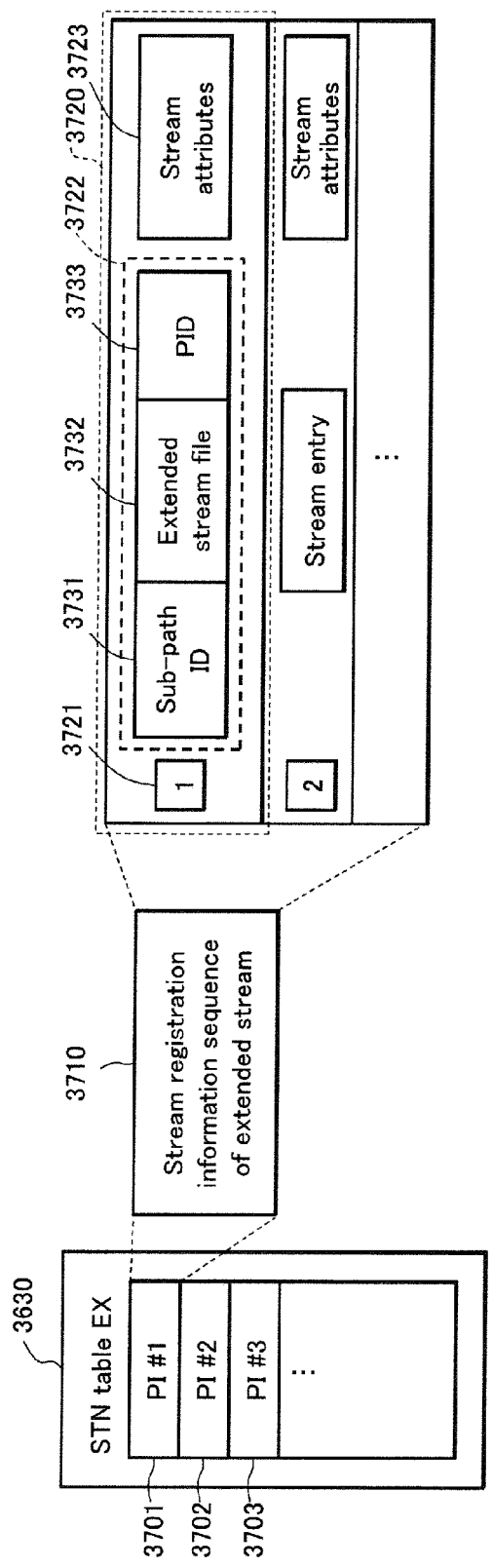
FIG. 37 is a schematic diagram showing the data structure of an STN table EX.

FIG. 37 is a schematic diagram showing the data structure of the STN table EX 3630. As shown in FIG. 37, the STN table EX 3630 includes stream registration information sequences 3701, 3702, 3703, . . . . The stream registration information sequences 3701, 3702, 3703, . . . individually correspond to the PI #1, PI #2, PI #3, . . . in the main path 3301. The playback device 102 in extended playback mode uses these stream registration information sequences 3701, 3702, and 3703 in combination with the stream registration information sequences included in the STN tables of the corresponding PIs. The stream registration information sequence 3701 for each PI includes a stream registration information sequence 3710 of the extended stream.

This stream registration information sequence 3710 of the extended stream is used in combination with another stream registration information sequence that is included in the STN table of the corresponding PI and indicates the base-view video stream. When reading a first stream registration information sequence from an STN table, the playback device 102 in extended playback mode automatically reads a second stream registration information sequence that is located in the STN table EX and to be combined with the first stream registration information sequence read from the STN table. When simply switching from 2D playback mode to extended playback mode, the playback device 102 can thus maintain already recognized STNs and stream attributes such as language without any changes.

The stream registration information sequence 3710 of the extended stream generally includes a plurality of pieces of stream registration information 3720. These pieces are the same in number as the pieces of stream registration information of the corresponding PI that indicate the base-view video stream. Each piece of stream registration information 3720 includes an STN 3721, stream entry 3722, and stream attribute information 3723. The STN 3721 is a serial number assigned individually to the piece of stream registration information 3720 and is the same as the STN of another piece of stream registration information that is located in the corresponding PI and to be combined with the piece of stream registration information 3720. The stream entry 3722 includes sub-path ID reference information 3731, stream file reference information 3732, and a PID 3733. The sub-path ID reference information 3731 indicates the sub-path ID of the sub-path that specifies the playback path of the extended stream. The stream file reference information 3732 is information to identify the extended stream file containing the extended stream. The PID 3733 is the PID of the elementary stream to be selected from among the extended stream, in particular, the PID of the resolution extension information. The stream attribute information 3723 includes attributes of the extended stream.

Playback of 4K2K Video Images in Accordance with Extended Playlist File

Figure 38:
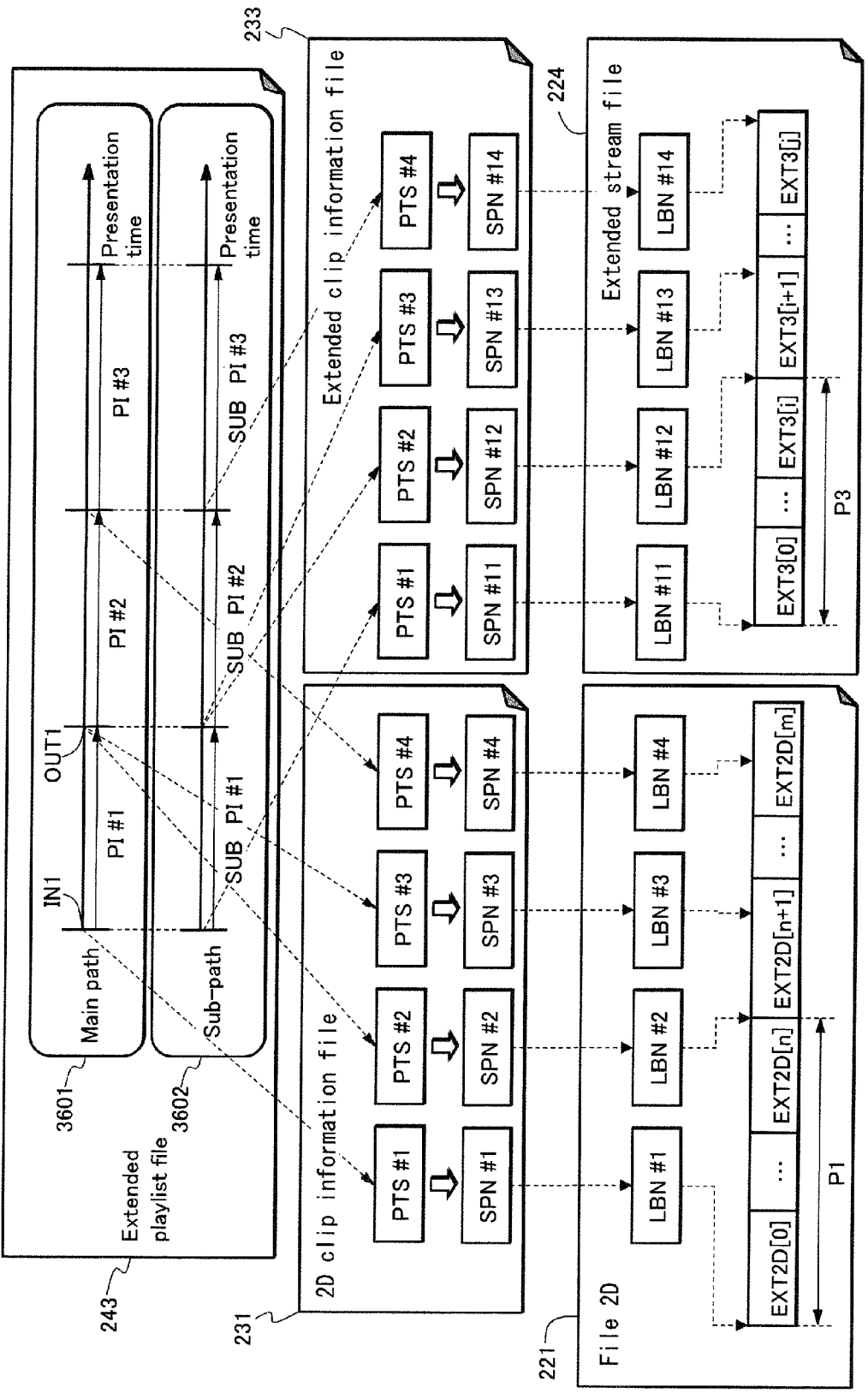
FIG. 38 is a schematic diagram showing correspondence between PTSs indicated by the extended playlist file and sections played back from the file 2D and the extended stream file.

FIG. 38 is a schematic diagram showing correspondence between PTSs indicated by the extended playlist file 243 and sections played back from the file 2D 221 and the extended stream file 224. As shown in FIG. 38, PI #1 in the main path 3601 of the extended playlist file 243 specifies PTS #1 that indicates the playback start time IN1 and PTS #2 that indicates the playback end time OUT1. The reference clip information of PI #1 indicates the 2D clip information file 231. In the sub-path 3602, SUB_PI #1 specifies the same PTS #1 and PTS #2 as PI #1. The reference clip information of SUB_PI #1 indicates the extended clip information file 233.

When playing back 4K2K 2D video images in accordance with the extended playlist file 243, the playback device 102 first reads PTS #1 and PTS #2 from PI #1 and SUB_PI #1. Next, the playback device 102 refers to the entry map in the 2D clip information file 231 to retrieve from the file 2D 221 SPN #1 and SPN #2 that correspond to PTS #1 and PTS #2, respectively. In parallel, the playback device 102 refers to the entry map in the extended clip information file 233 to retrieve from the extended stream file 224 SPN #11 and SPN #12 that correspond to PTS #1 and PTS #2, respectively. The playback device 102 then calculates the corresponding numbers of sectors from SPN #1 and SPN #2. Furthermore, the playback device 102 refers to these numbers of sectors and the file entry of the file 2D 221 to specify LBN #1 and LBN #2 at the start and end, respectively, of the sector group P1 on which extents EXT2D[0], ..., EXT2D[n] to be played back are recorded.

Calculation of the numbers of sectors and specification of LBNs are as per the description about FIGS. 28A, 28B, and 28C. Finally, the playback device 102 indicates the range from LBN #1 to LBN #2 to the BD-ROM drive 121. Similarly, the playback device 102 calculates the corresponding numbers of sectors from SPN #11 and SPN #12, and then uses these numbers of sectors and the file entry of the extended stream file 224 to specify LBN #11 and LBN #12 at the start and end, respectively, of the sector group P3 on which extended extents EXT3[0], ..., EXT3[i] to be played back are recorded. Furthermore, the playback device 102 indicates the range from LBN #11 to LBN #12 to the BD-ROM drive 121. In response to the indication from the playback device 102, the BD-ROM drive 121 uses the file entry of the file 2D 221 to read extents EXT2D[0], ..., EXT2D[n] of the file 2D 221 from the sector group P1 in the range from LBN #1 to LBN #2. In parallel, the BD-ROM drive 121 uses the file entry of the extended stream file 224 to read extended extents EXT3[0], ..., EXT3[i] from the sector group P3 in the range from LBN #11 to LBN #12. As can be understood from FIG. 11, the range from LBN #1 to LBN #2 and the range from LBN #11 to LBN #12 overlap with each other. Therefore, the extents EXT2D[0], ..., EXT2D[n] of the file 2D 221 and the extended extents EXT3[0], ..., EXT3[i] are read, beginning from one whose top is located at the smallest LBN. In this way, the playback device 102 can play back 4K2K 2D video images from the file 2D 221 and the extended stream file 224 in accordance with the main path 3601 and the sub-path 3602 of the extended playlist file 243.

2-15: Index File

Figure 39:
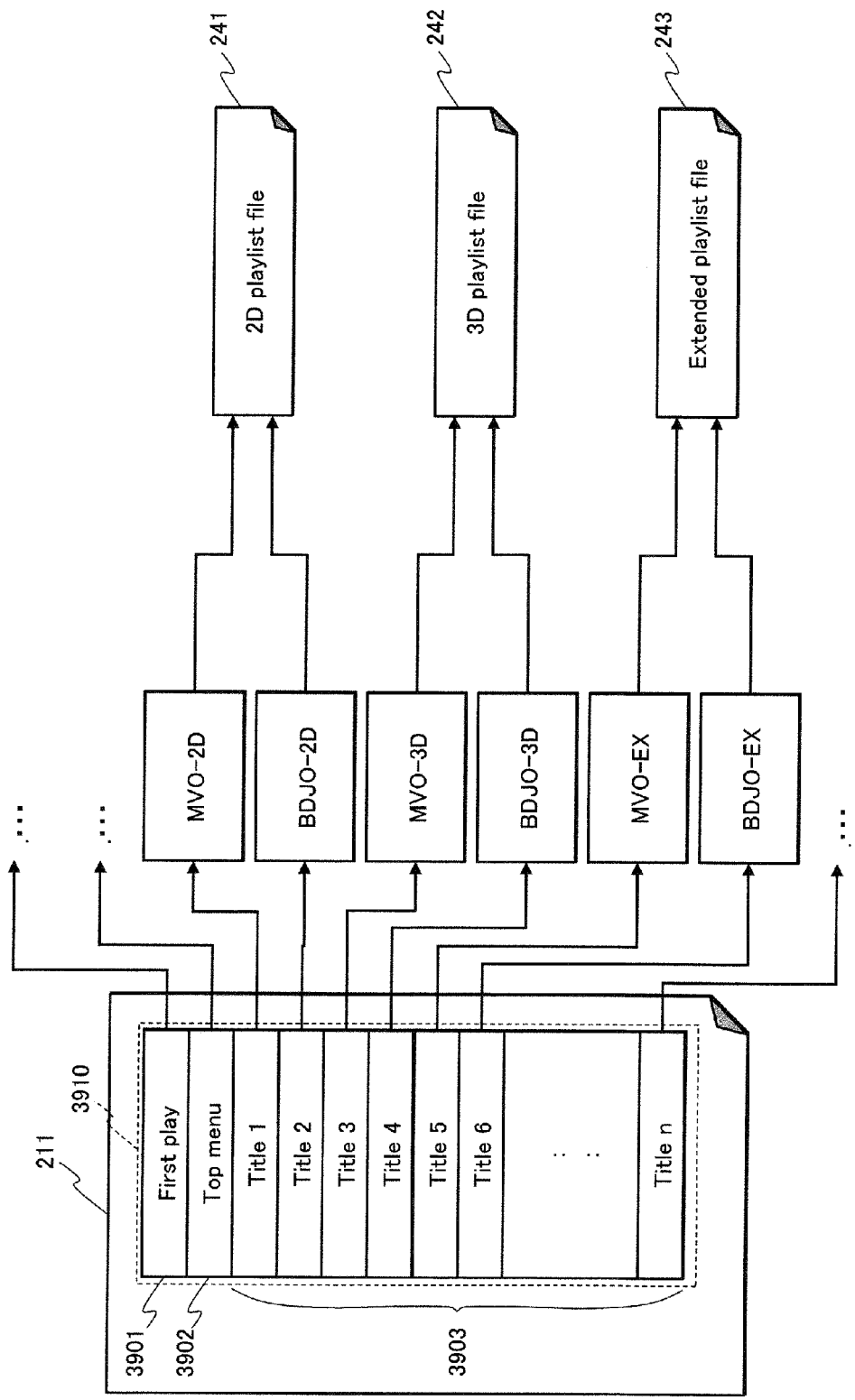
FIG. 39 is a schematic diagram showing a data structure of an index file.

FIG. 39 is a schematic diagram showing the data structure of the index file 211 shown in FIG. 2. As shown in FIG. 39, the index file 211 includes an index table 3910. The index table 3910 stores the items "first play" 3901, "top menu" 3902, and "title k" 3903 (k=1, 2, ..., n, where n is an integer greater than or equal to 1). Each item is associated either with a MV object MVO-2D, MVO-3D, or MVO-EX, or with a BD-J object BDJO-2D, BDJO-3D, or BDJO-EX. Each time a title or a menu is called in response to a user operation or an application program, a control unit in the playback device 102 refers to a corresponding item in the index table 3910. Furthermore, the control unit calls an object associated with the item from the BD-ROM disc 101 and accordingly executes a variety of processes. Specifically, the item "first play" 3901 specifies an object to be called when the BD-ROM disc 101 is loaded into the BD-ROM drive 121. The item "top menu" 3902 specifies an object for displaying a menu on the display device 103 when, for example, a command "go back to menu" is input by user operation. In the items "title k" 3903, the titles that constitute the content on the BD-ROM disc 101 are individually allocated. For example, when a title for playback is specified by user operation, in the item "title k" in which the title is allocated, the object for playing back video images from the AV stream file corresponding to the title is specified.

In the example shown in FIG. 39, the items "title 1" and "title 2" are allocated to titles of full HD 2D video images. The MV object associated with the item "title 1," MVO-2D, includes commands related to playback processes for full HD 2D video images by using the 2D playlist file 241. When the playback device 102 refers to the item "title 1," then in accordance with the MV object MVO-2D, the 2D playlist file 241 is read from the BD-ROM disc 101, and playback processes for full HD 2D video images are executed in accordance with the playback path specified therein. The BD-J object associated with the item "title 2," BDJO-2D, includes an application management table related to playback processes for full HD 2D video images using the 2D playlist file 241. When the playback device 102 refers to the item "title 2," then in accordance with the application management table in the BD-J object BDJO-2D, a Java application program is called from the JAR file 253 and executed. In this way, the 2D playlist file 241 is read from the BD-ROM disc 101, and playback processes for full HD 2D video images are executed in accordance with the playback path specified therein.

Furthermore, the item "title 3" and the item "title 4" are allocated to titles of 3D video images. The MV object associated with the item "title 3," MVO-3D, includes commands related to playback processes for full HD 2D video images by using the 2D playlist file 241, as well as commands related to playback processes for 3D video images by using the 3D playlist file 242. When the playback device 102 refers to the item "title 3," then, in accordance with the MV object MVO-3D, the 3D playlist file 242 is read from the BD-ROM disc 101, and playback processes for 3D video images are executed in accordance with the playback path specified therein. In the BD-J object associated with the item "title 4," BDJO-3D, the application management table specifies, in addition to a Java application program related to playback processes for 2D video images using the 2D playlist file 221, a Java application program related to playback processes for 3D video images using the 3D playlist file 242. When the playback device 102 refers to the item "title 4," then in accordance with the application management table in the BD-J object BDJO-3D, a Java application program is called from the JAR file 253 and executed. In this way, the 3D playlist file 242 is read from the BD-ROM disc 101, and playback processes for 3D video images are executed in accordance with the playback path specified therein.

Additionally, the item "title 5" and the item "title 6" are allocated to titles of 4K2K 2D video images. The MV object associated with the item "title 5," MVO-EX, includes commands related to playback processes for full HD 2D video images by using the 2D playlist file 241, as well as commands related to playback processes for 4K2K 2D video images by using the extended playlist file 243. When the playback device 102 refers to the item "title 5," then in accordance with the MV object MVO-EX, the extended playlist file 243 is read from the BD-ROM disc 101, and playback processes for 4K2K 2D video images are executed in accordance with the playback path specified therein. The BD-J object associated with the item "title 6," BDJO-EX, includes an application management table related to playback processes for full HD 2D video images using the 2D playlist file 241, as well as a Java application program related to playback processes for 4K2K 2D video images using the extended playlist file 243. When the playback device 102 refers to the item "title 6," then in accordance with the application management table in the BD-J object BDJO-EX, a Java application program is called from the JAR file 253 and executed.

In this way, the extended playlist file 243 is read from the BD-ROM disc 101, and playback processes for 4K2K 2D video images are executed in accordance with the playback path specified therein.

3: Structure of 3D Playback Device

Figure 40:
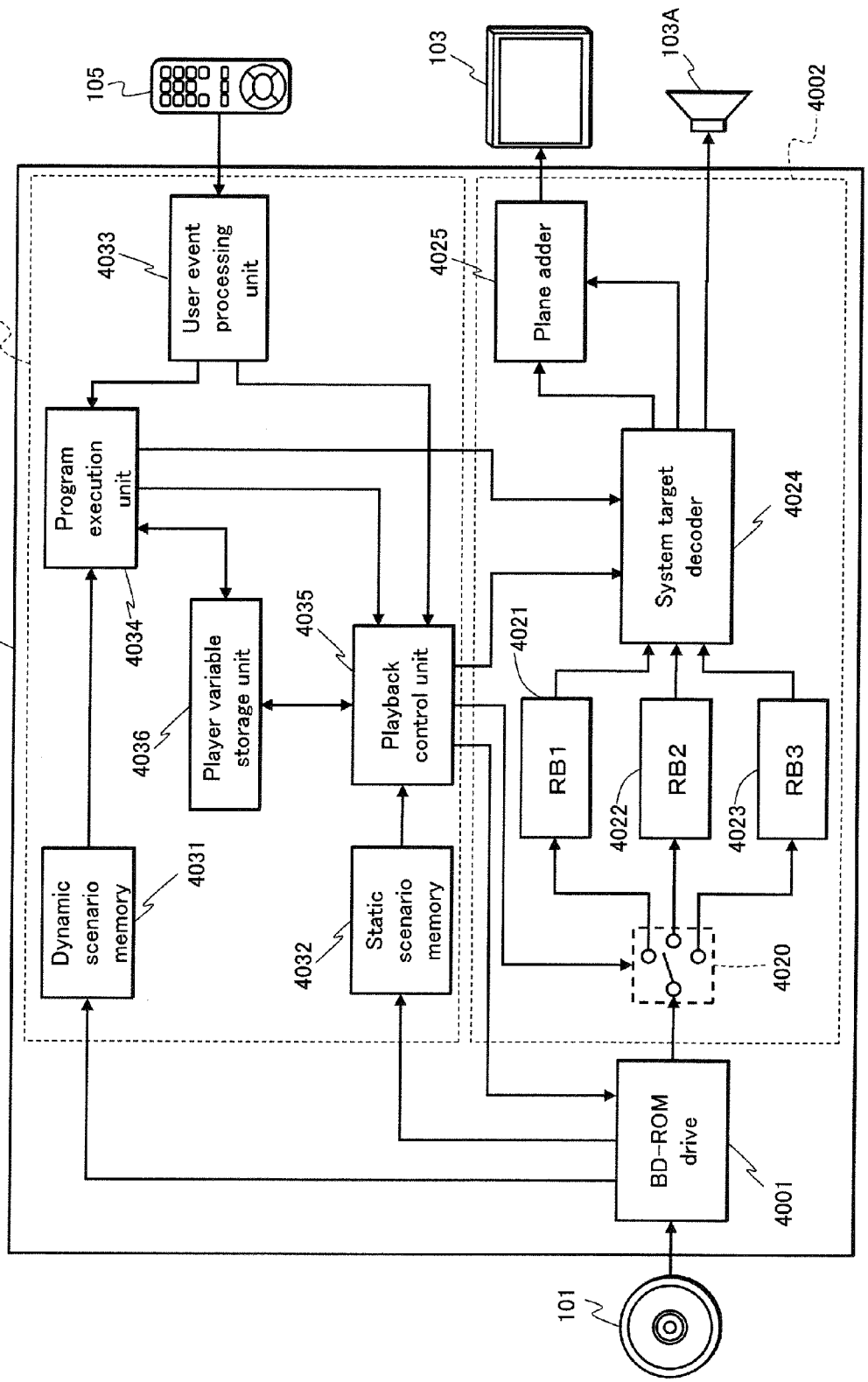
FIG. 40 is a functional block diagram of the playback device shown in FIG. 1.

FIG. 40 is a functional block diagram of the playback device 102 shown in FIG. 1. As shown in FIG. 40, the playback device 102 includes a BD-ROM drive 4001, playback unit 4002, and control unit 4003. The playback unit 4002 includes a switch 4020, first read buffer (RB1) 4021, second read buffer (RB2) 4022, third read buffer (RB3) 4023, system target decoder 4024, and plane adder 4025. The control unit 4003 includes a dynamic scenario memory 4031, static scenario memory 4032, user event processing unit 4033, program execution unit 4034, playback control unit 4035, and player variable storage unit 4036. The playback unit 4002 and the control unit 4003 are each implemented on a different integrated circuit. In particular, the program execution unit 4034 and the playback control unit 4035 are implemented by functions of the CPU in the playback device 102. Alternatively, the playback unit 4002 and the control unit 4003 may be integrated on a single integrated circuit.

When the BD-ROM disc 101 is loaded into the BD-ROM drive 4001, the BD-ROM drive 3701 radiates laser light to the disc 101 and detects change in the reflected light. Furthermore, using the change in the amount of reflected light, the BD-ROM drive 3701 reads data recorded on the disc 101. Specifically, the BD-ROM drive 4001 has an optical pickup, i.e. an optical head. The optical head has a semiconductor laser, collimate lens, beam splitter, objective lens, collecting lens, and optical detector. A beam of light radiated from the semiconductor laser sequentially passes through the collimate lens, beam splitter, and objective lens to be collected on a recording layer of the disc 101. The collected beam is reflected and diffracted by the recording layer. The reflected and diffracted light passes through the objective lens, the beam splitter, and the collecting lens, and is collected onto the optical detector. The optical detector generates a playback signal at a level in accordance with the amount of collected light. Furthermore, data is decoded from the playback signal.

Upon receiving an indication from the playback control unit 4035 of a range of LBNs as a file read request, the BD-ROM drive 4001 uses the file entry of the file to read extents in the file included in the range on the BD-ROM disc 101. When a plurality of files are to be read, and the ranges of LBNs indicated for the files overlap, the BD-ROM drive 4001 reads extents in order from the smallest top LBN in the overlapping sections, regardless of the file to which the extents belong. Among the files that are read in this way, the AV stream file is transferred to the switch 4020, dynamic scenario information is transferred to the dynamic scenario memory 4031, and static scenario information is transferred to the static scenario memory 4032. The "dynamic scenario information" includes an index file and a BD program file. The "static scenario information" includes a playlist file and a clip information file.

The switch 4020 transfers the AV stream file in units of extents from the BD-ROM drive 4001 to one of the read buffers 4021-4023. In the playback device 102 in 2D playback mode, the switch 4020 transfers extents from the file 2D to the RB1 4021. In the playback device 102 in 3D playback mode, the switch 4020 receives boundary information related to the extents in the file SS in advance from the playback control unit 4035. The boundary information indicates the boundary between the base-view extents and the dependent-view extents included in each extent in the file SS. Specifically, the boundary information indicates the number of source packets from the top of each extent included in the file SS to each boundary between a base-view extent and a dependent-view extent included in the extent. The switch 4020 then refers to the boundary information to extract base-view extents and dependent-view extents from each extent SS, transmit the base-view extents to the RB1 4021, and transmit the dependent-view extents to the RB2 4022. In the playback device 102 in extended playback mode, the switch 4020 transmits the extents in the file 2D to the RB1 4021 and transmits the extents in the extended stream file to the RB3 4023.

Information on whether each extent transmitted from the BD-ROM drive 4001 to switch 4020 belongs to the file 2D or the extended stream file is transmitted from the BD-ROM drive 4001 to the switch 4020.

The RB1 4021, the RB2 4022, and the RB3 4023 are buffer memories that use a memory element in the playback unit 4002. In particular, different areas in a single memory element are used as the RB1 4021, the RB2 4022, and the RB3 4023.

Alternatively, different memory elements may be used as the read buffers 4021-4023. The RB1 4021 receives base-view extents from the switch 4020 and stores these extents. The RB2 4022 receives dependent-view extents from the switch 4020 and stores these extents. The RB3 4023 receives extended extents from the switch 4020 and stores these extents.

The system target decoder 4024 reads extents from the read buffers 4021-4023 in units of source packets and demultiplexes the extents. The system target decoder 4024 then decodes each of the elementary streams obtained by the demultiplexing. At this point, the PIDs of the elementary streams to be decoded, as well as information necessary for decoding each elementary stream, such as the type of codec and attributes of the stream, are transferred in advance from the playback control unit 4035 to the system target decoder 4024. Furthermore, the system target decoder 4024 transmits the video frames decoded from the primary video stream (hereinafter referred to as the primary video plane), the video frames decoded from the secondary video stream (hereinafter referred to as the secondary video plane), the PG plane decoded from the PG stream, and the IG plane decoded from the IG stream to the plane adder 4025. These pieces of plane data represent the following: full HD 2D video images in 2D playback mode, a pair of left-view and right-view 2D video images in 3D playback mode, and 4K2K 2D video images in extended playback mode. On the other hand, the system target decoder 4024 mixes the decoded primary audio stream and secondary audio stream and transmits the resultant data to an audio output device, such as an internal speaker 103A of the display device 103. In addition, the system target decoder 4024 receives graphics data from the program execution unit 4034. The graphics data is used for rendering graphics on the screen for a GUI menu or the like and is in a raster data format such as JPEG or PNG. The system target decoder 4024 processes the graphics data for conversion to an image plane and outputs the image plane to the plane adder 4025. Details on the system target decoder 4024 are provided below.

The plane adder 4025 reads the primary video plane, the secondary video plane, the PG plane, the IG plane, and the image plane from the system target decoder 4024 and superimposes these planes one on another to yield one video frame. In particular, in L/R mode, each of the planes is composed of a data pair representing a left view and a right view. The plane adder 4025 superimposes data of the planes representing left views on the primary video plane representing a left view and superimposes data of the planes representing right views on the primary video plane representing a right view. On the other hand, in depth mode, each of the planes is composed of a data pair representing 2D video images and a depth map. Accordingly, the plane adder 4025 first generates a pair of left-view and right-view plane data from each of the planes. Subsequent combination process in depth mode is the same as in L/R mode. The combined video data is converted into a video signal in HDMI format and transmitted to the display device 103. The plane adder 4025 in 2D playback mode transmits video frames for full HD 2D video images. The plane adder 4025 in 3D playback mode alternately transmits a left-view video frame and a right-view video frame. The plane adder 4025 in extended playback mode transmits video frames for 4K2K 2D video images.

The dynamic scenario memory 4031 and static scenario memory 4032 are each a buffer memory. Different memory elements in the control unit 4003 are used as the dynamic scenario memory 4031 and the static scenario memory 4032. Alternatively, different areas in a single memory element may be used as the dynamic scenario memory 4031 and the static scenario memory 4032. The dynamic scenario memory 4031 stores dynamic scenario information, and the static scenario memory 4032 stores static scenario information.

The user event processing unit 4033 detects a user operation via the remote control 105 or the front panel of the playback device 102. Depending on the type of operation, the user event processing unit 4533 requests the program execution unit 4034 or the playback control unit 4035 to perform data processing. For example, when a user instructs to display a pop-up menu by pushing a button on the remote control 105, the user event processing unit 4033 detects the push and identifies the button. The user event processing unit 4033 further requests the program execution unit 4034 to execute a command corresponding to the button, i.e. a command to display the pop-up menu. On the other hand, when a user pushes a fast-forward or a rewind button on the remote control 105, the user event processing unit 4033 detects the push and identifies the button. The user event processing unit 4033 then requests the playback control unit 4035 to fast-forward or rewind the playlist currently being played back.

The program execution unit 4034 reads programs from MV object files and BD-J object files stored in the dynamic scenario memory 4031 and executes these programs. Furthermore, the program execution unit 4034 performs the following operations in accordance with the programs: (1) The program execution unit 4034 orders the playback control unit 4035 to perform playlist playback. (2) The program execution unit 4034 generates graphics data for a menu or game as PNG or JPEG raster data, transfers the generated data to the system target decoder 4024, and causes the generated data to be combined with other plane data. Via program design, specific details on these processes can be designed relatively flexibly. In other words, during the authoring process of the BD-ROM disc 101, the nature of these processes is determined while programming the MV object files and BD-J object files.

The playback control unit 4035 controls transfer of different types of files from the BD-ROM disc 101 to the read buffers 4021-4023, the dynamic scenario memory 4031, and the static scenario memory 4032. The file system of the BD-ROM disc 101 is used for this control. Specifically, when a certain file is to be transferred, the playback control unit 4035 first refers to the name of the file to retrieve the file entry of the file within the directory/file structure on the BD-ROM disc 101. Next, the playback control unit 4035 refers to the file entry to specify sectors of the BD-ROM disc 101 in which extents of the file to be transferred are recorded. Subsequently, the playback control unit 4035 instructs the BD-ROM drive 4001 to read data from the sectors. In response to this instruction, the BD-ROM drive 4001 transfers, in units of extents, the file to be transferred from the BD-ROM disc 101 to the buffer memories 4021-4023, 4031, and 4032.

The playback control unit 4035 decodes video data and audio data from the AV stream file by controlling the BD-ROM drive 4001 and the system target decoder 4024. Specifically, the playback control unit 4035 first reads a playlist file from the static scenario memory 4032, in response to an instruction from the program execution unit 4034 or a request from the user event processing unit 4033, and interprets the content of the file. In accordance with the interpreted content, particularly with the playback path, the playback control unit 4035 then specifies an AV stream file to be played back and instructs the BD-ROM drive 4001 and the system target decoder 4024 to read and decode the specified file. Such playback according to a playlist file is called "playlist playback."

In the playback device 102 in 2D playback mode, when the playback control unit 4035 is instructed by the program execution unit 4034 or another unit to perform playlist playback, the playback control unit 4035 reads PIs in order from the 2D playlist file stored in the static scenario memory 4032, setting the read PI as the current PI. Each time the playback control unit 4035 sets the current PI, it first sets operation conditions on the system target decoder 4024 in accordance with the STN table. In particular, the playback control unit 4035 selects the PID of the elementary stream for decoding and transmits the PID, together with the attribute information necessary for decoding the elementary stream, to the system target decoder 4024. Next, in accordance with the current PI, the playback control unit 4035 indicates a range of LBNs to the BD-ROM drive 4001 via the procedures indicated in the description about FIG. 32; in the sectors located within the range of the LBNs, extents of the file 2D to be read are recorded.

In the playback device 102 in 3D playback mode, when the playback control unit 4035 is instructed by the program execution unit 4034 or another unit to perform playlist playback, the playback control unit 4035 reads PIs in order from the 3D playlist file stored in the static scenario memory 4032, setting the read PI as the current PI. Each time the playback control unit 4035 sets the current PI, it sets operation conditions on the system target decoder 4024 and the plane adder 4025 in accordance with the STN table of the PI and the STN table SS in the 3D playlist file. In particular, the playback control unit 4035 selects the PID of the elementary stream for decoding and transmits the PID, together with the attribute information necessary for decoding the elementary stream, to the system target decoder 4024. Next, in accordance with the current PI, the playback control unit 4035 indicates a range of LBNs to the BD-ROM drive 4001 via the procedures indicated in the description about FIG. 35; in sectors located within the range of LBNs, extents of the file SS to be read are recorded. Meanwhile, the playback control unit 4035 refers to the extent start points in the clip information file stored in the static scenario memory 4032 to generate information on the boundaries of extents of the file SS, and then transmitting the boundary information to the switch 4020.

In the playback device 102 in extended playback mode, when the playback control unit 4035 is instructed by the program execution unit 4034 or another unit to perform playlist playback, the playback control unit 4035 reads PIs in order from the extended playlist file stored in the static scenario memory 4032, setting the read PI as the current PI. Each time the playback control unit 4035 sets the current PI, it first sets operation conditions on the system target decoder 4024 in accordance with the STN table of the PI and the STN table EX in the extended playlist file. In particular, the playback control unit 4035 selects the PID of the elementary stream for decoding and transmits the PID, together with the attribute information necessary for decoding the elementary stream, to the system target decoder 4024. Next, in accordance with the current PI, the playback control unit 4035 indicates a range of LBNs to the BD-ROM drive 4001 via the procedures indicated in the description about FIG. 38; in sectors located within the range of LBNs, extents of the file 2D and extended stream file to be read are recorded.

In addition, the playback control unit 4035 sets various types of player variables in the player variable storage unit 4036 using the static scenario information. With reference to the player variables, the playback control unit 4035 further specifies to the system target decoder 4024 the PIDs of the elementary streams to be decoded and provides the information necessary for decoding the elementary streams.

The player variable storage unit 4036 is composed of a group of registers for storing player variables. Types of player variables include system parameters (SPRM) and general parameters (GPRM). An SPRM indicates the status of the playback device 102. There may, for example, be 64 SPRMs that have the meanings listed below.

SPRM(0): Language code
SPRM(1): Primary audio stream number
SPRM(2): Subtitle stream number
SPRM(3): Angle number
SPRM(4): Title number
SPRM(5): Chapter number
SPRM(6): Program number
SPRM(7): Cell number
SPRM(8): Key name
SPRM(9): Navigation timer
SPRM(10): Current playback time
SPRM(11): Player audio mixing mode for karaoke
SPRM(12): Country code for parental management
SPRM(13): Parental level
SPRM(14): Player configuration for video
SPRM(15): Player configuration for audio
SPRM(16): Language code for audio stream
SPRM(17): Language code extension for audio stream
SPRM(18): Language code for subtitle stream
SPRM(19): Language code extension for subtitle stream
SPRM(20): Player region code
SPRM(21): Secondary video stream number
SPRM(22): Secondary audio stream number
SPRM(23): Player status
SPRM(24)-SPRM(63): Reserved The SPRM(10) indicates the PTS of the picture currently being decoded and is updated every time a picture is decoded. Accordingly, the current playback point can be known by referring to the SPRM(10).

The language code for audio stream in SPRM(16) and the language code for subtitle stream in SPRM(18) show default language codes of the playback device 102. These codes may be changed by a user with use of the OSD or the like of the playback device 102, or the codes may be changed by an application program via the program execution unit 4034. For example, if the SPRM(16) shows "English," then during playlist playback, the playback control unit 4035 first searches the STN table in the PI showing the current playback section, i.e. the current PI, for a stream entry having the language code for "English." The playback control unit 4035 then extracts the PID from the stream identification information of the stream entry and transmits the extracted PID to the system target decoder 4024. As a result, an audio stream having the PID is selected and decoded by the system target decoder 4024. These processes can be executed by the playback control unit 4035 with use of the MV object file or the BD-J object file.

During playback, the playback control unit 4035 updates the player variables in accordance with the status of playback. The playback control unit 3735 updates the SPRM(1), SPRM(2), SPRM(21), and SPRM(22) in particular. These SPRM respectively show, in the stated order, the STN of the audio stream, subtitle stream, secondary video stream, and secondary audio stream that are currently being processed. For example, suppose that the SPRM(1) has been changed by the program execution unit 4034. In this case, the playback control unit 4035 first refers to the STN shown by the new SPRM(1) and retrieves the stream entry that includes this STN from the STN table in the current PI. The playback control unit 4035 then extracts the PID from the stream identification information in the stream entry and transmits the extracted PID to the system target decoder 4024. As a result, an audio stream having the PID is selected and decoded by the system target decoder 4024. This is how the audio stream to be played back is switched. The subtitle stream and the secondary video stream to be played back can be similarly switched.

3-1: 2D Playlist Playback

Figure 41:
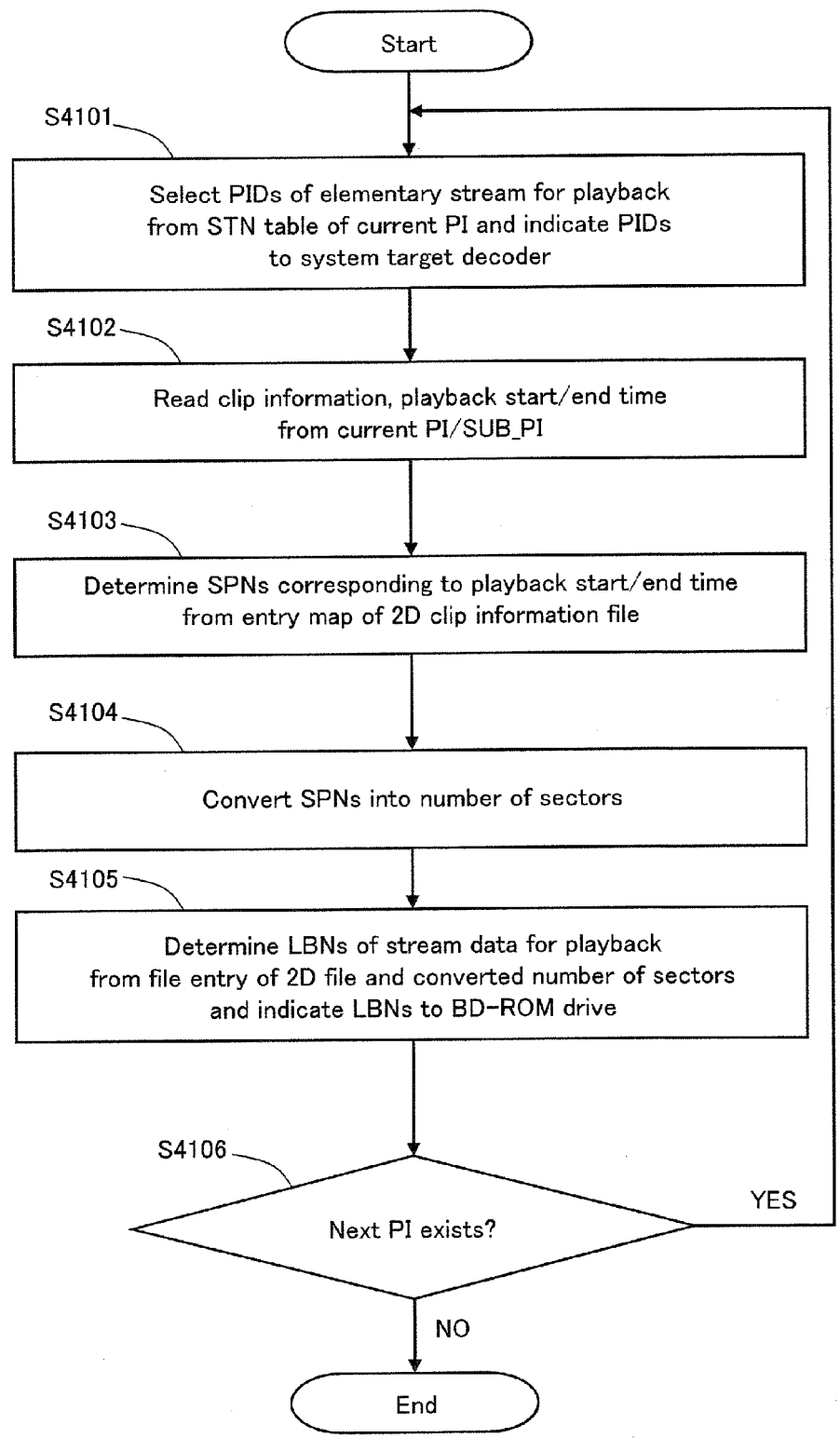
FIG. 41 is a flowchart of 2D playlist playback by the playback control unit shown in FIG. 40.

FIG. 41 is a flowchart of 2D playlist playback by a playback control unit 4035. 2D playlist playback is performed according to a 2D playlist file and is started when the playback control unit 4035 reads a 2D playlist file from the static scenario memory 4032.

In step S4101, the playback control unit 4035 first reads a single PI from the main path in the 2D playlist file and then sets the PI as the current PI. Next, from the STN table of the current PI, the playback control unit 4035 selects PIDs of elementary streams to be played back and specifies attribute information necessary for decoding the elementary streams. The selected PIDs and attribute information are indicated to the system target decoder 4024. The playback control unit 4035 further specifies a SUB_PI associated with the current PI from the sub-paths in the 2D playlist file. Thereafter, the process proceeds to step S4102.

In step S4102, the playback control unit 4035 reads reference clip information, a PTS #1 indicating a playback start time IN1, and a PTS #2 indicating a playback end time OUT1 from the current PI. From this reference clip information, a 2D clip information file corresponding to the file 2D to be played back is specified. Furthermore, when a SUB_PI exists that is associated with the current PI, similar information is also read from the SUB_PI. Thereafter, the process proceeds to step S4103.

In step S4103, the playback control unit 4035 refers to the entry map in the 2D clip information file to retrieve from the file 2D the SPN #1 and SPN #2 that correspond to the PTS #1 and PTS #2. The pair of PTSs indicated by the SUB_PI is also converted to a pair of SPNs. Thereafter, the process proceeds to step S4104.

In step S4104, from the SPN #1 and the SPN #2, the playback control unit 4035 calculates the number of sectors corresponding to the SPN #1 and the SPN #2. Specifically, the playback control unit 4035 first obtains the product of each of the SPN #1 and the SPN #2 multiplied by the data amount per source packet, i.e. 192 bytes. Next, the playback control unit 4035 obtains a quotient by dividing each product by the data amount per sector, i.e. 2048 bytes: N1=SPN #1×192/2048, N2=SPN #2×192/2048. The quotients N1 and N2 are the same as the total number of sectors, in the main TS, recorded in portions previous to the source packets to which SPN #1 and SPN #2 are allocated, respectively. The pair of SPNs converted from the pair of PTSs indicated by the SUB_PI is similarly converted to a pair of numbers of sectors. Thereafter, the process proceeds to step S4105.

In step S4105, the playback control unit 4035 specifies LBNs from the numbers of sectors N1 and N2 obtained in step S4104; at the LBNs, the top and end of extents to be played back are located. Specifically, with reference to the file entry of the file 2D to be played back, the playback control unit 4035 counts from the top of sectors in which the extents are recorded, in order to specify the LBN of the (N1+1)$^{th}$ sector=LBN #1 and the LBN of the (N2+1)$^{th}$ sector=LBN #2. The playback control unit 4035 further specifies a range from LBN #1 to LBN #2 to the BD-ROM drive 4001. The pair of numbers of sectors converted from the pair of PTSs indicated by the SUB_PI is similarly converted to a pair of LBNs and specified to the BD-ROM drive 4001. As a result, from the sectors located within the specified range, source packets belonging to extents are read in aligned units. Thereafter, the process proceeds to step S4106.

In step S4106, the playback control unit 4035 checks whether an unprocessed PI remains in the main path. When an unprocessed PI remains, the process is repeated from step S4101. When no unprocessed PI remains, the process is ended.

3-2: 3D Playlist Playback

Figure 42:
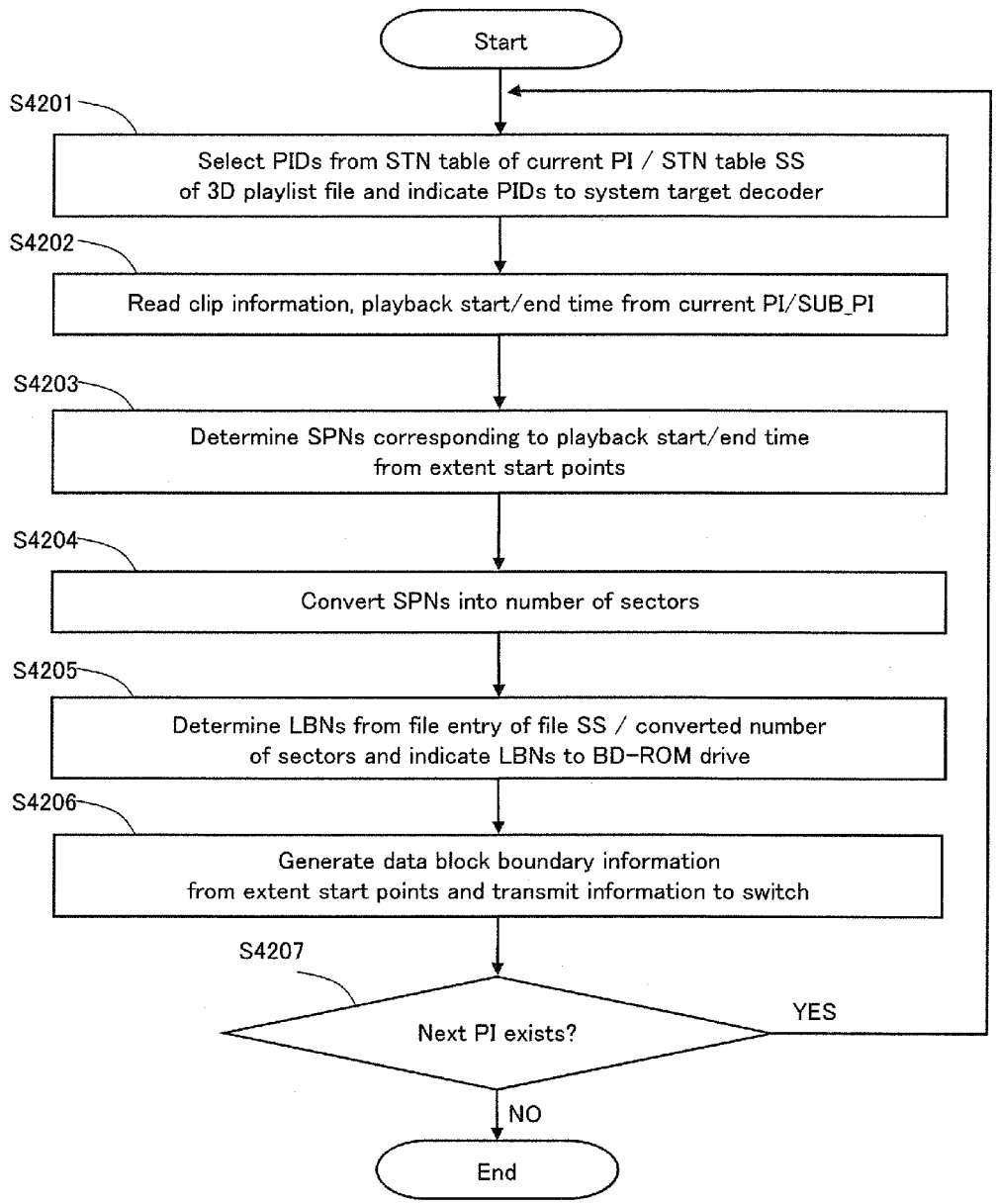
FIG. 42 is a flowchart of 3D playlist playback by the playback control unit shown in FIG. 40.

FIG. 42 is a flowchart of 3D playlist playback by a playback control unit 4035. 3D playlist playback is performed according to a 3D playlist file and is started when the playback control unit 4035 reads a 3D playlist file from the static scenario memory 4032.

In step S4201, the playback control unit 4035 first reads a single PI from the main path in the 3D playlist file and then sets the PI as the current PI. Next, from the STN table of the current PI, the playback control unit 4035 selects PIDs of elementary streams to be played back and specifies attribute information necessary for decoding the elementary streams. The playback control unit 4035 further selects, from among the elementary streams corresponding to the current PI in the STN table SS 3330 in the 3D playlist file, PIDs of additional elementary streams for playback, and the playback control unit 4035 specifies attribute information necessary for decoding these elementary streams. The selected PIDs and attribute information are indicated to the system target decoder 4024. The playback control unit 4035 additionally specifies, from among sub-paths in the 3D playlist file, a SUB_PI to be referenced at the same time as the current PI, specifying this SUB_PI as the current SUB_PI. Thereafter, the process proceeds to step S4202.

In step S4202, the playback control unit 4035 reads reference clip information, a PTS #1 indicating a playback start time IN1, and a PTS #2 indicating a playback end time OUT1 from the current PI and the SUB_PI. From this reference clip information, clip information files corresponding to the file 2D and the file DEP to be played back are specified. Thereafter, the process proceeds to step S4203.

In step S4203, with reference to the entry map in each of the clip information files specified in step S4202, the playback control unit 4035 retrieves the SPN #1 and SPN #2 in the file 2D, and the SPN #11 and SPN #12 in the file DEP, corresponding to the PTS #1 and the PTS #2. Referring to extent start points of each clip information file, the playback control unit 4035 further calculates, from the SPN #1 and the SPN #11, the number of source packets SPN #21 from the top of the file SS to the playback start position. The playback control unit 5035 also calculates, from the SPN #2 and the SPN #12, the number of source packets SPN #22 from the top of the file SS to the playback end position. Specifically, the playback control unit 4035 first retrieves, from among SPNs shown by extent start points of the 2D clip information file, a value "Am" that is the largest value less than or equal to SPN #1, and retrieves, from among the SPNs shown by extent start points of the DEP clip information file, a value "Bm" that is the largest value less than or equal to the SPN #11. The playback control unit 4035 then obtains the sum of the retrieved SPNs Am+Bm and sets the sum as SPN #21. Next, the playback control unit 4035 retrieves, from among SPNs shown by extent start points of the 2D clip information file, a value "An" that is the smallest value that is larger than the SPN #2, and retrieves, from among the SPNs shown by extent start points of the DEP clip information files, a value "Bn" that is the smallest value that is larger than the SPN #12. The playback control unit 4035 then obtains the sum of the retrieved SPNs An+Bn and sets the sum as SPN #22. Thereafter, the process proceeds to step S4204.

In step S4204, the playback control unit 4035 converts the SPN #21 and the SPN #22, determined in step S4203, into a pair of numbers of sectors N1 and N2.

Specifically, the playback control unit 4035 first obtains the product of SPN #21 and the data amount per source packet, i.e. 192 bytes. Next, the playback control unit 4035 divides this product by the data amount per sector, i.e. 2048 bytes: SPN #21×192/2048. The resulting quotient is the same as the number of sectors N1 from the top of the file SS to immediately before the playback start position. Similarly, from the SPN #22, the playback control unit 4035 calculates SPN #22×192/2048. The resulting quotient is the same as the number of sectors N2 from the top of the file SS to immediately before the playback end position. Thereafter, the process proceeds to step S4205.

In step S4205, the playback control unit 4035 specifies LBNs from the numbers of sectors N1 and N2 obtained in step S4204; at the LBNs, the start and end of the extents to be played back are located. Specifically, with reference to the file entry of the file SS to be played back, the playback control unit 4035 counts from the top of the sectors in which the extents are recorded, in order to specify the LBN of the $(N1+1)^{th}$ sector=LBN #1 and the LBN of the $(N2+1)^{th}$ sector=LBN #2. The playback control unit 4035 further specifies the range from LBN #1 to LBN #2 to the BD-ROM drive 4001. As a result, from the sectors located within the specified range, source packets belonging to extents are read in aligned units. Thereafter, the process proceeds to step S4206.

In step S4206, the playback control unit 4035 again refers to the extent start points of the clip information file used in step S4203 to generate boundary information for extents of the file SS, then transmitting the boundary information to the switch 4020. As a specific example, assume that SPN #21 indicating the playback start position is the same as the sum of SPNs indicating the extent start points, An+Bn, and that SPN #22 indicating the playback end position is the same as the sum of SPNs indicating the extent start points, Am+Bm. In this case, the playback control unit 4035 obtains a sequence of differences between SPNs from the respective extent start points, A(n+1)−An, B(n+1)−Bn, A(n+2)−A(n+1), B(n+2)−B(n+1), ..., Am−A(m−1), and Bm−B(m−1), and transmits the sequence to the switch 4020 as the boundary information. As shown in FIG. 29E, this sequence indicates the number of source packets in each of the base-view extents and dependent-view extents included in the extents in the file SS. The switch 4020 counts, from zero, the number of source packets of the extents in the file SS received from the BD-ROM drive 4001. Each time the count is the same as the difference between SPNs indicated by the boundary information, the switch 4020 switches the destination of output of the source packets between the RB1 4021 and RB2 4022 and resets the count to zero. As a result, {B(n+1)−Bn} source packets from the top of each extent SS in the file SS, i.e. the first dependent-view extent, are output to the RB2 4022, and the following {A(n+1)−An} source packets, i.e. the first base-view extent, are transmitted to the RB1 4021. Thereafter, dependent-view extents and base-view extents are extracted from the extents in the file SS alternately in the same way, alternating each time the number of source packets received by the switch 4020 is the same as the difference between SPNs indicated by the boundary information. Thereafter, the process proceeds to step S4207.

In step S4207, the playback control unit 4035 checks whether an unprocessed PI remains in the main path. When an unprocessed PI remains, the process is repeated from step S4201. When no unprocessed PI remains, the processing is ended.

3-3: Extended Playlist Playback

Figure 43:
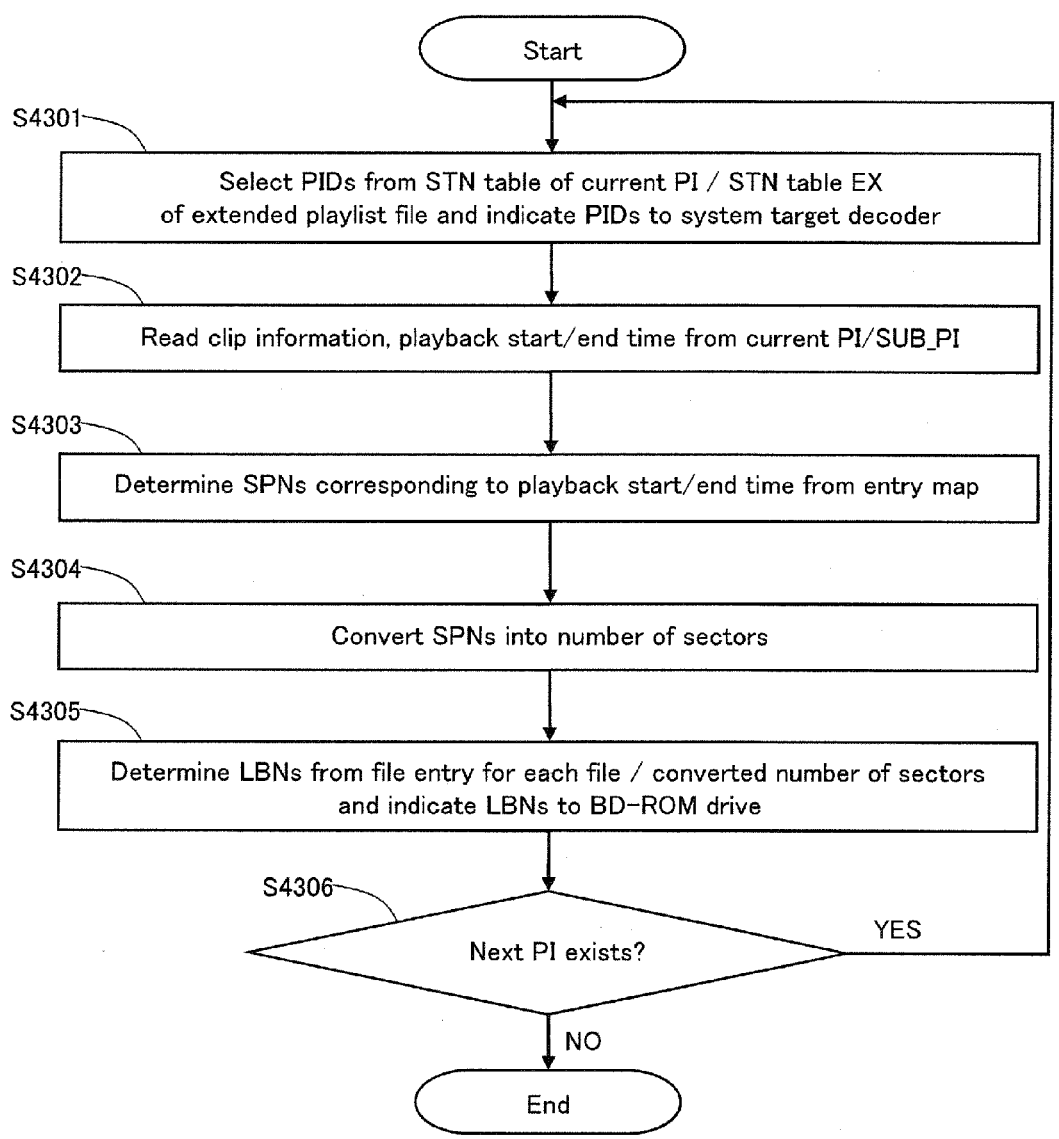
FIG. 43 is a flowchart of extended playlist playback by the playback control unit shown in FIG. 40.

FIG. 43 is a flowchart of extended playlist playback by the playback control unit 4035. Extended playlist playback is performed according to an extended playlist file and is started when the playback control unit 4035 reads the extended playlist file from the static scenario memory 4032.

In step S4301, the playback control unit 4035 first reads one PI from the main path in the extended playlist file and then sets the PI as the current PI. Next, from the STN table of the current PI, the playback control unit 4035 selects PIDs of elementary streams to be played back and specifies attribute information necessary for decoding the elementary streams. In addition, from the entry that is included in the STN table EX 3630 of the extended playlist file and corresponds to the current PI, the playback control unit 4035 selects the PID of resolution extension information and specifies the attribute information necessary for decoding the resolution extension information. The selected PID and attribute information are indicated to the system target decoder 4024. The playback control unit 4035 further specifies a SUB_PI to be referenced at the same time as the current PI from the sub-path of the extended playlist file, and sets this SUB_PI as the current SUB_PI.

Thereafter, the process proceeds to step S4302.

In step S4302, the playback control unit 4035 reads reference clip information, PTS #1 indicating a playback start time IN1, and PTS #2 indicating a playback end time OUT1 from each of the current PI and SUB_PI. From the reference clip information, clip information files individually corresponding to the file 2D and the extended stream file to be played back are specified. Thereafter, the process proceeds to step S4303.

In step S4303, the playback control unit 4035 refers to the entry map in each of the clip information files specified in step S4302, and then retrieves the pair of SPN #1 and SPN #2 in the file 2D and the pair of SPN #11 and SPN #12 in the extended stream file, the pairs correspond to the pair of PTS #1 and PTS #2. Thereafter, the process proceeds to step S4304.

In step S4304, the playback control unit 4035 calculates the corresponding numbers of sectors from SPN #1, #2, #11, and #12. Specifically, the playback control unit 4035 first multiplies each of SPN #1, #2, #11, and #12 by the data amount per source packet, i.e., 192 bytes. Next, the playback control unit 4035 divides 192 bytes times each of the SPNs by the data amount per sector, i.e., 2048 bytes: N1=SPN #1×192/2048, N2=SPN #2×192/2048, N11=SPN #11×192/2048, and N12=SPN #12×192/2048. The quotients N1 and N2 are equal to the total numbers of sectors in which first and second portions of the main TS are recorded, respectively; the first and second portions are located before the source packets to which SPN #1 and SPN #2 are allocated, respectively. The quotients N11 and N12 are equal to the total numbers of sectors in which first and second portions of the extended stream are recorded, respectively; the first and second portions are located before the source packets to which SPN #11 and SPN #12 are allocated, respectively. Thereafter, the process proceeds to step S4305.

In step S4305, the playback control unit 4035 determines LBNs that should be assigned to the start and end of extents of the file 2D to be played back from the numbers of sectors N1 and N2 obtained in step S4304; and determines LBNs that should be assigned to the start and end of extents of the extended stream file to be played back from the numbers of sectors N11 and N12 obtained in step S4304. Specifically, the playback control unit 4035 refers to the file entry of the file 2D to be played back to specify the LBN of the $(N1+1)^{th}$ sector=LBN #1 and the LBN of the $(N2+1)^{th}$ sector=LBN #2 counting from the top of the sectors in which the extents of the file 2D are recorded. Furthermore, the playback control unit 4035 refers to the file entry of the extended stream file to be played back to specify the LBN of the $(N11+1)^{th}$ sector=LBN #11 and the LBN of the $(N12+1)^{th}$ sector=LBN #12 counting from the top of the sectors in which the extents of the extended stream file are recorded. The playback control unit 4035 then indicates the range from LBN #1 to LBN #2 and the range from LBN #11 to LBN #12 to the BD-ROM drive 4001. As a result, the extents of the file 2D and extended stream file are read from the sectors located within the indicated ranges, beginning from the extent with its top located at the smallest LBN. Thereafter, the process proceeds to step S4306.

In step S4306, the playback control unit 4035 checks whether an unprocessed PI remains in the main path. When an unprocessed PI remains, the process is repeated from step S4301. When no unprocessed PI remains, the process is ended.

3-4: System Target Decoder

Structure in 2D Playback Mode

Figure 44:
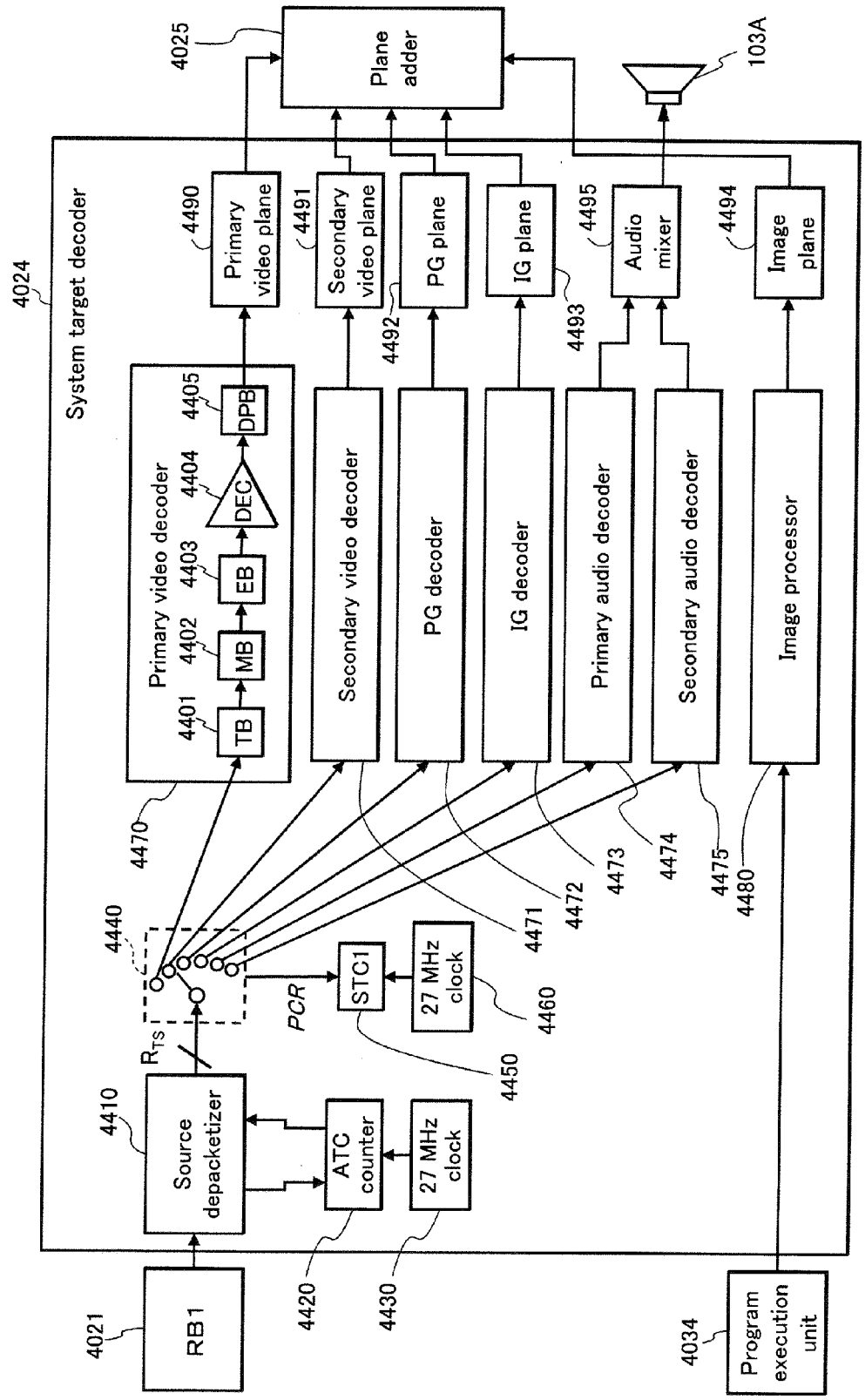
FIG. 44 is a functional block diagram of a system target decoder in 2D playback mode.

FIG. 44 is a functional block diagram of the system target decoder 4024 in 2D playback mode. As shown in FIG. 44, the system target decoder 4024 includes a source depacketizer 4410, ATC counter 4420, first 27 MHz clock 4430, PID filter 4440, STC counter (STC1) 4450, second 27 MHz clock 4460, primary video decoder 4470, secondary video decoder 4471, PG decoder 4472, IG decoder 4473, primary audio decoder 4474, secondary audio decoder 4475, image processor 4480, primary video plane memory 4490, secondary video plane memory 4491, PG plane memory 4492, IG plane memory 4493, image plane memory 4494, and audio mixer 4495.

The source depacketizer 4410 reads source packets from the RB1 4021, extracts the TS packets from the read source packets, and transfers the TS packets to the PID filter 4440. Furthermore, the source depacketizer 4410 synchronizes the time of the transfer with the time shown by the ATS of each source packet. Specifically, the source depacketizer 4410 first monitors the value of the ATC generated by the ATC counter 4420. In this case, the value of the ATC is incremented by the ATC counter 4420 in accordance with a pulse of a clock signal from the first 27 MHz clock 4430. Subsequently, at the instant the value of the ATC matches with the ATS of a source packet, the source depacketizer 4410 transfers the TS packets extracted from the source packet to the PID filter 4440. By adjusting the time of transfer in this way, the mean transfer rate of TS packets from the source depacketizer 4410 to the PID filter 4440 does not surpass the value $R_{TS}$ specified by the system rate 2711 in the 2D clip information file 231 shown in FIG. 27.

The PID filter 4440 first monitors a PID that includes each TS packet outputted by the source depacketizer 4410. When the PID matches with a PID pre-specified by the playback control unit 4035, the PID filter 4440 selects the TS packet and transfers it to the decoder 4470-4475 appropriate for decoding of the elementary stream indicated by the PID. For example, if a PID is 0x1011, the TS packets are transferred to the primary video decoder 4470. TS packets with PIDs ranging from 0x1B00-0x1B1F, 0x1100-0x111F, 0x1A00-0x1A1F, 0x1200-0x121F, and 0x1400-0-141F are transferred to the secondary video decoder 4471, primary audio decoder 4474, secondary audio decoder 4475, PG decoder 4472, and IG decoder 4473, respectively.

The PID filter 4440 further detects a PCR from TS packets using the PIDs of the TS packets. At each detection, the PID filter 4440 sets the value of the STC counter 4450 to a predetermined value. Then, the value of the STC counter 4450 is incremented in accordance with a pulse of the clock signal of the second 27 MHz clock 4460. In addition, the value to which the STC counter 4450 is set is indicated to the PID filter 4440 from the playback control unit 4035 in advance. The decoders 4470-4475 each use the value of the STC counter 4450 as the STC. Specifically, the decoders 4470-4475 first reconstruct the TS packets received from the PID filter 4440 into PES packets. Next, the decoders 4470-4475 adjust the timing of the decoding of data included in the PES payloads in accordance with the times indicated by the PTSs or the DTSs included in the PES headers.

The primary video decoder 4470, as shown in FIG. 44, includes a transport stream buffer (TB) 4401, multiplexing buffer (MB) 4402, elementary stream buffer (EB) 4403, compressed video decoder (DEC) 4804, and decoded picture buffer (DPB) 4405.

The TB 4401, MB 4402, and EB 4403 are each a buffer memory and use an area of a memory element internally provided in the primary video decoder 4470. Alternatively, some or all of the buffer memories may be separated between different memory elements. The TB 4401 stores the TS packets received from the PID filter 4440 as they are. The MB 4402 stores PES packets reconstructed from the TS packets stored in the TB 4401. Note that when the TS packets are transferred from the TB 4401 to the MB 4402, the TS header is removed from each TS packet. The EB 4403 extracts encoded VAUs from the PES packets and stores the VAUs therein. A VAU includes a compressed picture, i.e., an I picture, B picture, or P picture. Note that when data is transferred from the MB 4402 to the EB 4403, the PES header is removed from each PES packet.

The DEC 4404 is a hardware decoder designed specifically for decoding of compressed pictures and is composed of an LSI that includes, in particular, a function to accelerate the decoding. The DEC 4404 decodes a picture from each VAU in the EB 4403 at the time shown by the DTS included in the original PES packet. During decoding, the DEC 4404 first analyzes the VAU header to specify the compressed picture, compression encoding method, and stream attribute stored in the VAU, selecting a decoding method in accordance with this information. Compression encoding methods include, for example, MPEG-2, MPEG-4 AVC, and VC1. Furthermore, the DEC 4404 transmits the decoded, uncompressed picture to the DPB 4405.

Like the TB 4401, MB 4402, and EB 4403, the DPB 4405 is a buffer memory that uses an area of a built-in memory element in the primary video decoder 4470. Alternatively, the DPB 4405 may be located in a memory element separate from the other buffer memories 4401, 4402, and 4403. The DPB 4405 temporarily stores the decoded pictures. When a P picture or B picture is to be decoded by the DEC 4404, the DPB 4405 retrieves reference pictures, in response to an instruction from the DEC 4404, from among stored, decoded pictures. The DPB 4005 then provides the reference pictures to the DEC 4404. Furthermore, the DPB 4405 writes the stored pictures into the primary video plane memory 4490 at the time shown by the PTSs included in the original PES packets.

The secondary video decoder 4471 includes the same structure as the primary video decoder 4470. The secondary video decoder 4471 first decodes the TS packets of the secondary video stream received from the PID filter 4440 into uncompressed pictures. Subsequently, the secondary video decoder 4471 writes the uncompressed pictures into the secondary video plane memory 4491 at the time shown by the PTSs included in the PES packets decoded from the TS packets.

The PG decoder 4472 decodes the TS packets received from the PID filter 4440 into an uncompressed graphics object. The PG decoder 4472 then writes the uncompressed graphics object to the PG plane memory 4492 at the time shown by the PTSs included in the PES packets decoded from the TS packets.

The IG decoder 4473 decodes the TS packets received from the PID filter 4440 into an uncompressed graphics object. The IG decoder 4473 then writes the uncompressed graphics object to the IG plane memory 4493 at the time shown by the PTSs included in the PES packets decoded from the TS packets.

The primary audio decoder 4474 first stores the TS packets received from the PID filter 4440 in a buffer provided therein. Subsequently, the primary audio decoder 4474 removes the TS header and the PES header from each TS packet in the buffer, and decodes the remaining data into uncompressed LPCM audio data. Furthermore, the primary audio decoder 4474 transmits the resultant audio data to the audio mixer 4495 at the time shown by the PTS included in the original PES packet. The primary audio decoder 4474 selects the decoding method for compressed audio data in accordance with the compression encoding method and stream attributes for the primary audio stream included in the TS packets. Compression encoding methods include, for example, AC-3 and DTS.

The secondary audio decoder 4475 has the same structure as the primary audio decoder 4474. The secondary audio decoder 4475 first reconstructs PES packets from the TS packets of the secondary audio stream received from the PID filter 4440 and then decodes the data included in the PES payloads into uncompressed LPCM audio data. Subsequently, the secondary audio decoder 4475 transmits the uncompressed LPCM audio data to the audio mixer 4495 at the times shown by the PTSs included in the PES headers. The secondary audio decoder 4475 selects the decoding method for compressed audio data in accordance with the compression encoding method and stream attributes for the secondary audio stream included in the TS packets. Compression encoding methods include, for example, Dolby Digital Plus and DTS-HD LBR.

The audio mixer 4495 receives uncompressed audio data from both the primary audio decoder 4474 and the secondary audio decoder 4475 and then mixes the received data. The audio mixer 4495 also transmits the synthesized sound yielded by mixing audio data to, for example, an internal speaker 103A of the display device 103.

The image processor 4480 receives graphics data, i.e., PNG or JPEG raster data, from the program execution unit 4034. Upon receiving the graphics data, the image processor 4480 renders the graphics data and writes the graphics data to the image plane memory 4494.

The primary video plane memory 4490, secondary video plane memory 4491, PG plane memory 4492, IG plane memory 4493, and image plane memory 4494 are reserved as different areas in a memory element internal to the system target decoder 4024. Alternatively, the plane memories 4490-4494 may be separated between different memory elements.

The plane memories 4490-4494 can store the corresponding plane data and are equal in size to at least one video frame.

Structure in 3D Playback Mode

Figure 45:
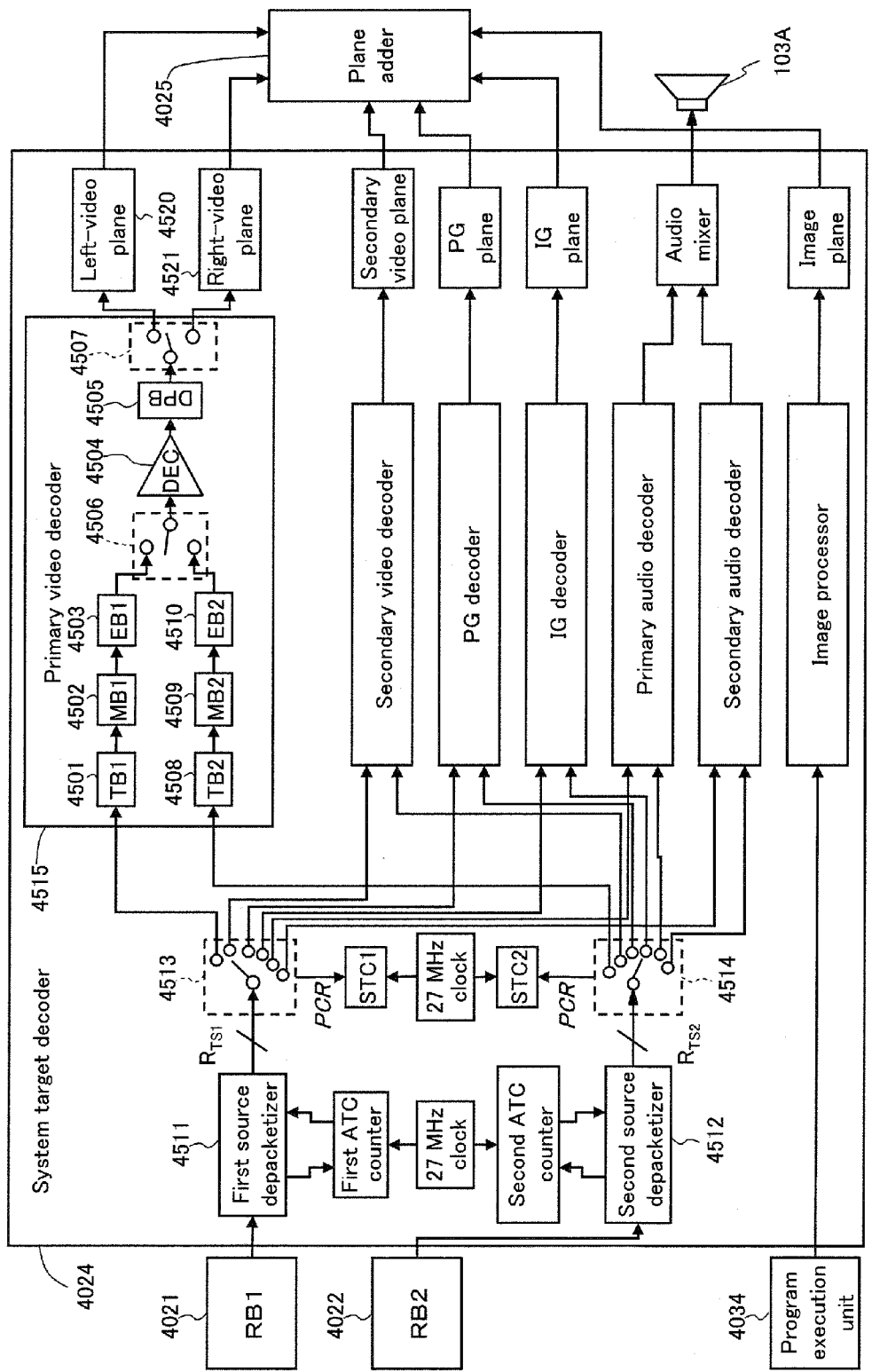
FIG. 45 is a functional block diagram of a system target decoder in 3D playback mode.

FIG. 45 is a functional block diagram of the system target decoder 4024 in 3D playback mode. The components shown in FIG. 45 differ from those shown in FIG. 44 in the following three points. (1) The input system from the read buffer to each of the decoders is doubled. (2) The primary video decoder, the secondary video decoder, the PG decoder, and the IG decoder can all decode the main TS and the sub-TS alternately. (3) Each plane memory can store plane data representing the left view and the right view. On the other hand, the primary audio decoder, secondary audio decoder, audio mixer, and image processor are the same as those shown in FIG. 44. Accordingly, among the components shown in FIG. 45, those differing from the components shown in FIG. 44 are described below. Details on similar elements can be found in the description about FIG. 44. Furthermore, since the decoders each have a similar structure, only the structure of the primary video decoder 4515 is described below. This description is also valid for the structure of the other decoders.

The first source depacketizer 4511 reads source packets from the RB1 4021, furthermore extracting TS packets included therein and transmitting the TS packets to the first PID filter 4513. The second source depacketizer 4512 reads source packets from the RB2 4022, furthermore extracting TS packets included therein and transmitting the TS packets to the second PID filter 4514. Each of the source depacketizers 4511 and 4512 further synchronizes the time of transfer the TS packets with the time shown by the ATS of each source packet. This synchronization method is the same method as the source depacketizer 4410 shown in FIG. 44. Accordingly, details thereof can be found in the description provided for FIG. 44. With this sort of adjustment of transfer time, the mean transfer rate $R_{TS1}$ of TS packets from the first source depacketizer 4511 to the first PID filter 4513 does not exceed the system rate indicated by the 2D clip information file. Similarly, the mean transfer rate $R_{TS2}$ of TS packets from the second source depacketizer 4512 to the second PID filter 4514 does not exceed the system rate indicated by the DEP clip information file.

The first PID filter 4513 compares the PID of each TS packet received from the first source depacketizer 4511 with the selected PID. The playback control unit 4035 designates the selected PID beforehand in accordance with the STN table in the 3D playlist file. When the two PIDs match with each other, the first PID filter 4513 transfers the TS packets to the decoder assigned to the PID. For example, if a PID is 0x1011, the TS packets are transferred to TB1 4501 in the primary video decoder 4515. On the other hand, TS packets with PIDs ranging from 0x1B00-0x1B1F, 0x1100-0x111F, 0x1A00-0x1A1F, 0x1200-0x121F, and 0x1400-0x141F are transferred to the secondary video decoder, primary audio decoder, secondary audio decoder, PG decoder, and IG decoder respectively.

The second PID filter 4514 compares the PID of each TS packet received from the second source depacketizer 4512 with the selected PID. The playback control unit 4035 designates the selected PID beforehand in accordance with the STN table SS in the 3D playlist file. When the two PIDs match with each other, the second PID filter 4514 transfers the TS packets to the decoder assigned to the PID. For example, if a PID is 0x1012 or 0x1013, the TS packets are transferred to TB2 4508 in the primary video decoder 4515. On the other hand, TS packets with PIDs ranging from 0x1B20-0x1B3F, 0x1220-0x127F, and 0x1420-0-147F are transferred to the secondary video decoder, PG decoder, or IG decoder respectively.

The primary video decoder 4515 includes a TB1 4501, MB1 4502, EB1 4503, TB2 4508, MB2 4509, EB2 4510, buffer switch 4506, DEC 4504, DPB 4505, and picture switch 4507. The TB1 4501, MB1 4502, EB1 4503, TB2 4508, MB2 4509, EB2 4510 and DPB 4505 are all buffer memories. Each of these buffer memories uses an area of a memory element included in the primary video decoder 4515. Alternatively, some or all of these buffer memories may be separated between different memory elements.

The TB1 4501 receives TS packets that include a base-view video stream from the first PID filter 4513 and stores the TS packets as they are. The MB1 4502 decodes PES packets from the TS packets stored in the TB1 4501 and stores the PES packets. The TS headers of the TS packets are removed at this point. The EB1 4503 extracts encoded VAUs from the PES packets stored in the MB1 4502 and stores the VAUs. The PES headers of the PES packets are removed at this point.

The TB2 4508 receives TS packets that include a dependent-view video stream from the second PID filter 4514 and stores the TS packets as they are. The MB2 4509 decodes PES packets from the TS packets stored in the TB2 4508 and stores the PES packets. The TS headers of the TS packets are removed at this point. The EB2 4510 extracts encoded VAUs from the PES packets stored in the MB2 4509 and stores the VAUs. The PES headers of the PES packets are removed at this point.

The buffer switch 4506 transfers the headers of the VAUs stored in the EB1l 4503 and the EB2 4510 in response to a request from the DEC 4504. Furthermore, the buffer switch 4506 transfers the compressed picture data for the VAUs to the DEC 4504 at the times indicated by the DTSs included in the original PES packets. In this case, the DTSs are equal for a pair of pictures belonging to the same 3D VAU between the base-view video stream and dependent-view video stream. Accordingly, for a pair of VAUs that have the same DTS, the buffer switch 4506 first transmits the VAU stored in the EB1 4503 to the DEC 4504.

Like the DEC 4404 shown in FIG. 44, the DEC 4504 is a hardware decoder designed specifically for decoding of compressed pictures and is composed of an LSI that includes, in particular, a function to accelerate the decoding. The DEC 4504 decodes the compressed picture data transferred from the buffer switch 4506 in order. During decoding, the DEC 4504 first analyzes each VAU header to specify the compressed picture, compression encoding method, and stream attribute stored in the VAU, selecting a decoding method in accordance with this information. Compression encoding methods include, for example, MPEG-2, MPEG-4 AVC, MVC, and VC1. Furthermore, the DEC 4504 transmits the decoded, uncompressed picture to the DPB 4505.

The DPB 4505 temporarily stores the decoded, uncompressed pictures. When the DEC 4504 decodes a P picture or a B picture, the DPB 4505 retrieves reference pictures from among the stored, uncompressed pictures in response to a request from the DEC 4504 and supplies the retrieved reference pictures to the DEC 4504.

The picture switch 4507 writes the uncompressed pictures from the DPB 4505 to either the left-video plane memory 4520 or the right-video plane memory 4521 at the time indicated by the PTS included in the original PES packet. In this case, the PTSs are equal between a base-view picture and a dependent-view picture belonging to the same 3D VAU. Accordingly, for a pair of pictures that have the same PTS and that are stored by the DPB 4505, the picture switch 4507 first writes the base-view picture in the left-video plane memory 4520 and then writes the dependent-view picture in the right-video plane memory 4521.

Structure in Extended Playback Mode

Figure 46:
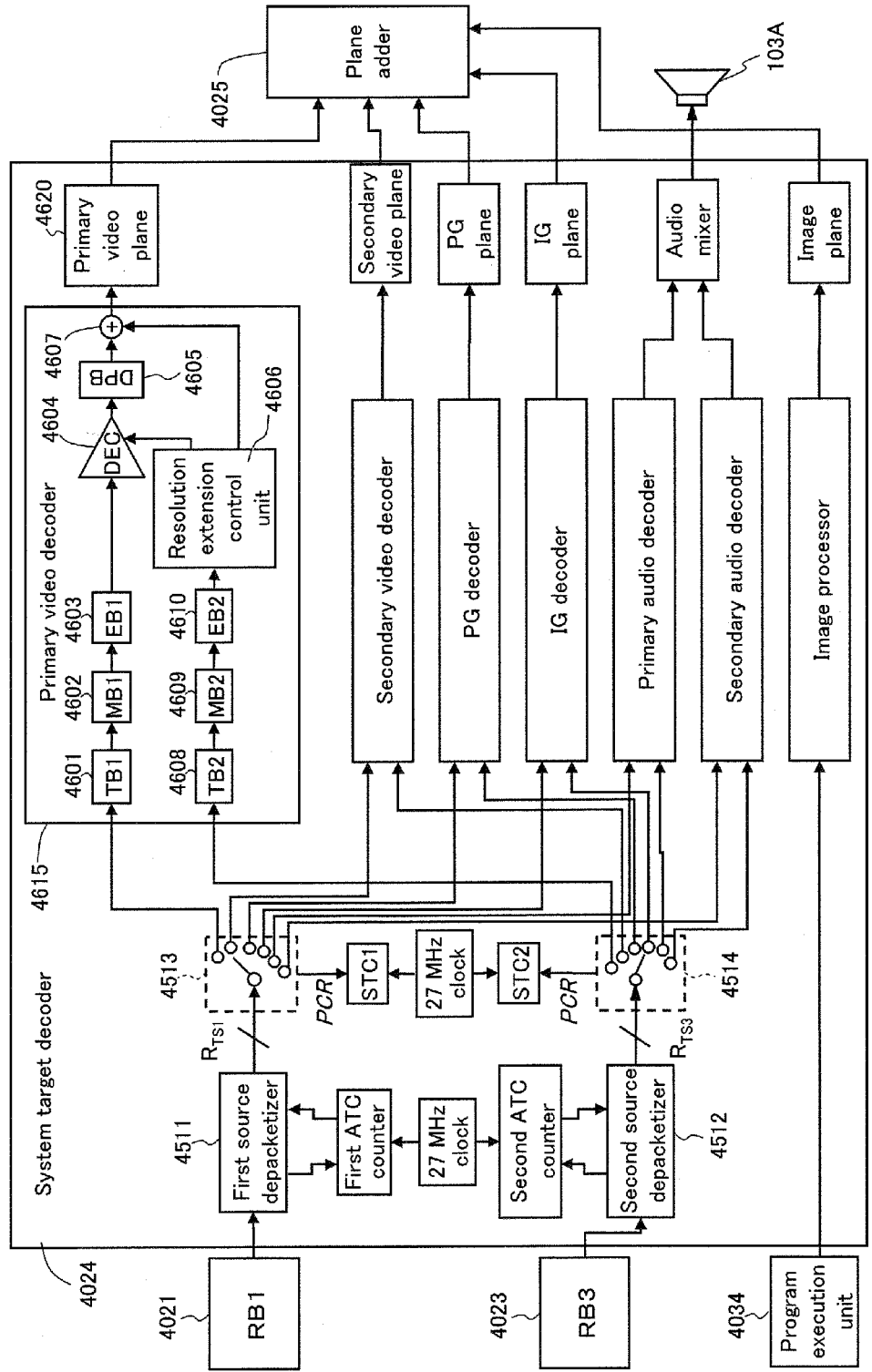
FIG. 46 is a functional block diagram of a system target decoder in extended playback mode.

FIG. 46 is a functional block diagram of the system target decoder 4024 in extended playback mode. The components shown in FIG. 46 differ from those shown in FIG. 45 in the following two points. (1) The primary video decoder, the secondary video decoder, the PG decoder, and the IG decoder can all decode the main TS and the extended stream alternately. (2) Each plane memory can store 4K2K plane data. On the other hand, the primary audio decoder, secondary audio decoder, audio mixer, and image processor are the same as those shown in FIG. 45. Accordingly, among the components shown in FIG. 46, those differing from the components shown in FIG. 45 are described below. Details on similar elements can be found in the description about FIG. 45. Furthermore, since the decoders each have a similar structure, only the structure of the primary video decoder 4615 is described below. This description is also valid for the structure of the other decoders.

The second source depacketizer 4512 reads source packets from the RB3 4023, furthermore extracting and transmitting TS packets from the source packets to the second PID filter 4514. The mean transfer rate $R_{TS3}$ for the TS packets to be transferred from the second source depacketizer 4512 to the second PID filter 4514 does not exceed the system rate indicated by the extended clip information file.

Every time the second PID filter 4514 receives a TS packet from the second source depacketizer 4512, the second PID filter compares the PID of the TS packet with PIDs to be selected. The PIDs to be selected have been preliminarily specified by the playback control unit 4035 in accordance with the STN table EX of the extended playlist file. When the PID of the TS packet matches with one of the PIDs to be selected, the second PID filter 4514 transfers the TS packet to the decoder assigned to its PID. For example, if the PID is 0x1014, the TS packet is transferred to TB2 4608 in the primary video decoder 4615.

The primary video decoder 4615 includes TB1 4601, MB1 4602, EB1 4603, TB2 4608, MB2 4609, EB2 4610, resolution extension control unit 4606, DEC 4604, DPB 4605, and adder 4607. TB1 4601, MB1 4602, EB1 4603, TB2 4608, MB2 4609, EB2 4610, and DPB 4605 are all buffer memories. Each of these buffer memories uses an area of a memory element included in the primary video decoder 4615. Alternatively, some or all of these buffer memories may be separated into different memory elements.

TB1 4601 receives TS packets that include a base-view video stream from the first PID filter 4513 and stores the TS packets as they are. MB1 4602 decodes PES packets from the TS packets stored in TB1 4601 and stores the PES packets. TS headers are removed from the TS packets at this point. EB1 4603 extracts encoded VAUs from the PES packets stored in MB1 4602 and stores the VAUs. PES headers are removed from the PES packets at this point.

TB2 4608 receives TS packets that include resolution extension information from the second PID filter 4514 and stores the TS packets as they are. MB2 4609 decodes PES packets from the TS packets stored in TB2 4608 and stores the PES packets. TS headers are removed from the TS packets at this point. EB2 4610 extracts encoded VAUs from the PES packets stored in MB2 4609 and stores the VAUs. PES headers are removed from the PES packets at this point.

The resolution extension control unit 4606 reads an extended resolution and an interpolation method from the resolution extension information stored in EB2 4610, and indicates the read information to the DEC 4604. Furthermore, the resolution extension control unit 4606 reads pixel difference information from the resolution extension information, and transmits the pixel difference information to the adder 4607 at the time indicated by the DTS included in the original PES packet. Here, a picture of the base-view video stream and resolution extension information of the extended stream, which are necessary for constituting a 4K2K video frame, have the same DTS.

Like the DEC 4404 shown in FIG. 44, the DEC 4604 is a hardware decoder designed specifically for decoding of compressed pictures and is composed of an LSI that includes, in particular, a function to accelerate the decoding. The DEC 4604 decodes the compressed picture data transferred from EB1 4603 in order. During decoding, the DEC 4604 first analyzes each VAU header to specify the compression encoding method and stream attributes of the compressed picture stored in the VAU, then selecting a decoding method in accordance with this information. Options of the compression encoding method include, for example, MPEG-2, MPEG-4 AVC, and VC1.

Furthermore, the DEC 4604 uses the interpolation method indicated by the resolution extension control unit 4606 to increase the resolution of the decoded, uncompressed pictures from full HD to the resolution indicated by the resolution extension control unit 4606, i.e., to 4K2K. Here, any of the well-known methods available to increase resolution of video images, such as the bilinear and bicubic methods, is used as the interpolation method. The DEC 4604 transmits the 4K2K pictures to the DPB 4605.

The DPB 4605 temporarily holds the decoded, uncompressed pictures. When the DEC 4604 decodes a P picture or a B picture, the DPB 4605 responds to a request from the DEC 4604 to retrieve one or more reference pictures from among the uncompressed pictures that the DPB 4605 holds, and then supply the reference pictures to the DEC 4604.

The adder 4607 reads a 4K2K picture from the DPB 4605, and in parallel, receives pixel difference information from the resolution extension control unit 4606. Then, the adder 4607 adds the difference in corresponding pixel data contained in the pixel difference information to pixel data contained in the picture. In this way, the video images represented by the 4K2K picture are converted to the original fine-resolution images. The 4K2K picture after converted is written to the primary video plane memory 4620 at the time indicated by the PTS included in the original PES packet.

Conversion of Resolution from Full HD to 4K2K

Figure 47:
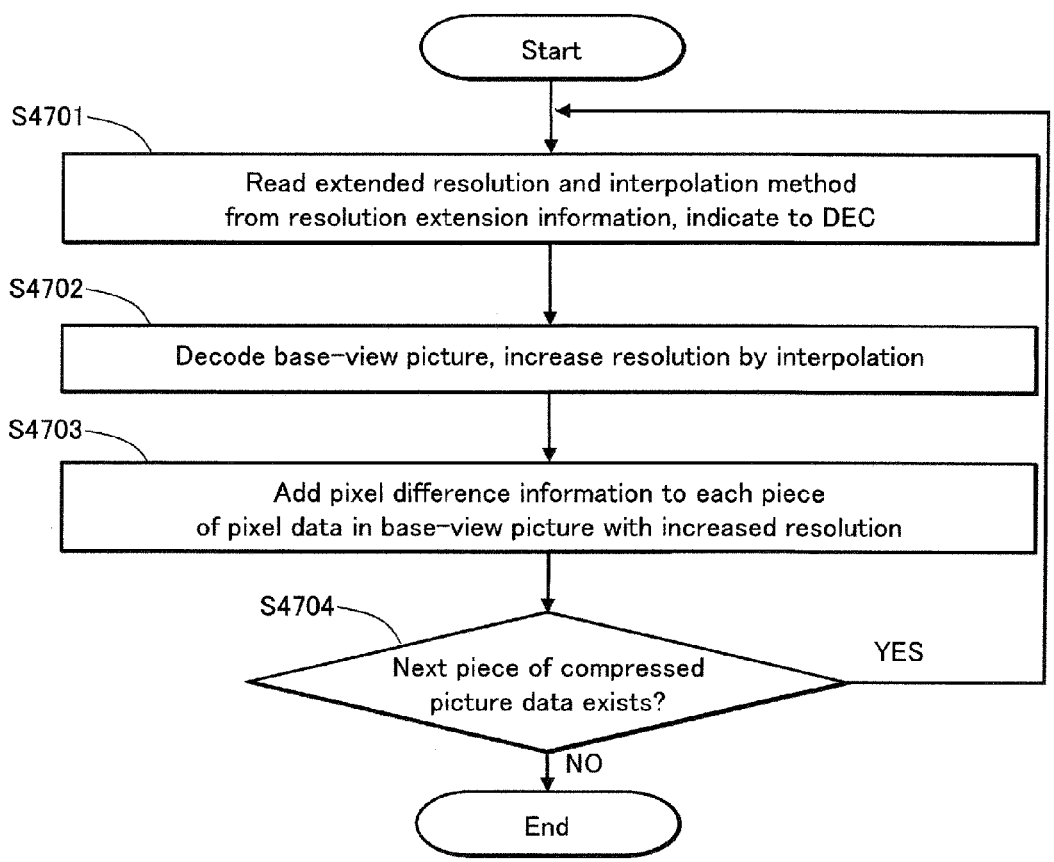
FIG. 47 is a flowchart of resolution conversion from full HD to 4K2K.

FIG. 47 is a flowchart of resolution conversion from full HD to 4K2K. This process is started when resolution extension information begins to be transferred from EB2 4610 to the resolution extension control unit 4606.

In step S4701, the resolution extension control unit 4606 reads an extended resolution and an interpolation method from the resolution extension information. The resolution extension control unit 4606 then indicates the extended resolution and the interpolation method to the DEC 4604. Thereafter, the process proceeds to step S4702.

In step S4702, DEC 4604 reads the compressed picture data from EB1 4603 and decodes a base-view picture from the compressed picture data. Furthermore, DEC 4604 uses the interpolation method indicated by the resolution extension control unit 4606 to increase the resolution of the base-view picture from full HD to the resolution indicated by the resolution extension control unit 4606, i.e., to 4K2K. DEC 4603 then writes the 4K2K picture to DPB 4605. Thereafter, the process proceeds to step S4703.

In step S4703, the adder 4607 reads the 4K2K base-view picture from DPB 4605 and receives pixel difference information from the resolution extension control unit 4606. At this point, the adder 4607 adds the difference in pixel data contained in the pixel difference information to the corresponding pixel data contained in the base-view picture. The 4K2K picture is written into the primary video plane memory 4620. Thereafter, the process proceeds to step S4704.

In step S4704, DEC 4604 confirms whether data of the next compressed picture exists in EB1 4603. If exists, the process is repeated from step S4701. If not, the process is ended.

4: Effects of Embodiment 1

As shown in FIGS. 14 and 15, the BD-ROM disc 101 according to Embodiment 1 of the present invention includes a combination of an extended data specific section, a monoscopic video specific section, and a stereoscopic video specific section immediately before and after the location where a long jump $J_{LY}$ is required, such as a layer boundary LB. The same portion of the main TS is duplicated in the monoscopic video specific section and the stereoscopic video specific section. The playback devices in 2D playback mode and extended playback mode read this portion from the monoscopic video specific section, whereas the playback device in 3D playback mode reads this portion from the stereoscopic video specific section. As a result, conditions that the sizes of base-view extents should satisfy in order to prevent buffer underflow from occurring during a long jump $J_{LY}$ can be set separately for the monoscopic video specific section and the stereoscopic video specific section. This technology therefore enables both seamless playback of video images during the long jump $J_{LY}$ in every mode and a further reduction in the buffer capacity built in the playback device.

Furthermore, the monoscopic video specific section is accessed by both the playback devices in 2D playback mode and extended playback mode. Therefore, from the BD-ROM disc 101, data that matches with the entirety of base-view extents $B_{3D}$ located in the stereoscopic video specific section can be eliminated except for the base-view extent $B_{2D}$ located in the monoscopic video specific section. As a result, the volume area 202B on the BD-ROM disc 101 can be utilized more effectively.

Moreover, the playback device in any mode skips access to either the monoscopic video specific section or the stereoscopic video specific section via a long jump $J_{LY}$. Accordingly, even if the system rates for the file 2D and the file SS are set to the maximum values of 48 Mbps and 64 Mbps, respectively, the jump distance of the long jump $J_{LY}$ in either mode does not exceed the maximum jump distance of 40,000 sectors. As a result, in any mode, a high image quality can be maintained regardless of the need for a long jump.

5: Modifications (A) The display device 103 according to Embodiment 1 of the present invention is a liquid crystal display. Alternatively, the display device according to the present invention may be another type of flat panel display, such as a plasma display, an organic EL display, etc., or a projector. Furthermore, the display device 103 shown in FIG. 1 is separate from the playback device 102. Alternatively, the display device may be formed integrally with the playback device.

(B) The recording medium 101 according to Embodiment 1 of the present invention is a BD-ROM disc. Alternatively, the recording medium according to the present invention may be a different portable recording medium, for example, an optical disc with a different format such as DVD or the like, a removable hard disk drive (HDD), or a semiconductor memory device such as an SD memory card.

(C) The 3D glasses 102 according to Embodiment 1 of the present invention are shutter glasses. Alternatively, the 3D glasses according to the present invention may be those including left and right lenses covered by polarization films with different polarization directions, or those including left and right lenses with different transmission spectra. When the former glasses are used, the display device uses different polarized lights to display left-view and right-view video images. When the latter glasses are used, the display device uses lights with different spectra to display left-view and right-view video images. Left lenses of both the glasses only allow left-view video images to pass through, and right lenses thereof only allow right-view video images to pass through.

(D) A picture contained in a PES packet 511 shown in FIG. 5 is the entirety of one encoded video frame. Alternatively, the picture may be one encoded field.

(E) The playback device 102 in L/R mode according to Embodiment 1 of the present invention plays back video frames representing left and right views from the base-view and dependent-view video streams, respectively. Conversely, the base-view and dependent-view video streams may represent right and left views, respectively.

(F) The arrangement of extents shown in FIG. 11 includes dependent-view extents placed before base-view extents. Contrary to the assumption under which the arrangement has been determined, when the system rate $R_{TS2}$ for the file DEP is set as high as the system rate $R_{TS1}$ for the file 2D, the second transfer rate $R_{EXT2}$ may exceed the first transfer rate $R_{EXT1}$ for the extent pair located at the top of an extent block. In this case, the base-view extent may be placed before the dependent-view extent. In other words, a smaller one of the extent pair is placed before the other larger one. This enables the read buffer to maintain a smaller capacity.

(G) Both arrangement 1 shown in FIG. 14 and arrangement 2 shown in FIG. 15 include the combinations of an extended data specific section, a monoscopic video specific section, and a stereoscopic video specific section located both immediately before and after the layer boundary LB. Alternatively, these sections may be only located either immediately before or immediately after the layer boundary LB. When these sections are located immediately before the layer boundary LB, the sizes of the base-view extents arranged in the stereoscopic video specific section need not satisfy condition 1. When the sections are located immediately after the layer boundary LB, the monoscopic video specific section can be located closer to the layer boundary LB than the stereoscopic video specific section, and thus the long jump in 2D playback mode can have a shorter jump distance than the long jump in 3D playback mode. In either case, the base-view extent to be read immediately before the long jump in 3D playback mode can have a reduced size, and thus the playback device in 3D playback mode allows the RB2 to maintain its capacity at the minimum necessary value.

(H) According to Embodiment 1 of the present invention, the extended data included in the extended stream is resolution extension information, or information necessary for extending full HD 2D video images, which are represented by the base-view video stream, to 4K2K 2D video images. Other embodiments may use the following types of extended data.

Depth Map Stream

Extended data may be a depth map stream. In this case, extended playback mode of the playback device 102 is equivalent to depth mode. In other words, the playback device 102 plays back 3D video images from extents read in accordance with the third playback path 1203 shown in FIG. 12.

Depth maps are used for playback of 3D video images as follows. 2D video images represented by the base-view video stream are the 3D video images projected onto a virtual 2D screen. The depth maps represent, pixel by pixel, the depths of portions of the 3D video images with respect to the 2D screen. In particular, the depth of an image to be displayed by a pixel is expressed by the luminance of the pixel. In the playback device 102 in depth mode, the plane adder 4025 constructs left- and right-view video frames from the combination of the base-view video stream and the depth maps.

Figure 48:
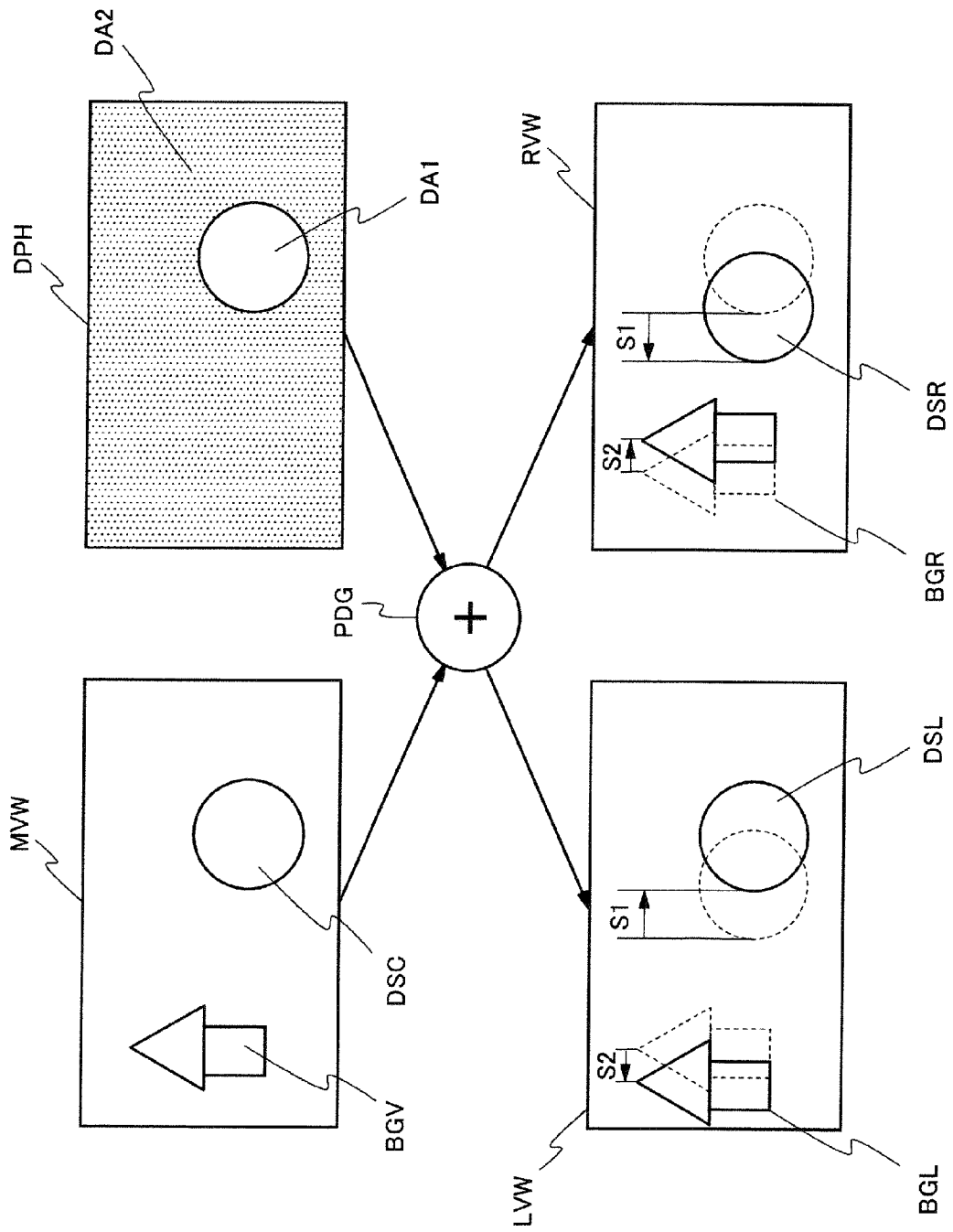
FIG. 48 is a schematic diagram showing an example of constructing a left view and a right view from the combination of a 2D video image and a depth map.

FIG. 48 is a schematic diagram showing an example of constructing a left view LVW and a right view RVW from the combination of 2D video images MVW and a depth map DPH. As shown in FIG. 48, the 2D video images MVW include a circular plate DSC shown in its background BGV. The depth map DPH expresses the depths for portions of the 2D video images MVW by the luminances of pixels. According to the depth map DPH, the area DA1 where the circular plate DSC is displayed in the 2D video images MVW is to be seen by viewers closer than the screen, while the area DA2 where the background BGV is displayed is to be farer than the screen. In the plane adder 4025 of the playback device 102, a parallax image generation unit PDG first calculates binocular parallax of each portion of the 2D video images MVW by using the depths of the portion indicated by the depth map DPH. Next, the parallax image generation unit PDG shifts the position of the portion to the left and right in the 2D video images MVW in accordance with the calculated binocular parallax to construct the left view LVW and the right view RVW. In the example shown in FIG. 48, the parallax image generation unit PDG shifts the circular plate DSC from its original position in the 2D video images MVW as follows: the circular plate DSL displayed in the left view LVW is located on the right side of the original position and at a distance S1 of half of the circular plate's binocular parallax from the original position, while the circular plate DSR displayed in the right view RVW is located on the left side of the original position and at the distance S1 therefrom. In this way, the circular plate DSC is seen by the viewers as being closer than the screen. Conversely, the parallax image generation unit PDG shifts the background BGV from its original position in the 2D video images MVW as follows: the background BGL displayed in the left view LVW is located on the left side of the original position and at a distance S2 of half of the background's binocular parallax from the original position, while the background BGR displayed in the right view RVW is located on the right side of the original position and at the distance S2 therefrom. In this way, the background BGV is seen by the viewers as being farer than the screen.

Pixel data included in the depth map only expresses the luminances of a single color, and therefore the bit rate of the depth map is generally lower than both the bit rates of the base-view and right-view video streams. Accordingly, the interleaved arrangement of extents shown in FIG. 13 is effective.

Audio Stream Conforming to DTS Extended Standard

Extended data is not limited to a video stream, but may also be an audio stream. In particular, extended data may be an audio stream conforming to the DTS extended standard. The DTS extended standard includes DTS-ES (Extended Surround), DTS-HD master audio, and DTS-HD high-resolution sound. In all of these standards, the extended stream contains a data portion as extended data; the data portion is to be combined with the primary audio stream included in the main TS. Combining this data portion with the primary audio stream improves audio quality and increases the number of channels for surround sound. In the playback device 102 in extended playback mode, the primary audio decoder 4474 decodes the primary audio stream from the main TS, and in parallel decodes the extended data from the extended stream, and then constructs a target audio stream from the decoded data.

In an audio stream conforming to the DTS extended standard, portion extended from the primary audio stream included in the main TS has a data amount much smaller than both the data amounts of the base-view and dependent-view video streams. Accordingly, the interleaved arrangement of extents shown in FIG. 13 is effective.

Video Stream for Super Picture-in-Picture

Extended data may be secondary video streams to be combined with the primary video stream of the main TS. The playback device 102 in extended playback mode can simultaneously display three or more types of video images on one screen by using the combination of the extended data and the primary video stream in addition to the secondary video streams of the main TS.

In picture-in-picture, the secondary video stream typically has a resolution lower than that of the primary video stream. Accordingly, the video stream included in the extended stream generally has a bit rate lower than both the bit rates of the base-view and dependent-view video streams. Accordingly, the interleaved arrangement of extents shown in FIG. 13 is effective.

Additional Pictures in Temporal Scalable Coding

Extended data may be information necessary for increasing the frame rate of the base-view video stream. For example, when the base-view video stream has a frame rate of 60 fps, additional pictures necessary for raising this value to 120 fps is contained in the extended stream as extended data. In particular, the additional pictures are compressed with reference to base-view pictures. In the playback device 102 in extended playback mode, the primary video decoder 4470 decodes the base-view pictures from the main TS and in parallel decodes the additional pictures from the extended stream by using the base-view pictures. Furthermore, the primary video decoder 4470 inserts the additional pictures between the base-view pictures to increase the frame rate of the base-view video stream. This enables video images to change even finer over time.

Since the additional pictures are for changing video images even finer between base-view pictures, the similarity between the additional pictures and the base-view pictures are generally high. Accordingly, by compressing the additional pictures with reference to the base-view pictures, the extended stream can have a bit rate much lower than both the bit rates of the base-view and dependent-view video streams. Therefore, the interleaved arrangement of extents shown in FIG. 13 is effective.

Difference in Video Images Before and after Camera's Angle of View is Enlarged

Extended data may be differences in video images before and after a camera's angle of view is enlarged. In this case, the base-view video stream represents video images captured by a camera with the original angle of view. In the playback device 102 in extended playback mode, the primary video decoder 4470 decodes one video frame from the base-view video stream and in parallel decodes pixel data from the extended stream; the pixel data represents video images to be displayed in a region outside video images represented by a video frame. The primary video decoder 4470 then reconstructs one video frame from the data. As a result, video images to be displayed within a wider angular range than the original video images can be played back.

The pixel data representing video images to be displayed in a region outside video images represented by the original video frame contained in the base-view video stream generally has a total data amount much smaller than those of the original video frame. Accordingly, the extended stream has a bit rate much lower than both the bit rates of the base-view and dependent-view video streams. Therefore, the interleaved arrangement of extents shown in FIG. 13 is effective.

Dependent-View Video Stream

Extended data may be a dependent-view video stream to be combined with the base-view video stream of the main TS to represent 3D video images, or alternatively may be information representing parallax between left and right views that are generated from combination between the base-view and dependent-view video streams. In this case, the playback device 102 in extended playback mode plays back 3D video images, like the playback device 102 in 3D playback mode. The dependent-view video stream of the extended stream differs from that of the sub-TS in the degree of parallax between left and right views generated from combination with the common base-view video stream.

The parallax between left and right views has a maximum value normally equal to or shorter than an average viewer's interpupillary distance (in the case of children, 5 cm or less). As long as this condition is satisfied, the parallax will not exceed the viewer's interpupillary distance. This can reduce the viewer's risk of visually induced motion sickness and eye strain. Left and right views with larger parallax are displayed on a larger screen of the display device 103. For example, when the dependent-view video stream of the sub-TS can be combined with the base-view video stream to generate left and right views having parallax suitable for a screen size of 50 inches or less, the dependent-view video stream of the extended stream is designed to be combined with the base-view video stream to generate left and right views having parallax suitable for a screen size of 100 inches or less.

When playing back 3D video images from the BD-ROM disc 101, the playback control unit 4035 in the playback device 102 selects 3D playback mode or extended playback mode, whichever is suitable for the screen size of the display device 103. Specifically, the playback control unit 4035 first acquires the screen size from the display device 103 via the HDMI cable 122. Next, the playback control unit 4035 selects 3D playback mode if the screen size of the display device 103 is equal to or less than 50 inches, and selects extended playback mode if the screen size is larger than 50 inches but does not exceed 100 inches. Therefore, the parallax between left and right views is set to a value appropriate for the screen size.

The playback device 102 in extended playback mode reads all of base-view, dependent-view, and extended extents in order, in contrast to reading extents according to the third playback path 1203 shown in FIG. 12. The playback device 102 then uses the file entries of the file SS and the extended stream file as well as the extent start points contained in the 3D clip information file to distribute the read extents among the RB1 4021, the RB2 4022, and the RB3 4023. The system target decoder 4024 provides the primary video decoder with source packets containing the base-view video stream, the dependent-view video stream, and the extended data from the RB1 4021, the RB2 4022, and the RB3 4023, respectively. When the extended data includes dependent-view pictures, the dependent-view pictures are highly similar to dependent-view pictures of the sub-TS, and therefore are compressed with reference to dependent-view pictures of the sub-TS. In this case, the primary video decoder uses dependent-view pictures of the sub-TS to decode dependent-view pictures from the extended data. On the other hand, when the extended data includes parallax information, the primary video decoder uses the parallax information to shift pixel data to the left or right in a dependent-view picture of the sub-TS. By combining a resulting dependent-view picture with a base-view picture, the primary video decoder constructs a pair of video frames representing left and right views.

The extended data is either pictures compressed with reference to the dependent-view pictures of the sub-TS or parallax information. Accordingly, the extended stream has a bit rate much lower than both the bit rates of the base-view video stream and the dependent-view video stream of the sub-TS. Therefore, the interleaved arrangement of extents shown in FIG. 13 is effective.

Resolution Extension Information for 3D Video Images

Extended data may include not only resolution extension information for the base-view video stream but also resolution extension information for the dependent-view video stream. In this case, the playback device 102 in extended playback mode plays back 4K2K 3D video images as follows.

The playback device 102 in extended playback mode reads all of base-view, dependent-view, and extended extents in order, in contrast to reading extents according to the third playback path 1203 shown in FIG. 12. The playback device 102 then uses the file entries of the file SS and the extended stream file as well as the extent start points contained in the 3D clip information file to distribute the read extents among the RB1 4021, the RB2 4022, and the RB3 4023. The system target decoder 4024 provides the primary video decoder with source packets containing the base-view video stream, the dependent-view video stream, and the extended data from the RB1 4021, the RB2 4022, and the RB3 4023, respectively. The primary video decoder first decodes full HD base-view and dependent-view pictures. The primary video decoder then increases the resolution of each picture to 4K2K through the interpolation method indicated by the resolution extension information. Next, the primary video decoder adds pixel difference information to each picture with increased resolution. thus generating a pair of video frames representing 4K2K left and right views.

The resolution extension information has a data amount much smaller than both base-view and dependent-view pictures. Accordingly, the extended stream has a bit rate much lower than both the bit rates of the base-view video stream and the dependent-view video stream of the sub-TS. Therefore, the interleaved arrangement of extents shown in FIG. 13 is effective.

Physiological Information

Application of 3D video image technology to medical care is also in progress. For example, when a surgeon operates a surgical robot during endoscopic surgery, 3D video images of the operative field are presented to the surgeon. Alternatively, 3D video images of surgery scene are used for monitoring the progress of surgery, conferences, presentations at academic meetings, and education of medical students. In these cases, extended data may be video images to be displayed on a physiological information monitor, or may be physiological information itself. Physiological information is information about patient's physical conditions, in particular, patient's vital signs such as an electrocardiogram, pulse rate, respiratory rate, blood pressure, body temperature, and brain waves. The playback device 102 in extended playback mode generates graphics images representing physiological information from the extended data, and then combines the graphics images with 2D video images represented by the main TS. Thus, the playback device 102 enables the display of patient's physiological information to overlap 2D video images of operative fields.

Video images displayed on a physiological information monitor are relatively simple graphics images. Furthermore, physiological information itself is simply numerical data. Accordingly, the extended stream has a bit rate much lower than both the bit rates of the main TS and the sub-TS. Therefore, the interleaved arrangement of extents shown in FIG. 13 is effective.

Additional Color Information for Bit Extension

Extended data may be information necessary for increasing the number of bits of color information included in pixel data of the base-view pictures. For example, when the pixel data of the base-view pictures expresses each of RGB or YCrCb color coordinates with eight bits, information necessary for converting the color coordinates to 12-bit representation is contained in the extended stream as extended data.

Figure 49:
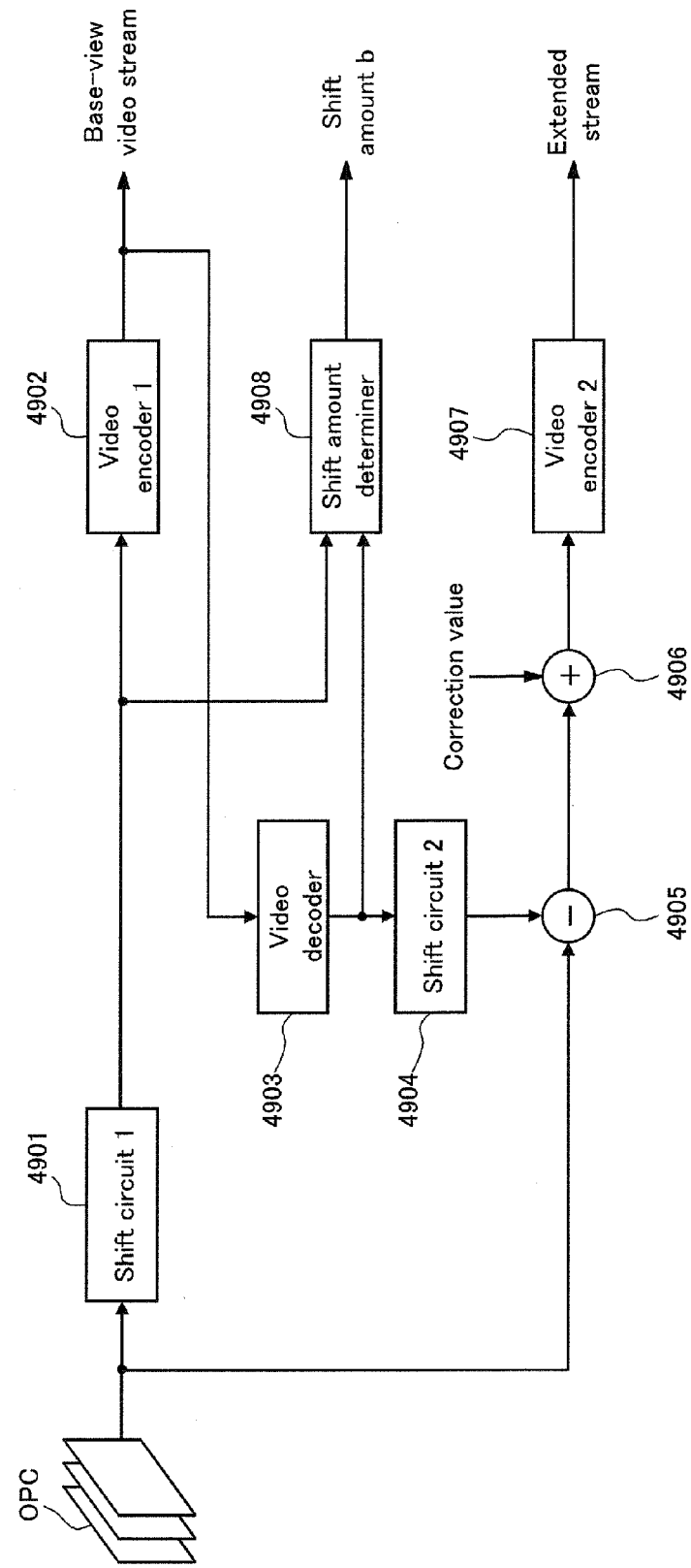
FIG. 49 is a block diagram of a system that generates a base-view video stream and an extended stream from a sequence of original pictures.

FIG. 49 is a block diagram of a system that generates a base-view video stream and an extended stream from a sequence of original pictures. As shown in FIG. 49, the system includes shift circuit 1 4901, video encoder 1 4902, a video decoder 4903, shift circuit 2 4904, a subtractor 4905, an adder 4906, video encoder 2 4907, and a shift amount determiner 4908.

Shift circuit 1 4901 extracts a bit sequence representing each color coordinate from pixel data of the original pictures OPC, and then shifts the bit sequence to the right by (N−8) bits. As a result, the number of bits representing each color coordinate is reduced from N to 8. Here, the number N is an integer larger than 8. When the original pictures OPC represent video images of a movie or the like, the number N is often 10 or 12.

Video encoder 1 4902 encodes and converts the original pictures OPC processed by shift circuit 1 4901 into the base-view video stream. The original pictures OPC are thus compressed and multiplexed into the base-view video stream. A compression encoding method to be used is MPEG-2, MPEG-4 AVC, MVC, or SMPTE VC-1. In particular, when MPEG-4 MVC is used, the pictures OPC are encoded as "Base view."

The video decoder 4903 decodes pictures from the base-view video stream generated by video encoder 1 4902. Here, the encoding by video encoder 1 4902 is irreversible. Accordingly, decoded pictures differ from pictures before processed by video encoder 1 4902 in a few lower-order bits among eight bits representing each color coordinate.

Shift circuit 2 4904 extracts a bit sequence representing each color coordinate from pixel data of pictures decoded by the video decoder 4903, and then shifts the bit sequence to the left by (N−8) bits. As a result, (N−8) zeros are added to the right of the bit sequence, thereby increasing the number of bits representing each color coordinate from 8 to N.

The subtractor 4905 compares pictures processed by the series of shift circuit 1 4901, video encoder 1 4902, the video decoder 4903, and shift circuit 2 4904 with the original pictures OPC, thus calculating a difference in N bits representing each color coordinate between pixels corresponding to each other. When the number of bits representing the difference exceeds eight, the subtractor 4905 rounds its lower-order bits up or down, so that the number of bits is limited up to eight. The difference in color coordinate and the output of the subtractor 4905 can therefore be treated as a new color coordinate and a picture, respectively. Hereinafter, this picture is referred to as an "extended picture."

The adder 4906 adds a correction value to the difference calculated by the subtractor 4905. The difference, even if negative, is thus converted into a positive number. Here, when video encoder 2 4907 can process pixel data that includes negative numbers, the adder 4906 may be omitted.

Video encoder 2 4907 encodes and converts extended pictures processed by the adder 4906 into the extended stream. The extended pictures are thus compressed and multiplexed into the extended stream. A compression encoding method to be used is MPEG-2, MPEG-4 AVC, MVC, or SMPTE VC-1. In particular, when MPEG-4 MVC is used, the extended pictures are encoded as "Non baseview." In other words, the extended stream has the same data structure as the dependent-view video stream.

The shift amount determiner 4908 first compares a picture processed by shift circuit 1 4901 with another picture decoded by the video decoder 4903 to check how many consecutive bits starting from the most significant bit of eight bits representing each color coordinate, pixels corresponding to each other have in common. Next, the shift amount determiner 4908 determines the smallest number of bits among the checked ones for each picture as being a shift amount for the picture. When the smallest number exceeds N−8, the shift amount is fixed at N−8. The shift amount determiner 4908 then incorporates the shift amount for each picture into the base-view video stream or the extended stream. In this case, the shift amount is incorporated into the supplementary data 831D, 832D, etc., of each VAU shown in FIG. 8. Alternatively, the shift amounts for all pictures included in each video sequence may be incorporated collectively into the supplementary data of VAU #1, i.e., the VAU located at the top of the video sequence.

Figure 50:
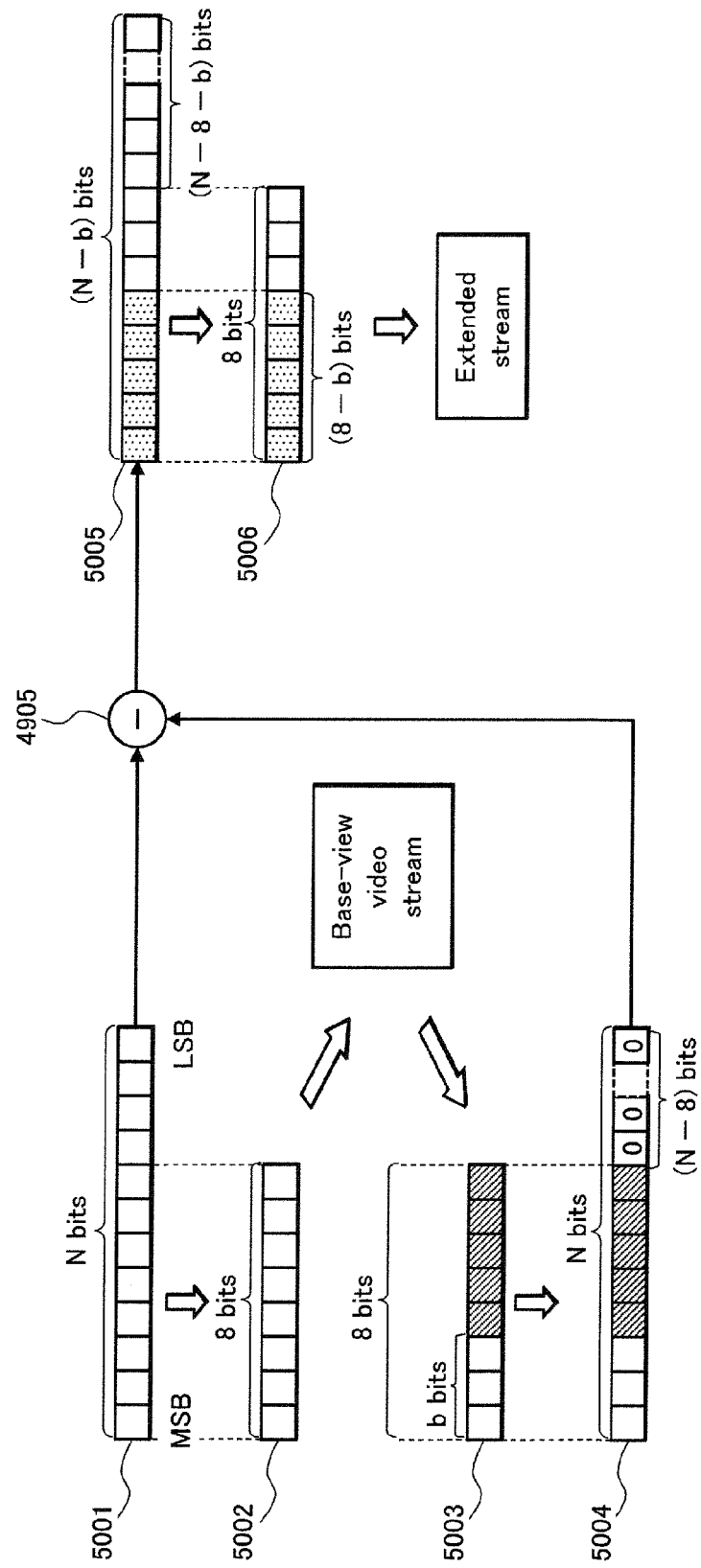
FIG. 50 is a schematic diagram showing a method of processing color coordinates in the system shown in FIG. 49.

FIG. 50 is a schematic diagram showing a method of processing color coordinates by the system shown in FIG. 49. As shown in FIG. 50, shift circuit 1 4901 first shifts N bits 5001 to the right by (N−8) bits; for example, the N bits 5001 represent a red color coordinate in data of one pixel included in the original pictures OPC. The eight higher-order bits 5002 are thus extracted from the N bits 5001 and incorporated into the base-view video stream by video encoder 1 4902. From the base-view video stream, eight bits 5003 representing the red color coordinate in the above-mentioned data of one pixel are decoded by the video decoder 4903. Shift circuit 2 4904 shifts these eight bits 5003 to the left by (N−8) bits. (N−8) zeros are thus added to the right of the eight bits 5003, then yielding new N bits 5004. The subtractor 4905 calculates the difference 5005 between the new N bits 5004 and the original N bits 5001. Furthermore, the subtractor 4905 extracts the eight higher-order bits 5006 from the difference 5005, and the video encoder 2 4907 incorporates the higher-order bits 5006 into the extended stream. Similar processing is performed for other color coordinates as well.

As indicated by the hatched areas in FIG. 50, the decoded eight bits 5003 differs from the original eight bits 5002 in the $(b+1)^{th}$ and subsequent bits from the most significant bit. Here, the number b is an integer at least zero and not more than eight. In this case, the difference 5005 is (N−b) bits. As indicated by the dotted areas in FIG. 50, the difference 5005 differs from (N−b) lower-order bits of the original N bits 5004 in (8−b) higher-order bits. The shift amount determiner 4908 calculates the value b for each color coordinate, and then determines the smallest value among the values b calculated for all color coordinates included in each picture as being the shift amount b for the picture. When the smallest value exceeds N−8, the shift amount b is fixed at N−8.

Figure 51:
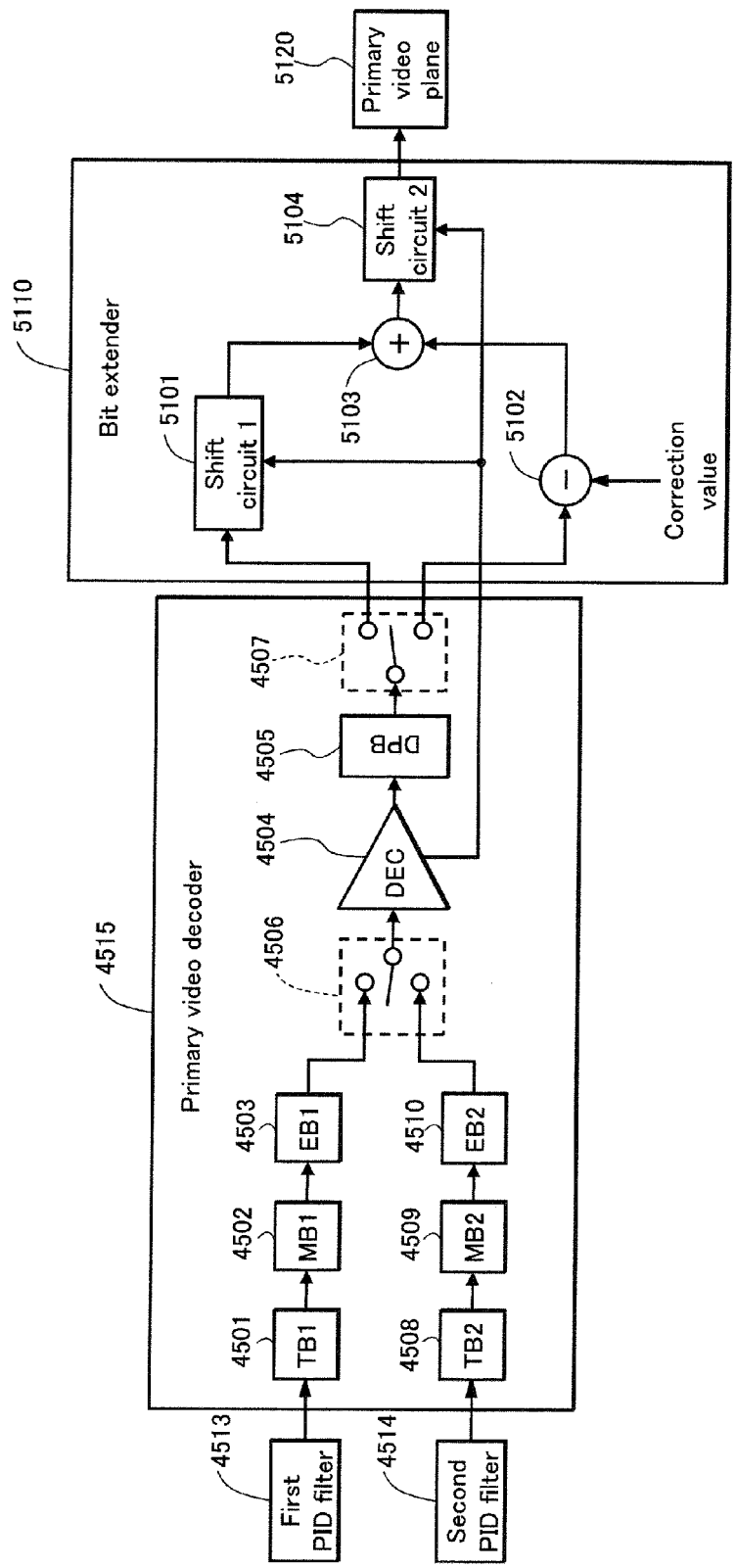
FIG. 51 is a block diagram showing an example of a processing system that is built in the system target decoder in extended playback mode to process the base-view video stream and the extended stream.

FIG. 51 is a block diagram showing an example of a processing system that is built in the system target decoder in extended playback mode to process the base-view video stream and the extended stream. As shown in FIG. 51, this processing system includes a first PID filter 4513, a second PID filter 4514, a primary video decoder 4515, a bit extender 5110, and a primary video plane memory 5120. The two PID filters 4513, 4514, and the primary video decider 4515 are similar to those shown in FIG. 45. Accordingly, differences from the elements shown in FIG. 45 are described below. Details on elements similar to those shown in FIG. 45 can be found in the description thereof.

Via the buffer switch 4506, the compressed video decoder (DEC) 4504 receives base-view and extended pictures from the first PID filter 4513 and the second PID filter 4514, respectively. The DEC 4504 then decodes the pictures in the order in which they were received. The DEC 4504 also reads the shift amounts b from the supplementary data or the like of the VAUs containing the pictures and then transmits the shift amounts b to the bit extender 5110.

The bit extender 5110 combines an extended picture and a base-view picture to which the same PTS has been assigned to increase the number of bits, which represent each color coordinate in pixel data, from eight to N. The bit extender 5110 includes shift circuit 1 5101, a subtractor 5102, an adder 5103, and shift circuit 2 5104.

Shift circuit 1 5101 first receives a decoded base-view picture and a shift amount b from the picture switch 4507 and the DEC 4504, respectively. Shift circuit 1 5101 next extracts a bit sequence representing each color coordinate from pixel data of the base-view picture, and then shifts the bit sequence to the left by b bits. As a result, b zeros are added to the right of the bit sequence, thereby increasing the number of bits representing the color coordinate from 8 to 8+b.

The subtractor 5102 receives a decoded extended picture from the picture switch 4507, and then removes a correction value from a bit sequence representing each color coordinate in pixel data of the extended picture. The correction value equals the correction value used by the adder 4906 shown in FIG. 49. Here, when the adder 4906 is omitted from the system shown in FIG. 49, the subtractor 5102 is omitted from the bit extender 5110.

The adder 5103 first receives (8+b) bits and 8 bits from shift circuit 1 5101 and the subtractor 5102, respectively; the (8+b) bits represent each color coordinate in pixel data of a base-view picture, and the 8 bits represent a difference in color coordinate included in pixel data of the corresponding extended picture. The adder 5103 next calculates the sum of these received bits.

Shift circuit 2 5104 first receives (8+b) bits representing a color coordinate from the adder 5103, and receives a shift amount b from the DEC 4504. Shift circuit 2 5104 next shifts the (8+b) bits to the left by (N−8−b) bits. As a result, (N−8−b) zeros are added to the right of the (8+b) bits, so that the number of bits representing the color coordinate increases from 8+b to N. Shift circuit 2 5104 then writes the N bits representing the color coordinate into the primary video plane memory 5120.

The primary video plane memory 5120 is a region that is reserved in a memory element built in the system target decoder 4024. A full HD primary video plane that is composed of pixel data representing each color coordinate with N bits can be stored in the primary video plane memory 5120.

Figure 52:
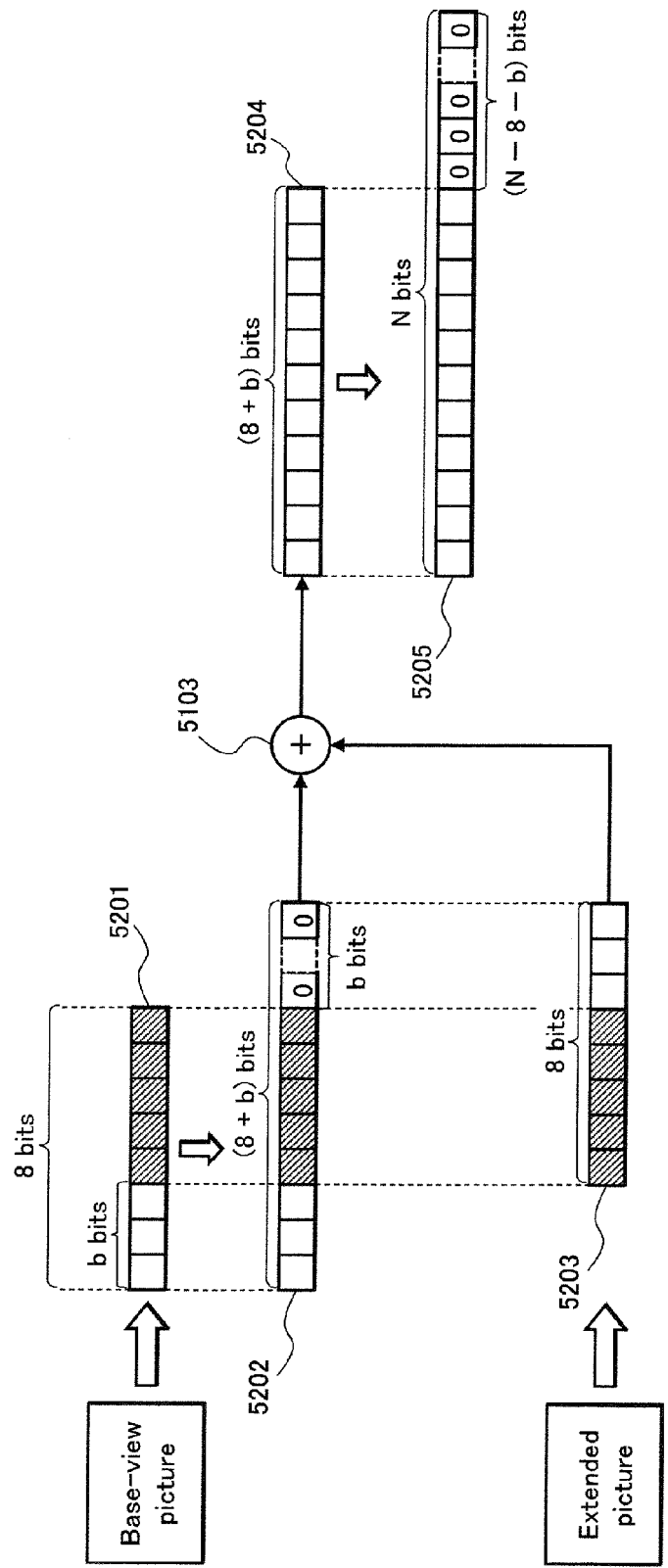
FIG. 52 is a schematic diagram showing a method of processing color coordinates by the bit extender shown in FIG. 51.

FIG. 52 is a schematic diagram showing a method by which the bit extender 5110 processes color coordinates. As shown in FIG. 52, shift circuit 1 5101 first shifts eight bits 5201 to the left by b bits; for example, the eight bits 5201 represent a red color coordinate in data of one pixel included in a decoded base-view picture. As a result, b zeros are added to the right of the eight bits 5201, and thus the eight bits 5201 are converted into (8+b) bits 5202. Next, the adder 5103 adds eight bits 5203 to the (8+b) bits 5202; the eight bits 5203 represent a difference in red color coordinate in data of the corresponding pixel included in a decoded extended picture. Shift circuit 2 5104 then shifts the resultant (8+b) bits 5204 to the left by (N−8−b) bits. (N−8−b) zeros are thus added to the right of the (8+b) bits 5204, thus yielding new N bits 5205. As is clear from FIG. 50, (8+b) higher-order bits of the new N bits 5205 nearly match with (8+b) higher-order bits of the original N bits 5001 representing a red color coordinate in data of the corresponding pixel included in the original pictures OPC. The error in the higher-order bits are an error arising from encoding of the extended picture, i.e., a difference between the difference 5006 before the encoding and the difference 5203 after the decoding, which are shown in FIGS. 50 and 52, respectively. Accordingly, the difference between the new N bits 5205 and the original N bits 5001 is much smaller than the difference between the N bits 5004 after the decoding, which are shown by the hatched areas in FIG. 50, and the original N bits 5001. Similar processing is performed for other color coordinates as well. In this way, the bit extender 5110 can restore the original pictures OPC at a high level of accuracy from the combination of the base-view pictures and the extended pictures.

Figure 53:
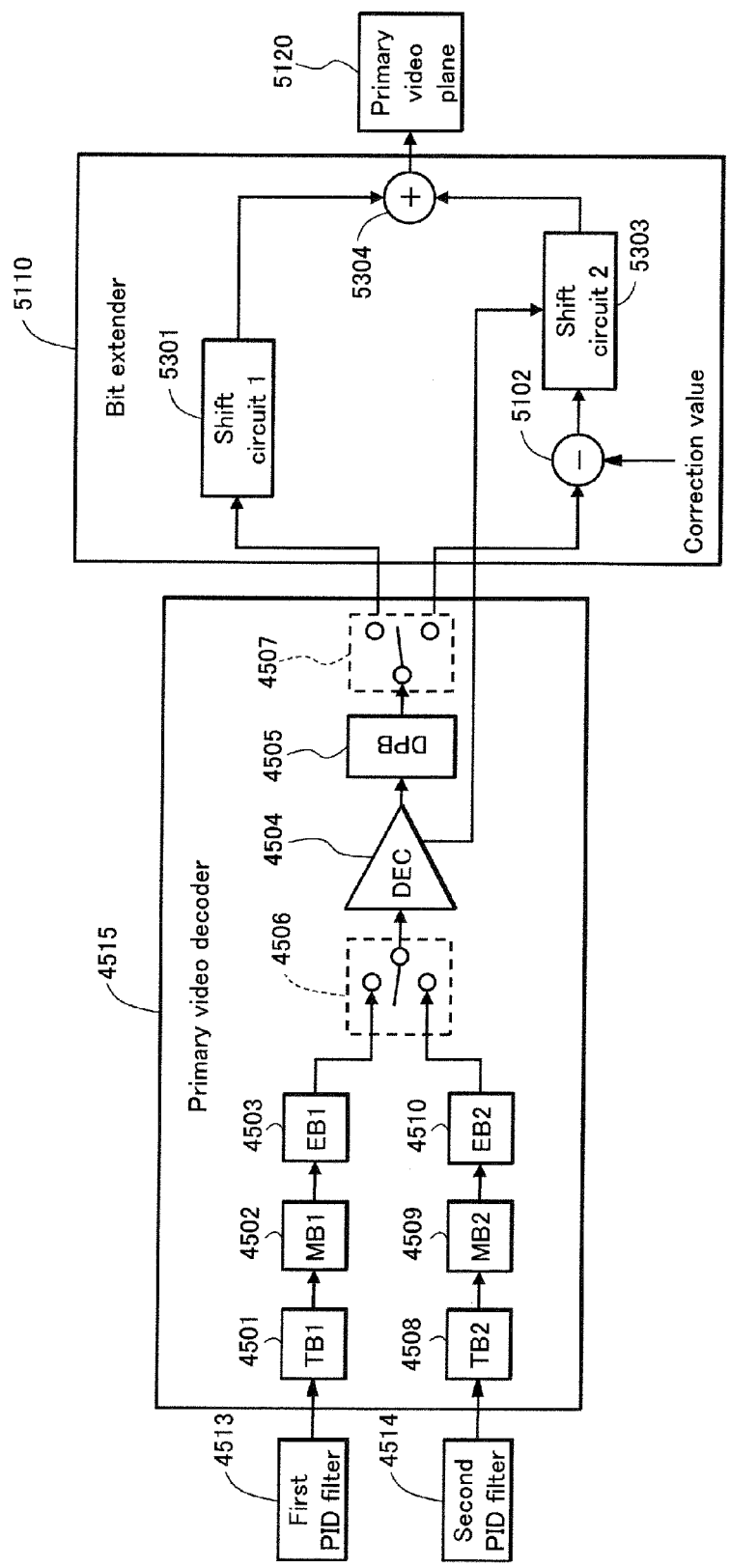
FIG. 53 is a block diagram showing another example of a processing system that is built in the system target decoder in extended playback mode to process the base-view video stream and the extended stream.

FIG. 53 is a block diagram showing another example of a processing system that is built in the system target decoder in extended playback mode to process the base-view video stream and the extended stream. As shown in FIG. 53, this processing system is similar to the one shown in FIG. 51, except for the bit extender 5310. Accordingly, the differences from the elements shown in FIG. 51 are described below. Details on the similar elements can be found in the description about the elements shown in FIG. 51.

The bit extender 5310 combines an extended picture and a base-view picture to which the same PTS has been assigned, and thus increases the number of bits representing a color coordinate in pixel data from eight to N. The bit extender 5310 includes shift circuit 1 5301, the subtractor 5102, shift circuit 2 5303, and an adder 5304.

Shift circuit 1 5301 first receives a decoded base-view picture from the picture switch 4507, next extracts bit sequences representing color coordinates from data of each pixel in the base-view picture, and then shifts each of the bit sequences to the left by (N−8) bits. As a result, (N−8) zeros are added to the right of each of the bit sequences, thereby increasing the number of bits representing each color coordinate from eight to N−8.

Shift circuit 2 5303 first receives eight bits representing the difference in color coordinate from the subtractor 5102, and a shift amount b from the DEC 4504. Shift circuit 2 5303 next shifts the eight bits to the left by (N−8−b) bits. As a result, (N−8−b) zeros are added to the right of the eight bits, thereby increasing the number of bits representing the difference in color coordinate from eight to N−b.

The adder 5304 first receives N bits and (N−b) bits from shift circuit 1 5301 and shift circuit 2 5303, respectively; the N bits represent a color coordinate in data of each pixel included in the base-view picture, and the (N−b) bits represent the difference in color coordinate in data of the corresponding pixel included in the extended picture. The adder 5304 next calculates the sum of the N and (N−b) bits, and then writes N bits representing the sum into the primary video plane memory 5120.

Figure 54:
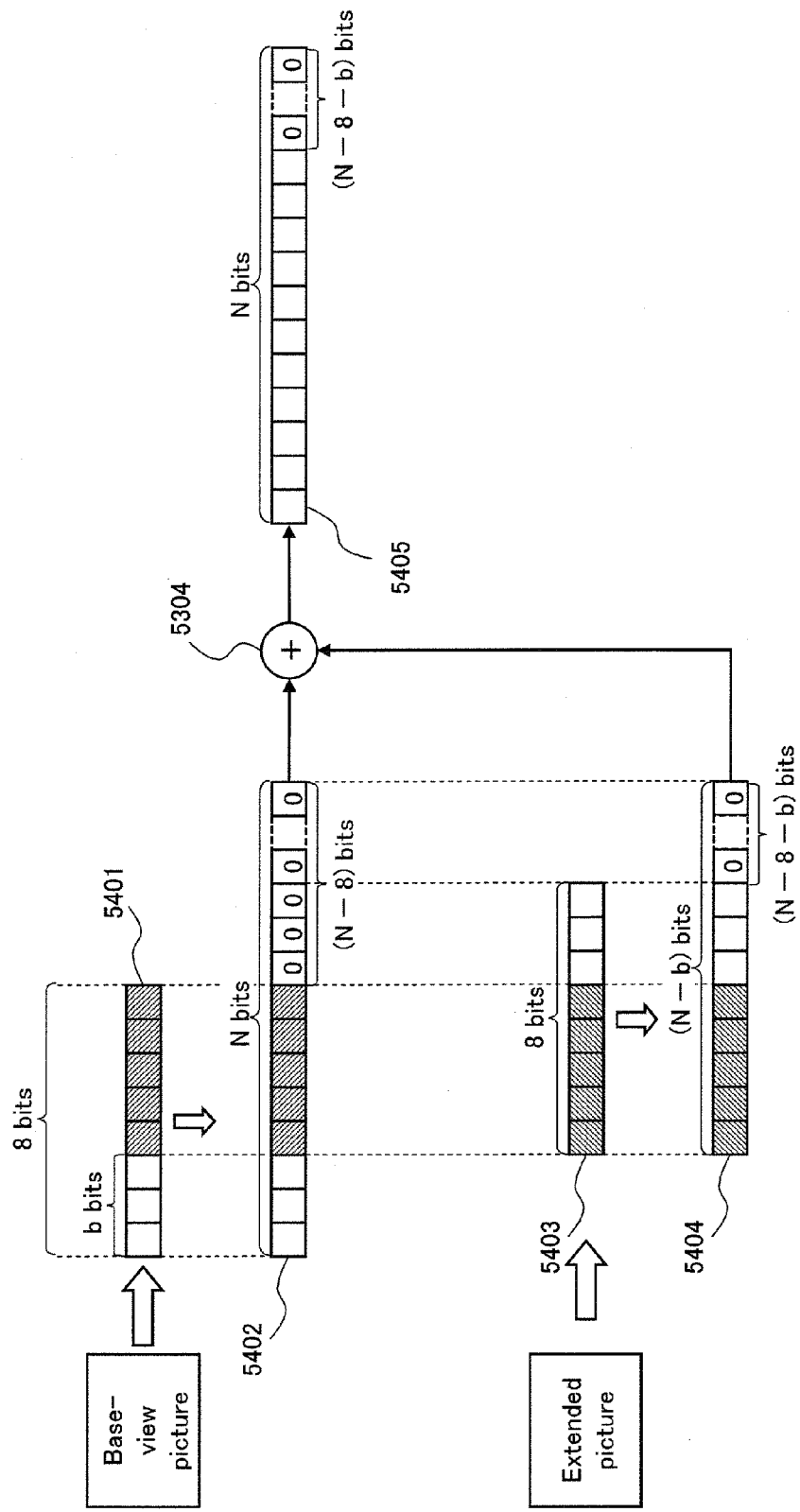
FIG. 54 is a schematic diagram showing a method of processing color coordinates by the bit extender shown in FIG. 53.

FIG. 54 is a schematic diagram showing a method by which the bit extender 5310 processes color coordinates. As shown in FIG. 54, shift circuit 1 5301 first shifts eight bits 5401 to the left by (N−8) bits; for example, the eight bits 5401 represent a red color coordinate in data of one pixel included in the decoded base-view picture. (N−8) zeros are thus added to the right of the eight bits 5401, thus yielding N bits 5402. On the other hand, shift circuit 2 5303 shifts other eight bits 5403 to the left by (N−8−b) bits; the eight bits 5403 represent the difference in red color coordinate in data of the corresponding pixel included in the decoded extended picture. As a result, (N−8−b) zeros are added to the right of the eight bits 5403, and thus the eight bits 5403 are converted into (N−b) bits 5404. Subsequently, the adder 5304 adds the (N−b) bits 5404 representing the difference to the yielded N bits 5402, thus yielding new N bits 5405. As is clear from FIG. 50, (8+b) higher-order bits of the new N bits 5405 nearly match with (8+b) higher-order bits of the original N bits 5001 representing the red color coordinate in data of the corresponding pixel included in the original pictures OPC. The error in the higher-order bits are the error arising from encoding of the extended picture, i.e., the difference between the difference 5006 before the encoding and the difference 5403 after the decoding, which are shown in FIGS. 50 and 54, respectively. Accordingly, the difference between the new N bits 5405 and the original N bits 5001 is much smaller than the difference between the N bits 5004 after the decoding, which are shown by the hatched areas in FIG. 50, and the original N bits 5001.

Similar processing is performed for other color coordinates as well. In this way, the bit extender 5310 can restore the original pictures OPC at a high level of accuracy from the combination of the base-view pictures and the extended pictures.

The data amount of the differences between color coordinates included in pixel data of the extended pictures is generally smaller than the data amount of color coordinates included in pixel data of the base-view pictures. Accordingly, the extended stream has generally a bit rate lower than both the bit rates of the base-view video stream and the dependent-view video stream. Therefore, the interleaved arrangement of extents shown in FIG. 13 is effective.

Embodiment 2

A recording device according to Embodiment 2 of the present invention records, in real-time, an AV stream file using the arrangement of extents according to Embodiment 1 of the present invention onto a writable recording medium, such as a BD-RE (Rewritable), BD-R (Recordable), hard disk, semiconductor memory card, or the like (hereinafter referred to as a BD disc or the like) that is mounted in an optical disc recorder or a video camera. The recording device converts a moving video content filmed by the video camera, or a content playback from another recording medium such as a BD-ROM disc, into an AV stream file using a predetermined compression encoding method and records the AV stream file on the recording medium. The content is expressed as both 2D video images at 4K2K and as full HD 3D video images. Next, the recording device generates a scenario. A "scenario" is information defining how each title included in the content is to be played back. Specifically, a scenario includes dynamic scenario information and static scenario information. The recording device then records the scenario on the recording medium.

Structure of Recording Device

Figure 55:
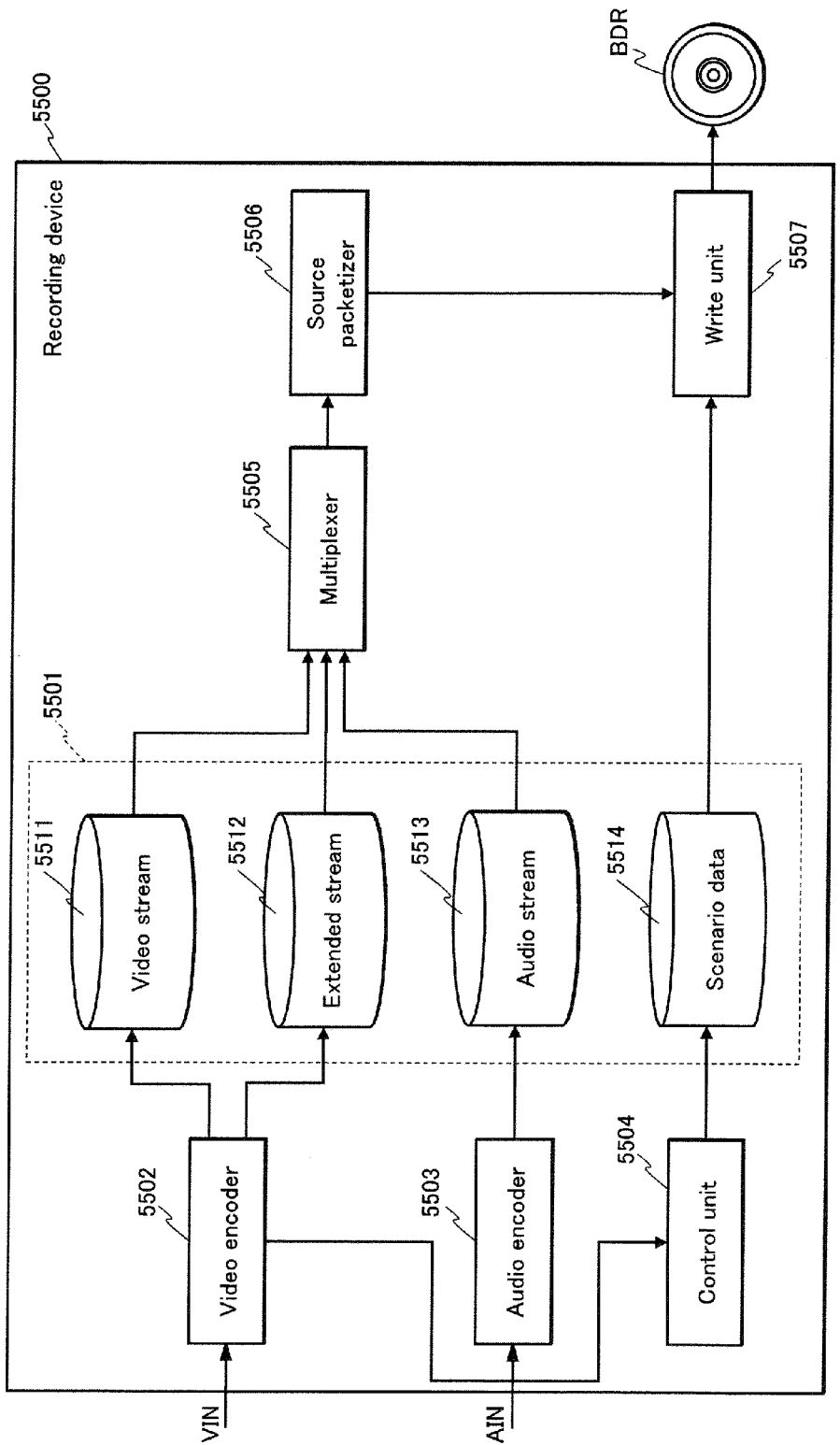
FIG. 55 is a functional block diagram of a recording device according to Embodiment 2 of the present invention.

FIG. 55 is a functional block diagram of a recording device according to Embodiment 2. As shown in FIG. 55, the recording device 5500 includes a storage unit 5501, a video encoder 5502, an audio encoder 5503, a control unit 5504, a multiplexer 5505, a source packetizer 5506, and a write unit 5507.

The storage unit 5501 is a storage device embedded in the recording device 5500 and is in particular an HDD. Alternatively, the storage unit 5501 may be an external HDD connected to the recording device 5500, or a semiconductor memory device internal or external to the recording device 5500.

The video encoder 5502 is dedicated hardware for encoding of video data. Alternatively, the video encoder 5502 may be an element that functions by the CPU internal to the recording device 5500 executing specific software. The video encoder 5502 compresses an analog or digital input video signal VIN using a compression encoding method such as MPEG-4 AVC, MVC, or MPEG-2. The video data is thus converted into a combination of a base-view video stream, a dependent-view video stream, and an extended stream. The converted video streams 5511 and the extended stream 5512 are stored in the storage unit 5501.

The video encoder 5502 uses a multiview coding method such as MVC to encode the 3D video image data. The 3D video image data is thus converted into a pair of a base-view video stream and a dependent-view video stream as shown in FIG. 7. In other words, the video frame sequence representing the left view is converted into a base-view video stream via inter-picture predictive encoding on the pictures in these video frames. On the other hand, the video frame sequence representing the right view is converted into a dependent-view video stream via predictive encoding on not only the pictures in these video frames, but also the base-view pictures. Note that the video frames representing the right view may be converted into a base-view video stream, and the video frames representing the left view may be converted into a dependent-view video stream.

When encoding the 3D video image data, the video encoder 5502 compares the left-view picture and the right-view picture before compression by macroblock during the inter-picture predictive encoding process, each macroblock being 8×8 or 16×16 pixels, in order to detect movement vectors in the video images between the pictures. The video encoder 5502 uses the detected movement vectors to compress each picture. The video encoder 5502 may instead use the movement vectors to calculate the binocular parallax of the video images, detecting depth information for each video image from the binocular parallax thereof. The video encoder 5502 may then use this depth information to generate a depth map for the left view or right view. In this case, the video encoder 5502 uses inter-picture predictive encoding on the pictures in the left-view or right-view stream data and the depth map stream to convert these into a base-view video stream and a depth map stream.

When encoding 2D video image data at 4K2K, the video encoder 5502 first extracts a full HD video frame from the base-view video stream obtained by encoding the 3D video image data and converts the video frame to a 4K2K video frame using a bicubic or a bilinear interpolation method. Next, the video encoder 5502 compares the converted 4K2K video frame with the original 4K2K video frame to generate pixel difference information. The video encoder 5502 then generates resolution extension information from the generated pixel difference information and converts the resolution extension information into the extended stream.

The audio encoder 5503 is dedicated hardware for encoding of audio data. Alternatively, the audio encoder 5503 may be an element that functions by the CPU internal to the recording device 5500 executing specific software. The audio encoder 5503 generates an audio stream 5513 from an audio input signal AIN, storing the audio signal 5513 in the storage unit 5501. The audio input signal AIN is, for example, LPCM audio data and is encoded using a compression encoding method such as AC-3.

The control unit 5504 is an element that functions by the CPU internal to the recording device 5500 executing specific software. The control unit 5504 generates scenario data 5514 and stores the scenario data 5514 in the storage unit 5501. The scenario data 5514 includes an index file, an MV object file, a clip information file, and a playlist file and specifies the playback method of the elementary streams 5511-5513 stored in the storage unit 5501.

In particular, the control unit 5504 generates the entry map of the clip information file in real-time as follows. Each time the video encoder 5502 encodes one GOP, the video encoder 5502 transmits a PTS and two SPNs to the control unit 5504; the PTS is included in the I or P picture located at the top of the GOP; the first SPN is assigned to the top of source packets in which the I or P picture is to be stored; and the second SPN is assigned to the top of source packets in which resolution extension information on the I or P picture is to be stored. The control unit 5504 adds the PTS and the first SPN transmitted by the video encoder 5502 to the entry map as one entry point.

The control unit 5504 also generates the extent start points 2742 and 2920 shown in FIGS. 29A and 29B by referring to the respective entry maps of the 2D clip information file and the DEP clip information file. At this point, extent ATC times are aligned between extent pairs. Furthermore, the control unit 5504 designs the arrangement of extents so that the size of each base-view extent, dependent-view extent, and extended extent satisfies conditions 1-6. In particular, immediately before or immediately after locations where a long jump is necessary, an extended data specific section, a monoscopic video specific section, and a stereoscopic video specific section are provided, as in arrangement 1 shown in FIG. 14 or arrangement 2 shown in FIG. 15.

The control unit 5504 also extracts the stream attribute information 2720 shown in FIG. 27 from the elementary stream in which the main TS, the sub-TS, and the extended stream are to be multiplexed and associates a combination of an entry map 2730, 3D meta data 2740, and stream attribute information 2720 with a piece of clip information 2710, as shown in FIG. 27. The 2D clip information file, the DEP clip information file, and the extended clip information file are thus generated. Subsequently, the control unit 5504 generates the 2D playlist file, the 3D playlist file, and the extended playlist file by referring to each clip information file.

The multiplexer 5505 multiplexes the elementary streams 5511-5513 stored in the storage unit 5501 into stream data in MPEG2-TS format. Specifically, as shown in FIG. 5, each of the elementary streams 5511-5512 is first converted into a series of TS packets. The series of TS packets are then multiplexed into one sequence of multiplexed stream data. The main TS, the sub-TS, and the extended stream are thus generated. These pieces of multiplexed stream data are output to the source packetizer 5506.

The source packetizer 5506 converts each TS packet in the main TS, the sub-TS, and the extended stream into one source packet. The main TS, the sub-TS, and the extended stream are thus each converted into a series of source packet sequences and output to the write unit 5507.

The write unit 5507 first writes the source packet sequences generated by the source packetizer 5506 on a BDR, such as a BD disc, in accordance with the arrangement of extents designed by the control unit 5504. In parallel, the write unit 5507 generates the file entries for the file 2D, the file DEP, the file SS, and the extended stream file within internal memory. Upon completion of writing all the source packet sequences to the BDR, such as a BD disc, the write unit 5507 writes the file entry for each AV stream file to the BDR, such as a BD disc. Each source packet sequence is thus recorded on the BDR, such as a BD disc, as an AV stream file. Subsequently, the write unit 5507 records the scenario data 5514 stored in the storage unit 5501 on the BDR, such as a BD disc.

When generating the file entry of the AV stream file, the write unit 5507 refers to the entry map and the 3D metadata included in the clip information file. Each SPN for entry points and extent start points is thereby used in creating allocation descriptors. In particular, the value of the LBN and the extent size to be represented by each allocation descriptor are determined in accordance with the arrangement of extents designed by the control unit 5504 so as to express an interleaved arrangement like the one shown in FIG. 11.

Method to Align Extent ATC Times

Figure 56:
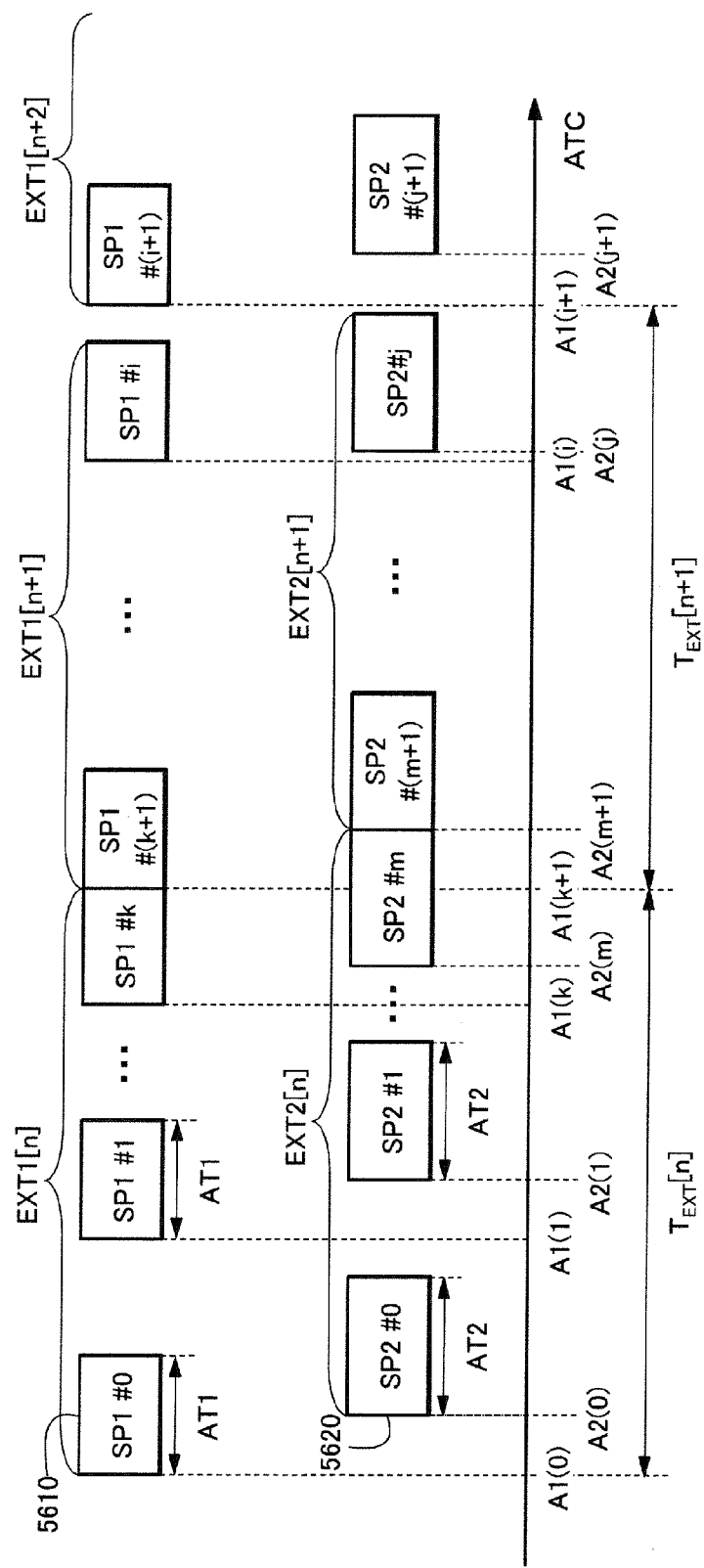
FIG. 56 is a schematic diagram showing a method to align extent ATC times between consecutive extents.

FIG. 56 is a schematic diagram showing a method to align extent ATC times between consecutive extents. For the sake of convenience, the following description applies to 3D playback mode. Extended playback mode is similar. First, ATSs along the same ATC time axis are assigned to source packets stored in a base-view extent (hereinafter, SP1) and source packets stored in a dependent-view extent (hereinafter, SP2). As shown in FIG. 56, the rectangles 5610 and 5620 respectively represent SP1 #p (p=0, 1, . . . , k, k+1, . . . , i, i+1) and SP2#q (q=0, 1, . . . , m, m+1, . . . , j, j+1). Here, the numbers i and j are integers at least one, the number k is an integer at least zero and at most i, and the number m is an integer at least zero and at most j. These rectangles 5610 and 5620 are arranged in order along the time axis by the ATS of each source packet. The positions A1(p) and A2(q) respectively of the top of each rectangle 5610 and 5620 represent the value of the ATS of the source packet. The length AT1 and AT2 respectively of each rectangle 5610 and 5620 represent the amount of time needed for the playback device in 3D playback mode to transfer one source packet from the read buffer to the system target decoder.

From the ATS A1(0) of SP1 #0 until an extent ATC time $T_{EXT}[n]$ has passed, SP1, i.e. SP1 #0, 1, 2, . . . , k, is transferred from the read buffer to the system target decoder and stored in the $(n+1)^{th}$ base-view extent EXT1[n] (the number n being an integer at least zero). Similarly, from the ATS A1(k+1) of SP1 #(k+1) until an extent ATC time $T_{EXT}[n+1]$ has passed, SP1, i.e. SP1 #(k+1), . . . , i, is transferred from the read buffer to the system target decoder and stored in the $(n+2)^{th}$ base-view extent EXT1[n+1].

On the other hand, SP2, which is to be stored in the $(n+1)^{th}$ dependent-view extent EXT2[n], is selected as follows. First, the sum of the ATS A1(0) of SP1 #0 and the extent ATC time $T_{EXT}[n]$ is sought as ATS A1(k+1) of SP1 #(k+1): ATS A1(k+1)=A1(0)+$T_{EXT}[n]$. Next, SP2, i.e. SP2 #0, 1, . . . , m, is selected. Transfer of SP2 from the read buffer to the system target decoder begins during the period from ATS A1(0) of SP1 #0 until ATS A1(k+1) of SP1 #(k+1). Accordingly, the top SP2, i.e. ATS A2(0) of SP2 #0, is always equal to or greater than the top SP1, i.e. ATS A1(0) of SP1 #0: A2(0)≥A1(0). Furthermore, the last SP2, i.e. ATS A2(m) of SP2 #m, is equal to or less than ATS A1(k+1) of SP1 #(k+1): A2(m)≤A1(k+1). In this context, completion of transfer of SP2 #m may be at or after ATS A1(k+1) of SP1 #(k+1).

Similarly, SP2, which is to be stored in the $(n+2)^{th}$ dependent-view extent EXT2[n+1], is selected as follows. First, ATS A1(i+1) of SP1 #(i+1), which is located at the top of the $(n+3)^{th}$ base-view extent EXT1[n+2], is calculated: ATS A1(i+1)=A1(k+1)+$T_{EXT}[n+1]$. Next, SP2, i.e. SP2 #(m+1), . . . , j, is selected. Transfer of SP2 from the read buffer to the system target decoder begins during the period from ATS A1(k+1) of SP1 #(k+1) until ATS A1(i+1) of SP1 #(i+1). Accordingly, the top SP2, i.e. ATS A2(m+1) of SP2 #(m+1), is equal to or greater than the top SP1, i.e. ATS A1(k+1) of SP1 #(k+1): A2(m+1)≥A1(k+1). Furthermore, ATS A2(j) of the last SP2 #j is equal to or less than ATS A1(i+1) of the SP1 #(i+1) located at the top of the next base-view extent EXT1[n+2]: A2(j)≤A1(i+1).

Real-time Recording of Content

Figure 57:
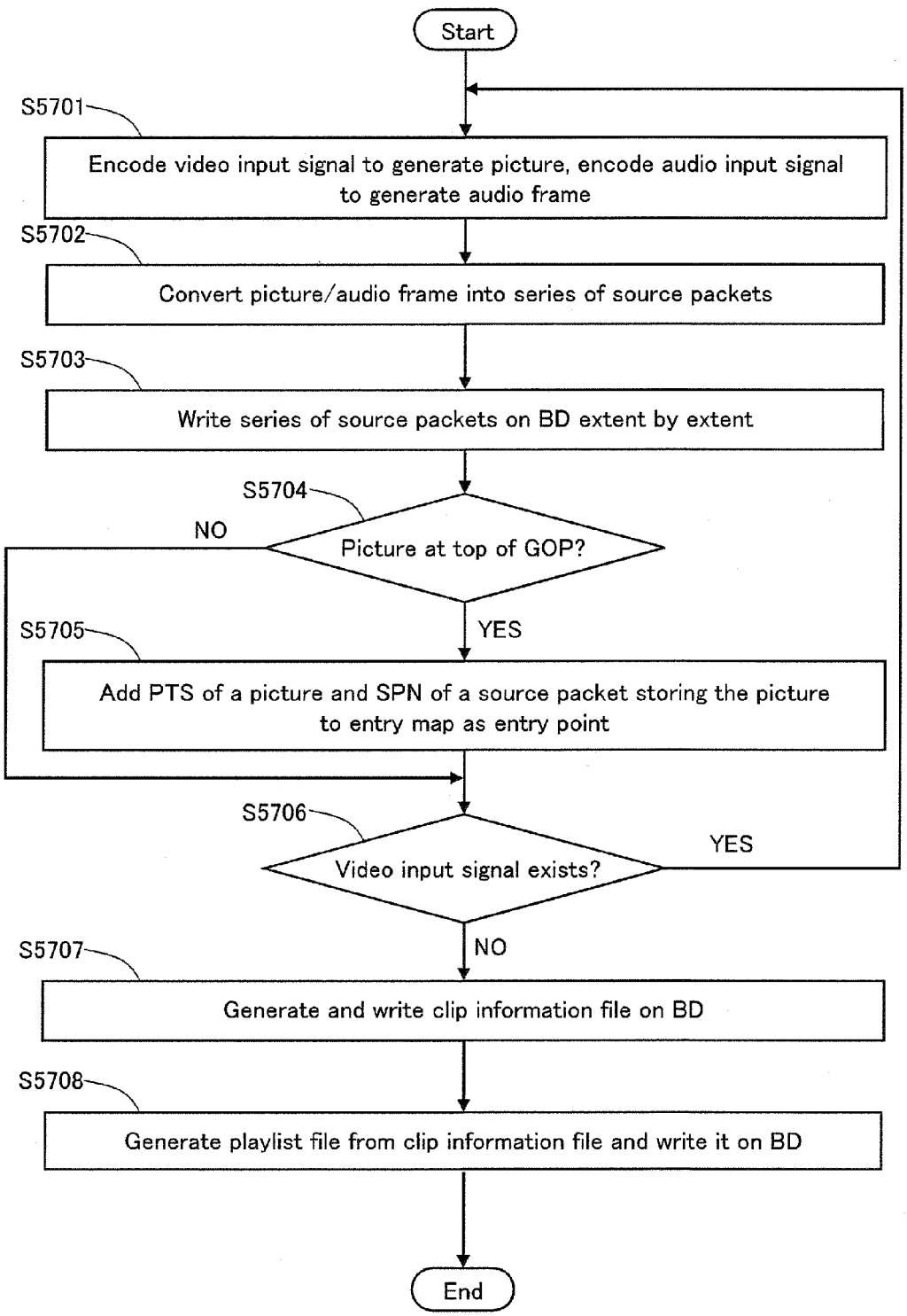
FIG. 57 is a flowchart of a method for real-time recording of content onto a BD disc or the like using the recording device shown in FIG. 55.

FIG. 57 is a flowchart of a method for real-time recording of content onto a BDR, such as a BD disc, using the recording device 5500 shown in FIG. 55. This method begins, for example, when power to the recording device 5500 is turned on.

In step S5701, the video encoder 5502 encodes a video input signal VIN to generate a picture and encodes an audio input signal AIN to generate an audio frame. In particular, the video frame representing the left view of a 3D video image is encoded as a base-view picture, and the video frame representing the right view is encoded as a dependent-view picture. Furthermore, a 4K2K video frame is converted into resolution extension information with reference to the base-view picture. The generated pictures, audio frame, and resolution extension information are stored in the storage unit 5501. Thereafter, processing proceeds to step S5702.

In step S5702, the multiplexer 5505 multiplexes the pictures, audio frame, and resolution extension information stored in the storage unit 5501 into one TS. Furthermore, the source packetizer 5506 converts the TS into a source packet sequence and transfers the source packet sequence to the write unit 5507. Thereafter, processing proceeds to step S5703.

In step S5703, the write unit 5507 accumulates the source packet sequence generated by the source packetizer 5506. Based on the accumulated source packet sequence, the control unit 5504 designs the arrangement of extents to be recorded on the BDR, such as a BD disc. The write unit 5507 writes the source packet sequences on the BDR, such as a BD disc, in accordance with the arrangement of extents designed by the control unit 5504. In parallel, the write unit 5507 generates the file entries for the AV stream files within internal memory. Thereafter, processing proceeds to step S5704.

In step S5704, the video encoder 5502 checks whether the picture generated in step S5701 is at the top of a GOP. If the picture is at the top of a GOP, processing proceeds to step S5705. If the picture is not at the top of a GOP, processing proceeds to step S5706.

In step S5705, the picture generated in step S5701 is at the top of a GOP. Accordingly, the video encoder 5502 transmits the PTS of the picture and two SPNs to the control unit 5504; the first SPN is assigned to the top of source packets in which the picture is to be stored; and the second SPN is assigned to the top of source packets in which resolution extension information for the picture is to be stored. The control unit 5504 adds the PTS and the first SPN transmitted by the video encoder 5502 to the entry map as one entry point. Thereafter, processing proceeds to step S5706.

In step S5706, the video encoder 5502 checks whether a video input signal YIN to be decoded exists. If the video input signal YIN exists, processing is repeated from step S5701. If the video input signal VIN does not exist, processing proceeds to step S5707.

In step S5707, all of the video input signals VIN to be decoded are converted into multiplexed stream data and recorded on the BDR, such as a BD disc. Accordingly, the write unit 5507 transmits the file entry for each AV stream from internal memory to the BDR, such as a BD disc. On the other hand, the control unit 5504 extracts the stream attribute information from the elementary streams to be multiplexed into the main TS, the sub-TS, and the extended stream and associates the stream attribute information with clip information along with the entry map and the 3D metadata. The 2D clip information file, the DEP clip information file, and the extended clip information file are thus generated. The write unit 5507 thus records these clip information files on the BDR, such as a BD disc. Thereafter, processing proceeds to step S5708.

In step S5708, the control unit 5504 uses the 2D clip information file, the DEP clip information file, and the extended clip information file to generate the 2D playlist file, the 3D playlist file, and the extended playlist file. The write unit 5507 records these playlist files on the BDR, such as a BD disc. Processing then terminates.

Embodiment 3

The recording device described in Embodiment 3 of the present invention is called an authoring device and records a content on a BD-ROM disc using the arrangement of extents according to Embodiment 1 of the present invention. The authoring device is generally located at a creation studio and used by authoring staff to create content to be distributed. First, in response to operations by the authoring staff, the recording device converts content into AV stream files using a predetermined compression encoding method. The content is expressed as both 2D video images at 4K2K and as full HD 3D video images. Next, the recording device generates a scenario. Then, the recording device generates a volume image for a BD-ROM disc from the AV stream files and scenario. Finally, the recording device records the value image on a BD-ROM disc.

Structure of Recording Device

Figure 58:
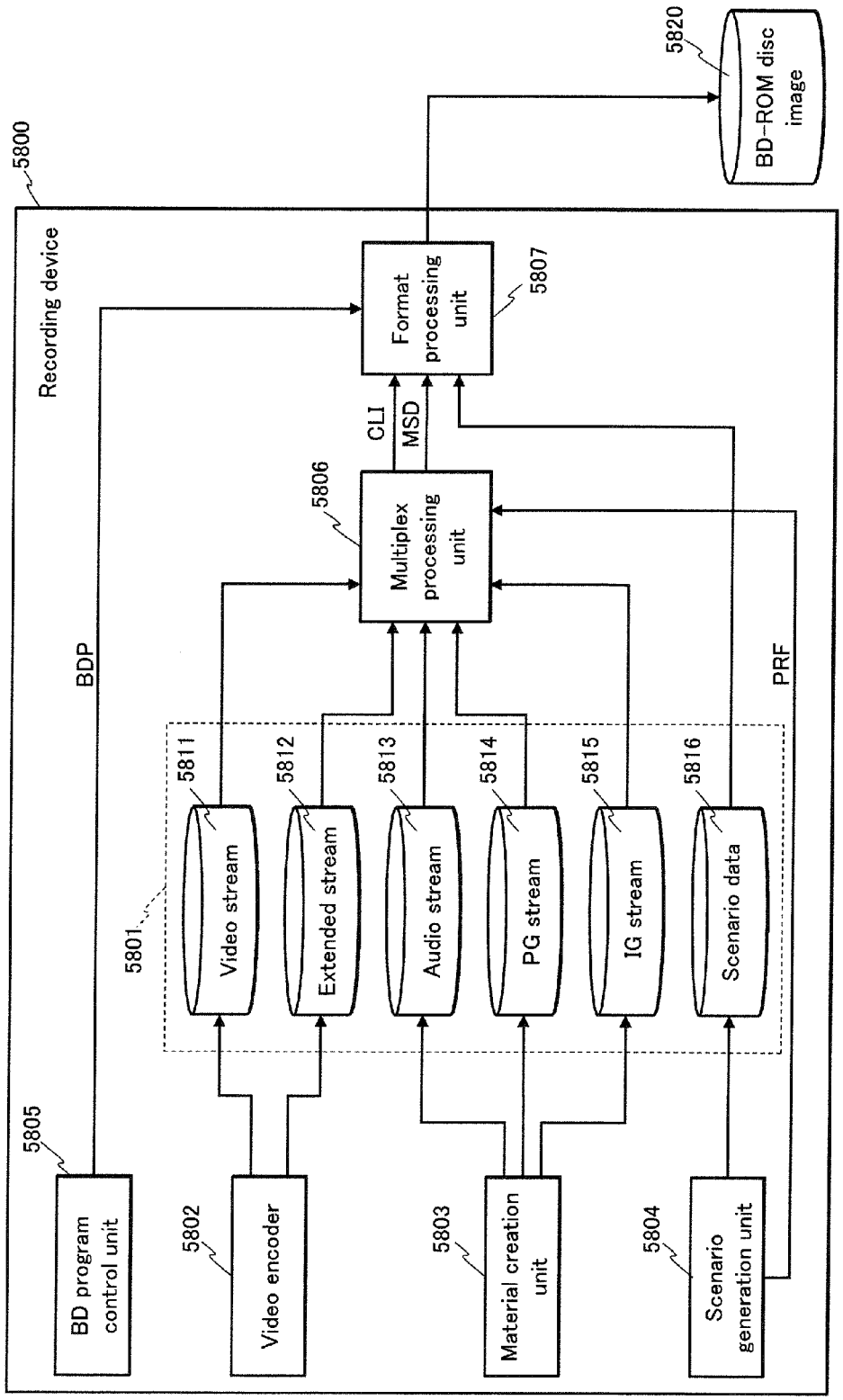
FIG. 58 is a functional block diagram of a recording device according to Embodiment 3 of the present invention.

FIG. 58 is a functional block diagram of a recording device according to Embodiment 3 of the present invention. As shown in FIG. 58, the recording device 5800 includes a database unit 5801, video encoder 5802, material creation unit 5803, scenario generation unit 5804, BD program creation unit 5805, multiplex processing unit 5806, and format processing unit 5807.

The database unit 5801 is a nonvolatile storage device embedded in the recording device 5800 and is in particular an HDD. Alternatively, the database unit 5801 may be an external HDD connected to the recording device 5800, or a nonvolatile semiconductor memory device internal or external to the recording device 5800.

The video encoder 5802 is dedicated hardware for encoding of video data. Alternatively, the video encoder 5802 may be an element that functions by the CPU internal to the recording device 5800 executing specific software. The video encoder 5802 receives video data, such as uncompressed bit map data, from the authoring staff and compresses the received video data in accordance with a compression encoding method such as MPEG-4 AVC or MPEG-2. The video data is thus converted into a combination of a base-view video stream, a dependent-view video stream, and an extended stream. The converted video streams 5811 and the extended stream 5812 are stored in the database unit 5801.

Like the video encoder 5502 shown in FIG. 55, the video encoder 5802 converts the 3D video image data into a pair of a base-view video stream and a dependent-view video stream. In particular, the video encoder 5802 calculates depth information of each 3D video image based on motion vectors between the left view and the right view and generates the depth map stream with reference to the depth information. The video encoder 5802 also refers to the base-view video stream obtained by encoding the 3D video image data to generate the extended stream that includes resolution extension information from the 2D video image data at 4K2K.

The material creation unit 5803 creates elementary streams other than the video stream 5811 and the extended stream 5812, such as an audio stream 5813, PG stream 5814, and IG stream 5815 and stores the created streams in the database unit 5801. For example, the material creation unit 5803 receives uncompressed LPCM audio data from the authoring staff, encodes the uncompressed LPCM audio data in accordance with a compression encoding method such as AC-3, and converts the encoded LPCM audio data into the audio stream 5813. When a DTS-HD extended audio stream is generated as the audio stream, each audio frame is separated into a DTS-HD core audio frame and an extended portion. The former is stored in the audio stream, and the latter is stored in the extended stream. The material creation unit 5803 additionally receives a subtitle information file from the authoring staff and generates the PG stream 5814 in accordance with the subtitle information file. The subtitle information file defines image data or text data for showing subtitles, display timings of the subtitles, and visual effects to be added to the subtitles, such as fade-in/out. Furthermore, the material creation unit 5803 receives bit map data and a menu file from the authoring staff and generates the IG stream 5815 in accordance with the bit map data and the menu file. The bit map data shows images that are to be displayed on a menu. The menu file defines how each button on the menu is to be transitioned from one status to another and defines visual effects to be added to each button.

The scenario generation unit 5804 generates scenario data 5816 in response to an instruction received from the authoring staff via a GUI and then stores the created scenario data 5816 in the database unit 5801. The scenario data 5816 includes an index file, an MV object file, and a playlist file and specifies the playback method of the elementary streams 5811-5815 stored in the database unit 5801. The scenario generation unit 5804 further generates a parameter file PRF and transfers the generated parameter file PRF to the multiplex processing unit 5806. The parameter file PRF defines, from among the elementary streams 5811-5815 stored in the database unit 5801, the elementary streams to be respectively multiplexed into the main TS, the sub-TS, and the extended stream.

The BD program creation unit 5805 provides the authoring staff with a programming environment for programming BD-J objects and Java application programs. The BD program creation unit 5805 receives a request from a user via a GUI and generates each program's source code according to the request. The BD program creation unit 5805 further generates BD-J object files from the BD-J objects and compresses the Java application programs in JAR files. The program files BDP are transferred to the format processing unit 5807.

The multiplex processing unit 5806 multiplexes the elementary streams 5811-5815 stored in the database unit 5801 as stream data in MPEG2-TS format in accordance with a parameter file PRF. Specifically, as shown in FIG. 5, each of the elementary streams 5811-5815 is first converted into a series of source packets. Next, the series of source packet are multiplex into a single series of multiplexed stream data. The main TS, the sub-TS, and the extended stream are thus generated. These pieces of multiplexed stream data MSD are output to the format processing unit 5807.

The multiplex processing unit 5806 then generates a 2D clip information file, a DEP clip information file, and an extended clip information file by the following four steps (I)-(IV). (I) An entry map is generated for each of the file 2D, the file DEP, and the extended clip information file. (II) Extent start points are generated by referring to the entry map of each clip information file. At this point, extent ATC times are aligned between extent pairs. Furthermore, the multiplex processing unit 5806 designs the arrangement of extents so that the size of each base-view extent, dependent-view extent, and extended extent satisfies conditions 1-6. In particular, immediately before or immediately after locations where a long jump is necessary, an extended data specific section, a monoscopic video specific section, and a stereoscopic video specific section are provided, as in arrangement 1 shown in FIG.

14 or arrangement 2 shown in FIG. 15. (III) The multiplex processing unit 5806 extracts the stream attribute information from elementary streams to be multiplexed into the main TS, the sub-TS, and the extended stream. (IV) A combination of the entry map, 3D metadata, and stream attribute information is associated with the clip information. Each clip information file CLI is thus generated and transmitted to the format processing unit 5807.

The format processing unit 5807 creates a BD-ROM disc image 5820 from (i) the scenario data 5816 stored in the database unit 5801, (ii) program files BDP such as BD-J object files created by the BD program creation unit 5805, and (iii) multiplexed stream data MSD and clip information files CLI generated by the multiplex processing unit 5806.

The format processing unit 5807 stores the multiplexed stream data MSD in the file 2D, the file DEP, the file SS, and the extended stream file. When generating the file entries of these AV stream files, the format processing unit 5807 refers to the entry map and the 3D metadata included in the clip information file. Each SPN for entry points and extent start points is thereby used in creating allocation descriptors. In particular, the value of the LBN and the extent size to be represented by each allocation descriptor are determined in accordance with the arrangement of extents designed by the multiplex processing unit 5806 so as to express an interleaved arrangement like the one shown in FIG. 11.

Authoring of BD-ROM Disc

Figure 59:
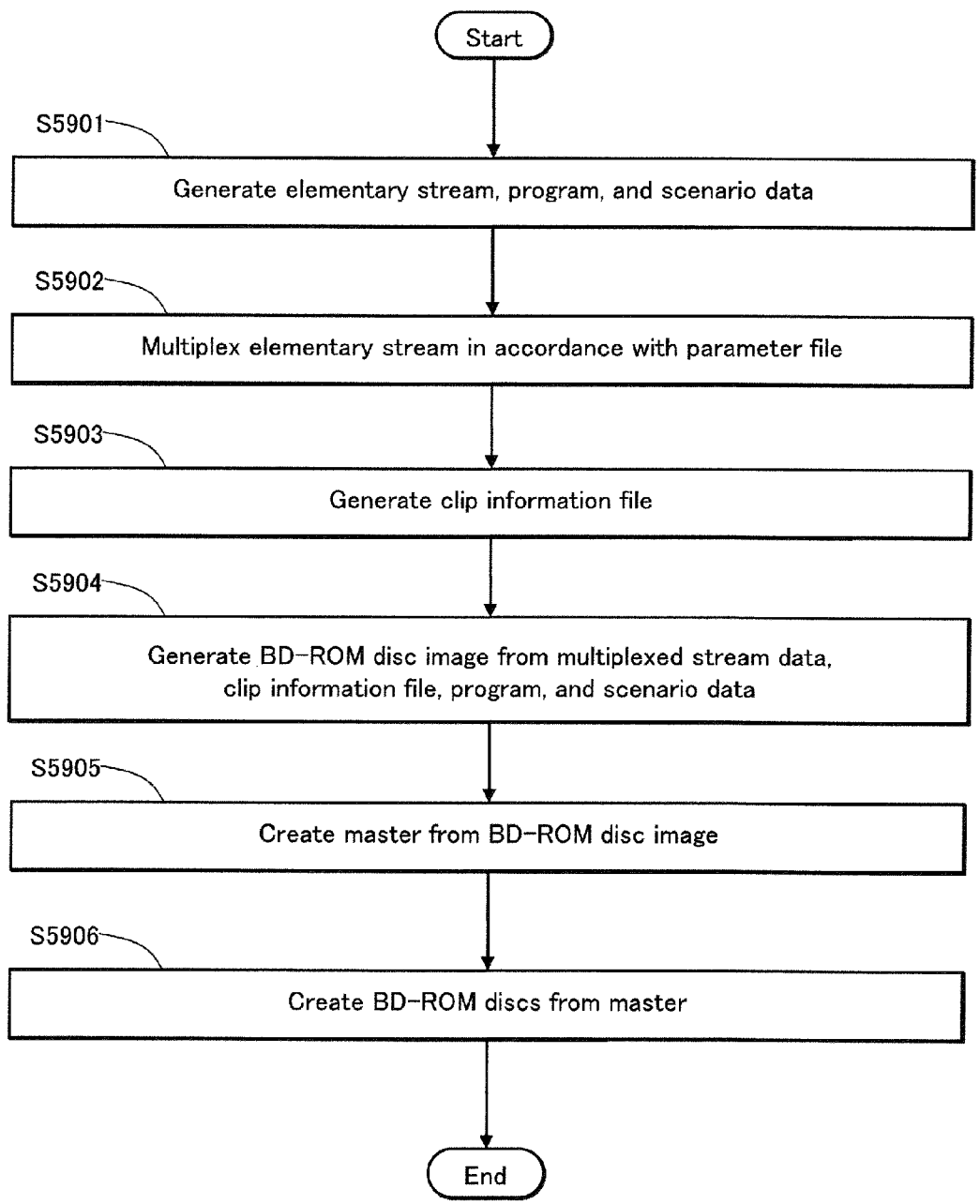
FIG. 59 is a flowchart of a method for recording movie content on a BD-ROM disc using the recording device shown in FIG. 58.

FIG. 59 is a flowchart of a method for recording content on a BD-ROM disc using the recording device 5800 shown in FIG. 58. This method begins, for example, when power to the recording device 5800 is turned on.

In step S5801, the elementary streams, programs, and scenario data to be recorded on a BD-ROM disc are generated. In other words, the video encoder 5802 generates a video stream 5811 and an extended stream 5812. The material creation unit 5803 generates an audio stream 5813, PG stream 5814, and IG stream 5815. The scenario generation unit 5804 generates scenario data 5816. These created pieces of data 5811-5816 are stored in the database unit 5801. The scenario generation unit 5804 also generates a parameter file PRF and transfers the generated parameter file PRF to the multiplex processing unit 5806. The BD program creation unit 5805 generates program files BDP, which include BD-J object files and JAR files, and transfers the program files BDP to the format processing unit 5807.

Thereafter, processing proceeds to step S5802.

In step S5802, the multiplex processing unit 5806 reads the elementary streams 5811-5815 from the database unit 5801 in accordance with a parameter file PRF and multiplexes the elementary streams into stream data in MPEG2-TS format. Thereafter, processing proceeds to step S5803.

In step S5803, the multiplex processing unit 5806 then generates a 2D clip information file, a DEP clip information file, and an extended clip information file. Furthermore, the multiplex processing unit 5806 sets the size of each base-view extent, dependent-view extent, and extended extent so as to satisfy conditions 1-6. Thereafter, processing proceeds to step S5804.

In step S5804, the format processing unit 5807 creates a BD-ROM disc image 5820 from the scenario data 5816, program files BDP, multiplexed stream data MDS, and clip information file CLI. In particular, when the multiplexed stream data MDS is stored in an AV stream file, the value of the LBN and the extent size to be represented by each allocation descriptor in the file entry are determined in accordance with the arrangement of extents designed by the multiplex processing unit 5806 so as to express an interleaved arrangement like the one shown in FIG. 11. Thereafter, processing proceeds to step S5805.

In step S5805, the BD-ROM disc image 5820 is converted into data for BD-ROM pressing. This data is recorded on a master BD-ROM disc by a mastering device. Thereafter, processing proceeds to step S5806.

In step S5806, BD-ROM discs 101 are mass produced by pressing the master obtained in step S5805. Processing thus concludes.

Supplement

File System on Recording Medium

When UDF is used as the file system for the recording medium, a data recording area such as the volume area 202B of the BD-ROM disc 101 shown in FIG. 2 generally includes areas in which a plurality of directories, a file set descriptor, and a terminating descriptor are respectively recorded. Each "directory" is a data group composing the directory. A "file set descriptor" indicates the LBN of the sector in which a file entry for the root directory is stored. The "terminating descriptor" indicates the end of the recording area for the file set descriptor.

Each directory shares a common data structure. In particular, each directory includes a file entry, directory file, and subordinate files.

The "file entry" includes a descriptor tag, Information Control Block (ICB) tag, and allocation descriptor. The "descriptor tag" indicates that the type of the data that includes the descriptor tag is a file entry. For example, when the value of the descriptor tag is "261," the type of that data is a file entry. The "ICB tag" indicates attribute information for the file entry itself. The "allocation descriptor" indicates the LBN of the sector on which the directory file belonging to the same directory is recorded.

The "directory file" typically includes a plurality of each of a file identifier descriptor for a subordinate directory and a file identifier descriptor for a subordinate file. The "file identifier descriptor for a subordinate directory" is information for accessing the subordinate directory located directly below that directory. This file identifier descriptor includes identification information for the subordinate directory, directory name length, file entry address, and actual directory name. In particular, the file entry address indicates the LBN of the sector on which the file entry of the subordinate directory is recorded. The "file identifier descriptor for a subordinate file" is information for accessing the subordinate file located directly below that directory. This file identifier descriptor includes identification information for the subordinate file, file name length, file entry address, and actual file name. In particular, the file entry address indicates the LBN of the sector on which the file entry of the subordinate file is recorded. The "file entry of the subordinate file," as described below, includes address information for the data constituting the actual subordinate file.

By tracing the file set descriptors and the file identifier descriptors of subordinate directories/files in order, the file entry of an arbitrary directory/file recorded on the recording medium can be accessed. Specifically, the file entry of the root directory is first specified from the file set descriptor, and the directory file for the root directory is specified from the allocation descriptor in this file entry. Next, the file identifier descriptor for the directory immediately below the root directory is detected from the directory file, and the file entry for that directory is specified from the file entry address therein. Furthermore, the directory file for that directory is specified from the allocation descriptor in the file entry. Subsequently, from within the directory file, the file entry for the subordinate directory or subordinate file is specified from the file entry address in the file identifier descriptor for that subordinate directory or subordinate file.

"Subordinate files" include extents and file entries. The "extents" are generally multiple in number and are data sequences whose logical addresses, i.e. LBNs, are consecutive on the disc. The entirety of the extents comprises the actual subordinate file. The "file entry" includes a descriptor tag, ICB tag, and allocation descriptors. The "descriptor tag" indicates that the type of the data that includes the descriptor tag is a file entry. The "ICB tag" indicates attribute information for the file entry itself. The "allocation descriptors" are provided in a one-to-one correspondence with each extent and indicate the arrangement of each extent in the data recording area, specifically the size of each extent and the LBN for the top of the extent. Accordingly, by referring to each allocation descriptor, each extent can be accessed. Also, the two most significant bits of each allocation descriptor indicate whether an extent is actually recorded on the sector for the LBN indicated by the allocation descriptor. Specifically, when the two most significant bits are "0," an extent has been assigned to the sector and has been actually recorded thereat. When the two most significant bits are "1," an extent has been assigned to the sector but has not been yet recorded thereat.

Like the above-described file system employing a UDF, when each file recorded on the recording medium is divided into a plurality of extents, the file system for the recording medium also generally stores the information showing the locations of the extents, as with the above-mentioned allocation descriptors, in the recording medium. By referring to the information, the location of each extent, particularly the logical address thereof, can be found.

Relationship Between Size of Extents and Capacity of Read Buffers

Arrangement 1

Figure 60:
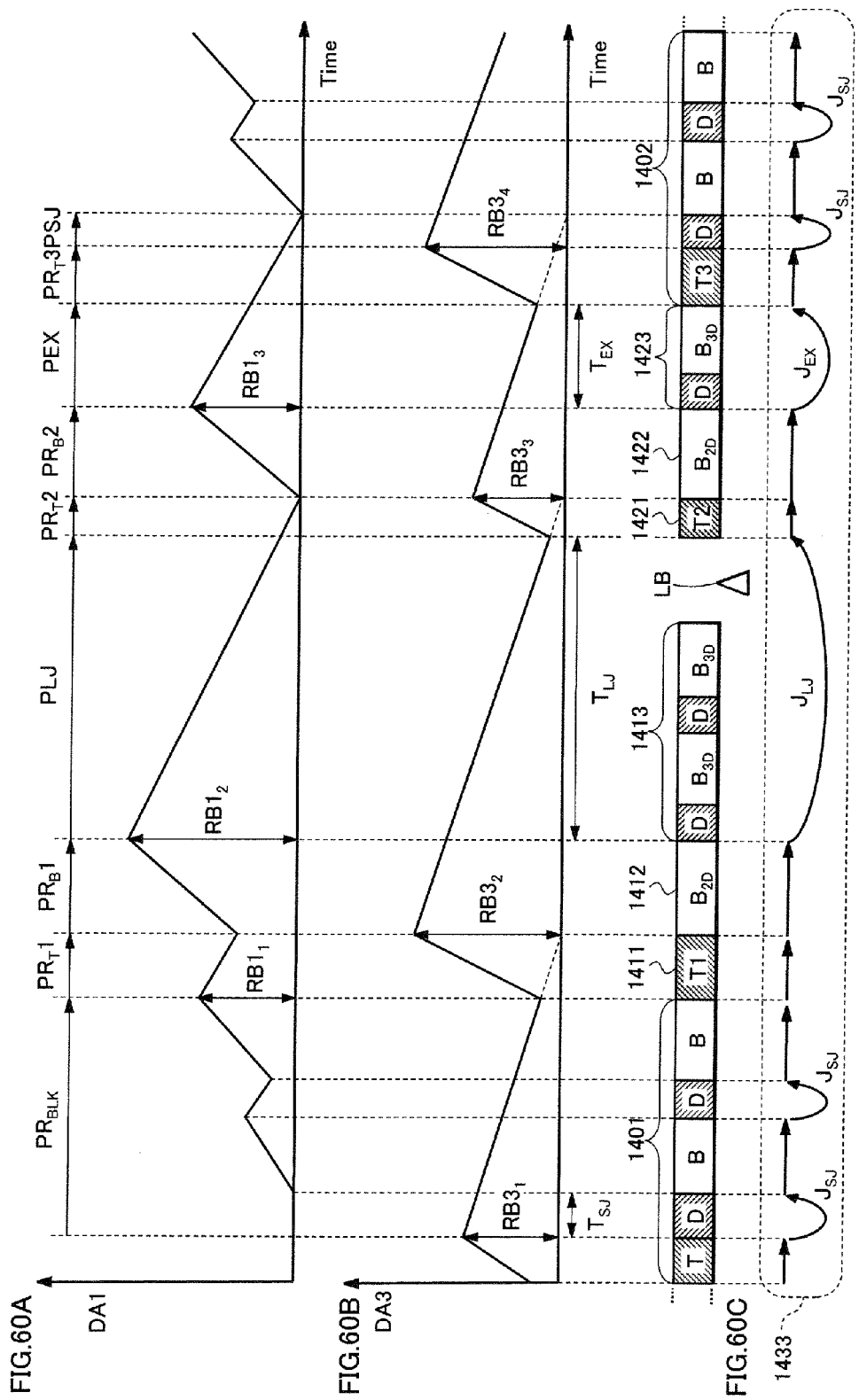
FIGS. 60A and 60B are graphs showing changes in data amounts stored in the RB1 and RB3 when a playback device in extended playback mode plays back video images seamlessly from extents placed in arrangement 1 shown in FIG. 14.
FIG. 60C is a schematic diagram showing the playback path in extended playback mode corresponding to the extents.

FIGS. 60A and 60B are graphs showing changes in data amounts stored in the RB1 and RB3 when a playback device in extended playback mode plays back video images seamlessly from extents placed in arrangement 1 shown in FIG. 14. FIG. 60C is a schematic diagram showing the playback path in extended playback mode corresponding to the extents. The playback path is the same as the playback 1433 shown in FIG. 14.

As shown in FIGS. 60A and 60C, during the preload period $PR_T1$ for the extended extent T1 in the first extended data specific section 1411, the stored data amount DA1 in the RB1 decreases at the first transfer rate $R_{EXT1}$. Accordingly, to prevent the stored data amount DA1 in the RB1 from reaching zero by the end of the period $PR_T1$, the lower limit $RB1_1$ on the stored data amount DA1 in the RB1 at the end of the read period $PR_{BLK}$ of data from the first shared section 1401 is expressed in equation (10), using the maximum value of the first transfer rate $R_{EXT1}$, i.e. $R_{MAX1}=R_{TS}1\times192/188$, and the size $S_{T1}$ of the extended extent T1:

$$RB1_1 = \frac{S_{T1}}{R_{UDEX}} \times R_{MAX1} = \frac{S_{T1}}{R_{UDEX}} \times R_{TS1} \times \frac{192}{188}. \quad (10)$$

As further shown in FIGS. 60A and 60C, during the period PLJ of the long jump $J_{LJ}$ over the first stereoscopic video specific section 1413 and the layer boundary LB, and during the preload period $PR_T2$ for the extended extent T2 in the second extended data specific section 1421, the stored data amount DA1 in the RB1 decreases at the first transfer rate $R_{EXT1}$. Accordingly, to prevent the stored data amount DA1 in the RB1 from reaching zero by the end of the periods PLJ and $PR_T2$, the lower limit $RB1_2$ on the stored data amount DA1 in the RB1 at the start of the long jump $J_{LJ}$ is expressed in equation (11), using the maximum value of the first transfer rate $R_{EXT1}$, i.e. $R_{MAX1}=R_{TS1}\times192/188$, the maximum jump time $T_{LJ}$ of the long jump $J_{LJ}$, and the size $S_{T2}$ of the extended extent T2.

$$RB1_2 = \left(T_{LJ} + \frac{S_{T2}}{R_{UDEX}}\right) \times R_{MAX1} = \left(T_{LJ} + \frac{S_{T2}}{R_{UDEX}}\right) \times R_{TS1} \times \frac{192}{188}. \quad (11)$$

As further shown in FIGS. 60A and 60C, during the period PEX of the jump $J_{EX}$ over the second stereoscopic video specific section 1423, during the preload period $PR_T3$ for the extended extent T3 in the second shared section 1402, and during the period PSJ of the jump $J_{SJ}$ to skip reading of the immediately subsequent dependent-view extent D, the stored data amount DA1 in the RB1 decreases at the first transfer rate $R_{EXT1}$. Therefore, to prevent the stored data amount DA1 in the RB1 from reaching zero by the end of the periods PEX, $PR_T3$, and PSJ, the lower limit $RB1_3$ on the stored data amount DA1 in the RB1 at the start of the jump $J_{EX}$ is expressed in equation (12), using the maximum value of the first transfer rate $R_{EXT1}$, i.e. $R_{MAX1}=R_{TS}1\times192/188$, the maximum jump time $T_{EX}$ and $T_{SJ}$ of the jumps $J_{EX}$ and $J_{SJ}$, and the size $S_{T3}$ of the extended extent T3:

$$RB1_3 = \left(T_{EX} + \frac{S_{T3}}{R_{UDEX}} + T_{SJ}\right) \times R_{MAX1} = \\ \left(T_{EX} + \frac{S_{T3}}{R_{UDEX}} + T_{SJ}\right) \times R_{TS1} \times \frac{192}{188}. \quad (12)$$

As a result, the capacity RB1 of the RB1 should be at least the maximum value among the lower limits $RB1_1$, $RB1_2$, and $RB1_3$ expressed in equations (10)-(12):

$$RB1 \geq \max(RB1_1, RB1_2, RB1_3).$$

As shown in FIGS. 60B and 60C, during the read period $PR_{BLK}$ of data from the extent block located last in the first shared section 1401, the stored data amount DA3 in the RB3 decreases at the third transfer rate $R_{EXT3}$. During the preload period $PR_T1$ of the extended extent T1 in the first extended data specific section 1411, the extended extent T1 is not read from the RB3. Accordingly, in order to maintain the provision of data from the RB3 to the system target decoder until the periods PLJ and $PR_T1$ have elapsed, the lower limit $RB3_1$ on the stored data amount DA3 in the RB3 at the start of the read period $PR_{BLK}$ of data from the extent block is expressed in equation (13), using the number n of extent pairs D, B included in the extent block, the size $S_B$ of the base-view extents, the maximum jump time $T_{SJ}$ of the jump $J_{SJ}$ to skip reading of the dependent-view extents, the size $S_{T1}$ of the extended extent T1, and the maximum value of the third transfer rate $R_{EXT3}$, i.e. $R_{MAX3}=R_{TS3}\times192/188$:

$$RB3_1 = \left\{\left(T_{SJ} + \frac{S_B}{R_{UDEX}}\right) \times n + \frac{S_{T1}}{R_{UDEX}}\right\} \times R_{MAX3} = \\ \left\{\left(T_{SJ} + \frac{S_B}{R_{UDEX}}\right) \times n + \frac{S_{T1}}{R_{UDEX}}\right\} \times R_{TS3} \times \frac{192}{188}. \quad (13)$$

As further shown in FIGS. 60B and 60C, during the read period $PR_B1$ of data from the first monoscopic video specific section 1412 and during the period PLJ of the long jump $J_{LJ}$ over the first stereoscopic video specific section 1413 and the layer boundary LB, the stored data amount DA3 in the RB3 decreases at the third transfer rate $R_{EXT3}$. During the preload period $PR_T2$ of the extended extent T2 in the second extended data specific section 1421, the extended extent T2 is not read from the RB3. Accordingly, in order to maintain provision of data from the RB3 to the system target decoder until the periods $PR_B1$, PLJ, and $PR_T2$ have elapsed, the lower limit $RB3_2$ on the stored data amount DA3 in the RB3 at the start of the long jump $J_{LJ}$ is expressed in equation (14), using the size $S_{B1}$ of the base-view extent in the first monoscopic video specific section 1412, the maximum jump time $T_{LJ}$ of the long jump $J_{LJ}$, the size $S_{T2}$ of the extended extent T2, and the maximum value of the third transfer rate $R_{EXT3}$, i.e. $R_{MAX3}=R_{TS}3\times192/188$:

$$RB3_2 = \left(\frac{S_{B1}}{R_{UDEX}} + T_{LJ} + \frac{S_{T2}}{R_{UDEX}}\right) \times R_{MAX3} = \quad (14)$$

$$\left(\frac{S_{B1}}{R_{UDEX}} + T_{LJ} + \frac{S_{T2}}{R_{UDEX}}\right) \times R_{TS3} \times \frac{192}{188}.$$

As further shown in FIGS. 60B and 60C, during the read period $PR_B2$ of data from the second monoscopic video specific section 1422 and during the period PEX of the jump $J_{EX}$ over the second stereoscopic video specific section 1423, the stored data amount DA3 in the RB3 decreases at the third transfer rate $R_{EXT3}$. Furthermore, during the preload period $PR_T3$ of the extended extent T3 in the second shared section 1402 and during the period PSJ of the jump $J_{SJ}$ to skip reading of the immediately subsequent dependent-view extent D, the extended extent T3 is not read from the RB3. Accordingly, in order to maintain provision of data from the RB3 to the system target decoder until the periods $PR_B2$, PEX, $PR_T3$, and PSJ have elapsed, the lower limit $RB3_3$ on the stored data amount DA3 in the RB3 at the start of the read period $PR_B2$ of data from the second monoscopic video specific section 1422 is expressed in equation (15), using the size $S_{B2}$ of the base-view extent in the second monoscopic video specific section 1422, the maximum jump times $T_{EX}$ and $T_{SJ}$ of the jumps $J_{EX}$ and $J_{SJ}$, the size $S_{T3}$ of the extended extent T3, and the maximum value of the third transfer rate $R_{EXT3}$, i.e. $R_{MAX3}=R_{TS}3\times192/188$:

$$RB3_3 = \left(\frac{S_{B2}}{R_{UDEX}} + T_{EX} + \frac{S_{T3}}{R_{UDEX}} + T_{SJ}\right) \times R_{MAX3} = \quad (15)$$

$$\left(\frac{S_{B2}}{R_{UDEX}} + T_{EX} + \frac{S_{T3}}{R_{UDEX}} + T_{SJ}\right) \times R_{TS3} \times \frac{192}{188}.$$

The extended extents T1 and T2 read from the extended data specific sections 1411 and 1421 into the RB3 are not transmitted from the RB3 until reading of the extended extents T1 and T2 is complete. Accordingly, the lower limits $RB3_2$ and $RB3_3$ on the stored data amount DA3 in the RB3 at the end of preloading of the extended extents T1 and T2 should be at least the maximum extent sizes $\max S_{T1}$ and $\max S_{T2}$ of the extended extents T1 and T2:

$$RB3_2 \geq \max S_{T1}, RB3_3 \geq \max S_{T2}. \quad (16)$$

The extended extent T3 read from the second shared section 1402 is not transferred from the RB3 until the jump period PSJ immediately subsequent to reading has elapsed. Accordingly, the lower limit $RB3_4$ of the stored data amount DA3 in the RB3 at the start of the jump period PSJ is expressed as the sum of the maximum extent size $\max S_{T3}$ of the extended extent T3 and the data amount $T_{SJ} \times R_{MAX3}$ provided from the RB3 to the system target decoder during the jump period PSJ:

$$RB3_4 = \max S_{T3} + T_{S1} \times R_{MAX3} = \max S_{T3} + T_{S1} \times R_{TS3} \times \frac{192}{188}. \quad (17)$$

As a result, the capacity RB3 of the RB3 should be at least the maximum value among the lower limits $RB3_1$, $RB3_2$, $RB3_3$, and $RB3_4$ expressed in equations (13)-(17):

$$RB3 \geq \max\Big(RB3_1, RB3_2, RB3_3,$$

$$\max S_{T1}, \max S_{T2}, \max S_{T3} + T_{SJ} \times R_{TS3} \times \frac{192}{188}\Big).$$

Arrangement 2

Figure 61:
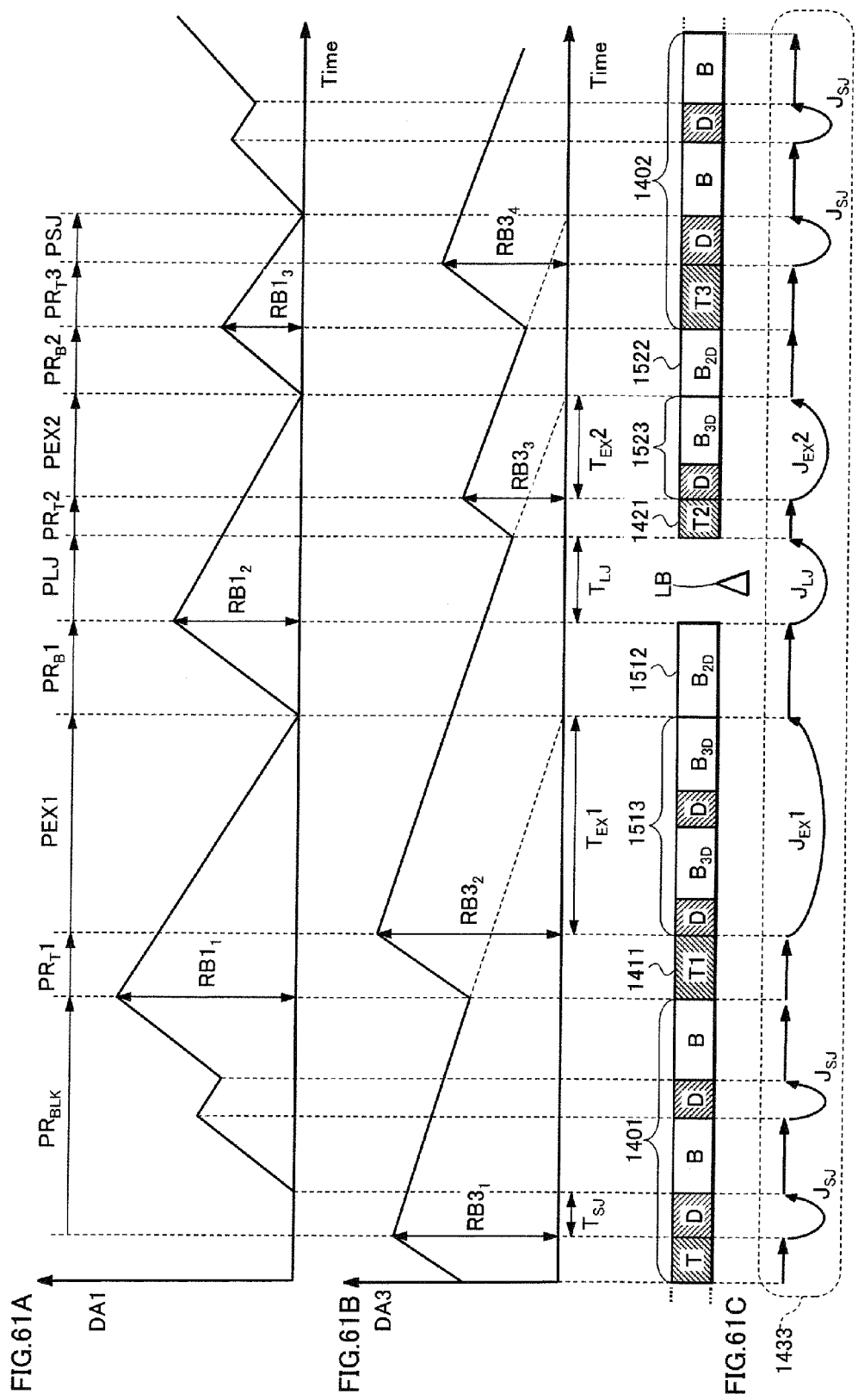
FIGS. 61A and 61B are graphs showing changes in data amounts stored in the RB1 and RB3 when a playback device in extended playback mode plays back video images seamlessly from extents placed in arrangement 2 shown in FIG. 15.
FIG. 61C is a schematic diagram showing the playback path in extended playback mode corresponding to the extents.

FIGS. 61A and 61B are graphs showing changes in data amounts stored in the RB2 and RB3 when a playback device in extended playback mode plays back video images seamlessly from extents placed in arrangement 2 shown in FIG. 15. FIG. 61C is a schematic diagram showing the playback path in extended playback mode corresponding to the extents. The playback path is the same as the playback 1533 shown in FIG. 15.

As shown in FIGS. 61A and 61C, during the preload period $PR_T1$ for the extended extent T1 in the first extended data specific section 1411, and during the period $P_{EX1}$ of the jump $J_{EX1}$ over the first stereoscopic video specific section 1513, the stored data amount DA1 in the RB1 decreases at the first transfer rate $R_{EXT1}$.

Accordingly, to prevent the stored data amount DA1 in the RB1 from reaching zero by the end of the periods $PR_T1$ and $P_{EX1}$, the lower limit $RB1_1$ on the stored data amount DA1 in the RB1 at the end of the read period $PR_{BLK}$ of data from the first shared section 1401 is expressed in equation (18), using the maximum value of the first transfer rate $R_{EXT1}$, i.e. $R_{MAX1}=R_{TS}1\times192/188$, the size $S_{T1}$ of the extended extent T1, and the maximum jump time $T_{EX1}$ of the jump $J_{EX1}$:

$$RB1_1 = \left(\frac{S_{T1}}{R_{UDEX}} + T_{EX1}\right) \times R_{MAX1} = \left(\frac{S_{T1}}{R_{UDEX}} + T_{EX1}\right) \times R_{TS1} \times \frac{192}{188}. \quad (18)$$

As further shown in FIGS. 61A and 61C, during the period PLJ of the long jump $J_{LJ}$ for skipping the layer boundary LB, during the preload period $PR_T2$ for the extended extent T2 in the second extended data specific section 1421, and during the period $P_{EX2}$ of the jump $J_{EX2}$ over the second stereoscopic video specific section 1523, the stored data amount DA1 in the RB1 decreases at the first transfer rate $R_{EXT1}$. Accordingly, to prevent the stored data amount DA1 in the RB1 from reaching zero by the end of the periods PLJ, $PR_T2$, and $P_{EX2}$, the lower limit $RB1_2$ on the stored data amount DA1 in the RB1 at the start of the long jump $J_{LJ}$ is expressed in equation (19), using the maximum value of the first transfer rate $R_{EXT1}$, i.e. $R_{MAX1}=R_{TS}1\times192/188$, the maximum jump time $T_{LJ}$ of the long jump $J_{LJ}$, the size $S_{T2}$ of the extended extent T2, and the maximum jump time $T_{EX2}$ of the jump $J_{EX2}$:

$$RB1_2 = \left(T_{LJ} + \frac{S_{T2}}{R_{UDEX}} + T_{EX2}\right) \times R_{MAX1} = \qquad (19)$$
$$\left(T_{LJ} + \frac{S_{T2}}{R_{UDEX}} + T_{EX2}\right) \times R_{TS1} \times \frac{192}{188}.$$

As further shown in FIGS. 61A and 61C, during the preload period $PR_T3$ for the extended extent T3 in the second shared section 1402, and during the period PSJ of the jump $J_{SJ}$ to skip reading of the immediately subsequent dependent-view extent D, the stored data amount DA1 in the RB1 decreases at the first transfer rate $R_{EXT1}$. Therefore, to prevent the stored data amount DA1 in the RB1 from reaching zero by the end of the periods $PR_T3$ and PSJ, the lower limit $RB1_3$ on the stored data amount DA1 in the RB1 at the start of preloading of the extended extent T3 in the second shared section 1402 is expressed in equation (20), using the maximum value of the first transfer rate $R_{EXT1}$, i.e. $R_{MAX1}=R_{TS}1\times192/188$, the maximum jump time $T_{SJ}$ of the jump $J_{SJ}$, and the size $S_{T3}$ of the extended extent T3:

$$RB1_3 = \left(\frac{S_{T3}}{R_{UDEX}} + T_{SJ}\right) \times R_{MAX1} = \left(\frac{S_{T3}}{R_{UDEX}} + T_{SJ}\right) \times R_{TS1} \times \frac{192}{188}. \qquad (20)$$

As a result, the capacity RB1 of the RB1 should be at least the maximum value among the lower limits $RB1_1$, $RB1_2$, and $RB1_3$ expressed in equations (18)-(20):

$$RB1 \geq \max(RB1_1, RB1_2, RB1_3).$$

As shown in FIGS. 61B and 61C, during the read period $PR_{BLK}$ of data from the extent block located last in the first shared section 1401, the stored data amount DA3 in the RB3 decreases at the third transfer rate $R_{EXT3}$. During the preload period $PR_T1$ of the extended extent T1 in the first extended data specific section 1411, and during the period $P_{EX1}$ of the jump $J_{EX1}$ over the first stereoscopic video specific section 1513, the extended extent T1 is not read from the RB3. Accordingly, in order to maintain the provision of data from the RB3 to the system target decoder until the periods PR1 and $P_{EX1}$ have elapsed, the lower limit $RB3_1$ on the stored data amount DA3 in the RB3 at the start of the read period $PR_{BLK}$ of data from the extent block is expressed in equation (21), using the number n of extent pairs D, B included in the extent block, the size $S_B$ of the base-view extents, the maximum jump time $T_{SJ}$ of the jump $J_{SJ}$ to skip reading of the dependent-view extents, the size $S_{T1}$ of the extended extent T1, the maximum jump time $T_{EX1}$ of the jump $J_{EX1}$ over the first stereoscopic video specific section 1513, and the maximum value of the third transfer rate $R_{EXT3}$, i.e. $R_{MAX3}=R_{TS}3\times192/188$:

$$RB3_1 = \left\{\left(T_{SJ} + \frac{S_B}{R_{UDEX}}\right) \times n + \frac{S_{T1}}{R_{UDEX}} + T_{EX1}\right\} \times R_{MAX3} = \qquad (21)$$
$$\left\{\left(T_{SJ} + \frac{S_B}{R_{UDEX}}\right) \times n + \frac{S_{T1}}{R_{UDEX}} + T_{EX1}\right\} \times R_{TS3} \times \frac{192}{188}.$$

As further shown in FIGS. 60B and 60C, during the jump period $P_{EX1}$ over the first stereoscopic video specific section 1513, during the read period $PR_B1$ of data from the first monoscopic video specific section 1512, and during the period PLJ of the long jump $J_{LJ}$ over the layer boundary LB, the stored data amount DA3 in the RB3 decreases at the third transfer rate $R_{EXT3}$. During the preload period $PR_T2$ of the extended extent T2 in the second extended data specific section 1421, and during the period $P_{EX2}$ of the jump $J_{EX2}$ over the second stereoscopic video specific section 1523, the extended extent T2 is not read from the RB3. Accordingly, in order to maintain provision of data from the RB3 to the system target decoder until the periods $P_{EX1}$, $PR_B1$, PLJ, $PR_T2$, and $P_{EX2}$ have elapsed, the lower limit $RB3_2$ on the stored data amount DA3 in the RB3 at the start of the jump $J_{EX1}$ is expressed in equation (22), using the size $S_{B1}$ of the base-view extent in the first monoscopic video specific section 1512, the maximum jump times $T_{EX1}$, $T_{LJ}$ and $T_{EX2}$ of the jumps $J_{EX1}$, $J_{LJ}$, and $J_{EX2}$, the size $S_{T2}$ of the extended extent T2, and the maximum value of the third transfer rate $R_{EXT3}$, i.e. $R_{MAX3}=R_{TS}3\times192/188$:

$$RB3_2 = \left(T_{EX1} + \frac{S_{B1}}{R_{UDEX}} + T_{LJ} + \frac{S_{T2}}{R_{UDEX}} + T_{EX2}\right) \times R_{MAX3} = \qquad (22)$$
$$\left(T_{EX1} + \frac{S_{B1}}{R_{UDEX}} + T_{LJ} + \frac{S_{T3}}{R_{UDEX}} + T_{EX2}\right) \times R_{TS3} \times \frac{192}{188}.$$

As further shown in FIGS. 61B and 61C, during the period $P_{EX2}$ of the jump $J_{EX2}$ over the second stereoscopic video specific section 1523 and during the read period $PR_B2$ of data from the second monoscopic video specific section 1522, the stored data amount DA3 in the RB3 decreases at the third transfer rate $R_{EXT3}$. Furthermore, during the preload period $PR_T3$ of the extended extent T3 in the second shared section 1402 and during the period PSJ of the jump $J_{SJ}$ to skip reading of the immediately subsequent dependent-view extent D, the extended extent T3 is not read from the RB3. Accordingly, in order to maintain provision of data from the RB3 to the system target decoder until the periods $P_{EX2}$, $PR_B2$, $PR_T3$, and PSJ have elapsed, the lower limit $RB3_3$ on the stored data amount DA3 in the RB3 at the start of the jump period $P_{EX2}$ is expressed in equation (23), using the maximum jump times $T_{EX2}$ and $T_{SJ}$ of the jumps $J_{EX2}$ and $J_{SJ}$, the size $S_{B2}$ of the base-view extent in the second monoscopic video specific section 1522, the size $S_{T3}$ of the extended extent T3, and the maximum value of the third transfer rate $R_{EXT3}$, i.e. $R_{MAX3}=R_{TS3}\times192/188$:

$$RB3_3 = \left(T_{EX2} + \frac{S_{B2}}{R_{UDEX}} + \frac{S_{T3}}{R_{UDEX}} + T_{SJ}\right) \times R_{MAX3} = \qquad (23)$$
$$\left(T_{EX2} + \frac{S_{B2}}{R_{UDEX}} + \frac{S_{T3}}{R_{UDEX}} + T_{SJ}\right) \times R_{TS3} \times \frac{192}{188}.$$

The extended extent T1 read from the first extended data specific section 1411 is not transferred from the RB3 until the jump period $P_{EX1}$ immediately subsequent to reading has elapsed. Accordingly, the lower limit $RB3_2$ of the stored data amount DA3 in the RB3 at the start of the jump period $P_{EX1}$ should be at least the sum of the maximum extent size $\max S_{T1}$ of the extended extent T1 and the data amount $T_{EX1} \times R_{MAX3}$ provided from the RB3 to the system target decoder during the jump period $P_{EX1}$:

$$RB3_2 \geq \max S_{T1} + T_{EX1} \times R_{MAX3} = \max S_{T1} + T_{EX1} \times R_{TS3} \times \frac{192}{188}. \qquad (24)$$

The extended extent T2 read from the second extended data specific section 1421 is not transferred from the RB3 until the jump period $P_{EX2}$ immediately subsequent to reading has elapsed. Accordingly, the lower limit $RB3_3$ of the stored data amount DA3 in the RB3 at the start of the jump period $P_{EX2}$ should be at least the sum of the maximum extent size $\max S_{T2}$ of the extended extent T2 and the data amount $T_{EX2} \times R_{MAX3}$ provided from the RB3 to the system target decoder during the jump period $P_{EX2}$:

$$RB3_3 \geq \max S_{T2} + T_{EX2} \times R_{MAX3} = \max S_{T2} + T_{EX2} \times R_{TS3} \times \frac{192}{188}. \quad (25)$$

The extended extent T3 read from the second shared section 1402 is not transferred from the RB3 until the jump period PSJ immediately subsequent to reading has elapsed. Accordingly, the lower limit $RB3_4$ of the stored data amount DA3 in the RB3 at the start of the jump period PSJ must be the sum of the maximum extent size $\max S_{T3}$ of the extended extent T3 and the data amount $T_{SJ} \times R_{MAX3}$ provided from the RB3 to the system target decoder during the jump period PSJ:

$$RB3_4 = \max S_{T3} + T_{SJ} \times R_{MAX3} = \max S_{T3} + T_{SJ} \times R_{TS3} \times \frac{192}{188}. \quad (26)$$

As a result, the capacity RB3 of the RB3 should be at least the maximum value among the lower limits $RB3_1$, $RB3_2$, $RB3_3$, and $RB3_4$ expressed in equations (21)-(26):

$$RB3 \geq \max\left( RB3_1, RB3_2, RB3_3, \max S_{T1} + T_{EX1} \times R_{TS3} \times \frac{192}{188}, \right.$$
$$\left. \max S_{T2} + T_{EX2} \times R_{TS3} \times \frac{192}{188}, \max S_{T3} + T_{SJ} \times R_{TS3} \times \frac{192}{188} \right).$$

When Arrangement 1 is Used Only Immediately Before a Layer Boundary LB

Figure 62:
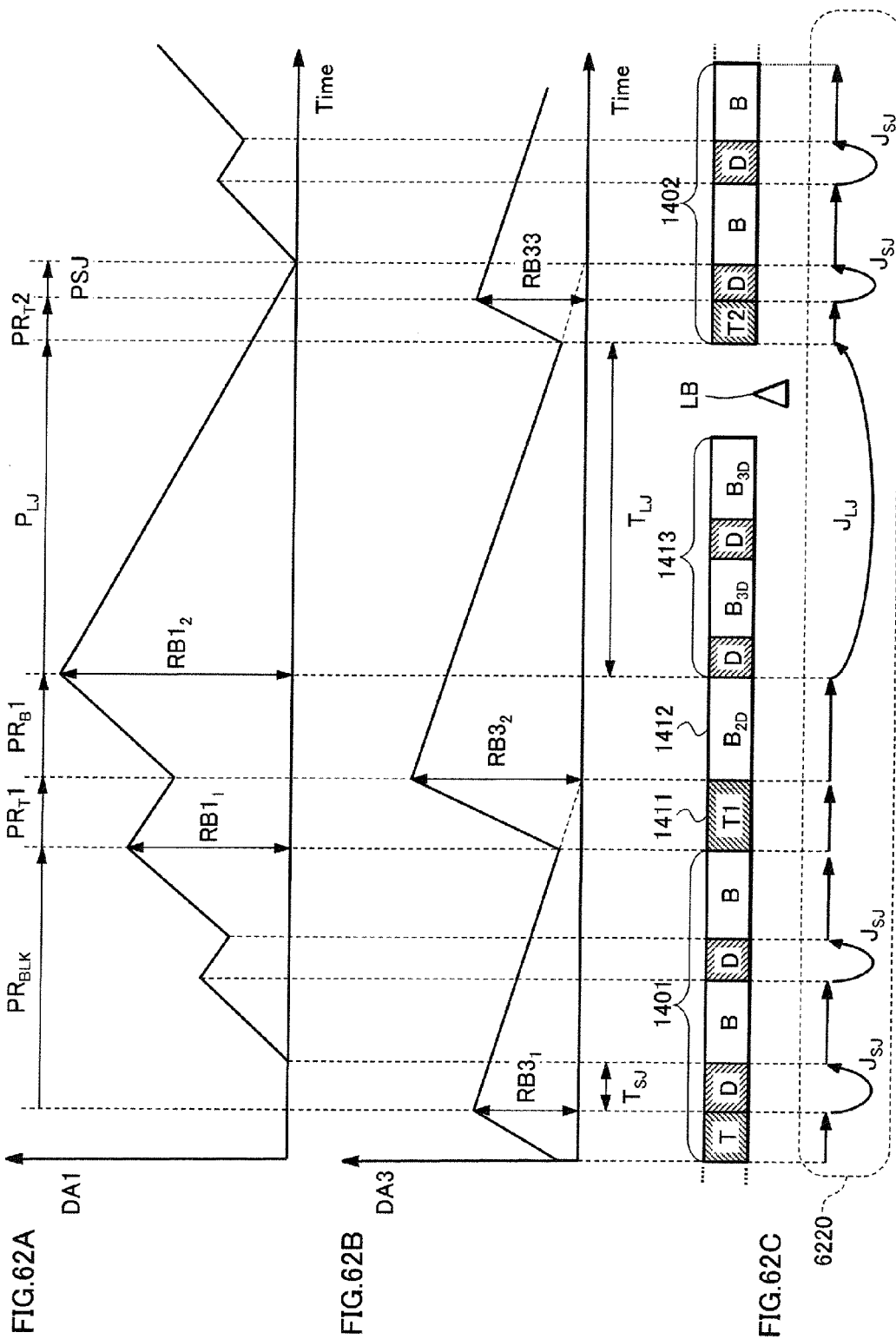
FIGS. 62A and 62B are graphs showing changes in data amounts stored in the RB1 and RB3 when a playback device in extended playback mode plays back video images seamlessly from extents when an extended data specific section, a monoscopic video specific section, and a stereoscopic video specific section are located only immediately before a layer boundary.
FIG. 62C is a schematic diagram showing the playback path in extended playback mode corresponding to the extents.

FIG. 62C is a schematic diagram showing extents when an extended data specific section, a monoscopic video specific section, and a stereoscopic video specific section are designed only immediately before a layer boundary LB, as well as the playback path in extended playback mode corresponding to the extents. The extents and the playback path are equivalent to those for arrangement 1 shown in FIG. 14 after removal of the second extended data specific section 1421, the second monoscopic video specific section 1422, and the second stereoscopic video specific section 1423. FIGS. 62A and 62B are graphs showing changes in data amounts stored in the RB1 and RB3 when a playback device in extended playback mode plays back video images seamlessly from extents shown in FIG. 62C.

As shown in FIGS. 62A and 62C, during the preload period $PR_T1$ for the extended extent T1 in the extended data specific section 1411, the stored data amount DA1 in the RB1 decreases at the first transfer rate $R_{EXT1}$. Accordingly, to prevent the stored data amount DA1 in the RB1 from reaching zero by the end of the period $PR_T1$, the lower limit $RB1_1$ on the stored data amount DA1 in the RB1 at the end of the read period $PR_{BLK}$ of data from the first shared section 1401 is expressed in equation (27), using the maximum value of the first transfer rate $R_{EXT1}$, i.e. $R_{MAX1} = R_{TS1} \times 192/188$, and the size $S_{T1}$ of the extended extent T1:

$$RB1_1 = \frac{S_{T1}}{R_{UDEX}} \times R_{MAX1} = \frac{S_{T1}}{R_{UDEX}} \times R_{TS1} \times \frac{192}{188}. \quad (27)$$

As further shown in FIGS. 62A and 62C, during the period PLJ of the long jump $J_{LJ}$ over the stereoscopic video specific section 1413, during the preload period $PR_T2$ for the extended extent T2 in the second shared section 1402, and during the period PSJ of the jump $J_{SJ}$ to skip reading of the immediately subsequent dependent-view extent D, the stored data amount DA1 in the RB1 decreases at the first transfer rate $R_{EXT1}$. Accordingly, to prevent the stored data amount DA1 in the RB1 from reaching zero by the end of the periods PLJ, $PR_T2$, and PSJ, the lower limit $RB1_2$ on the stored data amount DA1 in the RB1 at the start of the long jump $J_{LJ}$ is expressed in equation (28), using the maximum value of the first transfer rate $R_{EXT1}$, i.e. $R_{MAX1} = R_{TS}1 \times 192/188$, the maximum jump times $T_{LJ}$ and $T_{SJ}$ of the jumps $J_{LJ}$ and $J_{SJ}$, and the size $S_{T2}$ of the extended extent T2:

$$RB1_2 = \left( T_{LJ} + \frac{S_{T2}}{R_{UDEX}} + T_{SJ} \right) \times R_{MAX1} \quad (28)$$
$$= \left( T_{LJ} + \frac{S_{T2}}{R_{UDEX}} + T_{SJ} \right) \times R_{TS1} \times \frac{192}{188}.$$

As a result, the capacity RB1 of the RB1 should be at least the larger of the lower limits $RB1_1$ and $RB1_2$ expressed in equations (27) and (28):

$$RB1 \geq \max(RB1_1, RB1_2).$$

As shown in FIGS. 62B and 62C, during the read period $PR_{BLK}$ of data from the extent block located last in the first shared section 1401, the stored data amount DA3 in the RB3 decreases at the third transfer rate $R_{EXT3}$. During the preload period $PR_T1$ of the extended extent T1 in the extended data specific section 1411, the extended extent T1 is not read from the RB3. Accordingly, in order to maintain the provision of data from the RB3 to the system target decoder until the periods PLJ and $PR_T1$ have elapsed, the lower limit $RB3_1$ on the stored data amount DA3 in the RB3 at the start of the read period $PR_{BLK}$ of data from the extent block is expressed in equation (29), using the number n of extent pairs D, B included in the extent block, the size $S_B$ of the base-view extents, the maximum jump time $T_{SJ}$ of the jump $J_{SJ}$ to skip reading of the dependent-view extents, the size $S_{T1}$ of the extended extent T1, and the maximum value of the third transfer rate $R_{EXT3}$, i.e. $R_{MAX3} = R_{TS3} \times 192/188$:

$$RB3_1 = \left\{ \left( T_{SJ} + \frac{S_B}{R_{UDEX}} \right) \times n + \frac{S_{T1}}{R_{UDEX}} \right\} \times R_{MAX3} \quad (29)$$
$$= \left\{ \left( T_{SJ} + \frac{S_B}{R_{UDEX}} \right) \times n + \frac{S_{T1}}{R_{UDEX}} \right\} \times R_{TS3} \times \frac{192}{188}.$$

As further shown in FIGS. 62B and 62C, during the read period $PR_B$ of data from the monoscopic video specific section 1412 and during the period PLJ of the long jump $J_{LJ}$ over the stereoscopic video specific section 1413 and the layer boundary LB, the stored data amount DA3 in the RB3 decreases at the third transfer rate $R_{EXT3}$. Furthermore, during the preload period $PR_T2$ of the extended extent T2 in the second shared section 1402 and during the period PSJ of the jump $J_{SJ}$ to skip reading of the immediately subsequent dependent-view extent D, the extended extent T2 is not read from the RB3. Accordingly, in order to maintain provision of data from the RB3 to the system target decoder until the periods $PR_B$, PLJ, $PR_T2$, and PSJ have elapsed, the lower limit $RB3_2$ on the stored data amount DA3 in the RB3 at the start of the long jump $J_{LJ}$ is expressed in equation (30), using the size $S_{BS}$ of the base-view extent in the monoscopic video specific section 1412, the maximum jump times $T_{LJ}$ and $T_{SJ}$ of the jumps $J_{LJ}$ and $J_{SJ}$, the size $S_{T2}$ of the extended extent T2, and the maximum value of the third transfer rate $R_{EXT3}$, i.e. $R_{MAX3}=R_{TS}3 \times 192/188$:

$$RB3_2 = \left( \frac{S_{B1}}{R_{UDEX}} + T_{LJ} + \frac{S_{T2}}{R_{UDEX}} + T_{SJ} \right) \times R_{MAX3} \quad (30)$$

$$= \left( \frac{S_{B1}}{R_{UDEX}} + T_{LJ} + \frac{S_{T2}}{R_{UDEX}} + T_{SJ} \right) \times R_{TS3} \times \frac{192}{188}.$$

The extended extent T1 read from the extended data specific section 1411 into the RB3 is not transmitted from the RB3 until reading of the extended extent T1 is complete. Accordingly, the lower limit $RB3_2$ on the stored data amount DA3 in the RB3 at the end of preloading of the extended extent T12 should be at least the maximum extent size $\max S_{T1}$ of the extended extent T1:

$$RB3_2 \geq \max S_{T1}. \quad (31)$$

The extended extent T2 read from the second shared section 1402 is not transferred from the RB3 until the jump period PSJ immediately subsequent to reading has elapsed. Accordingly, the lower limit $RB3_3$ of the stored data amount DA3 in the RB3 at the start of the jump period PSJ is expressed as the sum of the maximum extent size $\max S_{T2}$ of the extended extent T3 and the data amount $T_{SJ} \times R_{MAX3}$ provided from the RB3 to the system target decoder during the jump period PSJ:

$$RB3_3 = \max S_{T2} + T_{SJ} \times R_{MAX3} \quad (32)$$

$$= \max S_{T2} + T_{SJ} \times R_{TS3} \times \frac{192}{188}.$$

As a result, the capacity RB3 of the RB3 should be at least the maximum value among the lower limits $RB3_1$, $RB3_2$, and $RB3_3$ expressed in equations (29)-(32):

$$RB3 \geq \max \left( RB3_1, RB3_2, \max S_{T1}, \max S_{T2} + T_{SJ} \times R_{TS3} \times \frac{192}{188} \right).$$

When Arrangement 2 is Used Only Immediately Before a Layer Boundary LB

Figure 63:
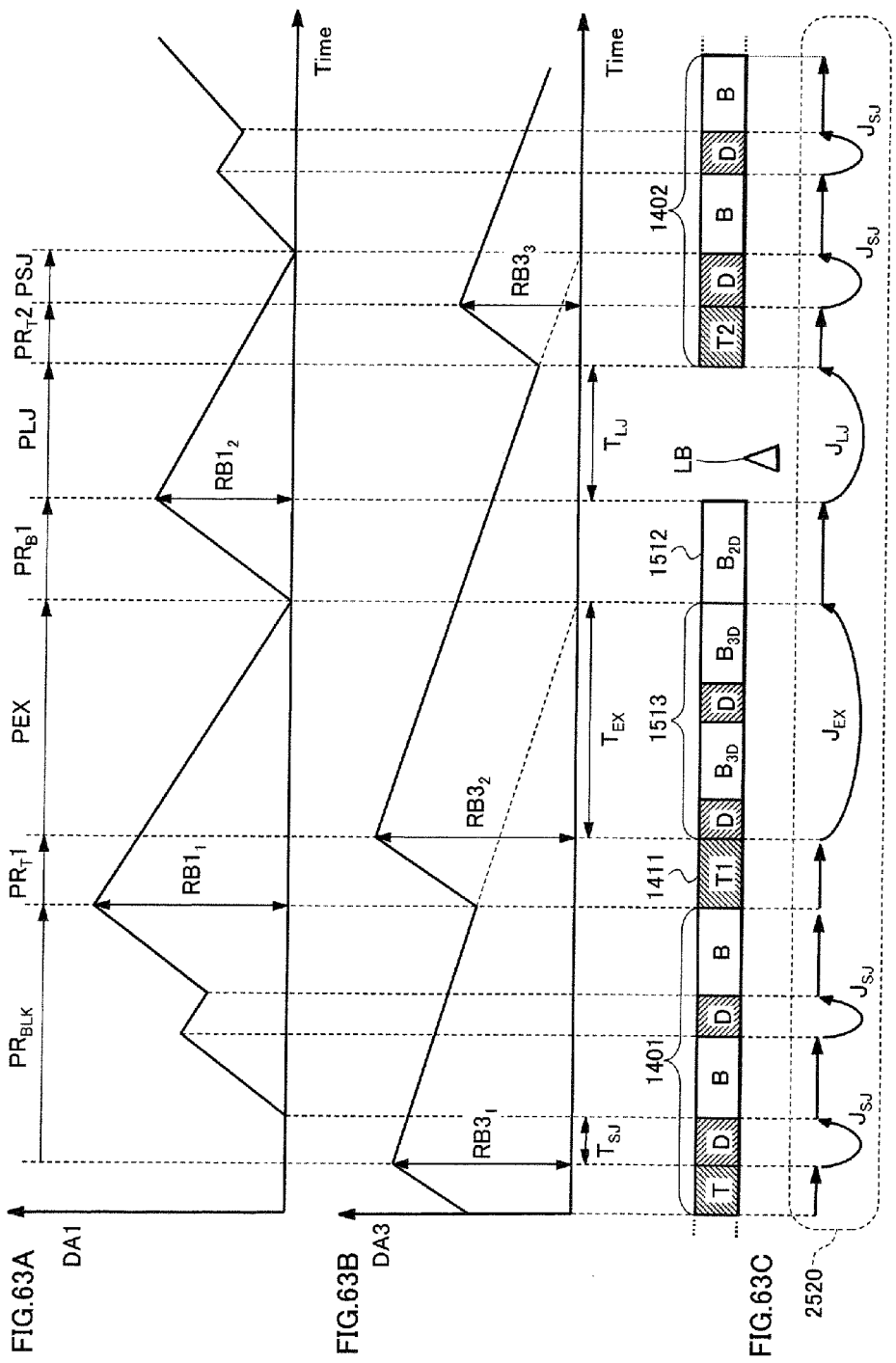
FIGS. 63A and 63B are graphs showing changes in data amounts stored in the RB1 and RB3 when a playback device in extended playback mode plays back video images seamlessly from extents when the locations of the monoscopic video specific section and the stereoscopic video specific section are reversed compared to those shown in FIG. 62C.
FIG. 63C is a schematic diagram showing the playback path in extended playback mode corresponding to the extents.
Figure 64:
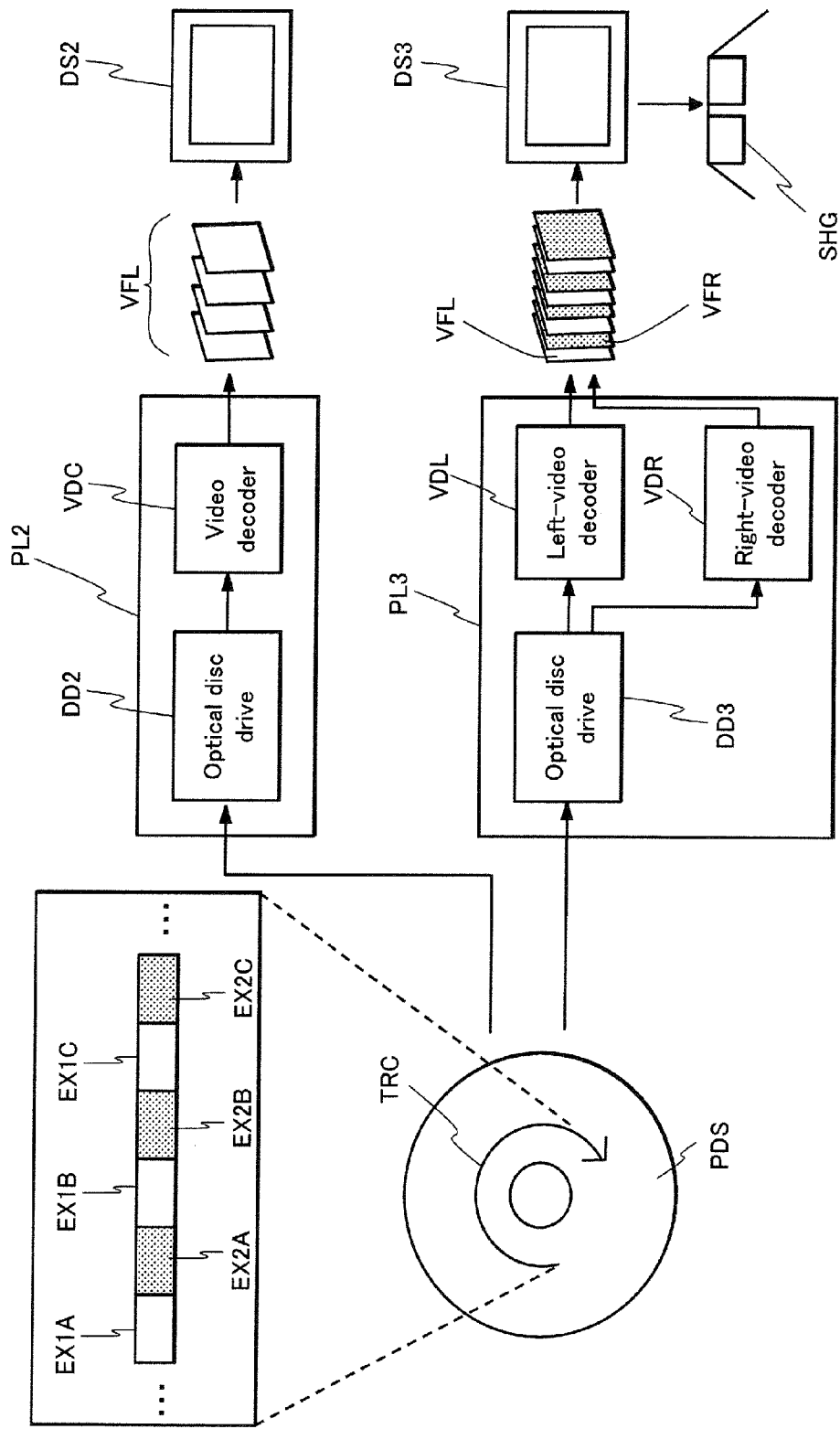
FIG. 64 is a schematic diagram showing technology for ensuring compatibility with 2D playback devices for an optical disc on which 3D video content is recorded.

FIG. 63C is a schematic diagram showing extents when the locations of monoscopic and stereoscopic video specific sections are reversed compared to those shown in FIG. 62C, as well as the playback path in extended playback mode corresponding to the extents. The extents and the playback path are equivalent to those for arrangement 2 shown in FIG. 15 after removal of the second extended data specific section 1421, the second monoscopic video specific section 1422, and the second stereoscopic video specific section 1523. FIGS. 63A and 63B are graphs showing changes in data amounts stored in the RB1 and RB3 when a playback device in extended playback mode plays back video images seamlessly from the extents shown in FIG. 63C.

As shown in FIGS. 63A and 63C, during the preload period $PR_T1$ for the extended extent T1 in the extended data specific section 1411, and during the period PEX for the jump $J_{EX}$ over the stereoscopic specific section 1513, the stored data amount DA1 in the RB1 decreases at the first transfer rate $R_{EXT1}$. Accordingly, to prevent the stored data amount DA1 in the RB1 from reaching zero by the end of the periods $PR_T1$ and PEX, the lower limit $RB1_1$ on the stored data amount DA1 in the RB1 at the end of the read period $PR_{BLK}$ of data from the first shared section 1401 is expressed in equation (33), using the maximum value of the first transfer rate $R_{EXT1}$, i.e. $R_{MAX1}=R_{TS1} \times 192/188$, the size $S_{T1}$ of the extended extent T1, and the maximum jump time $T_{EX}$ of the jump $J_{EX}$:

$$RB1_1 = \left( \frac{S_{T1}}{R_{UDEX}} + T_{EX} \right) \times R_{MAX1} \quad (33)$$

$$= \left( \frac{S_{T1}}{R_{UDEX}} + T_{EX} \right) \times R_{TS1} \times \frac{192}{188}.$$

As further shown in FIGS. 63A and 63C, during the period PLJ of the long jump $J_{LJ}$ over the layer boundary LB, during the preload period $PR_T2$ for the extended extent T2 in the second shared section 1402, and during the period PSJ of the jump $J_{SJ}$ to skip reading of the immediately subsequent dependent-view extent D, the stored data amount DA1 in the RB1 decreases at the first transfer rate $R_{EXT1}$. Accordingly, to prevent the stored data amount DA1 in the RB1 from reaching zero by the end of the periods PLJ, $PR_T2$, and PSJ, the lower limit $RB1_2$ on the stored data amount DA1 in the RB1 at the start of the long jump $J_{LJ}$ is expressed in equation (34), using the maximum value of the first transfer rate $R_{EXT1}$, i.e. $R_{MAX1}=R_{TS1} \times 192/188$, the maximum jump times $T_{LJ}$ and $T_{SJ}$ of the jumps $J_{LJ}$ and $J_{SJ}$, and the size $S_{T2}$ of the extended extent T2:

$$RB1_2 = \left( T_{LJ} + \frac{S_{T2}}{R_{UDEX}} + T_{SJ} \right) \times R_{MAX1} \quad (34)$$

$$= \left( T_{LJ} + \frac{S_{T2}}{R_{UDEX}} + T_{SJ} \right) \times R_{TS1} \times \frac{192}{188}.$$

As a result, the capacity RB1 of the RB1 should be at least the larger of the lower limits $RB1_1$ and $RB1_2$ expressed in equations (33) and (34):

$$RB1 \geq \max(RB1_1, RB1_2).$$

As shown in FIGS. 63B and 63C, during the read period $PR_{BLK}$ of data from the extent block located last in the first shared section 1401, the stored data amount DA3 in the RB3 decreases at the third transfer rate $R_{EXT3}$. During the preload period $PR_T1$ of the extended extent T1 in the extended data specific section 1411, and during the period PEX of the jump $J_{EX}$ over the stereoscopic video specific section 1513, the extended extent T1 is not read from the RB3. Accordingly, in order to maintain the provision of data from the RB3 to the system target decoder until the periods $PR_T1$ and PEX have elapsed, the lower limit $RB3_1$ on the stored data amount DA3 in the RB3 at the start of the read period $PR_{BLK}$ of data from the extent block is expressed in equation (35), using the number n of extent pairs D, B included in the extent block, the size $S_B$ of the base-view extents, the maximum jump time $T_{SJ}$ of the jump $J_{SJ}$ to skip reading of the dependent-view extents, the size $S_{T1}$ of the extended extent T1, the maximum jump time $T_{EX1}$ of the jump $J_{EX}$ over the stereoscopic video specific section 1513, and the maximum value of the third transfer rate $R_{EXT3}$, i.e. $R_{MAX3}=R_{TS3} \times 192/188$:

$$RB3_1 = \left\{ \left( T_{SJ} + \frac{S_B}{R_{UDEX}} \right) \times n + \frac{S_{T1}}{R_{UDEX}} + T_{EX} \right\} \times R_{MAX3} \quad (35)$$

$$= \left\{ \left( T_{SJ} + \frac{S_B}{R_{UDEX}} \right) \times n + \frac{S_{T1}}{R_{UDEX}} + T_{EX} \right\} \times R_{TS3} \times \frac{192}{188}.$$

As further shown in FIGS. 63B and 63C, during the jump period PEX over the stereoscopic video specific section 1513, during the read period $PR_B$ of data from the monoscopic video specific section 1512, and during the period PLJ of the long jump $J_{LJ}$ over the layer boundary LB, the stored data amount DA3 in the RB3 decreases at the third transfer rate $R_{EXT3}$. Furthermore, during the preload period $PR_T2$ of the extended extent T2 in the second shared section 1402 and during the period PSJ of the jump $J_{SJ}$ to skip reading of the immediately subsequent dependent-view extent D, the extended extent T2 is not read from the RB3. Accordingly, in order to maintain provision of data from the RB3 to the system target decoder until the periods PEX, $PR_B$, PLJ, $PR_T2$, and PSJ have elapsed, the lower limit $RB3_2$ on the stored data amount DA3 in the RB3 at the start of the jump $J_{Ex}$ is expressed in equation (36), using the size $S_{B1}$ of the base-view extent in the monoscopic video specific section 1512, the maximum jump times $T_{EX}$, $T_{LJ}$, and $T_{SJ}$ of the jumps $J_{EX}$, $J_{LJ}$, and $J_{SJ}$, the size $S_{T2}$ of the extended extent T2, and the maximum value of the third transfer rate $R_{EXT3}$, i.e. $R_{MAX3}=R_{TS3}\times192/188$:

$$RB3_2 = \left(T_{EX} + \frac{S_{B1}}{R_{UDEX}} + T_{LJ} + \frac{S_{T2}}{R_{UDEX}} + T_{SJ}\right) \times R_{MAX3} \quad (36)$$
$$= \left(T_{EX} + \frac{S_{B1}}{R_{UDEX}} + T_{LJ} + \frac{S_{T2}}{R_{UDEX}} + T_{SJ}\right) \times R_{TS3} \times \frac{192}{188}.$$

The extended extent T1 read from the extended data specific section 1411 is not transferred from the RB3 until the jump period PEX immediately subsequent to reading has elapsed. Accordingly, the lower limit $RB3_2$ of the stored data amount DA3 in the RB3 at the start of the jump period PEX should be at least the sum of the maximum extent size $\max S_{T1}$ of the extended extent T1 and the data amount $T_{EX}\times R_{MAX3}$ provided from the RB3 to the system target decoder during the jump period PEX:

$$RB3_2 \geq \max S_{T1} + T_{EX} \times R_{MAX3} \quad (37)$$
$$= \max S_{T1} + T_{EX} \times R_{TS3} \times \frac{192}{188}.$$

The extended extent T2 read from the second shared section 1402 is not transferred from the RB3 until the jump period PSJ immediately subsequent to reading has elapsed. Accordingly, the lower limit $RB3_3$ of the stored data amount DA3 in the RB3 at the start of the jump period PSJ must be the sum of the maximum extent size $\max S_{T2}$ of the extended extent T2 and the data amount $T_{SJ}\times R_{MAX3}$ provided from the RB3 to the system target decoder during the jump period PSJ:

$$RB3_3 = \max S_{T2} + T_{SJ} \times R_{MAX3} \quad (38)$$
$$= \max S_{T2} + T_{SJ} \times R_{TS3} \times \frac{192}{188}.$$

As a result, the capacity RB3 of the RB3 should be at least the maximum value among the lower limits $RB3_1$, $RB3_2$, and $RB3_3$ expressed in equations (35)-(38):

$$RB3 \geq \max\left(RB3_1, RB3_2, \right.$$
$$\left. \max S_{T1} + T_{EX} \times R_{TS3} \times \frac{192}{188}, \max S_{T2} + T_{SJ} \times R_{TS3} \times \frac{192}{188}\right).$$

Other Characterizations of the Present Invention

Based on the above embodiments, the present invention may be characterized as follows.

In a recording medium according to an aspect of the present invention, the monoscopic video specific section may be located immediately after the stereoscopic video specific section. In this case, the playback device in 3D playback mode can skip access to only the extended data specific section by performing a jump immediately after finishing reading of data from the shared section. Accordingly, the extent blocks arranged at the end of the shared section should include two or more extent pairs, like the other extent blocks.

In a recording medium according to an aspect of the present invention, a first combination of the stereoscopic video specific section, the monoscopic video specific section, and the extended data specific section may be located immediately before a location at which a long jump is necessary, and a second combination thereof may be immediately after the location. In this case, in the playback path in each mode, the start point and end point of the long jump may be designed to be in different positions. Accordingly, in the playback path in any mode, the distance of the long jump can reliably be kept within an acceptable range.

A recording device according to an aspect of the present invention is for recording a main-view stream, a sub-view stream, and an extended stream on a recording medium and comprises an encoding unit, a multiplexing unit, and a write unit. The encoding unit encodes main views of stereoscopic video images into a main-view video stream, sub-views of the stereoscopic video images into a sub-view video stream, and extended data to be used in combination with the main-view video stream. The multiplexing unit multiplexes the main-view video stream into the main-view stream, the sub-view video stream into the sub-view stream, and the extended data into the extended stream. The multiplexing unit also divides the main-view stream into a plurality of main-view extents, the sub-view stream into a plurality of sub-view extents, and the extended stream into a plurality of extended extents, and determines an arrangement of extents on the recording medium. The write unit writes the plurality of main-view extents, the plurality of sub-view extents, and the plurality of extended extents onto the recording medium in accordance with the arrangement of extents determined by the multiplexing unit. The multiplexing unit designs a shared section, a stereoscopic video specific section, a monoscopic video specific section, and an extended data specific section on the recording medium. The shared section includes a continuous, interleaved arrangement of extents having one each of the plurality of main-view extents, the plurality of sub-view extents, and the plurality of extended extents. The stereoscopic video specific section includes a continuous, interleaved arrangement of extents having one each of the plurality of main-view extents and the plurality of sub-view extents. The monoscopic video specific section is located adjacent to the stereoscopic video specific section and includes a continuous arrangement of a copy of the main-view extent arranged in the stereoscopic video specific section. The extended data specific section is located immediately before a continuous arrangement of the stereoscopic video specific section and the monoscopic video specific section and includes one of the plurality of extended extents that is to be used in combination with the copy of the main-view extent arranged in the monoscopic video specific section. The design of the shared, stereoscopic video specific, monoscopic video specific, and extended data specific sections causes a playback device to perform access as follows. First, the playback device is caused to access the shared section when playing back the stereoscopic video images, when playing back the main views as monoscopic video images, and when using the extended stream in combination with the main-view stream. Next, the playback device is caused to access the stereoscopic video specific section during playback of the stereoscopic video images, next to the shared section immediately before start of a long jump, or ahead of the shared section immediately after completion of a long jump. Furthermore, the playback device is caused to access the monoscopic video specific section during playback of the monoscopic video images, next to the shared section immediately before start of a long jump, or ahead of the shared section immediately after completion of a long jump. Finally, the playback device is caused to access the extended data specific section and the monoscopic video specific section when reading the extended stream along with the main-view stream, next to the shared section immediately before start of a long jump, or ahead of the shared section immediately after completion of a long jump.

A recording method according to an aspect of the present invention is for recording a main-view stream, a sub-view stream, and an extended stream on a recording medium and comprises the following steps. First, main views of stereoscopic video images are encoded into a main-view video stream, sub-views of the stereoscopic video images are encoded into a sub-view video stream, and extended data to be used in combination with the main-view video stream is encoded. Next, the main-view video stream is multiplexed into the main-view stream, the sub-view video stream into the sub-view stream, and the extended data into the extended stream. The main-view stream is then divided into a plurality of main-view extents, the sub-view stream into a plurality of sub-view extents, and the extended stream into a plurality of extended extents, and an arrangement of extents on the recording medium is determined. The plurality of main-view extents, the plurality of sub-view extents, and the plurality of extended extents are then written onto the recording medium in accordance with the determined arrangement of extents. In the step to determine the arrangement of extents, a shared section, a stereoscopic video specific section, a monoscopic video specific section, and an extended data specific section are designed on the recording medium. The shared section includes a continuous, interleaved arrangement of extents having one each of the plurality of main-view extents, the plurality of sub-view extents, and the plurality of extended extents. The stereoscopic video specific section includes a continuous, interleaved arrangement of extents having one each of the plurality of main-view extents and the plurality of sub-view extents. The monoscopic video specific section is located adjacent to the stereoscopic video specific section and includes a continuous arrangement of a copy of the main-view extent arranged in the stereoscopic video specific section. The extended data specific section is located immediately before a continuous arrangement of the stereoscopic video specific section and the monoscopic video specific section and includes one of the plurality of extended extents that is to be used in combination with the copy of the main-view extent arranged in the monoscopic video specific section. The design of the shared, stereoscopic video specific, monoscopic video specific, and extended data specific sections on the recording medium causes a playback device to perform access as follows. The playback device is caused to access the shared section when playing back the stereoscopic video images, when playing back the main views as monoscopic video images, and when using the extended stream in combination with the main-view stream. The playback device is caused to access the stereoscopic video specific section during playback of the stereoscopic video images, next to the shared section immediately before start of a long jump, or ahead of the shared section immediately after completion of a long jump. The playback device is caused to access the monoscopic video specific section during playback of the monoscopic video images, next to the shared section immediately before start of a long jump, or ahead of the shared section immediately after completion of a long jump. The playback device is caused to access the extended data specific section and the monoscopic video specific section when reading the extended stream along with the main-view stream, next to the shared section immediately before start of a long jump, or ahead of the shared section immediately after completion of a long jump.

When reading data recorded on a recording medium by the recording device and the method according to the above aspect of the present invention, a playback device accesses different areas immediately before and immediately after performing a long jump during playback of the stereoscopic video images, playback of the monoscopic video images, and use of the extended stream in combination with the main-view stream. Therefore, the above recording device and method may set the conditions to be satisfied by the size of extents in order to prevent buffer underflow during the long jump separately for each area. This technology therefore makes seamless playback of both stereoscopic video images and monoscopic video images compatible with a further reduction in the buffer capacity within the playback device. Furthermore, the same monoscopic video specific section is accessed both during playback of the monoscopic video images and during use of the extended stream in combination with the main-view stream. As a result, the data amount of the main-view extents to be redundantly recorded on one recording medium is reduced to a minimum. Accordingly, during playback of stereoscopic video images, playback of monoscopic video images, and use of the extended stream in combination with the main-view stream, the distance of the long jump can be kept within an acceptable range. The above recording device and method can thus record a combination of 3D video content and extended data on a recording medium so as to allow the playback device to maintain good playback performance.

INDUSTRIAL APPLICABILITY

The present invention relates to a technology for recording and playback of stereoscopic video images, and as described above, arranges three types of sections immediately before or immediately after locations on a recording medium where a long jump is necessary. The present invention thus clearly has industrial applicability.

REFERENCE SIGNS LIST

1401 first shared section
1411 first extended data specific section
1412 first monoscopic video specific section
1413 first stereoscopic video specific section
1402 second shared section
1421 second extended data specific section
1422 second monoscopic video specific section
1423 second stereoscopic video specific section
L0 first recording layer
L1 second recording layer
LB layer boundary
T extended extent
D dependent-view extent B base-view extent
B$_{2D}$ 2D-playback-only block
B$_{3D}$ 3D-playback-only block
EXT2D[m] Extent in file 2D
EXTSS[m] Extent in file SS
EXT3[m] Extent in extended stream file
J$_{LY}$ long jump
J$_{2D}$ jump in 2D playback mode
J$_{3D}$ jump in 3D playback mode
J$_{EX}$ jump in extended playback mode

The invention claimed is:

1. A non-transitory recording medium including a main-view stream, a sub-view stream, and an extended stream recorded thereon, the main-view stream representing main views of stereoscopic video images, the sub-view stream representing sub-views of the stereoscopic video images, and the extended stream to be used in combination with the main-view stream,
the main-view stream including a plurality of main-view extents, the sub-view stream including a plurality of sub-view extents, and the extended stream including a plurality of extended extents,
the non-transitory recording medium comprising:
a shared section including a continuous, interleaved arrangement of extents having one each of the plurality of main-view extents, the plurality of sub-view extents, and the plurality of extended extents;
a stereoscopic video specific section including a continuous, interleaved arrangement of extents having one each of the plurality of main-view extents and the plurality of sub-view extents;
a monoscopic video specific section located adjacent to the stereoscopic video specific section and including a continuous arrangement of a copy of the main-view extent arranged in the stereoscopic video specific section; and
an extended data specific section located immediately before a continuous arrangement of the stereoscopic video specific section and the monoscopic video specific section and including one of the plurality of extended extents that is to be used in combination with the copy of the main-view extent arranged in the monoscopic video specific section,
the shared section being accessed when the stereoscopic video images are played back, when the main views are played back as monoscopic video images, and when the extended stream is used in combination with the main-view stream,
the stereoscopic video specific section being accessed during playback of the stereoscopic video images, next to the shared section immediately before start of a long jump, or ahead of the shared section immediately after completion of a long jump,
the monoscopic video specific section being accessed during playback of the monoscopic video images, next to the shared section immediately before start of a long jump, or ahead of the shared section immediately after completion of a long jump, and
the extended data specific section and the monoscopic video specific section being accessed when the extended stream is read along with the main-view stream, next to the shared section immediately before start of a long jump, or ahead of the shared section immediately after completion of a long jump.

2. The non-transitory recording medium of claim 1, wherein
the monoscopic video specific section is located immediately after the stereoscopic video specific section.

3. The non-transitory recording medium of claim 1, wherein
a first combination of the stereoscopic video specific section, the monoscopic video specific section, and the extended data specific section is located immediately before a location at which a long jump is necessary, and a second combination thereof is immediately after the location.

4. A playback device for reading a main-view stream, a sub-view stream, and an extended stream from a recording medium, the main-view stream representing main views of stereoscopic video images, the sub-view stream representing sub-views of the stereoscopic video images, and for playing back the stereoscopic video images, playing back the main views as monoscopic video images, and using the extended stream in combination with the main-view stream,
the main-view stream including a plurality of main-view extents, the sub-view stream including a plurality of sub-view extents, and the extended stream including a plurality of extended extents,
the recording medium comprising:
a shared section including a continuous, interleaved arrangement of extents having one each of the plurality of main-view extents, the plurality of sub-view extents, and the plurality of extended extents;
a stereoscopic video specific section including a continuous, interleaved arrangement of extents having one each of the plurality of main-view extents and the plurality of sub-view extents;
a monoscopic video specific section located adjacent to the stereoscopic video specific section and including a continuous arrangement of a copy of the main-view extent arranged in the stereoscopic video specific section; and
an extended data specific section located immediately before a continuous arrangement of the stereoscopic video specific section and the monoscopic video specific section and including one of the plurality of extended extents that is to be used in combination with the copy of the main-view extent arranged in the monoscopic video specific section,
the playback device comprising:
a read unit configured to read data from the recording medium;
a switching unit configured to extract the main-view stream, the sub-view stream, and the extended stream from the data read by the read unit;
a first read buffer for storing the main-view stream extracted by the switching unit;
a second read buffer for storing the sub-view stream extracted by the switching unit;
a third read buffer for storing the extended stream extracted by the switching unit; and
a decoding unit configured to read and decode the main-view stream from the first read buffer, the sub-view stream from the second read buffer, and the extended stream from the third read buffer,
the read unit
accessing the shared section when the stereoscopic video images are played back, when the main views are played back as monoscopic video images, and when the extended stream is used in combination with the main-view stream,
accessing the stereoscopic video specific section during playback of the stereoscopic video images, next to the shared section immediately before performing a long jump, or ahead of the shared section immediately after performing a long jump, accessing the monoscopic video specific section during playback of the monoscopic video images, next to the shared section immediately before performing a long jump, or ahead of the shared section immediately after performing a long jump, and accessing the extended data specific section and the monoscopic video specific section when reading the extended stream along with the main-view stream, immediately before performing a long jump, or ahead of the shared section immediately after performing a long jump.

5. A recording device for recording a main-view stream, a sub-view stream, and an extended stream on a recording medium, the recording device comprising:

an encoding unit configured to encode main views of stereoscopic video images into a main-view video stream, sub-views of the stereoscopic video images into a sub-view video stream, and extended data to be used in combination with the main-view video stream;

a multiplexing unit configured to multiplex the main-view video stream into the main-view stream, the sub-view video stream into the sub-view stream, and the extended data into the extended stream, and to divide the main-view stream into a plurality of main-view extents, the sub-view stream into a plurality of sub-view extents, and the extended stream into a plurality of extended extents, and to determine an arrangement of extents on the recording medium; and a write unit configured to write the plurality of main-view extents, the plurality of sub-view extents, and the plurality of extended extents onto the recording medium in accordance with the arrangement of extents determined by the multiplexing unit, the multiplexing unit configured to design a shared section, a stereoscopic video specific section, a monoscopic video specific section, and an extended data specific section on the recording medium, a shared section including a continuous, interleaved arrangement of extents having one each of the plurality of main-view extents, the plurality of sub-view extents, and the plurality of extended extents;

a stereoscopic video specific section including a continuous, interleaved arrangement of extents having one each of the plurality of main-view extents and the plurality of sub-view extents;

a monoscopic video specific section located adjacent to the stereoscopic video specific section and including a continuous arrangement of a copy of the main-view extent arranged in the stereoscopic video specific section; and an extended data specific section located immediately before a continuous arrangement of the stereoscopic video specific section and the monoscopic video specific section and including one of the plurality of extended extents that is to be used in combination with the copy of the main-view extent arranged in the monoscopic video specific section, so that the design of the shared, stereoscopic video specific, monoscopic video specific, and extended data specific sections causes a playback device:

to access the shared section when playing back the stereoscopic video images, when playing back the main views as monoscopic video images, and when using the extended stream in combination with the main-view stream;

to access the stereoscopic video specific section during playback of the stereoscopic video images, next to the shared section immediately before start of a long jump, or ahead of the shared section immediately after completion of a long jump;

to access the monoscopic video specific section during playback of the monoscopic video images, next to the shared section immediately before start of a long jump, or ahead of the shared section immediately after completion of a long jump; and to access the extended data specific section and the monoscopic video specific section when reading the extended stream along with the main-view stream, next to the shared section immediately before start of a long jump, or ahead of the shared section immediately after completion of a long jump.

6. A method for recording a main-view stream, a sub-view stream, and an extended stream on a recording medium, the method comprising the steps of:

encoding main views of stereoscopic video images into a main-view video stream, sub-views of the stereoscopic video images into a sub-view video stream, and extended data to be used in combination with the main-view video stream;

multiplexing the main-view video stream into the main-view stream, the sub-view video stream into the sub-view stream, and the extended data into the extended stream;

dividing the main-view stream into a plurality of main-view extents, the sub-view stream into a plurality of sub-view extents, and the extended stream into a plurality of extended extents, and determining an arrangement of extents on the recording medium; and writing the plurality of main-view extents, the plurality of sub-view extents, and the plurality of extened extents onto the the recording medium in accordance with the arrangement of extents determined, the arrangement of extents determined including a shared section, a steroscopic video specific section, a monoscopic video specific section, and an extended data specific section:

a shared section including a continuous, interleaved arrangement of extents having one each of the plurality of main-view extends, the plurality of sub-view extents, and the plurality of extended extents;

a stereoscopic video specfic section including a contiuous, interleaved arrangement of extents having one each of the plurality of main-view extents and the plurality of sub-view extents;

a monoscopic video specific section located adjacent to the stereoscopic video specific section and including a continuous arrangement of a copy of the main-view extent arranged in the steroscopic video specific section; and an extended data specific section located immediately before a continuous arrangement of the stereoscopic video specific section and the monoscopic video specific section and including one of the plurality of extended extents that is to be used in combination with the copy of the main-view extent arranged in the monoscopic video specific section, so that the design of the shared, stereoscopic video specific, monoscopic video specific, and extended data specific sections causes a playback device:

to access the shared section when playing back the stereoscopic video images, when playing back the main views as monoscopic video images, and when using the extended stream in combination with the main-view stream;

to access the stereoscopic video specific section during playback of the stereoscopic video images, next to the shared section immediately before start of a long jump, or ahead of the shared section immediately after completion of a long jump;

to access the monoscopic video specific section during playback of the monoscopic video images, next to the shared section immediately before start of a long jump, or ahead of the shared section immediately after completion of a long jump; and to access the extended data specific section and the monoscopic video specific section when reading the extended stream along with the main-view stream, next to the shared section immediately before start of a long jump, or ahead of the shared section immediately after completion of a long jump.

* * * * *